US012617488B2

(12) United States Patent
Zawistowski

(10) Patent No.: US 12,617,488 B2
(45) Date of Patent: May 5, 2026

(54) TWO-WHEELED VEHICLE WITH CONFIGURABLE IDLER

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

( * ) Notice: Subject to any disclaimer, the term of this patent is extended or adjusted under 35 U.S.C. 154(b) by 895 days.

(21) Appl. No.: 17/931,046

(22) Filed: Sep. 9, 2022

(65) Prior Publication Data

US 2023/0070334 A1      Mar. 9, 2023

Related U.S. Application Data

(60) Provisional application No. 63/242,211, filed on Sep. 9, 2021.

(51) Int. Cl.
| | |
|---|---|
| *B62K 25/28* | (2006.01) |
| *B62K 19/30* | (2006.01) |
| *B62M 9/16* | (2006.01) |

(52) U.S. Cl.
CPC ............ *B62K 25/286* (2013.01); *B62K 19/30* (2013.01); *B62M 9/16* (2013.01)

(58) Field of Classification Search
CPC ...... B62K 25/286; B62K 19/30; B62K 25/06; B62K 25/10; B62K 25/26; B62K 25/30; B62M 9/16
USPC ........................................................ 280/284
See application file for complete search history.

(56) References Cited

U.S. PATENT DOCUMENTS

| | | | |
|---|---|---|---|
| 421,748 | A | 2/1890 | McErlain |
| 519,855 | A | 5/1894 | Whitaker |
| 591,306 | A | 10/1897 | Tolson |
| 630,232 | A | 8/1899 | Hughes et al. |
| 712,784 | A | 11/1902 | Ellis |

(Continued)

FOREIGN PATENT DOCUMENTS

| | | |
|---|---|---|
| CA | 2293366 A1 | 12/1998 |
| CA | 2980086 A1 | 6/2005 |

(Continued)

OTHER PUBLICATIONS

Nicolai Maschinenbau, "History of Nicolai," Gesellschaft für Zweirad und Maschinenbau mbh, at least as early as 1995, 3 pages.

(Continued)

*Primary Examiner* — Valentin Neacsu
*Assistant Examiner* — Morgan Knauf
(74) *Attorney, Agent, or Firm* — Dorsey & Whitney LLP

(57) ABSTRACT

An idler for a two-wheeled vehicle is disclosed. In one embodiment the idler includes a cog configured to rotate about an idler axis; a bearing received in the cog; an idler mount coupled to a suspended body of the two-wheeled vehicle, the idler mount including: a body, an aperture formed in the body, and a flange extending from the body around the aperture. The bearing is received on an outer surface of the flange, the idler axis and a link body pivot axis of a suspension of the two-wheeled vehicle are located within the aperture, and the idler axis and the link body pivot axis are separated from one another by an offset amount.

18 Claims, 111 Drawing Sheets

(56)  References Cited

U.S. PATENT DOCUMENTS

| | | | |
|---|---|---|---|
| 724,871 | A | 4/1903 | Hunter |
| 944,795 | A | 12/1909 | Leet et al. |
| 1,043,269 | A | 11/1912 | Stephenson |
| 1,068,583 | A | 7/1913 | Harley |
| 1,168,702 | A | 1/1916 | Babis, Jr. |
| 1,220,606 | A | 3/1917 | Chelstrom |
| 1,261,440 | A | 4/1918 | Rigby |
| 1,283,030 | A | 10/1918 | Ashton |
| 1,369,356 | A | 2/1921 | Rigby |
| 2,173,520 | A | 9/1939 | Klatt |
| 3,803,933 | A | 4/1974 | Huret et al. |
| 3,813,955 | A | 6/1974 | Huret et al. |
| 3,847,028 | A | 11/1974 | Bergles |
| 3,917,313 | A | 11/1975 | Smith et al. |
| 3,977,697 | A | 8/1976 | MacPike et al. |
| 4,058,181 | A | 11/1977 | Buell |
| 4,076,271 | A | 2/1978 | Doncque |
| 4,114,918 | A | 9/1978 | Lutz |
| 4,241,617 | A | 12/1980 | Fujimoto et al. |
| 4,265,329 | A | 5/1981 | de Cortanze |
| 4,279,172 | A | 7/1981 | Nagano et al. |
| 4,322,088 | A | 3/1982 | Miyakoshi et al. |
| 4,360,214 | A | 11/1982 | Isono |
| 4,408,674 | A | 10/1983 | Boyesen |
| 4,410,196 | A | 10/1983 | Ribi |
| 4,415,057 | A | 11/1983 | Yamaguchi |
| 4,429,760 | A | 2/1984 | Koizumi et al. |
| 4,433,747 | A | 2/1984 | Offenstadt |
| 4,463,824 | A | 8/1984 | Boyesen |
| 4,463,964 | A | 8/1984 | Takayanagi et al. |
| 4,485,885 | A | 12/1984 | Fukuchi |
| 4,500,302 | A | 2/1985 | Crepin |
| 4,506,755 | A | 3/1985 | Tsuchida et al. |
| 4,540,193 | A | 9/1985 | Noda et al. |
| 4,544,044 | A | 10/1985 | Boyesen |
| RE32,059 | E | 12/1985 | Nagano |
| 4,558,761 | A | 12/1985 | Boyesen |
| 4,561,519 | A | 12/1985 | Omori |
| 4,574,909 | A | 3/1986 | Ribi |
| 4,582,343 | A | 4/1986 | Waugh |
| 4,586,913 | A | 5/1986 | Nagano |
| 4,596,302 | A | 6/1986 | Suzuki et al. |
| 4,619,633 | A | 10/1986 | Nagano |
| 4,621,706 | A | 11/1986 | Boyesen |
| 4,671,525 | A | 6/1987 | Ribi |
| 4,673,053 | A | 6/1987 | Tanaka et al. |
| 4,679,811 | A | 7/1987 | Shuler |
| 4,702,338 | A | 10/1987 | Trema |
| 4,735,277 | A | 4/1988 | Prince |
| 4,744,434 | A | 5/1988 | Miyakoshi et al. |
| 4,789,042 | A | 12/1988 | Pitts |
| 4,789,174 | A | 12/1988 | Lawwill |
| RE32,924 | E | 5/1989 | Nagano |
| 4,830,391 | A | 5/1989 | Silk |
| 4,878,884 | A | 11/1989 | Romano |
| 4,951,791 | A | 8/1990 | Creixell |
| 5,011,459 | A | 4/1991 | Van De Vel |
| 5,121,937 | A | 6/1992 | Lawwill |
| 5,205,572 | A | 4/1993 | Buell et al. |
| 5,226,674 | A | 7/1993 | Buell et al. |
| 5,244,224 | A | 9/1993 | Busby |
| 5,259,637 | A | 11/1993 | Busby |
| 5,282,517 | A | 2/1994 | Prince |
| 5,295,702 | A | 3/1994 | Buell |
| 5,299,820 | A | 4/1994 | Lawwill |
| 5,306,036 | A | 4/1994 | Busby |
| 5,332,246 | A | 7/1994 | Buell |
| 5,335,929 | A | 8/1994 | Takagaki et al. |
| 5,354,085 | A | 10/1994 | Gally |
| 5,356,165 | A | 10/1994 | Kulhawik et al. |
| 5,360,078 | A | 11/1994 | Rifenburg et al. |
| 5,370,411 | A | 12/1994 | Takamiya et al. |
| 5,380,253 | A * | 1/1995 | Iwasaki .................. B62M 9/126 474/80 |
| 5,409,248 | A | 4/1995 | Williams |
| 5,409,249 | A | 4/1995 | Busby |
| 5,417,445 | A | 5/1995 | Smart |
| 5,429,380 | A | 7/1995 | Lawwill |
| 5,435,584 | A | 7/1995 | Buell |
| 5,441,292 | A | 8/1995 | Busby |
| 5,452,910 | A | 9/1995 | Harris |
| 5,474,318 | A | 12/1995 | Castellano |
| 5,498,013 | A | 3/1996 | Hwang |
| 5,509,679 | A | 4/1996 | Leitner |
| 5,553,881 | A | 9/1996 | Klassen et al. |
| 5,570,896 | A | 11/1996 | Collins |
| 5,597,366 | A | 1/1997 | Ozaki |
| 5,607,367 | A | 3/1997 | Patterson |
| 5,611,557 | A | 3/1997 | Farris et al. |
| 5,628,524 | A | 5/1997 | Klassen et al. |
| 5,658,001 | A | 8/1997 | Blanchard |
| 5,678,837 | A | 10/1997 | Leitner |
| 5,688,200 | A | 11/1997 | White |
| 5,772,228 | A | 6/1998 | Owyang |
| 5,791,674 | A | 8/1998 | D'Aluisio et al. |
| 5,816,966 | A | 10/1998 | Yang et al. |
| 5,826,899 | A | 10/1998 | Klein et al. |
| 5,899,480 | A | 5/1999 | Leitner |
| 5,901,974 | A | 5/1999 | Busby et al. |
| 5,957,473 | A | 9/1999 | Lawwill |
| 6,012,999 | A | 1/2000 | Patterson |
| 6,076,845 | A | 6/2000 | Lawwill et al. |
| 6,086,080 | A | 7/2000 | Scheffer |
| 6,102,421 | A | 8/2000 | Lawwill et al. |
| 6,131,934 | A | 10/2000 | Sinclair |
| 6,206,397 | B1 | 3/2001 | Klassen et al. |
| 6,244,610 | B1 | 6/2001 | Kramer-Massow |
| 6,406,048 | B1 | 6/2002 | Castellano |
| 6,439,593 | B1 | 8/2002 | Tseng |
| 6,450,520 | B1 | 9/2002 | Girard |
| 6,488,301 | B2 | 12/2002 | Klassen et al. |
| 6,543,799 | B2 | 4/2003 | Miyoshi |
| 6,629,903 | B1 | 10/2003 | Kondo |
| 6,712,374 | B2 | 3/2004 | Assier |
| 6,793,230 | B1 | 9/2004 | Cheng |
| 6,843,494 | B2 | 1/2005 | Lam |
| 6,845,998 | B2 | 1/2005 | Probst |
| 6,871,867 | B2 | 3/2005 | Parigian |
| 6,877,591 | B1 | 4/2005 | Hso |
| 6,886,846 | B2 | 5/2005 | Carroll |
| 6,902,504 | B2 | 6/2005 | Fukuda |
| 6,926,298 | B2 | 8/2005 | Ellsworth et al. |
| 6,955,373 | B2 | 10/2005 | Chang |
| 6,969,081 | B2 | 11/2005 | Whyte |
| 7,025,698 | B2 | 4/2006 | Wickliffe |
| 7,048,292 | B2 | 5/2006 | Weagle |
| 7,066,481 | B1 | 6/2006 | Soucek |
| RE39,159 | E | 7/2006 | Klassen et al. |
| 7,100,930 | B2 | 9/2006 | Saiki |
| 7,104,908 | B2 | 9/2006 | Nagano |
| 7,128,329 | B2 | 10/2006 | Weagle |
| 7,131,511 | B2 | 11/2006 | Arnold |
| 7,210,695 | B2 | 5/2007 | Griffiths |
| 7,216,883 | B2 | 5/2007 | Oconnor |
| 7,350,797 | B2 | 4/2008 | Carroll |
| 7,377,535 | B2 | 5/2008 | Chamberlain |
| 7,392,999 | B2 | 7/2008 | Oconnor |
| 7,395,892 | B2 | 7/2008 | Alonzo |
| 7,413,208 | B2 | 8/2008 | Weng |
| 7,427,077 | B2 | 9/2008 | Lesage et al. |
| 7,467,803 | B2 | 12/2008 | Buckley |
| 7,494,146 | B2 | 2/2009 | Tseng |
| 7,581,743 | B2 | 9/2009 | Graney |
| 7,635,141 | B2 | 12/2009 | Oconnor |
| 7,658,394 | B1 | 2/2010 | Huang |
| 7,677,347 | B2 | 3/2010 | Brawn |
| 7,703,785 | B2 | 4/2010 | Colegrove et al. |
| 7,703,788 | B2 | 4/2010 | Tanouye et al. |
| 7,712,757 | B2 | 5/2010 | Berthold |
| 7,717,212 | B2 | 5/2010 | Weagle |
| 7,722,072 | B2 | 5/2010 | Hoogendoorn |
| 7,722,488 | B2 | 5/2010 | Kunisawa et al. |
| 7,766,135 | B2 | 8/2010 | Fox |
| 7,784,810 | B2 | 8/2010 | Graney |

(56) References Cited

U.S. PATENT DOCUMENTS

| | | |
|---|---|---|
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,168,977 B2 | 10/2015 | Mcleay |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy et al. |
| 9,598,140 B2 | 3/2017 | Berthold |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,919,765 B2 | 3/2018 | Wickliffe et al. |
| 9,988,122 B2 | 6/2018 | Pedretti |
| 10,011,318 B2 | 7/2018 | Beale |
| 10,160,512 B2 | 12/2018 | Beale |
| 10,336,398 B2 | 7/2019 | Hudec |
| 10,343,742 B2 | 7/2019 | Zawistowski |
| 10,363,988 B2 | 7/2019 | Buckley |
| 10,737,742 B2 | 8/2020 | Soncrant |
| 2001/0024024 A1 | 9/2001 | Klassen et al. |
| 2003/0038450 A1 | 2/2003 | Lam |
| 2003/0090082 A1 | 5/2003 | Ellsworth et al. |
| 2003/0160421 A1 | 8/2003 | Assier |
| 2003/0193163 A1 | 10/2003 | Chamberlain et al. |
| 2003/0193164 A1 | 10/2003 | Parigian |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0022428 A1 | 2/2006 | Whyte |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0261556 A1 | 10/2009 | Beale et al. |
| 2009/0261557 A1 | 10/2009 | Beale et al. |
| 2009/0278331 A1 | 11/2009 | Graney |
| 2009/0283986 A1 | 11/2009 | Falke |
| 2009/0322055 A1 | 12/2009 | Arraiz |
| 2010/0059965 A1 | 3/2010 | Earle |
| 2010/0102531 A1 | 4/2010 | Graney et al. |
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0115181 A1 | 5/2011 | Weagle |
| 2011/0140387 A1 | 6/2011 | Andal et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |

(56) References Cited

U.S. PATENT DOCUMENTS

| | | | |
|---|---|---|---|
| 2013/0001918 A1 | 1/2013 | Graney et al. | |
| 2013/0001919 A1 | 1/2013 | Graney et al. | |
| 2013/0093160 A1 | 4/2013 | Alsop | |
| 2013/0096781 A1 | 4/2013 | Reichenbach et al. | |
| 2013/0214503 A1 | 8/2013 | Chiuppani | |
| 2013/0249181 A1 | 9/2013 | Becker et al. | |
| 2013/0249188 A1 | 9/2013 | Beale | |
| 2013/0285346 A1 | 10/2013 | Wimmer | |
| 2014/0001729 A1 | 1/2014 | Hudec | |
| 2014/0015220 A1 | 1/2014 | Talavasek | |
| 2014/0042726 A1 | 2/2014 | Canfield et al. | |
| 2014/0060950 A1 | 3/2014 | Beutner | |
| 2014/0109728 A1 | 4/2014 | Mcrorie | |
| 2014/0167385 A1 | 6/2014 | Gogo et al. | |
| 2014/0217697 A1 | 8/2014 | Buckley | |
| 2014/0318306 A1 | 10/2014 | Tetsuka | |
| 2015/0001829 A1 | 1/2015 | Berthold | |
| 2015/0035241 A1* | 2/2015 | McLeay | B62K 25/28 |
| | | | 280/5.513 |
| 2015/0054250 A1 | 2/2015 | Hu | |
| 2015/0115569 A1 | 4/2015 | Matheson et al. | |
| 2015/0175238 A1 | 6/2015 | Lumpkin | |
| 2015/0183487 A1 | 7/2015 | Tsai | |
| 2015/0191213 A1 | 7/2015 | Beale | |
| 2015/0251724 A1 | 9/2015 | Hudec | |
| 2015/0360743 A1 | 12/2015 | Oconnor | |
| 2016/0083042 A1 | 3/2016 | Voss | |
| 2016/0272273 A1 | 9/2016 | Colegrove et al. | |
| 2016/0280317 A1 | 9/2016 | Hoogendoorn | |
| 2016/0311493 A1 | 10/2016 | Scheffer | |
| 2016/0318582 A1 | 11/2016 | Johnson et al. | |
| 2017/0151996 A1 | 6/2017 | Southall | |
| 2018/0037295 A1 | 2/2018 | Beale | |
| 2018/0072379 A1 | 3/2018 | Talavasek et al. | |
| 2018/0140387 A1 | 5/2018 | Richard | |
| 2018/0148123 A1 | 5/2018 | Neilson | |
| 2018/0229798 A1 | 8/2018 | Hoogendoorn et al. | |
| 2018/0265165 A1 | 9/2018 | Zawistowski | |
| 2018/0297661 A1 | 10/2018 | Beale | |
| 2019/0039682 A1 | 2/2019 | Zawistowski | |
| 2019/0144069 A1 | 5/2019 | Beale | |
| 2019/0300096 A1 | 10/2019 | Chamberlain et al. | |
| 2019/0300097 A1 | 10/2019 | Chamberlain et al. | |
| 2020/0031428 A1* | 1/2020 | Lund | B62K 25/283 |
| 2020/0070930 A1 | 3/2020 | Buckley | |
| 2021/0046996 A1 | 2/2021 | Beale | |
| 2021/0269117 A1* | 9/2021 | Zawistowski | B62M 6/40 |

FOREIGN PATENT DOCUMENTS

| | | | | | |
|---|---|---|---|---|---|
| CN | 109436179 A | * | 3/2019 | | B62M 9/126 |
| DE | 692011 C | | 6/1940 | | |
| DE | 9405076 U1 | | 5/1994 | | |
| DE | 9416803 U1 | | 12/1994 | | |
| DE | 4435482 A1 | | 4/1996 | | |
| DE | 20112448 U1 | | 10/2001 | | |
| DE | 102004059187 A1 | | 6/2006 | | |
| DE | 102019002456 A1 | | 10/2019 | | |
| DE | 102021104753 A1 | | 9/2021 | | |
| EP | 0422324 A1 | | 4/1991 | | |
| EP | 0723907 B1 | | 7/1998 | | |
| EP | 0941917 A2 | | 9/1999 | | |
| EP | 1060979 A2 | | 12/2000 | | |
| EP | 1238900 A2 | | 9/2002 | | |
| EP | 2540609 A1 | | 1/2013 | | |
| EP | 1799534 B1 | | 8/2014 | | |
| EP | 2812234 A1 | | 12/2014 | | |
| FR | 541520 A | | 7/1922 | | |
| FR | 933079 A | | 4/1948 | | |
| FR | 2774966 A1 | | 8/1999 | | |
| GB | 17336 | | 10/1913 | | |
| GB | 2522461 A | | 7/2015 | | |
| GB | 2525870 B | | 1/2017 | | |
| GB | 2590808 B | | 7/2022 | | |
| GB | 2594780 B | | 7/2022 | | |
| GB | 2605244 A | | 9/2022 | | |
| GE | 2338216 A | | 12/1999 | | |
| JP | H0725378 A | | 1/1995 | | |
| NL | 2027223 B1 | | 2/2022 | | |
| WO | 9422710 A1 | | 10/1994 | | |
| WO | 9803390 A1 | | 1/1998 | | |
| WO | 9818671 A1 | | 5/1998 | | |
| WO | 9856645 A1 | | 12/1998 | | |
| WO | 199944880 | | 9/1999 | | |
| WO | 9965760 A1 | | 12/1999 | | |
| WO | 9944880 A9 | | 1/2000 | | |
| WO | 03010042 A1 | | 2/2003 | | |
| WO | 03018392 A1 | | 3/2003 | | |
| WO | 03021129 A1 | | 3/2003 | | |
| WO | 2004045940 A2 | | 6/2004 | | |
| WO | 2005030564 A2 | | 4/2005 | | |
| WO | 2005030565 A1 | | 4/2005 | | |
| WO | 2005090149 A1 | | 9/2005 | | |
| WO | 2006005687 A1 | | 1/2006 | | |
| WO | 2006032052 A2 | | 3/2006 | | |
| WO | 2006061052 A1 | | 6/2006 | | |
| WO | 2008025950 A1 | | 3/2008 | | |
| WO | 2008130336 A1 | | 10/2008 | | |
| WO | 2009121936 A1 | | 10/2009 | | |
| WO | 2010033174 A1 | | 3/2010 | | |
| WO | 2010103057 A1 | | 9/2010 | | |
| WO | 2010121267 A1 | | 10/2010 | | |
| WO | 2012024697 A1 | | 2/2012 | | |
| WO | 2012027900 A1 | | 3/2012 | | |
| WO | 2012063098 A1 | | 5/2012 | | |
| WO | 2012122634 A1 | | 9/2012 | | |
| WO | 2013028138 A2 | | 2/2013 | | |
| WO | 2013078436 A1 | | 5/2013 | | |
| WO | 2013119616 A1 | | 8/2013 | | |
| WO | 2013142855 A2 | | 9/2013 | | |
| WO | 2013192622 A1 | | 12/2013 | | |
| WO | 2014009019 A1 | | 1/2014 | | |
| WO | 2014029759 A1 | | 2/2014 | | |
| WO | 2014202890 A1 | | 12/2014 | | |
| WO | 2015196242 A1 | | 12/2015 | | |
| WO | 2016036237 A1 | | 3/2016 | | |
| WO | 2016097433 A1 | | 6/2016 | | |
| WO | 2016134471 A1 | | 9/2016 | | |
| WO | 2018027192 A1 | | 2/2018 | | |
| WO | 2018170505 A1 | | 9/2018 | | |
| WO | 2019010394 A1 | | 1/2019 | | |
| WO | 2021133996 A1 | | 7/2021 | | |
| WO | 2021174088 A1 | | 9/2021 | | |
| WO | 2021257865 A1 | | 12/2021 | | |

OTHER PUBLICATIONS

Nicolai, "Nicolai Trombone Frame," at least as early as 1995, 6 pages.

U.S. Patent and Trademark Office, Final Office Action mailed on Jul. 22, 2021, for U.S. Appl. No. 15/925,165, 15 pages.

"Combined Search and Examination Report under Sections 17 and 18(3)", mailed by U.K. Intellectual Property Office on Aug. 25, 2021, for U.K. Application No. GB2102854.3, 8 pages.

"Extended European Search Report for EP 18768549.0", mailed Feb. 8, 2021.

"International Search Report & Written Opinion", mailed on Jul. 16, 2021, for PCT Application No. PCT/US2021/020034, 16 pages.

"International Search Report & Written Opinion mailed Apr. 13, 2021, in PCT Application No. PCT/US2020/066980, 16 pages".

"International Search Report mailed Jun. 19, 2020, in PCT Application No. PCT/US2020/016265, 18 pages".

"Invitation to Pay Additional Fees and, Where Applicable, Protest Fee", mailed May 5, 2021, in PCT Application No. PCT/US2021/020034, 3 pages.

"Netherlands Intellectual Property Office, Search Report and Opinion", issued Nov. 15, 2021, for Dutch Application No. 2027668, 24 pages.

"Netherlands Patent Office, Written Opinion and Search Report mailed Sep. 24, 2021", in Dutch and English, for Netherlands Application No. 2027223, 17 pages.

(56)        References Cited

OTHER PUBLICATIONS

"U.K. Intellectual Property Office", Search Report mailed Jul. 7, 2022, for U.K. Application No. GB2208682.1, 3 pages.
"U.K. Intellectual Property Office, "Combined Search and Examination Report under Sections 17 an 18(3),"", mailed Apr. 21, 2021, for U.K. Application No. GB2020235.4, 6 pages.
Aston, "Canyon Sender—Review", https://www.pinkbike.com/news/canyon-sender-review-2017.html, Mar. 13, 2017, 33 pages.
Aston, "Robot Bike Co R160—First Look", https://www.pinkbike.com/news/robot-bike-co-r160-first-look-2016.html (Accessed Jun. 30, 2020), May 27, 2016, 39 pages.
Author Unknown, "Sarrus Linkage", Wikipedia, http://en.wikipedia.org/wiki/Sarrus_linkage, 1 page, at least as early as Aug. 20, 2010.
Chen, "Design of Structural Mechanisms", A dissertation submitted for the degree of Doctor of Philosophy in the Department of Engineering Science at the University of Oxford, St Hugh's College, 2003, 160 Pages.
Cunningham, "First Look: Felt 2014", https://www.pinkbike.com/news/First-Look-Felt-2014.html (Accessed Jun. 30, 2020), Aug. 7, 2013, 20 pages.
DB Bikes, "Felt Compulsion 50 Mountain Bike 2017", https://downhillbikesforsale.com/products/Felt-Compulsion-50-Mountain-Bike-2017.html, (Accessed Jun. 30, 2020), 9 pages.
EP, "European Extended Search Report", Application No. 12851566.5, May 28, 2015, 7 pages.
EP, "Extended European Search Report", Application No. 11818903.4, Sep. 15, 2015, 8 pages.
EP, "Supplementary Search Report", Application No. 05798319.9, Dec. 11, 2009, 1 page.
European Patent Office, "Communication Pursuant to Article 94(3) EPC", mailed Jul. 8, 2022, for European Application No. 18768549.0, 6 pages.
Foale, "Motorcycle Handling and Chassis Design: The Art and Science", https://epdf.pub/motorcycle-handling-and-chassis-design-the-art-and-science.html, Mar. 2002, 498 pages.
GB IPO, "Combined Search and Exam Report", App. No. 2020235.4, Apr. 21, 2021, 6 pages.
Giant Bicycles, "Anthem Advanced Pro 29 1", https://www.giant-bicycles.com/us/anthem-advanced-pro-29-1-2021, (Accessed Sep. 14, 2020), 8 pages.
Kavik Bicycles, "Kavik Regen Suspension", (Accessed Jun. 30, 20), 2 pages.
Li, "Movable Spatial 6R Linkages", XP055249075, Retrieved from the Internet on Oct. 13, 2016: URL:http://people.ricam.oeaw.ac.at/z.li/publications/talks/6.pdf, Oct. 2, 2013, 48 Pages.
Mountain Bike Action, "Bike Test: Felt Compulsion 1 27.5", https://mbaction.com/oct-felt-compulsion-1-27-5/, (Accessed Jun. 30, 20), 10 pages.
MTBR: Mountain Bike Review Forum, "Jayem Discussion Starter #1—Knolly Suing Intense for Building Bikes with Seat-tubes in Front of the BB", https://www.mtbr.com/threads/knolly-suing-intense-for-building-bikes-with-seat-tubes-in-front-of-the-bb.1173867/, Jan. 2021, 16 pages.

Overholt, "IB17: Tantrum Cycles makes it to production, gets noticed by Adventure Capitalists", https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
PCT, "International Search Report and Written Opinion", Application No. PCT/US2011/048696, Dec. 14, 2011, 10 pages.
PCT, "International Search Report and Written Opinion", Application No. PCT/US2015/065090, Feb. 12, 2016, 11 pages.
PCT, "International Search Report and Written Opinion", Application No. PCT/US2012/066427, Jan. 18, 2013, 12 pages.
PCT, "International Search Report and Written Opinion", Application No. PCT/US2018/041054, Sep. 28, 2018, 12 pages.
PCT, "International Search Report and Written Opinion", Application No. PCT/US2018/023124, Aug. 2, 2018, 14 pages.
PCT, "International Search Report and Written Opinion", Application No. PCT/US2005/33410, Nov. 29, 2006, 5 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, "First Ride: 2021 Canyon Sender CFR", https://www.pinkbike.com/news/first-ride-2021-canyon-sender-cfr.html, Aug. 11, 2020, 23 pages.
Roberts, "Pinkbike, "What's Going On With Commencal's Prototype DH Race Bike?"", published Jun. 9, 2021, 9 pages.
Sarrut, "Note Sur La Transformation Des Mouvements Rectilignes Alternatifs", Académie des Sciences, 36, 1036-1038, 1853, 5 Pages.
Smurthwaite, "Pinkbike, "Spotted: A New Commencal Supreme Breaks Cover at the Portugal Cup"", published Mar. 7, 2022, 4 pages.
U.S. Patent and Trademark Office, "Non-Final Office Action", mailed Sep. 16, 2022, for U.S. Appl. No. 16/705,049, 10 pages.
"U.S. Appl. No. 62/815,675", filed Mar. 8, 2019, Mar. 8, 2019.
"U.S. Appl. No. 62/833,496", filed Apr. 12, 2019, Apr. 12, 2019.
"U.S. Appl. No. 62/867,169", filed Jun. 26, 2019, Jun. 26, 2019.
Worsey, "Forbidden Druid Review—Are high pivots just for downhill?", Enduro, [online], Mar. 4, 2019 [retrieved on Jun. 16, 2021], From Internet: <url: https://enduro-mtb.com/en/fobidden-druid-review/>; 15 pages.
Zawistowski, Think Turquoise, http://www.yeticycles.com/blog/?p=237 [Retrieved from the Internet on Jul. 27, 2011], Jul. 18, 2010.
Zawistowski, "Quantifying Wheel Path", Think Turquoise, http://www.yeticycles.com/blog/?p=237 [Retrieved from the Internet on Jul. 27, 2011], Jul. 18, 2010, 4 Pages.
U.S. Patent and Trademark Office, "International Search Report," mailed Jan. 20, 2023, for PCT Application No. PCT/US2022/076232, 2 pages.
U.S. Patent and Trademark Office, "Written Opinion," mailed Jan. 20, 2023, for PCT Application No. PCT/US2022/076232, 11 pages.
"Spotted: A New Commencal Supreme Breaks Cover at the Portugal Cup", Article published on Mar. 7, 2022.
"What's Going On With Commencal's Prototype DH Race Bike?", Article published on Jun. 9, 2021.

* cited by examiner

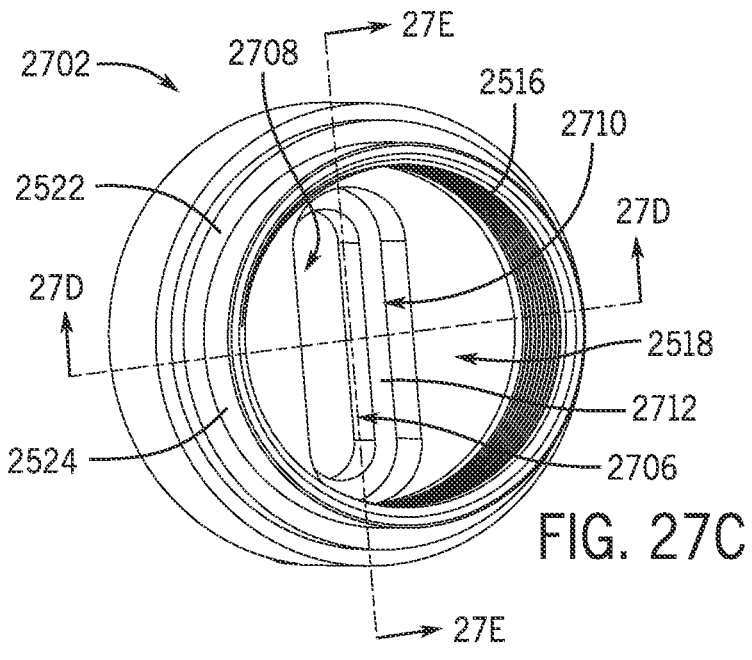
FIG. 27C
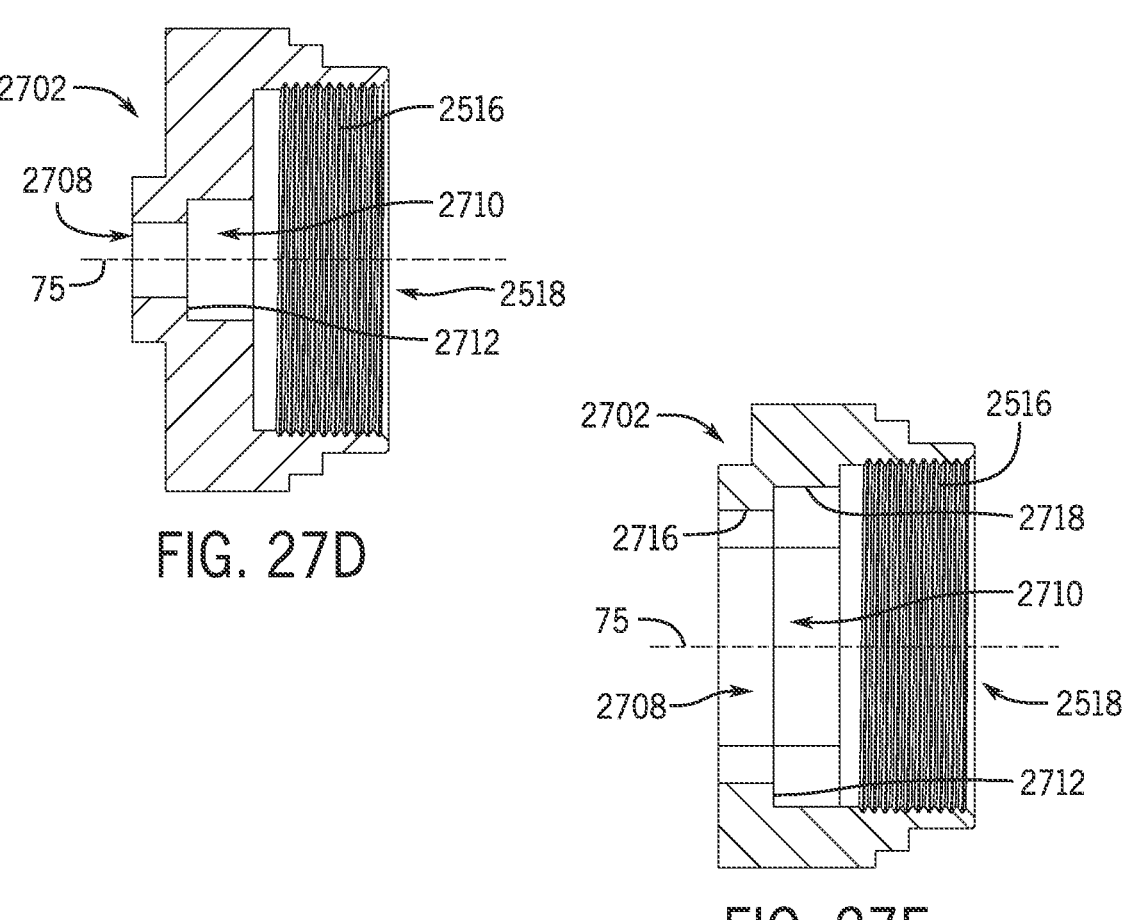
FIG. 27D
FIG. 27E

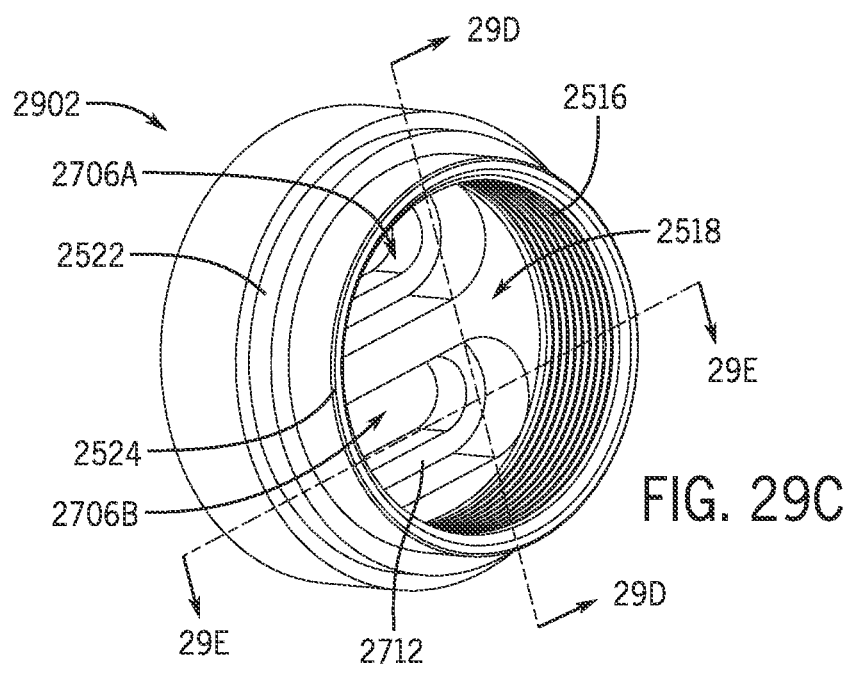
FIG. 29C
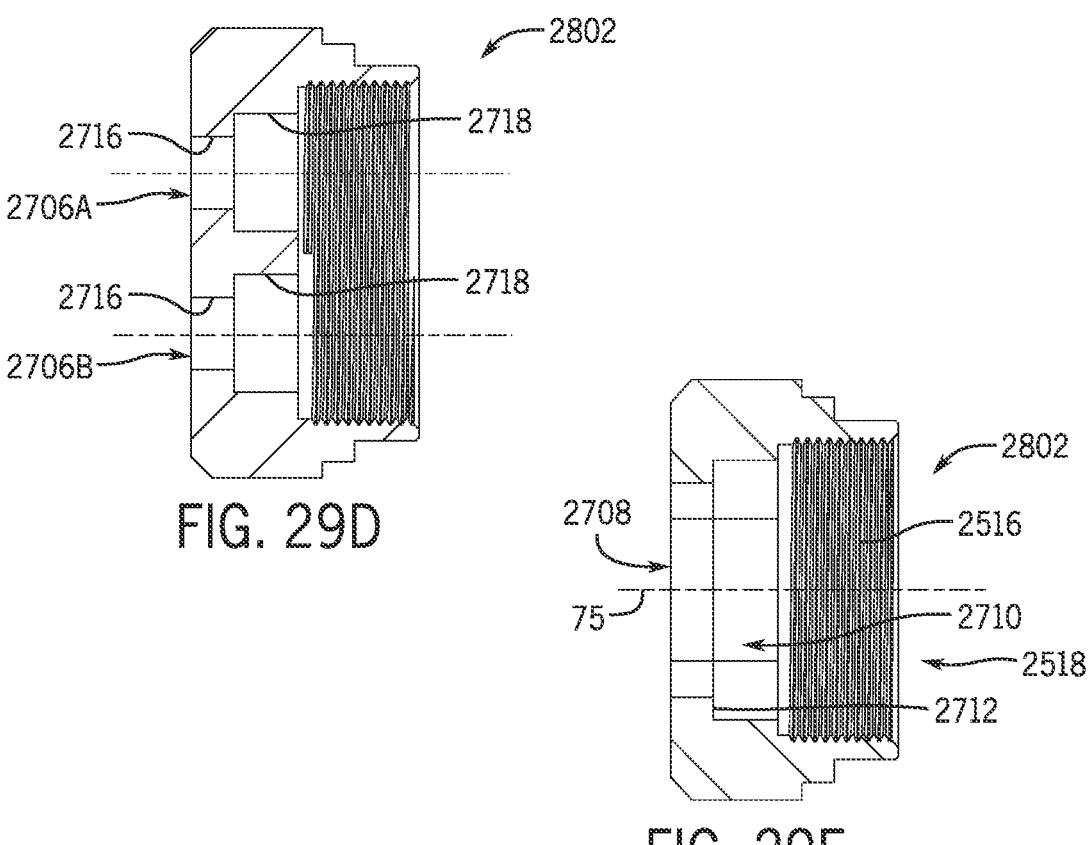
FIG. 29D
FIG. 29E

TWO-WHEELED VEHICLE WITH CONFIGURABLE IDLER

CROSS REFERENCE TO RELATED APPLICATIONS

This application claims the benefit of priority pursuant to 35 U.S.C. § 119(e) of U.S. provisional patent application No. 63/242,211, filed 9 Sep. 2021, entitled "Idler" which is hereby incorporated by reference herein in its entirety.

TECHNICAL FIELD

The technology described herein relates to vehicle suspension systems, specifically, to linkages and drive trains within a vehicle suspension system.

BACKGROUND

Vehicle suspension terminology depends upon the reference frame considered. Consider a static vehicle that has two wheels, each of which are supported by the ground. Such vehicles can include a suspended body and a non-suspended body operatively coupled to each wheel. In a two-wheel vehicle, such as a bicycle, electric bicycle or pedelec or motorcycle, etc. there is typically one rear wheel known as the driven wheel, which includes a driven cog. The driven cog is often part of a group of cogs called a cassette wherein different cog sizes may be shifted into to alter the gear ratio. There is also one front wheel. The driving cog is typically coupled to the suspended body. A derailleur mechanism may be used to shift the driving chain or belt into various driven cogs of the cassette. The driving cog, which is connected to the driven cog via the driving chain/belt, is rotated by a crank under human power, or by a motor, or by combined motor and human power. The reaction of the driven wheel and the ground causes the vehicle to accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are typically coupled to each other in a manner that allows the bodies the suspended body and the non-suspended body to move relative to one another, such as by flexing, camming, rotating, and/or translating relative to one another. The linkage constrains the movement of the suspended body and the non-suspended body relative to one another, during which movement of the driven wheel and brake on the non-suspended body may move relative to the suspended body. A combination of damper(s) and/or spring(s) is/are typically arranged to react to relative motion between the suspended body and the driven wheel. The linkage may be highly responsible for the vehicle's dynamic response to acceleration and deceleration as well as the mechanical advantage over the shock/damper. While the shock/damper may resist movement of the suspension linkage, the path of the driven wheel and/or driven wheel axis between extended and compressed positions of the suspension linkage is not affected by the presence or absence of the shock/damper. The shock/damper does not affect the degrees of freedom of the suspension linkage. The shock/damper does not affect the relative motion of the links making up the suspension linkage is not affected.

The information included in this Background section of the specification, including any references cited herein and any description or discussion thereof, is included for technical reference purposes and is not to be regarded subject matter by which the scope of the invention as defined in the claims is to be bound.

SUMMARY

The technology disclosed herein relates to vehicle suspension linkages. In one embodiment, a two-wheel vehicle suspension linkage is provided. The suspension includes a suspended body 1, a link body 2, a link body 3, a link body 4, a link body 5, and a link body 6 operatively coupled with one another and a idler cog 56 with rotation axis 75 that is pivotally connected to suspended body 1. Link body 2 is the wheel carrier and the brake carrier body in this embodiment. The link body 3 includes jointed connections with the suspended body 1 defining PIVC[1][3], the link body 4 defining PIVC[3][4], and the link body 6 defining PIVC[3][6]. Idler cog rotation axis 75 is coincident to PIVC[1][3]. The link body 4 includes an additional jointed connection with the link body 2 defining PIVC[2][4]. The link body 5 includes additional jointed connections with suspended body 1 defining PIVC[1][5], link body 2 defining PIVC[2][5], and the link body 6 defining PIVC[5][6]. The suspension may be coupled to a damper unit configured to resist movement between two or more of the suspended body 1, link body 2, link body 3, link body 4, link body 5, or link body 6. The damper unit may include an extension body or bodies to increase its effective length.

In yet another embodiment, a two-wheel vehicle suspension linkage is provided. The suspension includes a suspended body 1, a swingarm body 2, a link body 3, a link body 4, a link body 5, and a link body 6 operatively coupled with one another and a idler cog 56 with rotation axis 75 that is pivotally connected to suspended body 1. In various embodiments, the link body 2 is the wheel carrier and the brake carrier body. The link body 3 includes jointed connections with the suspended body 1 defining PIVC[1][3], the link body 4 defining PIVC[3][4], and the link body 6 defining PIVC[3][6]. Idler cog rotation axis 75 is not coincident to PIVC[1][3]. The link body 4 includes an additional jointed connection with the link body 2 defining PIVC[2][4]. The link body 5 includes additional jointed connections with suspended body 1 defining PIVC[1][5], link body 2 defining PIVC[2][5], and the link body 6 defining PIVC[5][6]. The suspension may be coupled to a damper unit configured to resist movement between two or more of the suspended body 1, link body 2, link body 3, link body 4, link body 5, or link body 6. The damper unit may include an extension body or bodies to increase its effective length.

In one aspect, a two-wheel vehicle suspension linkage includes: a suspended body 1, a wheel carrier body 2, a link body 3, a link body 4, a link body 5, and a link body 6 operatively coupled defining a primary instantaneous velocity center (PIVC) at each joint between link bodies; a wheel operatively connected to the rear wheel carrier body 2; a driven cog operatively connected to the rear wheel; a driving cog operatively connected to the suspended body 1; an idler operatively connected by an elongated flexible member to the suspended body 1, the wheel carrier body 2, the link body 3, the link body 4, the link body 5 or the link body 6, where the idler is rotatable about an idler rotation axis; an elongated flexible member disposed along a route between the driving cog and the driven cog, where the idler is disposed in the route between the driving cog and the driven cog; and a damper unit configured to resist movement between two or more of the suspended body 1, wheel carrier body 2, link body 3, link body 4, link body 5, or link body 6.

The two-wheel vehicle suspension linkage may also include where the idler is pivotally connected to the suspended body 1.

The two-wheel vehicle suspension linkage of any may also include, where the idler is rotatably connected to suspended body 1 concentrically with a linkage pivot with the wheel carrier body 2, the link body 3, the link body 4, the link body 5 or the link body 6.

The two-wheel vehicle suspension linkage may also include where the idler rotation axis is coincident to a PIVC defined by a combination of the suspended body 1, the wheel carrier body 2, the link body 3, the link body 4, the link body 5, or the link body 6.

The two-wheel vehicle suspension linkage may also include where the link body 3 has jointed connections with the suspended body 1 defining a PIVC[1][3], the link body 4 defining a PIVC[3][4], and the link body 6 defining a PIVC[3][6]. The two-wheel vehicle suspension linkage may also include the link body 4 with a jointed connection with wheel carrier body 2 defining a PIVC[2][4]. The two-wheel vehicle suspension linkage may also include the link body 5 with jointed connections with the suspended body 1 defining a PIVC[1][5], the wheel carrier body 2 defining a PIVC[2][5], and the link body 6 defining a PIVC[5][6], where the idler rotation axis is not coincident to the PIVC[1][3].

The two-wheel vehicle suspension linkage may also include where the idler is an idler cog.

The two-wheel vehicle suspension linkage may also include where at least one PIVC migration path reverses as the suspension linkage moves from an at least partially extended state to an at least partially compressed state.

The two-wheel vehicle suspension linkage may also include where the suspended body 1 has a motive power source compartment, and an energy storage compartment selectively coverable by a panel.

The two-wheel vehicle suspension linkage may also include where at least one PIVC migration path reverses as the suspension linkage moves from an at least partially extended state to an at least partially compressed state.

The two-wheel vehicle suspension linkage may also include where the driving cog axis is rotatable about a driving cog axis and the idler rotation axis is disposed above and forward of the driving cog axis.

The two-wheel vehicle suspension linkage may also include where a contact angle formed between a forward vertical tangent of the driving cog and line that is tangent to both the driving cog and the idler is greater than zero degrees.

The two-wheel vehicle suspension linkage may also include an instantaneous force center (IFC) located at an intersection of a force vector of the flexible member and a driving force vector, where, as the suspension linkage moves between an extended and compressed state, the IFC moves from an extended position rearward to an intermediate position and then forward to compressed position.

The two-wheel vehicle suspension linkage may also include where an anti-squat percentage of the suspension linkage increases as a vertical travel of the wheel increases to a first position, where, as the vertical wheel travel increases further to a second position, the anti-squat percentage falls.

The two-wheel vehicle suspension linkage may also include where a rate of change of a power transmitting length of the flexible member (dPTL) increases as a vertical travel of the wheel increases to a first position, where, as the vertical wheel travel increases further to a second position, the dPTL falls.

The two-wheel vehicle suspension linkage may also include where the idler is mounted to the suspended body 1. Other technical features may be readily apparent to one skilled in the art from the following figures, descriptions, and claims.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog having a driving cog diameter and operatively connected to the suspended body 1, where the driving cog is rotatable in a driving cog center plane about a driving cog axis normal to the driving cog center plane, and a driving cog region is defined between a front driving cog plane tangent to a front of the driving cog diameter and parallel to the driving cog axis, and a rear driving cog plane tangent to a rear of the driving cog diameter and parallel to the driving cog axis, where at least a portion of one or more of the plurality of link bodies is located inside the driving cog region and extends transversely outward past the driving cog center plane.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog operatively connected to the suspended body 1 defining a driving cog axis of rotation and a driving cog radius; where the link body 3 includes jointed connections with the suspended body 1 defining a PIVC[1][3], the link body 4 defining a PIVC[3][4], and the link body 6 defining a PIVC[3][6]. The two-wheel vehicle suspension linkage also includes the link body 4 has a jointed connection with wheel carrier body 2 defining a PIVC[2][4]. The two-wheel vehicle suspension linkage also includes the link body 5 has jointed connections with the suspended body 1 defining a PIVC[1][5], the wheel carrier body 2 defining PIVC[2][5], and the link body 6 defining an PIVC[5][6], where the driving cog radius is about 40%-65% of a distance from the PIVC [1][3] to the driving cog axis of rotation.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog operatively connected to suspended body 1 defining a driving cog radius; where the link body 3 includes jointed connections with the suspended body 1 defining a PIVC[1][3], the link body 4 defining a PIVC[3][4], and the link body 6 defining a PIVC[3][6]. The two-wheel vehicle suspension linkage also includes the link body 4 has a jointed connection with wheel carrier body 2 defining a PIVC[2][4]. The two-wheel vehicle suspension linkage also includes the link body 5 has jointed connections with the suspended body 1 defining a PIVC[1][5], the wheel carrier body 2 defining a PIVC[2][5], and the link body 6 defining a PIVC[5][6], where the driving cog radius is about 40%-70% of a distance from the PIVC [3][5] to the PIVC[5][6].

In one aspect, a two-wheel vehicle suspension linkage includes a suspended body 1, a wheel carrier body 2, a wheel operatively connected to the rear wheel carrier body 2, a driven cog operatively connected to the rear wheel, a driving cog operatively connected to the suspended body 1, an idler operatively connected by an elongated flexible member to the suspended body 1, where the idler is rotatable about an idler rotation axis, and an elongated flexible member disposed along a route between the driving cog and the driven cog, where the idler is disposed in the route between the driving cog and the driven cog, where an instantaneous force center (IFC) is located at an intersection of a force vector of the flexible member and a driving force vector, where, as the suspension linkage moves between an extended and compressed state, the IFC moves from an extended position rearward to an intermediate position and then forward to compressed position.

The two-wheel vehicle suspension linkage may also include a damper unit configured to resist movement between two or more of the suspended body 1, wheel carrier body 2, link body 3, link body 4, link body 5, or link body 6. Other technical features may be readily apparent to one skilled in the art from the following figures, descriptions, and claims.

In one aspect, a two-wheel vehicle suspension linkage includes a suspended body 1, a wheel carrier body 2, a wheel operatively connected to the rear wheel carrier body 2, a driven cog operatively connected to the rear wheel, a driving cog operatively connected to the suspended body 1, an idler operatively connected by an elongated flexible member to the suspended body 1, where the idler is rotatable about an idler rotation axis, and an elongated flexible member disposed along a route between the driving cog and the driven cog, where the idler is disposed in the route between the driving cog and the driven cog, where a rate of change of a power transmitting length of the flexible member (dPTL) increases as a vertical travel of the wheel increases to a first position, where, as the vertical wheel travel increases further to a second position, the dPTL falls.

The two-wheel vehicle suspension linkage may also include a damper unit configured to resist movement between two or more of the suspended body 1, wheel carrier body 2, link body 3, link body 4, link body 5, or link body 6. Other technical features may be readily apparent to one skilled in the art from the following figures, descriptions, and claims.

The two-wheel vehicle suspension linkage may also include where the link body 3 has jointed connections with the suspended body 1 defining a PIVC[1][3], the link body 4 defining a PIVC[3][4], and the link body 6 defining a PIVC[3][6]. The two-wheel may also include the link body 4 has a jointed connection with the wheel carrier body 2 defining a PIVC[2][4]. The two-wheel may also include the link body 5 has jointed connections with the suspended body 1 defining a PIVC[1][5], the wheel carrier body 2 defining a PIVC[2][5], and the link body 6 defining a PIVC[5][6]; where the idler rotation axis is coincident to the PIVC[1][3].

The two-wheel vehicle suspension linkage may also include where the idler is mounted to an axle, where the axle is pivotally connecting a wheel carrier body 2, linkage body 3, linkage body 4, linkage body 5, or linkage body 6 to suspended body-1.

The two-wheel vehicle suspension linkage may also include where the link body 6 defines a longitudinal axis, and the longitudinal axis moves from a position behind the PIVC[1][5] when the suspension linkage is in an at least partially extended state to a position in front of the PIVC [1][5] when the suspension linkage is in an at least partially compressed state.

The two-wheel vehicle suspension linkage may also include a motive power source received in the motive power source compartment, an energy storage module received in the energy storage compartment and contained by the panel, an electrical conduit in electrical communication with the motive power source and the energy storage module and operative to supply electrical power from the energy storage module to the motive power source.

The two-wheel vehicle suspension linkage may also include where the idler rotation axis is coincident with a PIVC.

The two-wheel vehicle suspension linkage may also include where the idler rotation axis is not coincident with a PIVC.

The two-wheel vehicle suspension linkage may also include where the compressed position is forward of at least one of the extended position or the intermediate position.

The two-wheel vehicle suspension linkage may also include where the dPTL is maximized near a sag point of the rear suspension.

The two-wheel vehicle suspension linkage may also include where the dPTL is maximized at a first value of the vertical travel of the wheel, and where the link body 3 has an inflection point at a second value of the vertical travel of the wheel greater than the first value.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a link body 3, a link body 4, a link body 5, and a link body 6 operatively coupled with one another and the suspended body 1 and wheel carrier body 2 and defining a primary instantaneous velocity center (PIVC) at each joint between link bodies.

The two-wheel vehicle suspension linkage may also include a link body 3, a link body 4, a link body 5, and a link body 6 operatively coupled with one another and the suspended body 1 and wheel carrier body 2 and defining a primary instantaneous velocity center (PIVC) at each joint between link bodies. Other technical features may be readily apparent to one skilled in the art from the following figures, descriptions, and claims.

The two-wheel vehicle suspension linkage may also include where the PIVC [1][3] 7 is spaced apart from the idler rotation axis by a distance of less than or equal to 50-mm.

In one aspect, an idler for a two-wheeled vehicle includes a cog configured to rotate about an idler axis. The idler also includes an idler mount coupled to a suspended body of the two-wheeled vehicle, the idler mount including a body, an aperture formed in the body, and a flange extending from the body around the aperture, the idler axis and a link body pivot axis of a suspension of the two-wheeled vehicle are located within the aperture, and the idler axis and the link body pivot axis are separated from one another by an offset amount.

Optionally in some embodiments, the idler also includes a bearing received in the cog.

Optionally in some embodiments, the bearing is received on an outer surface of the flange.

Optionally in some embodiments, the idler mount is configured to threadedly engage with an axle that forms the link body pivot axis.

Optionally in some embodiments, the idler mount further includes a protrusion extending from an outer surface thereof, the protrusion configured to receive a guide for a drive member that engages with the cog.

Optionally in some embodiments, the offset amount is about 8-mm.

Optionally in some embodiments, the body includes a second aperture formed there in and the body is couplable to the suspended body by a fastener received in the second aperture and an aperture formed in the suspended body.

Optionally in some embodiments, the body includes a first locking feature, the suspended body includes a second locking feature, where the first locking feature is configured to be received in the second locking feature to prevent relative rotation of the idler mount and the suspended body.

Optionally in some embodiments, the link body pivot axis includes a primary instantaneous velocity center of the suspension.

The idler may also further include a cap including a shaft portion including external threads formed on an external portion thereof, and a head portion, where the aperture includes internal threads formed on an interior portion thereof and the external threads are threadedly couplable with the internal threads to secure the bearing and the cog to the idler mount.

Optionally in some embodiments, the cog includes a flange that locates the bearing.

In one aspect, a two-wheel vehicle suspension linkage includes a suspended body 1, a wheel carrier body 2, a link body 3, a link body 4, a link body 5, and a link body 6 operatively coupled defining a primary instantaneous velocity center (PIVC) at each joint between link bodies. The two-wheel vehicle suspension linkage also includes a wheel operatively connected to the rear wheel carrier body 2. The two-wheel vehicle suspension linkage also includes a driven cog operatively connected to the rear wheel. The two-wheel vehicle suspension linkage also includes a driving cog operatively connected to the suspended body 1. The two-wheel vehicle suspension linkage also includes an idler operatively connected by an elongated flexible member to the suspended body 1, the wheel carrier body 2, the link body 3, the link body 4, the link body 5 or the link body 6, where the idler is rotatable about an idler rotation axis, where the idler includes an idler mount coupled to a suspended body of the two-wheeled vehicle, the idler mount including a body, an aperture formed in the body, and a flange extending from the body around the aperture, where the bearing is received on an outer surface of the flange, the idler axis and a link body pivot axis of a suspension of the two-wheeled vehicle are located within the aperture, and the idler axis and the link body pivot axis are separated from one another by an offset amount.

Optionally in some embodiments, the suspension linkage may also include where the idler further includes an idler cog configured to rotate about an idler axis, a bearing received in the idler cog.

Optionally in some embodiments, the two-wheel vehicle suspension linkage may also include further includes an elongated flexible member disposed along a route between the driving cog and the driven cog, where the idler is disposed in the route between the driving cog and the driven cog.

Optionally in some embodiments, the two-wheel vehicle suspension linkage may also include further includes a damper unit configured to resist movement between two or more of the suspended body 1, wheel carrier body 2, link body 3, link body 4, link body 5, or link body 6.

Optionally in some embodiments, the two-wheel vehicle suspension linkage may also include where the offset amount is about 8-mm.

Optionally in some embodiments, the body includes a second aperture formed there in and the body is couplable to the suspended body by a fastener received in the second aperture and an aperture formed in the suspended body.

Optionally in some embodiments, the two-wheel vehicle suspension linkage may also include where the link body 3 includes jointed connections with the suspended body 1 defining a PIVC[1][3], where the PIVC[1][3] forms the link body pivot axis, the link body 4 defining a PIVC[3][4], and the link body 6 defining a PIVC[3][6]. The two-wheel vehicle suspension linkage may also include the link body 4 includes a jointed connection with the wheel carrier body 2 defining a PIVC[2][4]; the link body 5 includes jointed connections with the suspended body 1 defining a PIVC[1][5], the wheel carrier body 2 defining a PIVC[2][5], and the link body 6 defining a PIVC[5][6].

Optionally in some embodiments, the two-wheel vehicle suspension linkage may also include where the idler include a cap includes a shaft portion including external threads formed on an external portion thereof, and a head portion, where the aperture includes internal threads formed on an interior portion thereof and the external threads are threadedly couplable with the internal threads to secure the bearing and the idler cog to the idler mount.

Optionally in some embodiments, the two-wheel vehicle suspension linkage may also include where the body includes a first locking feature, the suspended body includes a second locking feature, where the first locking feature is configured to be received in the second locking feature to prevent relative rotation of the idler mount and the suspended body.

Optionally in some embodiments, the two-wheel vehicle suspension linkage may also include wherein the idler cog includes a flange that locates the bearing.

Optionally in some embodiments, the two-wheel vehicle suspension linkage may also include where the link body 6 defines a longitudinal axis, and the longitudinal axis moves from a position behind the PIVC[1][5] when the suspension linkage is in an at least partially extended state to a position at least partially in front of the PIVC[1][5] when the suspension linkage is in an at least partially compressed state.

In one embodiment, an idler assembly for a two-wheeled vehicle includes a cog including a cog aperture. The cog is configured to rotate about an idler axis located in the cog aperture. An idler mount is coupled to a suspended body of the two-wheeled vehicle. The idler mount is reconfigurable to move the idler axis with two or fewer degrees of freedom with respect to the suspended body.

Optionally in some embodiments, the idler axis is moveable to a position where at least a portion of the idler overlaps with an IVC of a suspension linkage of the vehicle.

Optionally in some embodiments, the idler axis is moveable to a position concentric with an IVC of a suspension linkage of the vehicle.

Optionally in some embodiments, the idler mount is reconfigurable within a plane defined by a vertical direction and a longitudinal direction of the vehicle.

Optionally in some embodiments, the idler mount includes one or more cam surfaces formed therein.

Optionally in some embodiments, the idler mount is releasably securable to an anchor associated with the suspended body by a fastener that guides the idler mount along the one or more cam surfaces.

Optionally in some embodiments, the one or more cam surfaces are formed in a slot formed in the idler mount.

Optionally in some embodiments, the idler mount is reconfigurable to move the idler axis with one or fewer degrees of freedom with respect to the suspended body.

Optionally in some embodiments, the idler mount includes a first plurality of cam surfaces and a second plurality of cam surfaces formed in respective slots formed in the idler mount.

Optionally in some embodiments, the idler mount is releasably securable to two anchors associated with the suspended body by respective fasteners that guide the idler mount along the respective first and second plurality of cam surfaces.

Optionally in some embodiments, the two anchors are disposed along a longitudinal line.

Optionally in some embodiments, the two anchors are disposed along a vertical line.

Optionally in some embodiments, the idler mount includes one or more curved cam surfaces formed therein.

Optionally in some embodiments, the idler mount is reconfigurable to move the idler axis to at least two discrete positions with respect to the suspended body.

Optionally in some embodiments, the idler mount includes an inner bracket including a first boss having a first circumferential face; an outer bracket including a second boss having a second circumferential face, wherein the first and second circumferential faces are arranged in a facing relationship to form a idler mount structure suitable to receive an inner race of a bearing, and the cog is coupled to an outer race of the bearing.

Optionally in some embodiments, reconfiguring the idler mount affects a performance characteristic of a suspension linkage of the vehicle.

Optionally in some embodiments, the performance characteristic is anti-squat behavior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 2B-1 shows a partial enlarged view of the embodiment of FIG. 2B.

FIG. 2D-1 shows a partial enlarged view of the embodiment of FIG. 2B.

FIG. 27C is an isometric view of an idler mount of the idler assembly of FIG. 27A.

FIG. 27D is a section view of the idler mount of FIG. 27C taken along line 27D-27D of FIG. 27C.

FIG. 27E is a section view of the idler mount of FIG. 27C taken along line 27E-27E of FIG. 27C.

FIG. 29C is an isometric view of an idler mount of the idler assembly of FIG. 29A.

FIG. 29D is a section view of the idler mount of FIG. 29C taken along line 29D-29D of FIG. 29C.

FIG. 29E is a section view of the idler mount of FIG. 29C taken along line 29E-29E of FIG. 29C.

FIG. 32G is an isometric view of an embodiment of an outer bracket of the idler assembly of FIG. 32A.

FIG. 32H is an isometric view of an embodiment of an outer bracket of the idler assembly of FIG. 32A.

FIG. 33A is an elevation view of the idler assembly of FIG. 32A in a second configuration.

FIG. 33B is an isometric view of an embodiment of an inner bracket of the idler assembly of FIG. 32A in the configuration of FIG. 33A.

FIG. 33C is an isometric view of an embodiment of an outer bracket of the idler assembly of FIG. 32A in the configuration of FIG. 33A.

FIGS. 34A-34E are examples of performance characteristics of a suspension linkage according to any of the embodiments of idler assemblies herein.

DETAILED DESCRIPTION

Disclosed herein is a system or linkage that operatively couples a suspended body to a driven wheel. The suspended body and non-suspended body may move relative to one another, as defined by the system or linkage that operably couples them. In some embodiments, the driven wheel is associated with the non-suspended body (e.g., a rear triangle, chain stay and/or seat stay). In some embodiments, the driven wheel may be associated with the suspended body (e.g., a front wheel drive vehicle). In accordance with the various embodiments provided herein, the suspension system linkage improves suspension performance based on the interrelationships of its linkage bodies and the related instantaneous velocity centers (IVCs). In one example, the linkage has 15 IVCs. In particular, the linkage may be a 6-bar linkage. The 6-bar linkage may define a suspended body portion and a non-suspended body portion. Moreover, an additional idler may be operatively coupled to the suspended body or the non-suspended body. In this case, a driving chain or belt is routed in a loop around the driven mechanism (e.g. driven cog), the idler and the driving mechanism (e.g. driving cog). Either or both of the driven mechanism or the driving mechanism may be a respective single member (e.g., a single cog, pulley, or ring), or the driving and driven mechanisms may include a cassette with a plurality of members (e.g., cogs, pulleys, or rings). The idler may be located between the driving mechanism and the driven mechanism so that the driving mechanism transmits the force to the driven mechanism via the idler. In various embodiments, the idler is specifically located with respect to physical IVCs, or PIVCs that are unique to a 6-bar linkage.

Figure 8A:
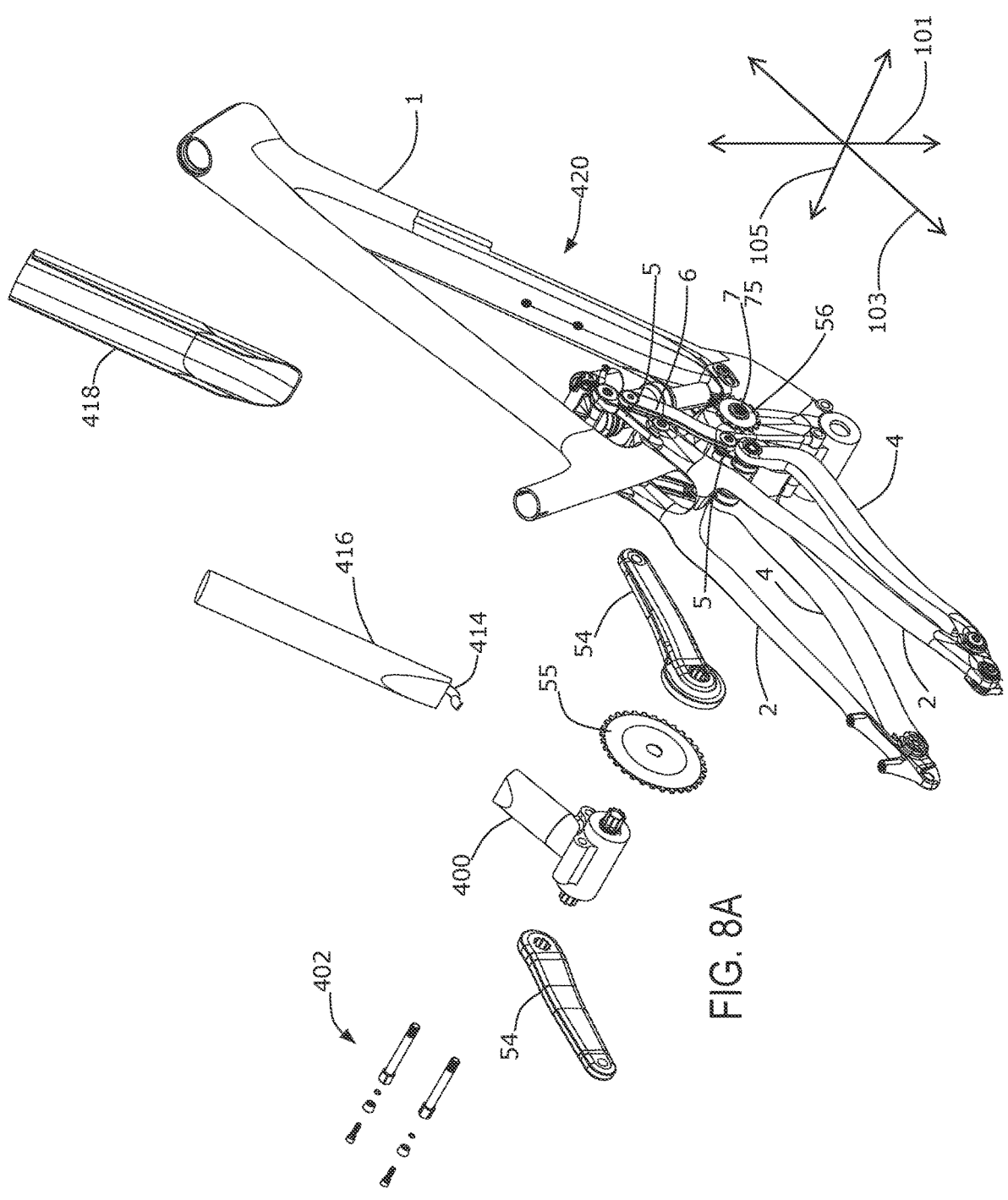
FIG. 8A is an exploded isometric view of a 6-bar suspension linkage for an electric bike.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art. As shown in FIG. 8A, for illustration purposes, it may be helpful to discuss positional relationships among the components of the vehicles disclosed herein in terms of one or more directions, such as a vertical direction 101 that is substantially normal to a support surface over which the vehicle travels, a longitudinal direction 103 substantially in a forward or backward direction of travel of the vehicle, and a transverse or left/right direction 105. In some instances longitudinal or radial axes or directions are described locally with respect to certain components, rather than with reference to the vehicle as a whole. These directions are intended to be illustrative only and in no way limiting.

Accordingly, the positions of IVCs may change depending on the configuration of the system. A particular IVC may be in a different position depending on whether the system is in a compressed or extended state defining an IVC migration path. Thus, the interrelationships between IVCs can be analyzed, allowing for a mathematical analysis of the movement of the linkage subsystem. Additionally, methods to calculate anti-squat, anti-rise, and leverage rate is detailed. While support is provided herein, Pat. Pub. No.

US2018-0265165A1 provides additional detailed support of these methods, algorithms and analysis systems and the 6-bar linkage suspension and is hereby incorporated by reference in its entirety.

It is understood that throughout this disclosure the relationship of various linkages are described with respect to characteristics and structures of those linkages. One analysis system useful for assessing these relationships is the Mobility Analysis of Mechanisms. The Mobility Analysis of Mechanisms (Kutzbach (or Grubler) mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots can include revolute, slider, cam joints, or any other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real-world accuracy of the characteristics discussed herein while allowing for real world variance in the characteristics. Note that if bodies are coupled as one and not considered rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$mobility = m = 3(n-1-p) + p$$

n=number of bodies (or links or members)
p=number of joints
Σf=sum of the kinetic variables in the mechanism As an example, this equation may be applied to a 4-bar linkage. The following solves the equation for a 4-bar linkage:

$$p = n = 4$$
$$m = 3(n-1-p) + p$$
$$m = 3(4-1-4) + 4$$
$$m = 3(-1) + 4$$
$$m = -3 + 4$$
$$m = 1$$

As another example, this equation may be applied to a 6-bar linkage. The following solves the equation for a 6-bar linkage:

$$n = 6$$
$$p = 7$$

$$m = 3(n-1-p) + p$$
$$m = 3(6-1-7) + 7$$
$$m = 3(-2) + 7$$
$$m = -6 + 7$$
$$m = 1$$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing vehicle suspension linkages design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT[T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body. This is a result of the front-triangle remaining fixed in the reference frame chosen for suspension analysis.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to a body 1 and a body 2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but also depend upon suspended body-1 since this is the body in which a passenger or rider will be included. Suspended body-1 may be referenced herein as the front triangle of a bicycle.

As used herein DIVC[AD] can define both the acceleration and deceleration response of the vehicle; DIVC[A] can define the acceleration response of the vehicle; and DIVC[D] can define the deceleration response of the vehicle. As used herein DIVC[C] is defined as a DIVC that includes an acceleration component. As such, in certain embodiments, DIVC[C] can be equal to DIVC[A] or DIVC[AD]. As used herein DIVC[E] is defined as a DIVC that includes a deceleration component. As such, in certain embodiments, DIVC[E] can be equal to DIVC[D] or DIVC[AD].

As used herein DIVC is a general term that may generically cover a DIVC[AD] or a DIVC[A] or a DIVC[D] or a DIVC[C] or a DIVC[E] or any combination thereof. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC[AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicle's two wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. 100% anti-squat is when the anti-squat force is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point, an anti-squat below 100% is preferred so that the driving force is reduced, and the suspension can be utilized later in the travel where pedaling typically does not occur. This may also reduce feedback from the driving force to the rider. Too high of an anti-squat is less than ideal because it results in high feedback from the driving force to the rider and is detrimental to pedaling efficiency because the load transfer and anti-squat force are far from equilibrium.

When the vehicle decelerates, the force distribution changes and the front wheel load is increased while the rear wheel load is decreased. As a result, the rear suspension tends to extend or rise. This is known in vehicle dynamics as anti-rise. The magnitude of anti-rise is directly related to the DIVC[E] migration.

100% anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Another suspension characteristic is the leverage rate (LR), which is the ratio of the change in vertical wheel travel to the change in shock stroke. A plot can be generated to represent the instantaneous leverage rate from the fully extended to the fully compressed state. The motion ratio (MR) is the inverse of the LR. Generally, the higher the leverage rate the greater the mechanical advantage on the shock/damper and the lower the force that compresses the shock. Generally, the lower the leverage rate the lesser the mechanical advantage on the shock/damper and the higher the force that compresses the shock.

The direction of the DWAP is also a suspension performance metric. The ability of the rear suspension to absorb bumps when the vehicle is moving forward increases the more rearward the path from the extended state to the compressed state. The rearward path allows the rear wheel to move with the impact improving performance.

Anti-squat, rate of change of the power transmitting length (dPTL), described below, anti-rise, leverage rate and DWAP direction are four performance metrics or suspension characteristics pertinent to suspension designs. Anti-squat and DWAP are directly related to the driving cog axis location. As the suspension linkage arrangement is altered so that the DWAP direction is more rearward, DIVC[A] typically is raised the anti-squat percentage will increase. This is discussed in further detail below during the discussion of the chain/belt and frame components of anti-squat. This increase may result in poor suspension performance due to excessive extension of the wheel carrier body under acceleration, stiffening the suspension and reducing traction and comfort.

As the DIVC[D] is moved higher above the ground, the DWAP direction will tend to move rearward. As a result, the anti-rise percentage will increase. This increase may result in poor suspension performance due to excessive compression of the wheel carrier body under deceleration, stiffening the suspension and reducing traction and comfort.

In order to manipulate the magnitudes of the anti-squat and/or anti-rise percentages and simultaneously increase the rearward direction of the DWAP, a drive train vector adjustment mechanism may be utilized with a 6-bar linkage. In one example, the drive train vector adjustment mechanism may be a drive train idler positioned between the driving portion of the drive train and the driven portion of the drive train. In a more particular example, the idler may be an idler cog that is located between the driving cog and the driven cog. This idler cog may change the chain force vector angle. Changing this chain force vector angle can manipulate the anti-squat percentage. For example, incorporating the idler cog may reduce the anti-squat percentage as compared to a system that does not include an idler cog. Additionally, or alternatively, this 6-bar layout also allows the DIVC[D] to be located further forward than conventional designs allowing for lower anti-rise percentages. These concepts and further derivations are discussed below. The various embodiments discussed below are discussed using an idler cog. It is however understood that other vector adjustment mechanisms can also be used in place of the idler cog for the respective systems. For example, simple pulleys may be used for belt driven systems or cable driven systems. In some examples, a pin or other vector adjustment device may be used to offset the drive mechanism, so the force vector of the drive mechanism is moved away from the driving member (e.g. the driven gear, cog, etc.)

Based upon the number of bodies present in the structure, the total number of instantaneous velocity centers (IVCs) can be determined. The following equation can be used:

$$\text{Number of Instance Centers} = N = \frac{n(n-1)}{2}$$

$n$ = numbers of bodies moving relative to one another $N$ = total number of instantaneous velocity centers of the linkage As an example, this equation may be applied to a 4-bar linkage. In this example, n=4. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

In accordance with various embodiments, the suspension system can include a suspension setup having more than four links. It may be noted that while some of the concepts discussed herein might be accomplished with four links, in some of the embodiments discuss herein, as shown herein by example, six links are used. As is suitable, more or few links can also be used to accomplish the various concepts as discussed herein.

As noted above, there are 15 IVCs in a 6-bar linkage.

$$N_6 = \frac{6(6-1)}{2} = \frac{30}{2} = 15$$

A selection of the 15 total IVCs can be determined visually without being derived using other IVCs as further described below. As used herein, these IVCs are known as physical IVCs, or PIVCs. PIVCs are defined at the pivotal axes or virtual pivotal axes of jointed linkage body members. There are four PIVCs in a 4-bar linkage while there are seven PIVCs in a 6-bar linkage.

Figure 1A:
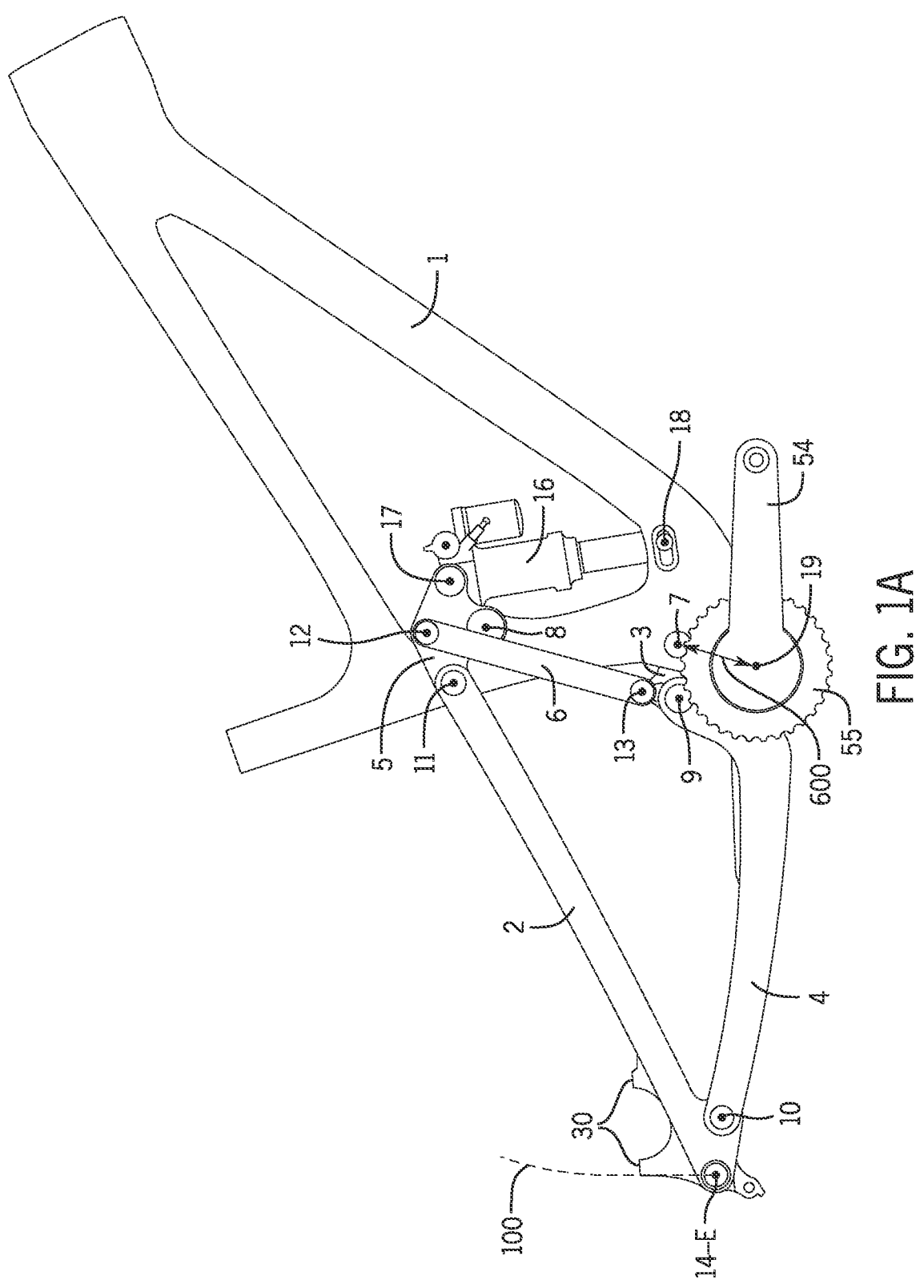
FIG. 1A shows a 6-bar suspension linkage system with a typical configuration in the extended state.

FIG. 1A shows a bicycle frame having an example of a 6-bar suspension. This drive train layout has a direct drive from the drive cog to the driven cog without an idler in-between. Here, crank arm 54 and driving cog 55 rotate about driving cog axis 19. The suspension includes a suspended body 1, a link body 2, a link body 3, a link body 4, a link body 5, and a link body 6 operatively coupled with one another. Link body 2 is the wheel carrier and the brake carrier body in this embodiment. In other embodiments, the wheel carrier and the brake carrier body may differ. The link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC [2][5] 11, and the link body 6 defining PIVC[5][6] 12. The suspension includes a damper unit 16 pivotally connected to link body 5 at joint 17 and suspended body 1 at joint 18. The damper unit 16 is configured to resist movement between the two bodies. FIG. 1A also illustrates the brake caliper mounts 30 and rear wheel axis positioned in the extended state 14-E. Both the brake caliper mounts 30 and the rear wheel axis are also shown as being located on link body 2. Link body 2 may be referred to the seatstay in this embodiment, however the seatstay may be a different link body in other embodiments. Link body 4 may be referred to the chainstay in this embodiment, however the chainstay may be a different link body in other embodiments. Also shown is offset 600, which is the distance between the driving cog axis and PIVC[1][3] 7. This offset is pertinent to and manipulative of the magnitude of rearward direction of DWAP 100.

Figure 1B:
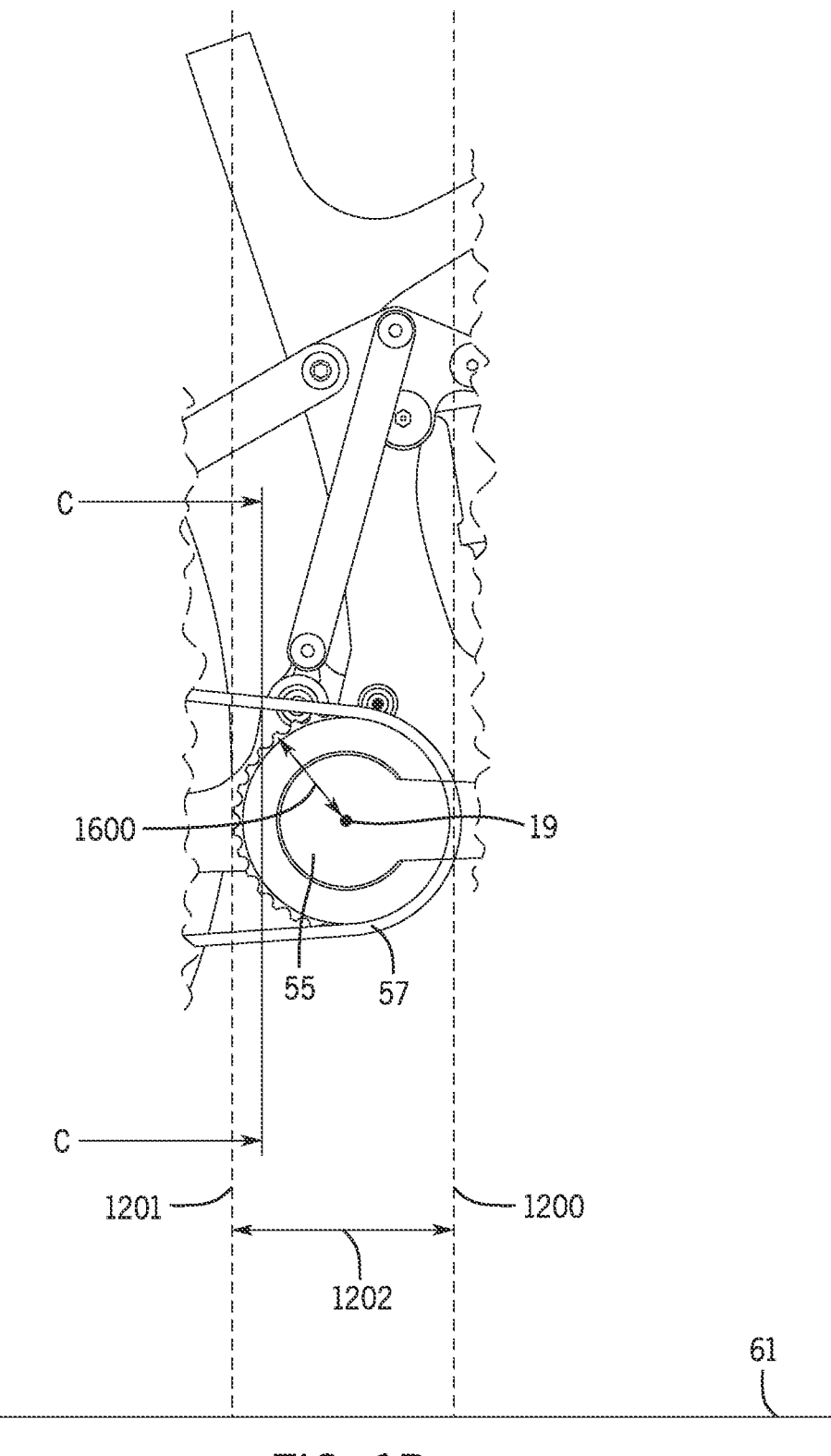
FIG. 1B is a section of the embodiment of FIG. 1A with cross section C-C.

FIG. 1B shows a portion of the embodiment of FIG. 1A with the location of cross section C-C denoted. Here the following are shown: Driving cog axis 19; driving cog 55; chain/belt 57; ground 61; front driving cog plane 1200 which is parallel to driving cog axis 19, perpendicular to the ground, and tangent to the diameter of driving cog 55; rear driving cog plane 1201 which is parallel to driving cog axis 19, perpendicular to the ground, and tangent to the diameter of driving cog 55; driving cog region width 1202 which is equivalent to the driving cog diameter; driving cog radius 1600 which is equivalent to half of the driving cog diameter; and cross section line C. Cross section line C is located within the region defined by the ground 61, front driving cog plane 1200, and rear driving cog plane 1201.

Figure 1C:
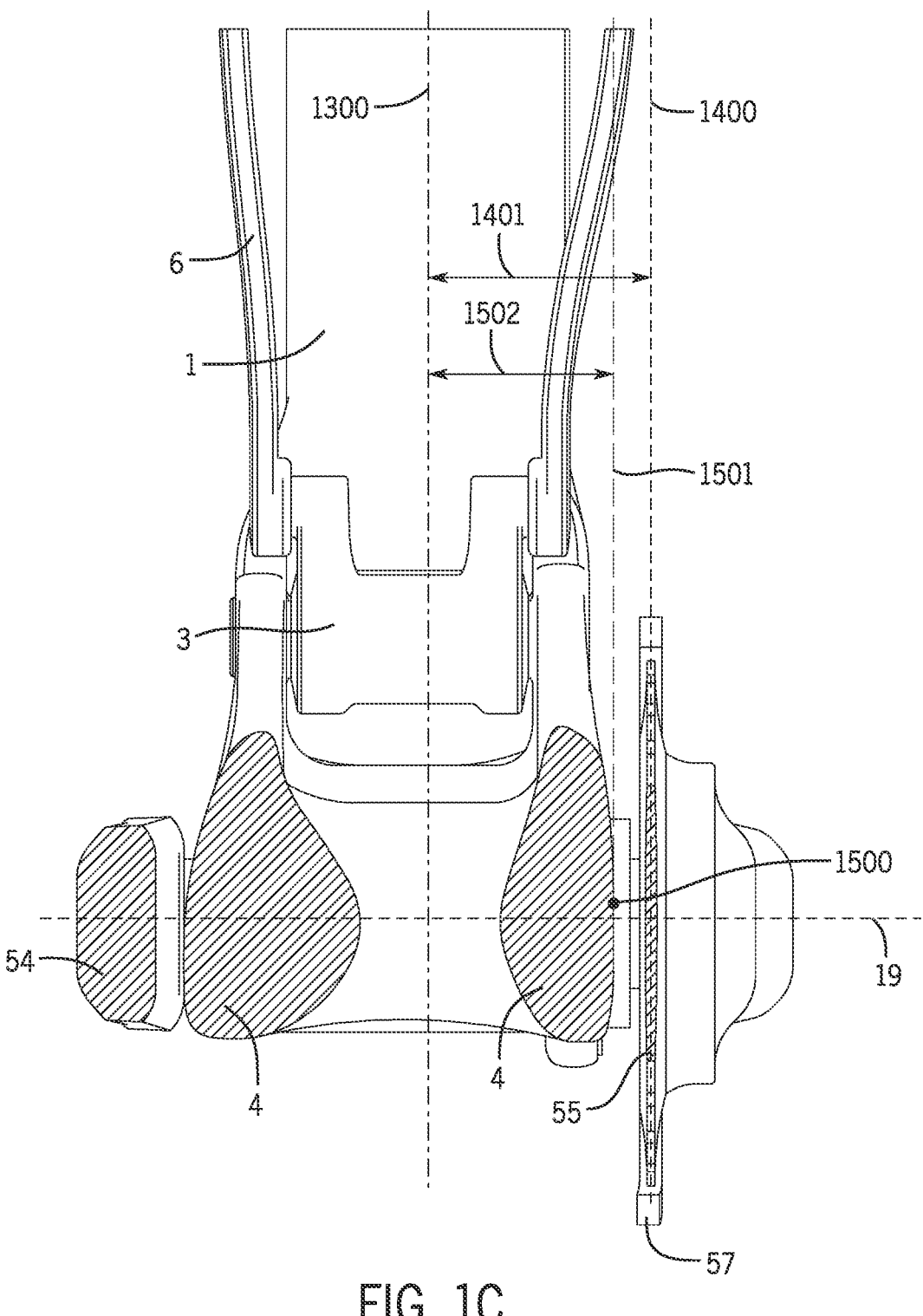
FIG. 1C shows cross-section C-C of the embodiment of FIG. 1B.

FIG. 1C shows cross-section C-C of the embodiment of FIG. 1B. Here the following are shown: Driving cog axis 19; driving cog 55; driving cog center plane 1400; chain/belt 57; crank arm assembly 54; suspended body-1; link body-3; link body-6; link body-4; point 1500 located on link body-4; link body-4 reference plane 1501 that is normal to driving cog axis 19 and coincident to point 1500; frame center plane 1300; chain/belt-line 1401 which is the distance from frame center plane 1300 to driving cog center plane 1400; and link body-4 reference distance 1502 which is the distance from frame center plane 1300 to link body-4 reference plane 1501. Here it is clear that chain/belt-line distance 1401 is greater than link body-4 reference distance 1502. Therefore, no portion of link body-4 is located outside ("outside" being the direction, relative to the plane, away from the vehicle frame/suspension) of driving cog center plane 1400.

Figure 2A:
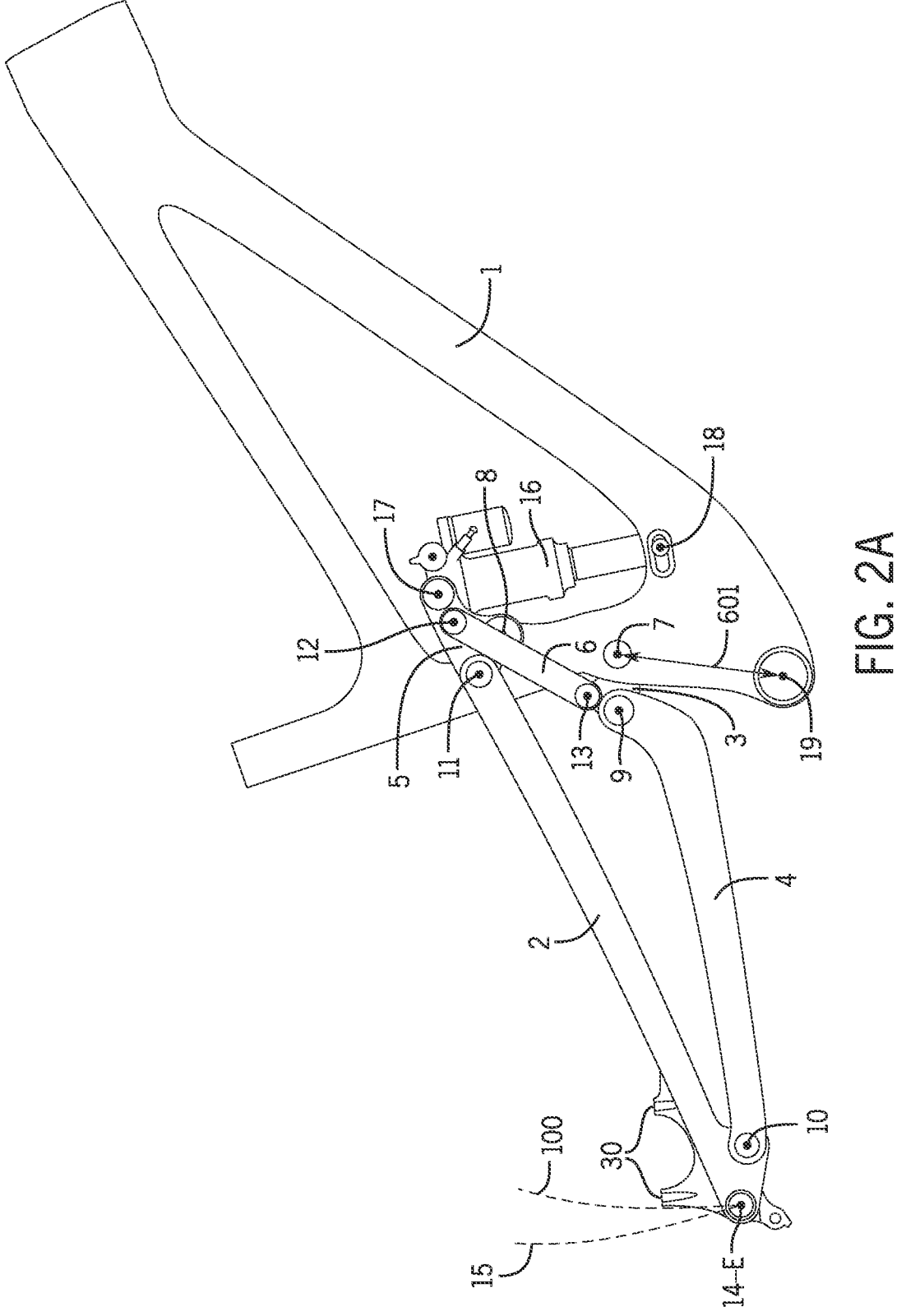
FIG. 2A shows an embodiment of a 6-bar suspension linkage system in the extended state.
Figure 2B:
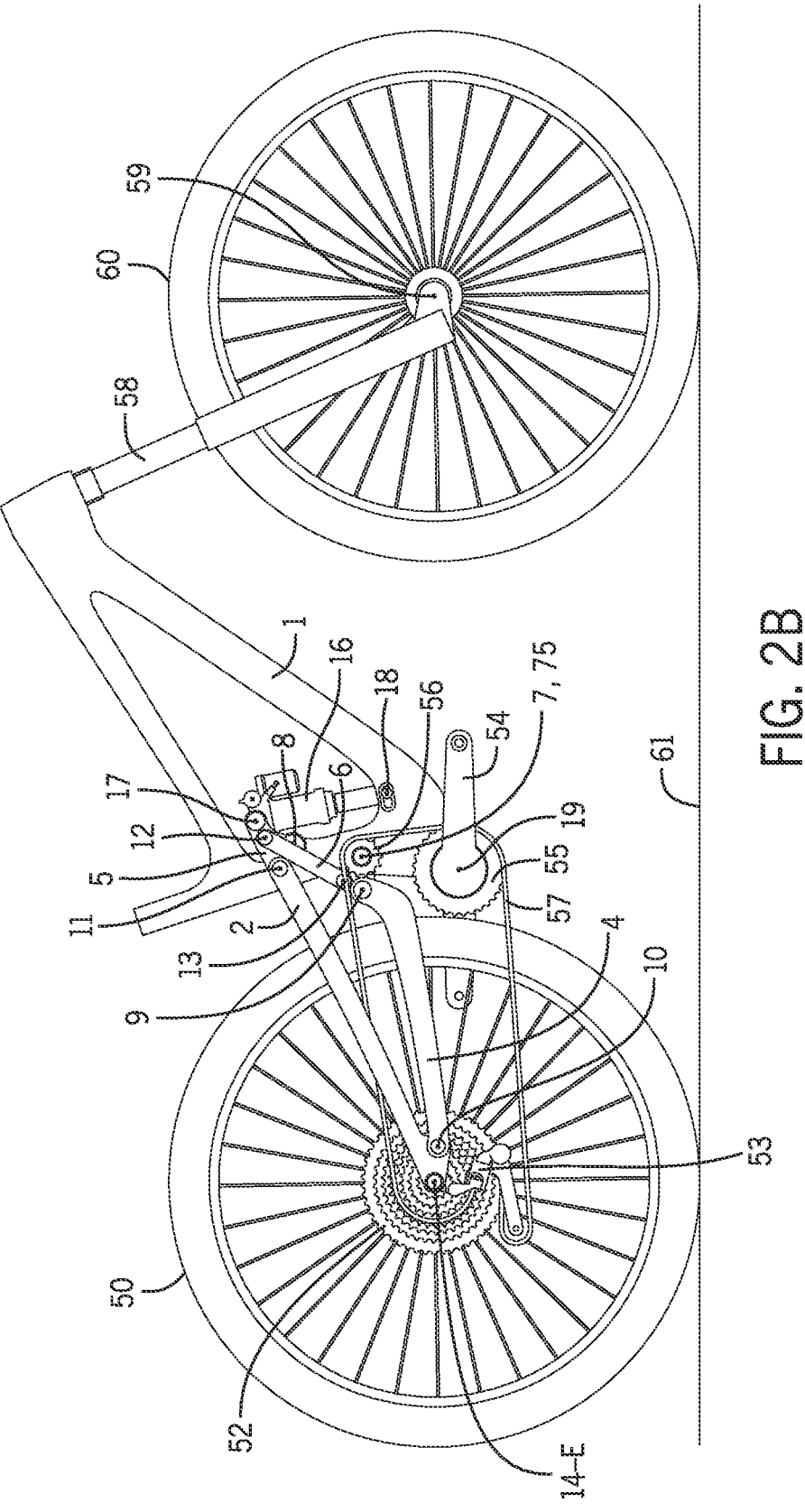
FIG. 2B shows the embodiment of FIG. 2A of a bicycle with the disclosed 6-bar suspension linkage system in the extended state.
Figures 1, 2B:
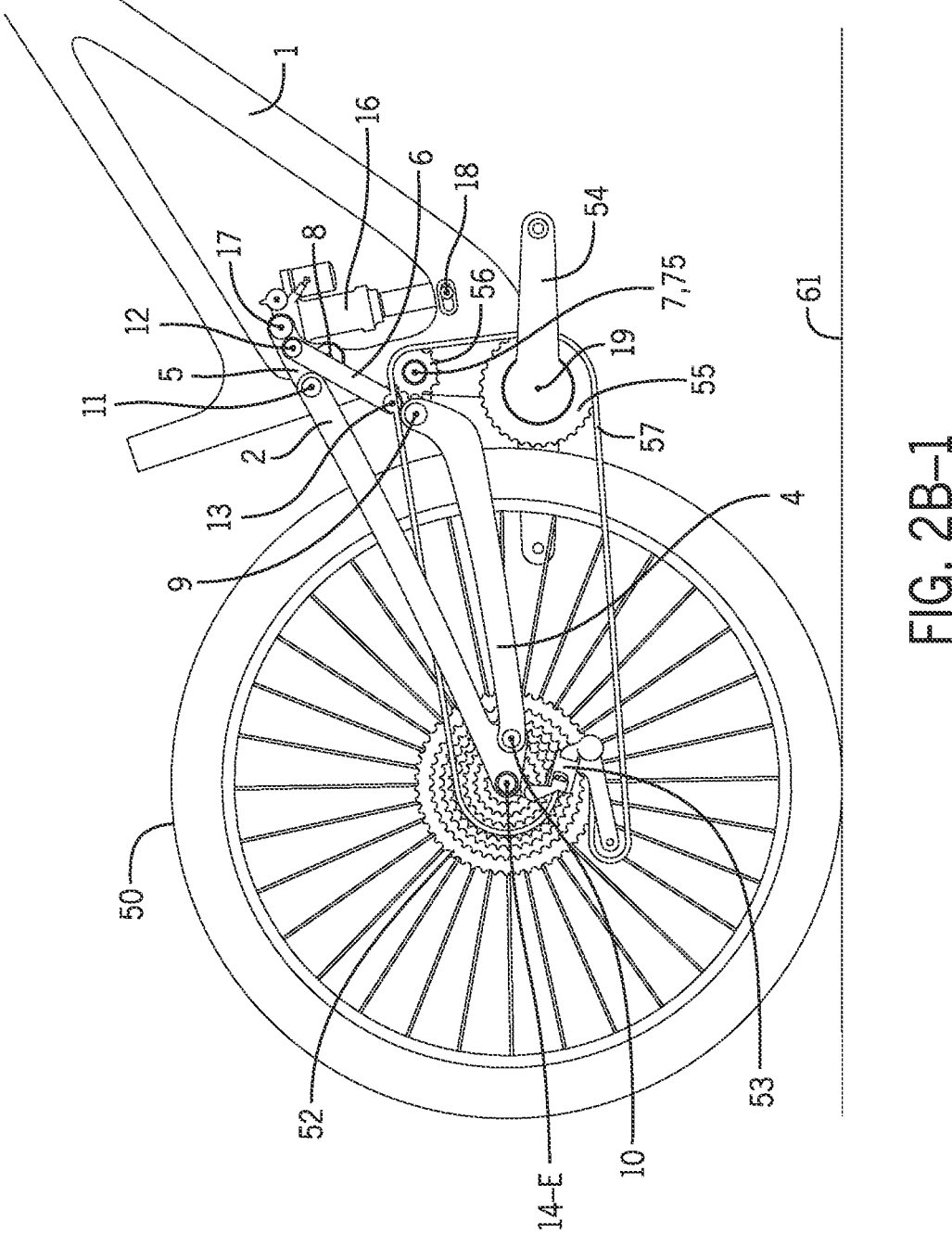

In accordance with various embodiments, the suspension system includes a 6-bar linkage and an idler cog. FIG. 2A shows a bicycle frame with a 6-bar suspension having an idler cog 56. Note, an example of the idler is not shown in FIG. 2A for clarity. The idler cog 56 is shown in FIG. 2B. As discussed above the idler is shown as an idler cog as used with a chain drive. As illustrated, the crank arm 54 and driving cog 55 rotate about driving cog axis 19. The suspension includes a suspended body 1, a link body 2, a link body 3, a link body 4, a link body 5, and a link body 6 operatively coupled with one another. In this embodiment, the link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC[2][5] 11, and the link body 6 defining PIVC[5][6] 12. The suspension includes a damper unit 16 pivotally connected to link body 5 at 17 and suspended body 1 at 18 configured to resist movement between the two bodies. Brake caliper mounts 30 and rear wheel axis at the extended state 14-E are located on link body 2 which is also the wheel carrier and brake carrier body in this embodiment.

FIG. 2A also illustrates the PIVC[1][3] 7 and offset 601. The offset 601 is the distance between the driving cog axis and PIVC[1][3] 7. This distance is pertinent and manipulative of the magnitude of rearward direction of DWAP 15. Note that offset 601 (of FIG. 2A) is greater than offset 600 (FIG. 1A), and as a result, DWAP 15 is more rearward compared to DWAP 100.

FIG. 2B shows the bicycle frame from FIG. 2A with additional components for clarity. As illustrated, the rear wheel 50 can be pivotally connected to link body 2 and rear wheel axis 14-E. A rear cassette 52 is a group of various driven cog sizes that chain/belt 57 can be shifted across mechanically via rear derailleur mechanism 53. Also shown are front suspension fork 58 wherein front wheel 60 is pivotally connected at front wheel axis 59. Rear wheel 50 and front wheel 60 contact the surface 61. Note that the surface 61 (e.g., the ground) is depicted as a line, but represents a plane/surface in 3d-space.

As shown in this particular embodiment, idler cog 56 includes an axis 75 that is coincident to IVC[1][3] 7. In other embodiments, these axes may be different (see embodiments, below). Chain/belt 57 is routed from driving cog 55, which is rigidly connected to crank arm assembly 54, to idler cog 56 to a driven cog of cassette 52 through the cogs of rear derailleur 53 and back to the driving cog 55 in a continuous loop. When the crank arm assembly 54 is rotated, power is transmitted from driving cog 55 to a driven cog of cassette 52 via the idler cog 56. As a result, the chain force vector is along the top part of the chain/belt from the tangent connection point of the driven cog of cassette 52 to the tangent connection point of idler cog 56. Note that the cassette 52 with multiple driven cogs and derailleur mechanism 53 may be absent in other embodiments. In other embodiments, a single driven cog may be used.

Figure 2C:
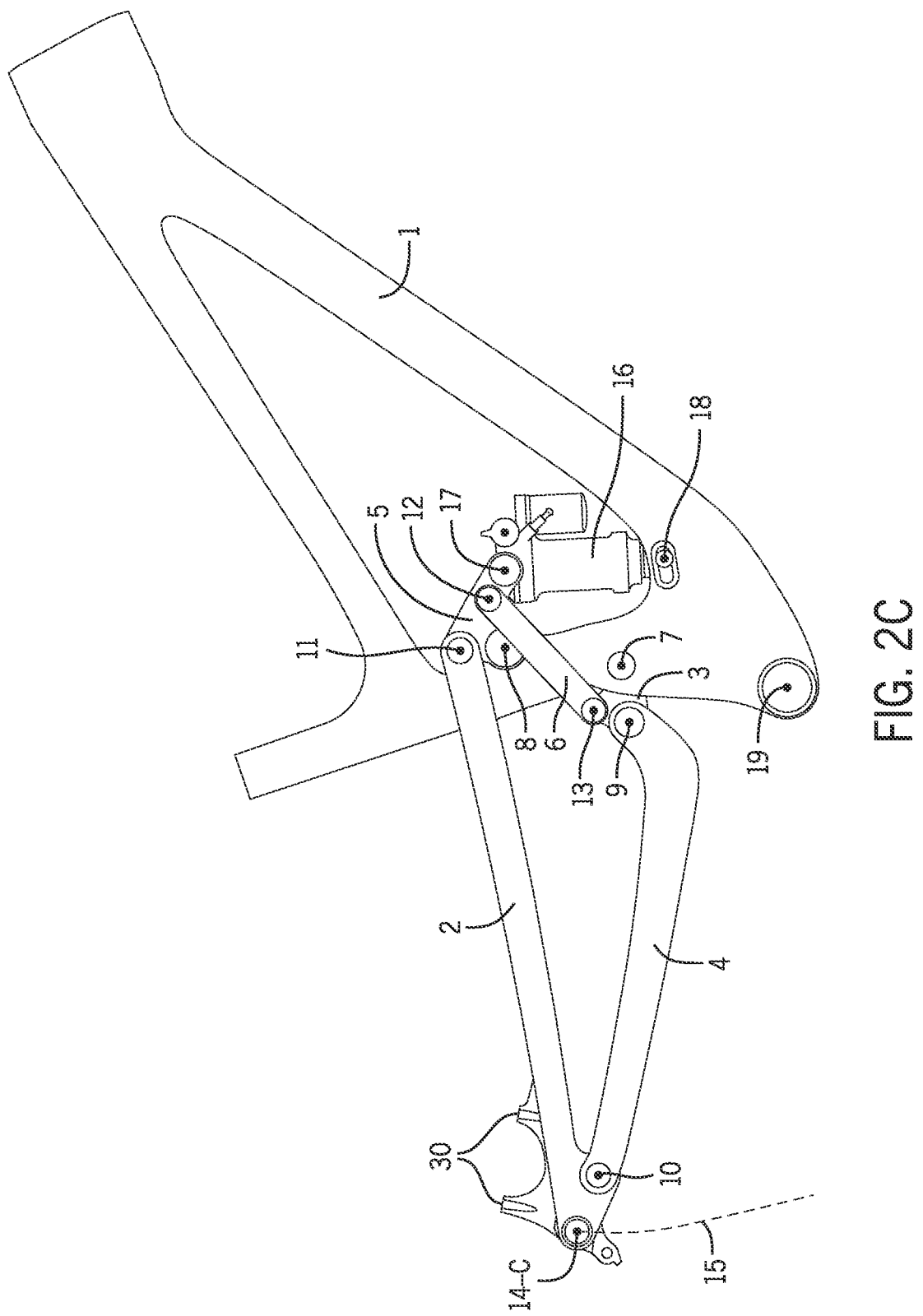
FIG. 2C shows the embodiment of FIG. 2A of a 6-bar suspension linkage system in the compressed state.
Figure 2D:
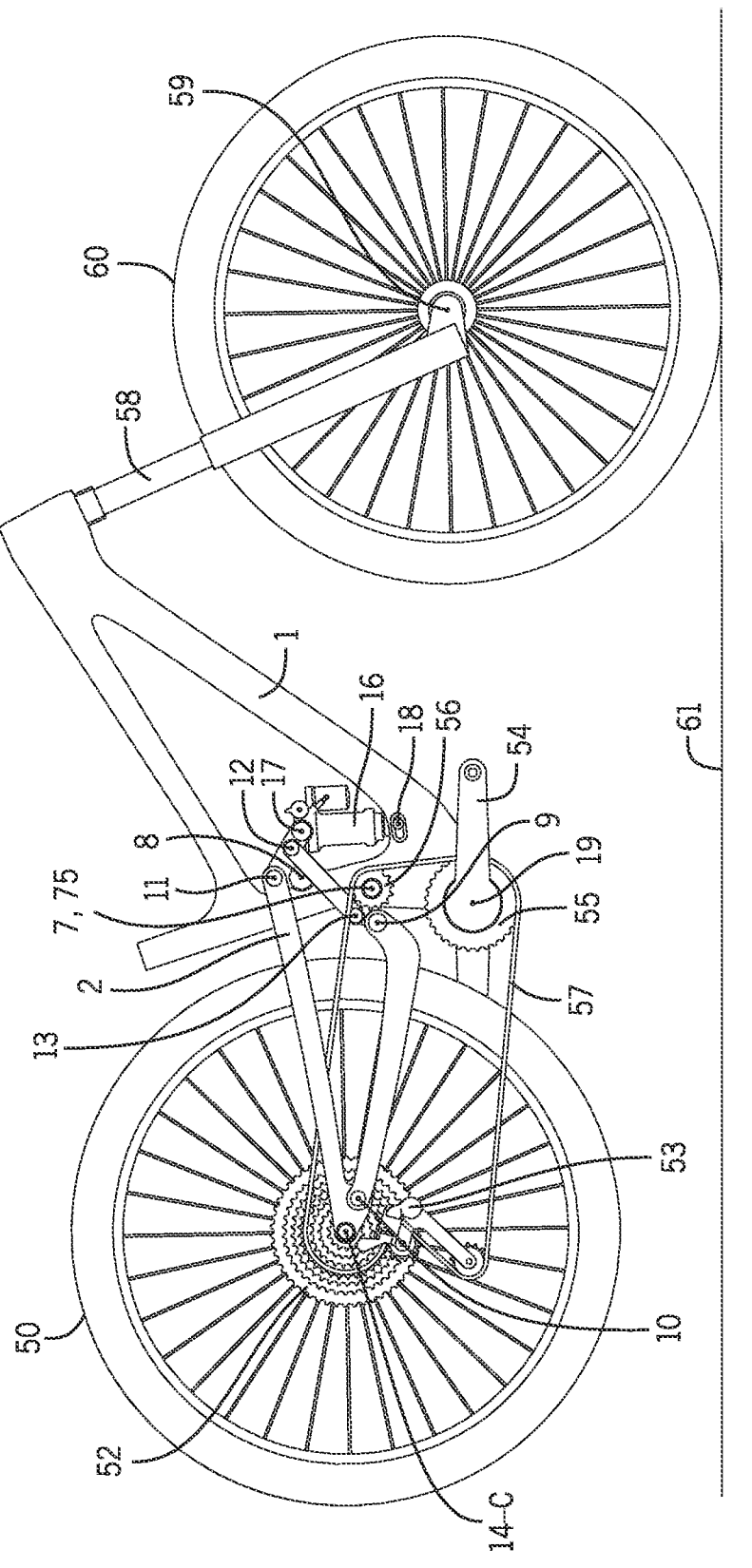
FIG. 2D shows the embodiment of FIG. 2A of a bicycle with the disclosed 6-bar suspension linkage system in the compressed state.
Figures 1, 2D:
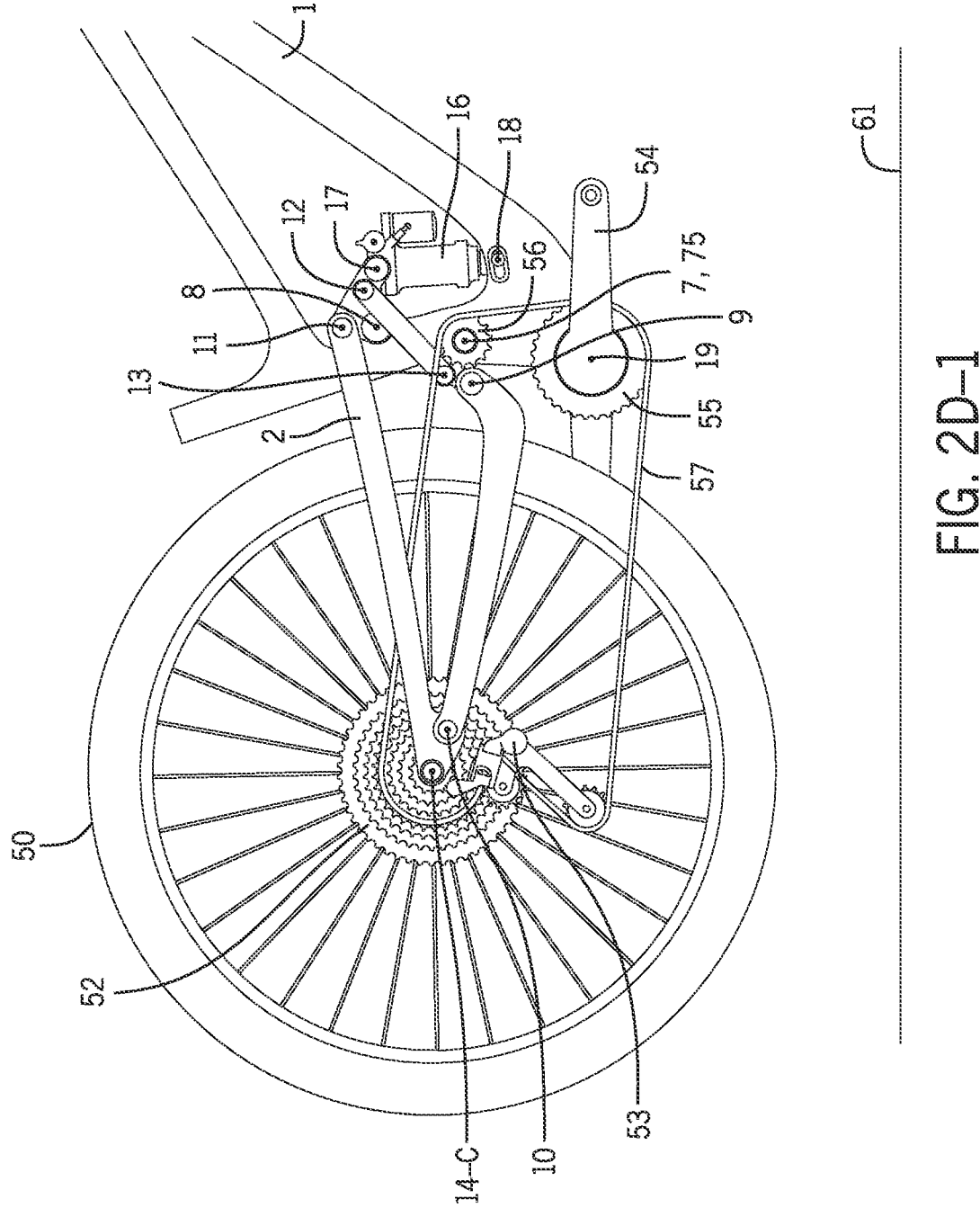
Figure 2E:
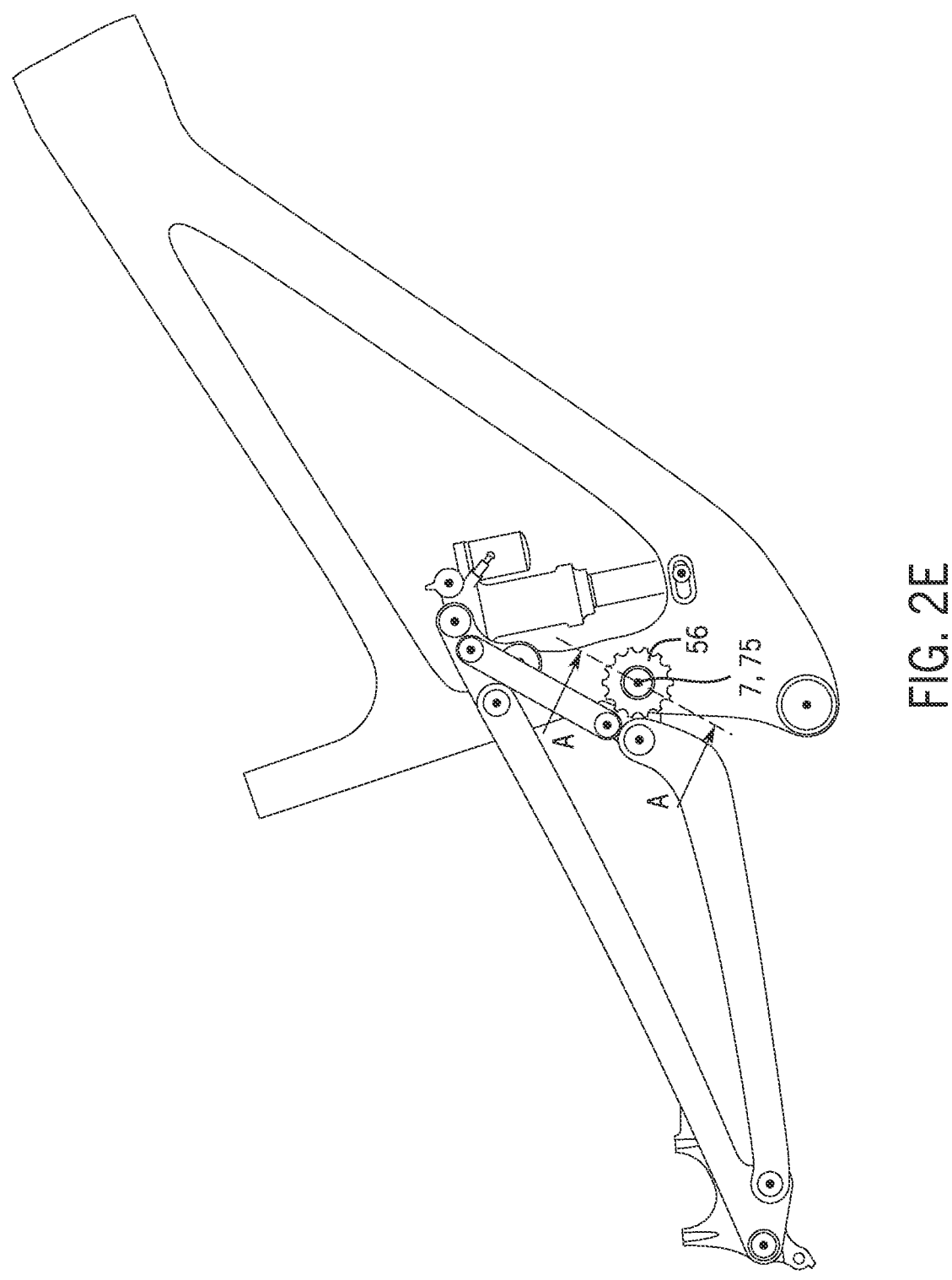
FIG. 2E shows the embodiment of FIG. 2A of a 6-bar suspension linkage system in the extended state with cross-section A.

FIG. 2C shows the bicycle frame from FIG. 2A in the compressed state. Here, rear wheel axis 14-C is shown. FIG. 2D shows the bicycle frame from FIG. 2B in the compressed state. FIG. 2E shows the 6-bar suspension linkage system of FIG. 2A in the extended state with cross-section line A-A passing through the idler cog 56.

Figure 2F:
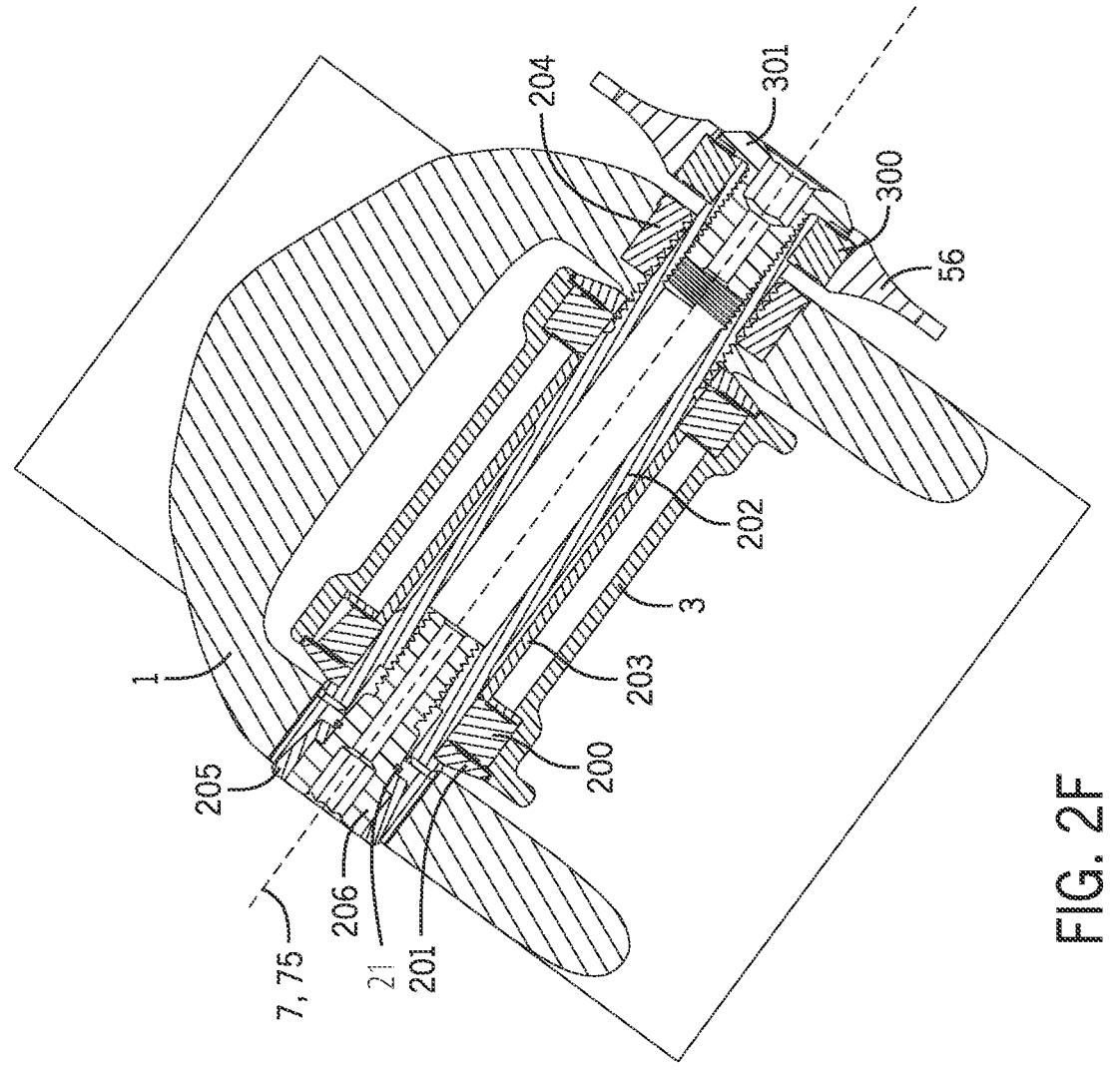
FIG. 2F shows cross-section A-A of the embodiment of FIG. 2A.

FIG. 2F illustrates a cross sectional view taken at cross-section A-A of FIG. 2E showing details of idler cog 56 assembly. For example, link body 3 can be pivotally mounted to is suspended body 1 about PIVC[1][3] axis 7. In various embodiments, the link body 3 includes a pivotable joint mechanism. For example, a set of bearings 200 can be pressed into link body 3 with bearing sleeve 203 in-between, and inner race extensions 201 to the exterior. While a bearing mechanism is described herein as an example, other joints can also be utilized (e.g. torsion joints). Axle 202 pins link body 3 to suspended body 1 and threads into a nut housed in suspended body 1. Axle 202 has an expanding collet head feature 220 so that when wedge 205 is compressed axially by bolt 206, the head of axle 202 expands against suspended body-1 preventing axle 202 from loosening. Bearing 300 is pressed into idler cog 56 and bolt 301 secures the idler cog and bearing to axle 202 so that both PIVC[1][3] 7 and idler cog axis 75 are coincident.

When idler cog axis 75 is coincident to PIVC[1][3] 7, the assembly can be optimized for weight since the idler assembly can be integrated into the pivot assembly of link body 3. This also provides fewer machined interfaces simplifying manufacturing and potentially lower costs. The chain force about idler cog 56 due to the driving cog 55 can be of high magnitude and the axle 202 provides adequate strength.

In accordance with various embodiments, the transverse envelope of the link body 4 is not limited by the chain ring 55. For example, some or all of the link body 4 is positioned above the chain ring 55. In the case of FIG. 1A, link body 4 is lower in the assembly and is positioned behind driving cog 55 in this view. As a result, the link body 4 structure must be sufficiently narrow when viewed from the top view (normal to the ground) in order to limit or prevent interference with the chainring 55 and rear wheel/tire 50. With embodiment 1, link body 4 is located higher on the frame and is above driving cog 55. As a result, link body 4 can be much wider from the back view which is illustrated further in FIGS. 1B-1C and 2G-2H. This allows for a stronger structure with the ability to provide additional tire clearance which allows for a greater range of tire size compatibility and a greater ability to shed mud, dirt and other trail debris.

Figure 2G:
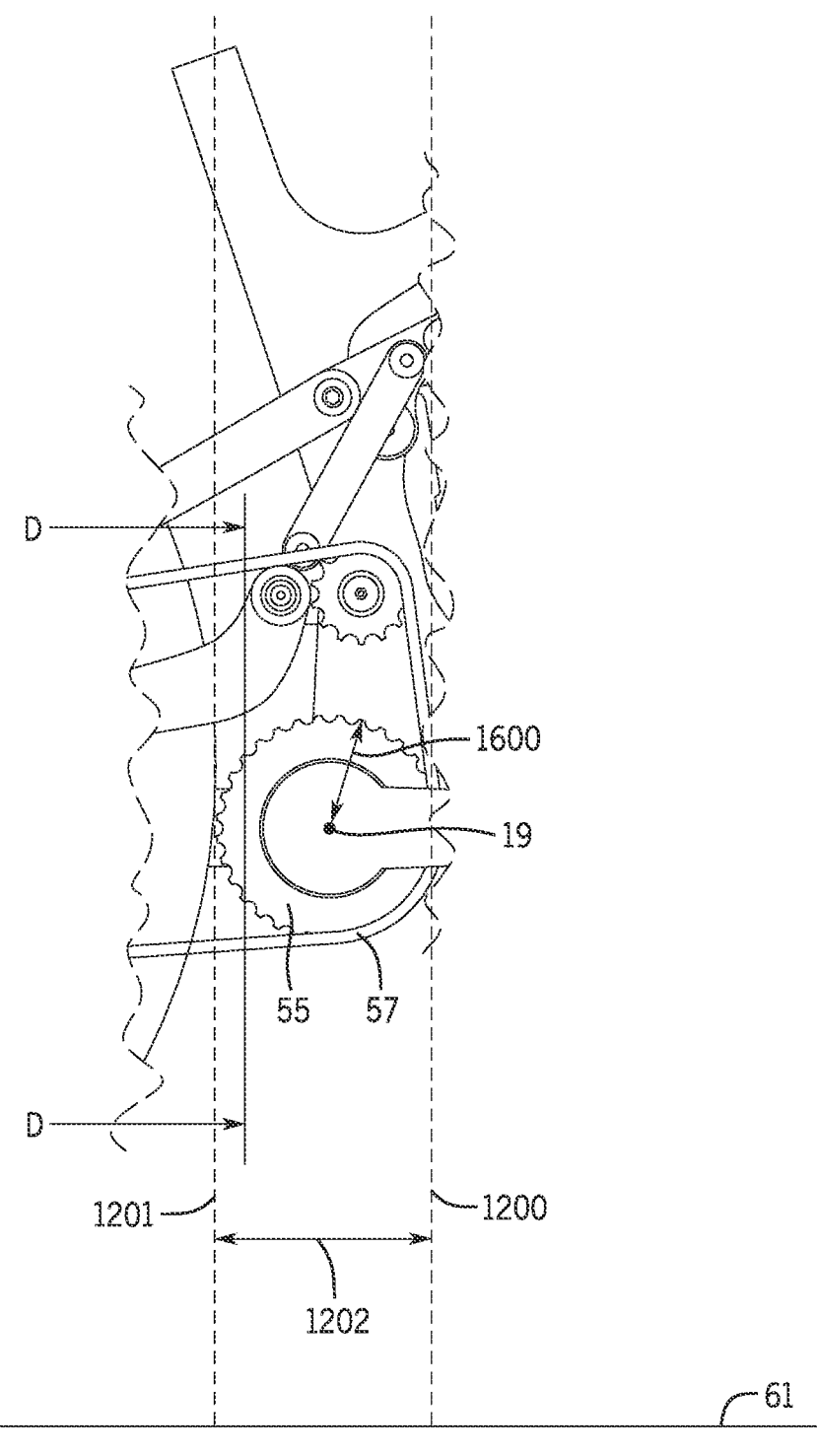
FIG. 2G is a section of the embodiment of FIG. 2B with cross section D-D.

FIG. 2G shows a section of the embodiment of FIG. 2B with cross section D-D. Here the following are shown: Driving cog axis 19; driving cog 55; chain/belt 57; ground 61; front driving cog plane 1200 which is parallel to driving cog axis 19, perpendicular to the ground, and tangent to the diameter of driving cog 55; rear driving cog plane 1201 which is parallel to driving cog axis 19, perpendicular to the ground, and tangent to the diameter of driving cog 55;

driving cog region width 1202 which is equivalent to the driving cog diameter; driving cog radius 1600 which is equivalent to half of the driving cog diameter; and cross section line D-D. Cross section line D-D is located within the region defined by the ground 61, front driving cog plane 1200, and rear driving cog plane 1201.

Figure 2H:
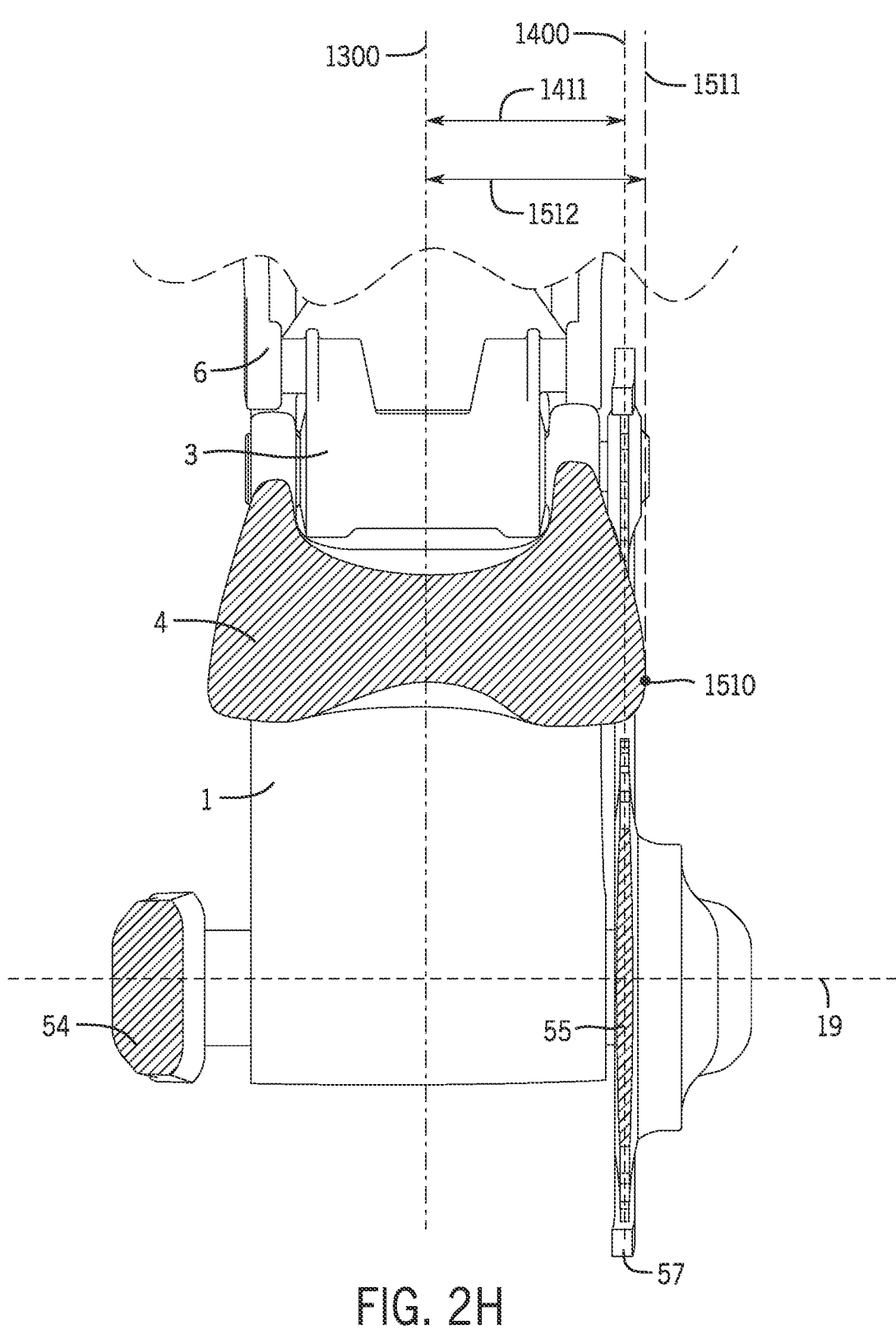
FIG. 2H shows cross-section D-D of the embodiment of FIG. 2G.

FIG. 2H shows cross-section D-D of the embodiment of FIG. 2G. Here the following are shown: Driving cog axis 19; driving cog 55; driving cog center plane 1400; chain/belt 57; crank arm assembly 54; suspended body 1; link body 3; link body 6; link body-4; point 1510 located on link body 4; link body 4 reference plane 1511 that is normal to driving cog axis 19 and coincident to point 1510; frame center plane 1300; chain/belt-line 1411 which is the distance from frame center plane 1300 to driving cog center plane 1400; and link body 4 reference distance 1512 which is the distance from frame center plane 1300 to link body 4 reference plane 1511. Here it is clear that chain/belt-line distance 1411 is less than link body 4 reference distance 1512. Therefore, a portion of link body 4 is located outside ("outside" being the direction, relative to the plane, away from the vehicle frame/suspension) of driving cog center plane 1400. The ability to extend link body 4 outward of driving cog center plane 1400 increases the strength of link body 4 by allowing for a larger cross section while maintaining clearance to driving cog body 55. It also allows for greater clearance between link body 4 and rear wheel/tire 50 which allows for more clearance for trail debris such as mud and dirt.

In accordance with various embodiments, the link body 6 length is minimized with the addition of idler cog 56. As link body 4, and link body 3 are moved upwards and dimension of 601 is greater than that of 600, the size of link body 6 decreases. This decreases the weight of link body 6 aiding in the overall performance of the machine.

In accordance with various embodiments, the anti-squat percentage can be adjusted by increasing or decreasing the diameter of idler cog 56. However, the efficiency of the chain/belt force transfer from idler cog 56 may decrease with decreased cog diameter. In accordance with various embodiments, alternative tuning can be performed by changing the relationship between idler cog axis 75 and PIVC[1][3] 7. For example, idler cog axis 75 can be moved so that it is not coincident to PIVC[1][3] 7. This alternative structure is discussed in more detail in the disclosure of FIGS. 3A-3F.

Figure 3A:
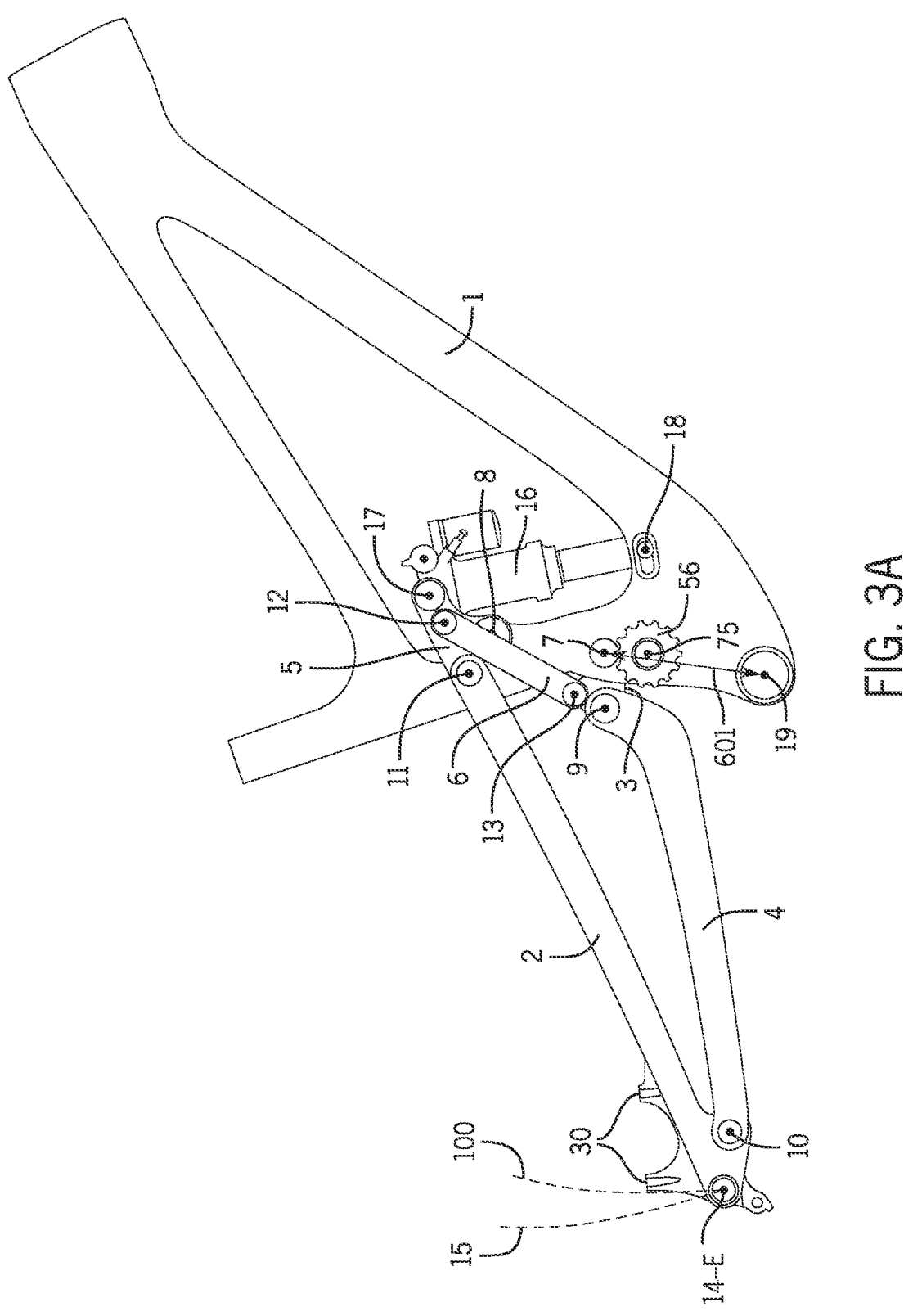
FIG. 3A shows another embodiment of a 6-bar suspension linkage system in the extended state.

With regards to FIGS. 3A-3F and in accordance with various embodiments, the suspension system includes a 6 bar linkage. FIG. 3A shows a bicycle frame with a 6 bar suspension with idler cog 56 with axis 75. Here, crank arm 54 and driving cog 55 rotate about driving cog axis 19. The suspension includes a suspended body 1, a link body 2, a link body 3, a link body 4, a link body 5, and a link body 6 operatively coupled with one another. In accordance with various embodiments, the link body 2 is the wheel carrier and the brake carrier body. In other embodiments, the wheel carrier and the brake carrier body may differ. The link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC[2][5] 11, and the link body 6 defining PIVC[5][6] 12. The suspension includes a damper unit 16 pivotally connected to link body-5 at 17 and suspended body 1 at 18 configured to resist movement between the two bodies. Brake caliper mounts 30 and rear wheel axis at the extended state 14-E are located on link body 2 which is also the wheel carrier and brake carrier body in this embodiment. In accordance with various embodiments, the link body 2 is the seatstay. Alternatively, the seatstay may be a different link body in other embodiments. In accordance with various embodiments, the link body 4 may be referred to the chainstay. Alternatively, the chainstay may be a different link body in other embodiments. Note that idler cog axis 75 is offset from (i.e. not coincident with) PIVC[1][3] 7. Also shown is distance 601, which is the distance between the driving cog axis and PIVC[1][3] 7. This distance is pertinent to the magnitude of rearward direction of DWAP 15. Note that offset 601 is greater than offset 600, and as a result, DWAP 15 is more rearward compared to DWAP 100.

Figure 3B:
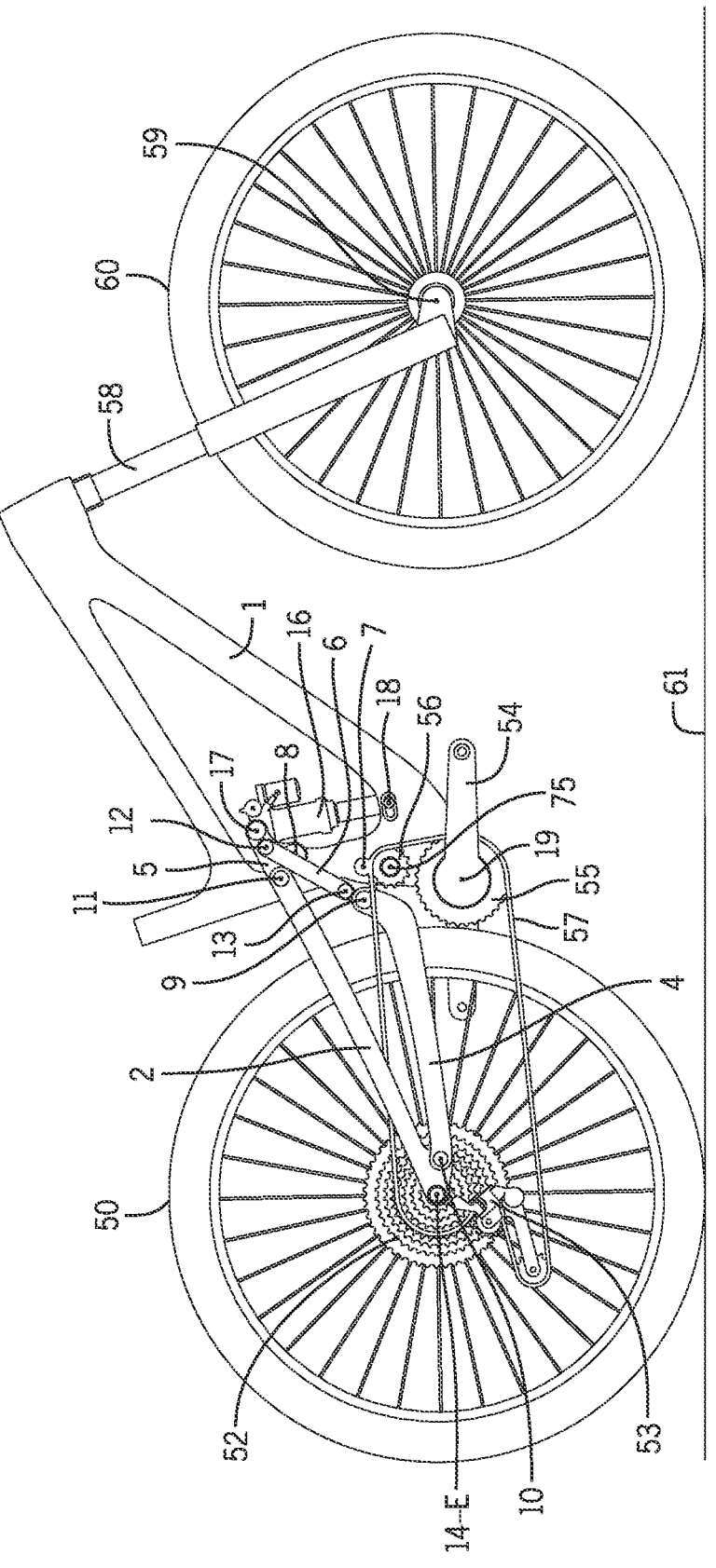
FIG. 3B shows the embodiment of FIG. 3B of a bicycle with the disclosed 6-bar suspension linkage system in the extended state.

FIG. 3B shows the bicycle frame from FIG. 3A with additional components for clarity. Here rear wheel 50 is pivotally connected to link body 2 and rear wheel axis 14-E. A rear cassette 52 is a group of various driven cog sizes. The chain/belt 57 can be shifted into mechanically via rear derailleur mechanism 53 moving between the various driven cogs. Idler cog 56 includes axis 75. Axis 75 is offset from IVC[1][3] 7. Chain/belt 57 is routed from driving cog 55, which is rigidly connected to crank arm assembly 54, to idler cog 56 to a driven cog of cassette 52 through the cogs of rear derailleur 53 and back to the driving cog 55 in a continuous loop. When the crank arm assembly 54 is rotated, power is transmitted from driving cog 55 to a driven cog of cassette 52 via the idler cog 56. As a result, the chain force vector is along the top part of the chain/belt from the tangent connection point of the driven cog of cassette 52 to the tangent connection point of idler cog 56. Note that the cassette 52 with multiple driven cogs and the derailleur mechanism 53 may be absent in other embodiments. In other embodiments, a single driven cog may be used. Also shown is a front suspension fork 58 wherein front wheel 60 is pivotally connected at front wheel axis 59. Rear wheel 50 and front wheel 60 contact the ground 61.

Figure 3C:
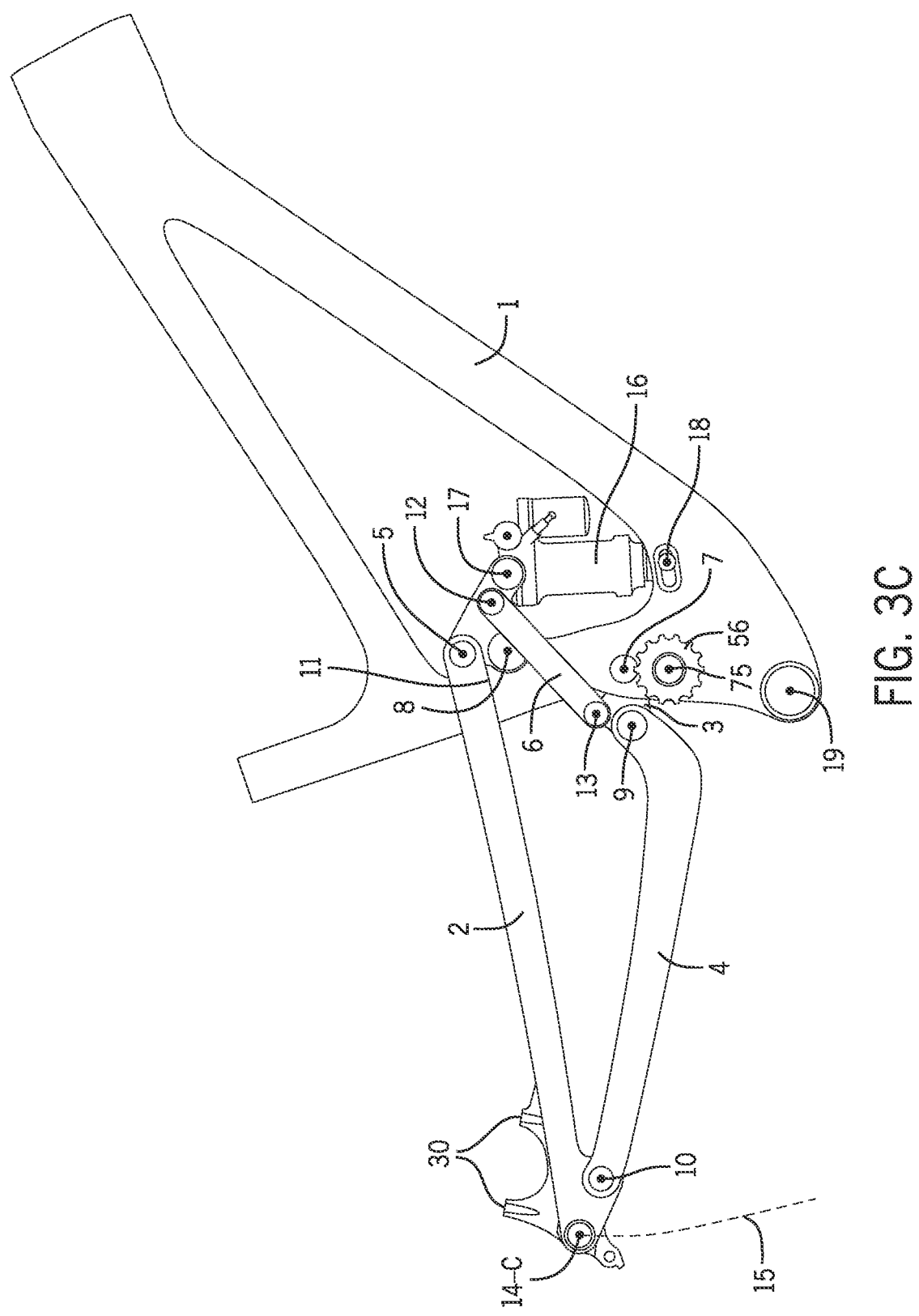
FIG. 3C shows the embodiment of FIG. 3B of a 6-bar suspension linkage system in the compressed state.
Figure 3D:
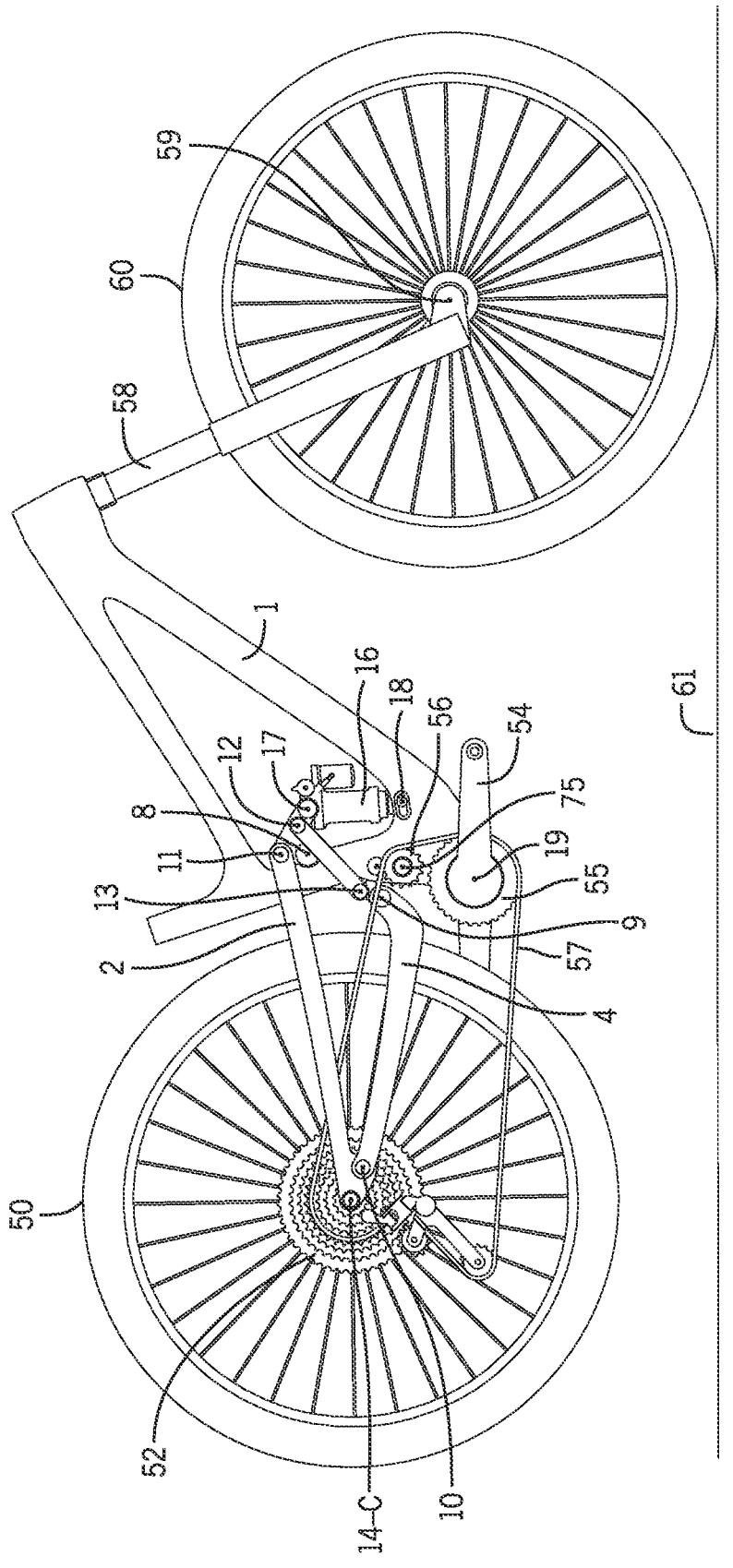
FIG. 3D shows the embodiment of FIG. 3B of a bicycle with the disclosed 6-bar suspension linkage system in the compressed state.
Figure 3E:
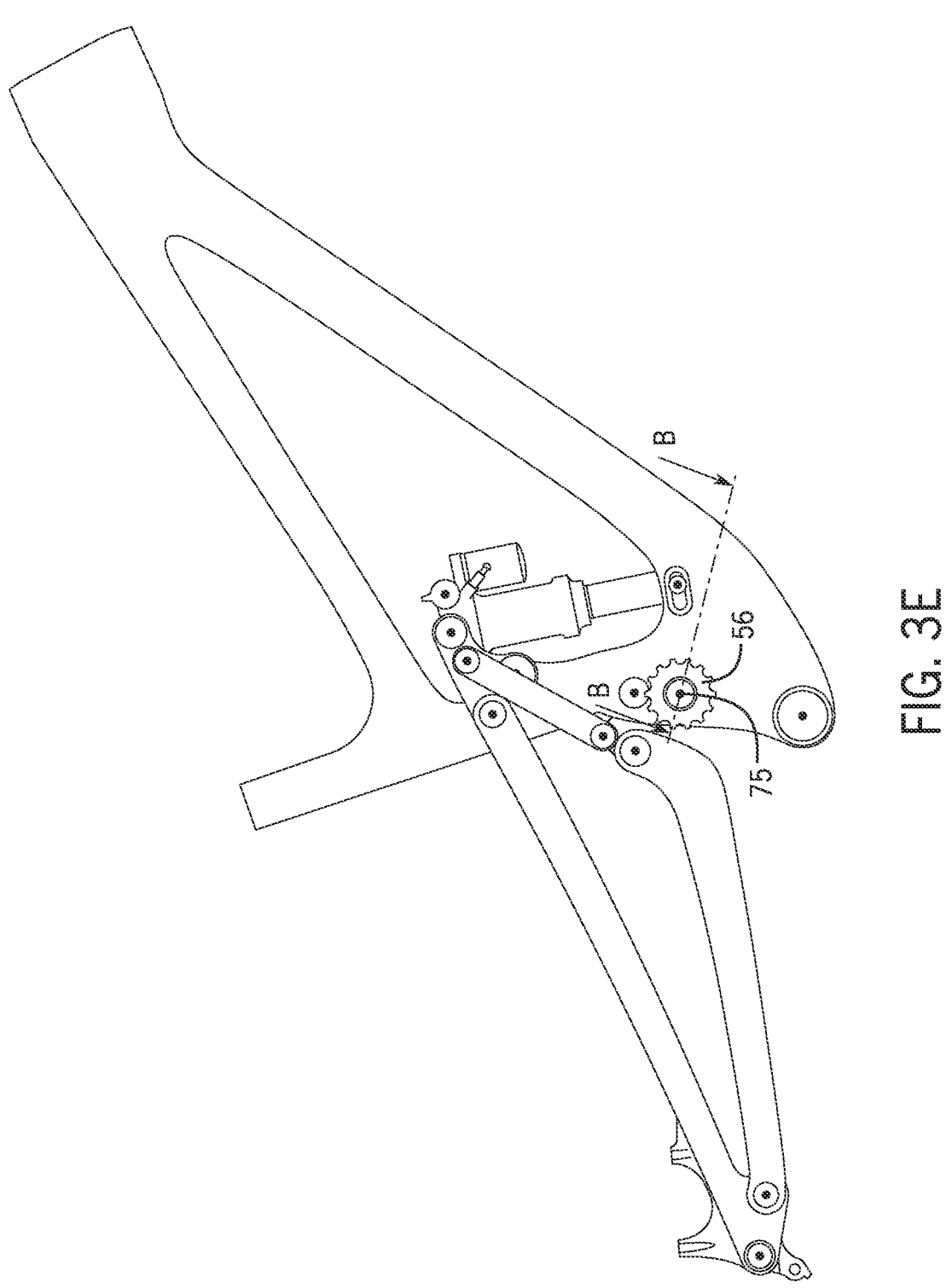
FIG. 3E shows the embodiment of FIG. 3B of a 6-bar suspension linkage system in the extended state with cross-section B.

FIG. 3C shows the bicycle frame from FIG. 3A in the compressed state. Here, rear wheel axis 14-C is shown. FIG. 3D shows the bicycle frame from FIG. 3B in the compressed state. FIG. 3E shows the 6-bar suspension linkage system of FIG. 3A in the extended state with cross-section line B-B through idler cog 56.

Figure 3F:
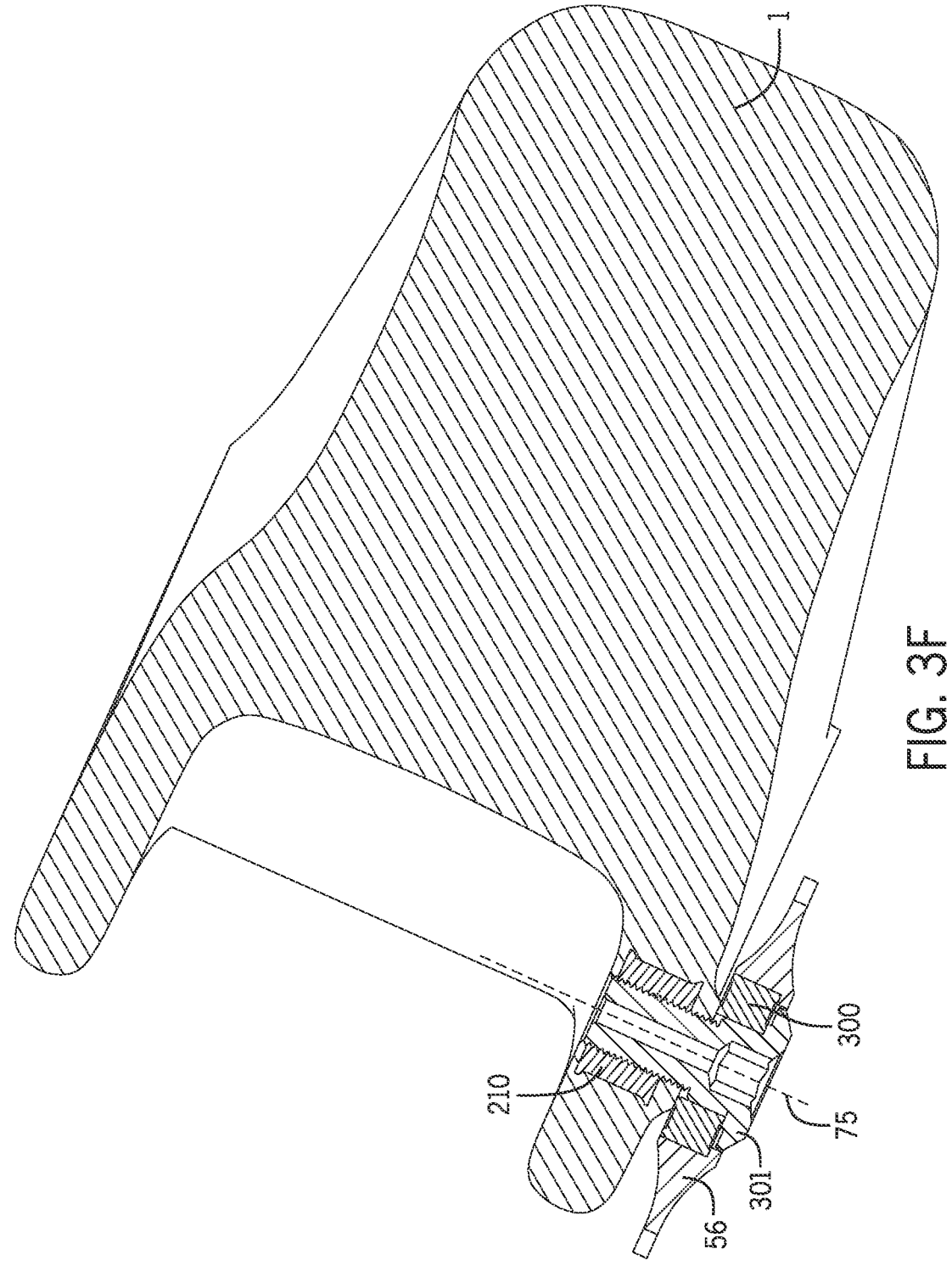
FIG. 3F shows cross-section B-B of the embodiment of FIG. 3B.

FIG. 3F shows the cross-section taken along line B-B of FIG. 3E showing details of the idler cog 56 assembly. Here bearing 300 is pressed into idler cog 56 and bolt 301 secures the idler cog and bearing to threaded insert 210 housed within suspended body-1.

When idler cog axis 75 is offset from PIVC[1][3] 7, a greater range of anti-squat percentages are possible. The idler cog diameter can remain the same, while a large change in anti-squat is possible depending upon the location of idler cog axis 75. The anti-squat percentage can be fine-tuned by increase or decreasing the diameter of idler cog 56.

Tony Foale (Foale, Tony. *Motorcycle Handling and Chassis Design the Art and Science. Second Edition*. Spain: Tony Foale Designs by Tony Foale, 2002. PDF accessed 2011.) incorporated herein by reference in its entirety, details a simple graphical method to determine anti-squat and anti-rise percentages by using a side view of a belt or chain-driven two-wheel vehicle.

Figure 4:
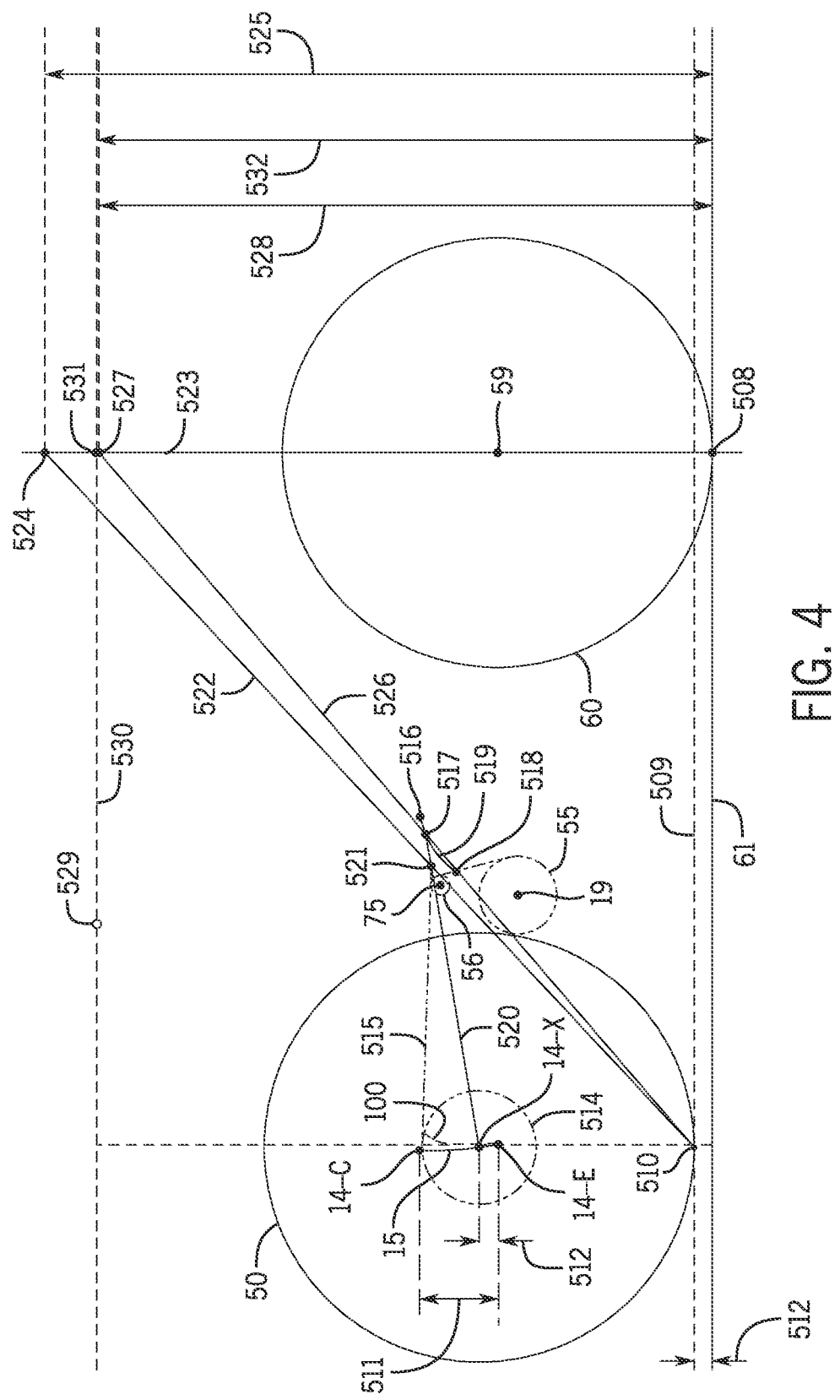
FIG. 4 is a schematic illustrating an anti-squat and anti-rise analysis of a 6-bar suspension with an idler.

The method described in Tony Foale is used in the analysis shown in FIG. 4. Shown in FIG. 4 are the following: Driven wheel 50; front wheel 60; Front wheel axis 59; Driven wheel axis at the extended state 14-E; Driven wheel axis at an intermediate state 14-X; Driven wheel axis at the compressed state 14-C; Driven wheel axis path (DWAP) 15 and DWAP 100 for comparison. Ground line 61 tangent to driven wheel at extended state and perpendicular to gravity; Tangent point 508 of front wheel 60 to ground line 61; Ground line at an intermediate state 509 is parallel to 61; Driven wheel tire to ground tangent point at an intermediate state 510; Total driven wheel suspension travel distance perpendicular to the ground line known as the total vertical wheel travel 511; Intermediate driven wheel suspension travel distance perpendicular to the ground line known as the intermediate vertical wheel travel 512; Driving cog 55 and driving cog axis 19; Driven cog 514; Chain force vector 515 that is tangent to the tops of idler cog 56 and the driven cog 514; Idler cog 56 rotates about idler cog axis 75; DIVC[AD] at the extended state 516; DIVC[AD] at an intermediate state 517; DIVC[AD] at the compressed state 518; DIVC [AD] migration path 519; Driving force vector 520 drawn through the driven wheel axis at an intermediate state 14-X and the DIVC[AD] at an intermediate state 517; Instantaneous Force Center (IFC) 521 located at the intersection of chain force vector 515 and driving force vector 520; Anti-Squat force vector 522 drawn through the driven wheel tire to ground tangent point at an intermediate state 510 and the Instantaneous Force Center (IFC) 521; Squat layout line 523 which is perpendicular to the ground and passes through front wheel axis 59; Anti-Squat definition point 524 where Anti-Squat force vector 522 intersects with Squat layout line 523; Anti-Squat measured distance 525 is the perpendicular distance from the ground line 61 to the Anti-Squat definition point 524; Anti-Rise force vector 526 is drawn through driven wheel tire to ground tangent point at an intermediate state 510 and DIVC[AD] at an intermediate state 517; Anti-Rise definition point 527 where Anti-Rise force vector 526 intersects the Squat layout line 523; Anti-Rise measured distance 528 is the perpendicular distance from the ground line 61 to the Anti-Rise definition point 527; Center of Gravity (COG) 529 is the mass of the suspended body of the vehicle including the rider, passengers and any cargo; COG horizontal 530 is a line drawn parallel to the ground through COG 529; COG definition point 531 is the point in which the COG horizontal 530 intersects the Squat layout line 523; COG measured distance 532 is the perpendicular distance from the ground line 61 to the COG horizontal 530.

Anti-Squat may be defined as:

$$Anti\text{-}Squat = \left(\frac{Anti\text{-}Squat \ measured \ distance}{COG \ measured \ distance}\right)100\%$$

Anti-Squat in this example is then equal to:

$$Anti\text{-}Squat = \left(\frac{Anti\text{-}Squat \ measured \ distance(525)}{COG \ measured \ distance(532)}\right)100\%$$

Anti-Rise may be defined as:

$$Anti\text{-}Rise = \left(\frac{Anti\text{-}Rise \ measured \ distance}{COG \ measured \ distance}\right)100\%$$

Anti-Rise in this example is then equal to:

$$Anti\text{-}Rise = \left(\frac{Anti\text{-}Rise \ measured \ distance(528)}{COG \ measured \ distance(532)}\right)100\%$$

Anti-squat and anti-rise may be calculated at all points from the extended state to the compressed state to generate anti-squat and anti-rise curves. These curves are typically plotted as a function of "vertical wheel travel" which is equivalent to the total driven wheel suspension travel distance 511 perpendicular to the ground line 61 in FIG. 4. The anti-squat curve will change depending upon the sizes of idler cog 56 and driven cog 514 since this will change the location of the Instantaneous Force Center (IFC) 521. Note that in this example the DIVC[AD] is considered. As a result, both the anti-squat and anti-rise may be calculated using the DIVC[AD] migration. If the suspension linkage was arranged so that the DIVC[A] was separate from the DIVC[D], the DIVC[A] migration would be used to calculate the anti-squat, while the DIVC[D] migration would be used to calculate the anti-rise using the same methodology.

When the suspended body is loaded with a rider, passenger or cargo the suspension will compress or sag to a desired vertical wheel travel at sag point between the extended and compressed state. The preferred sag point varies depending upon desired ride characteristics but typically ranges between 15-45%. The suspension will be positioned near this sag point as the vehicle accelerates from a static position.

The sag percentage is defined as the following:

$$Sag = \left(\frac{Vertical \ wheel \ travel \ value \ at \ sag \ point}{Total \ vertical \ wheel \ travel \ value}\right)100\%$$

Figure 5:
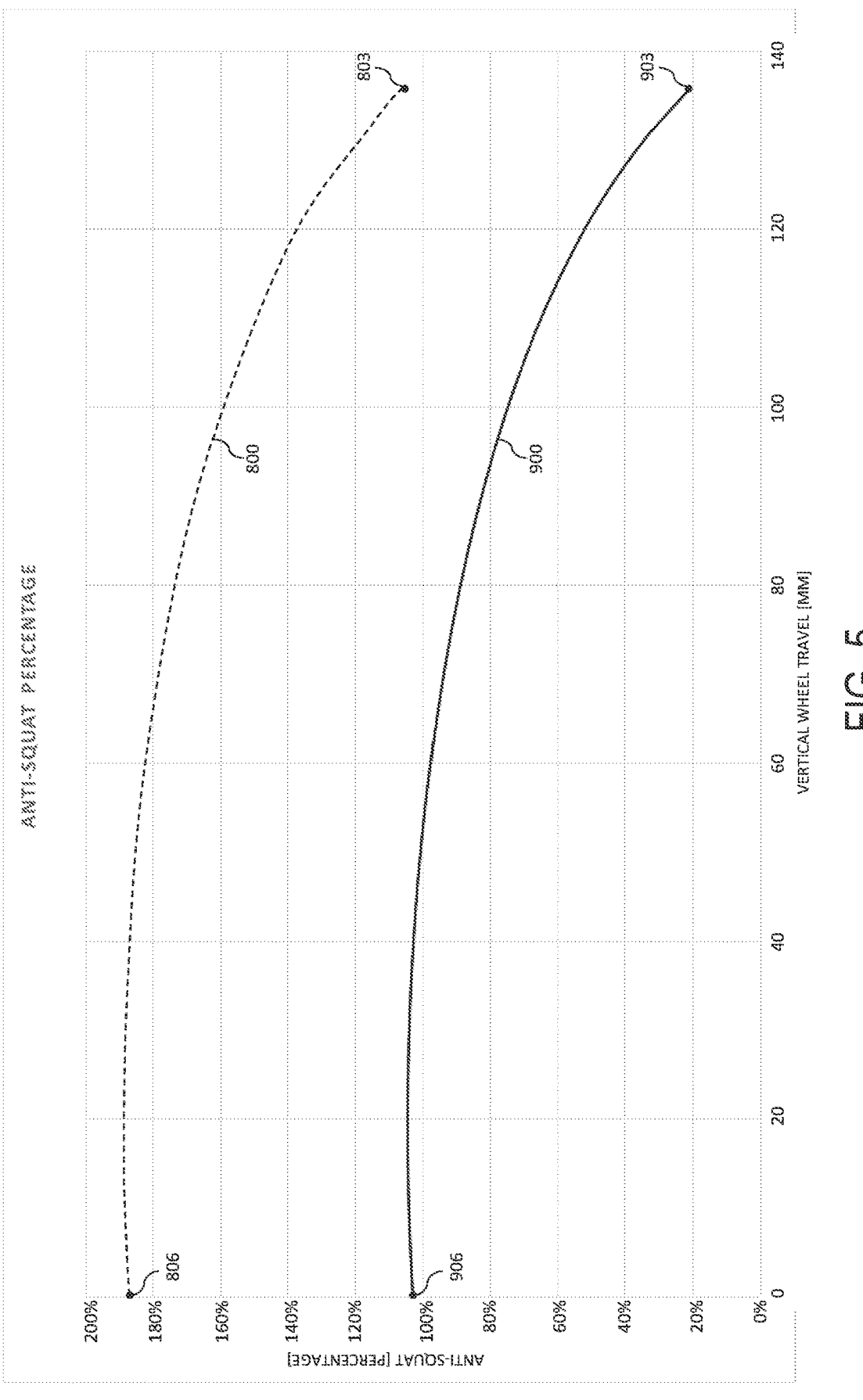
FIG. 5 is a graph depicting expected/exemplary anti-squat curves of a 6-bar suspension linkage system with a typical configuration and an expected/exemplary anti-squat curve of the embodiments illustrated in FIGS. 2A and 3A.

If the suspension linkage geometry/layout is altered, (number of linkage bodies, link body lengths and PIVC locations), the anti-squat, anti-rise, and leverage rate curves may vary. Suspension performance is therefore directly related to the suspension linkage layout. For example, FIG. 5 shows two anti-squat curves as a comparison. Anti-squat curve 900 is an example from the embodiment of FIG. 2A where an idler cog is implemented. In this example, the dimension of 601 is about 136 mm. 906 is the anti-squat percentage of the embodiment of FIG. 2A at the extended state, while 903 is the anti-squat percentage of the embodiment of FIG. 2A at the compressed state. Anti-squat curve 800 is that of linkage layout of the embodiment of FIG. 1A where no idler cog is used. In this example, dimension 600 is ~70 mm. In this case the chain force vector is tangent to the tops of driving cog 55 and the driven cog 514. 806 is the anti-squat percentage of at the extended state, while 803 is the anti-squat percentage at the compressed state in this case. The addition of the idler cog of the embodiment of FIG. 2A greatly reduces the anti-squat percentage, but the general curve form may remain. The same may be true with the embodiment of FIG. 3B. Anti-squat curves 600 and 800 have a generally stable and higher anti squat values initially creating an efficient pedaling platform that prevents bobbing when accelerating. This results in efficient power transfer during acceleration since energy is not being wasted to compress the shock/damper. There is then a non-linear drop-off towards the compressed state. This is beneficial because continuing a similar high anti-squat percentage in this portion of the travel since it would inhibit suspension compression from absorbing impacts.

Figure 19:
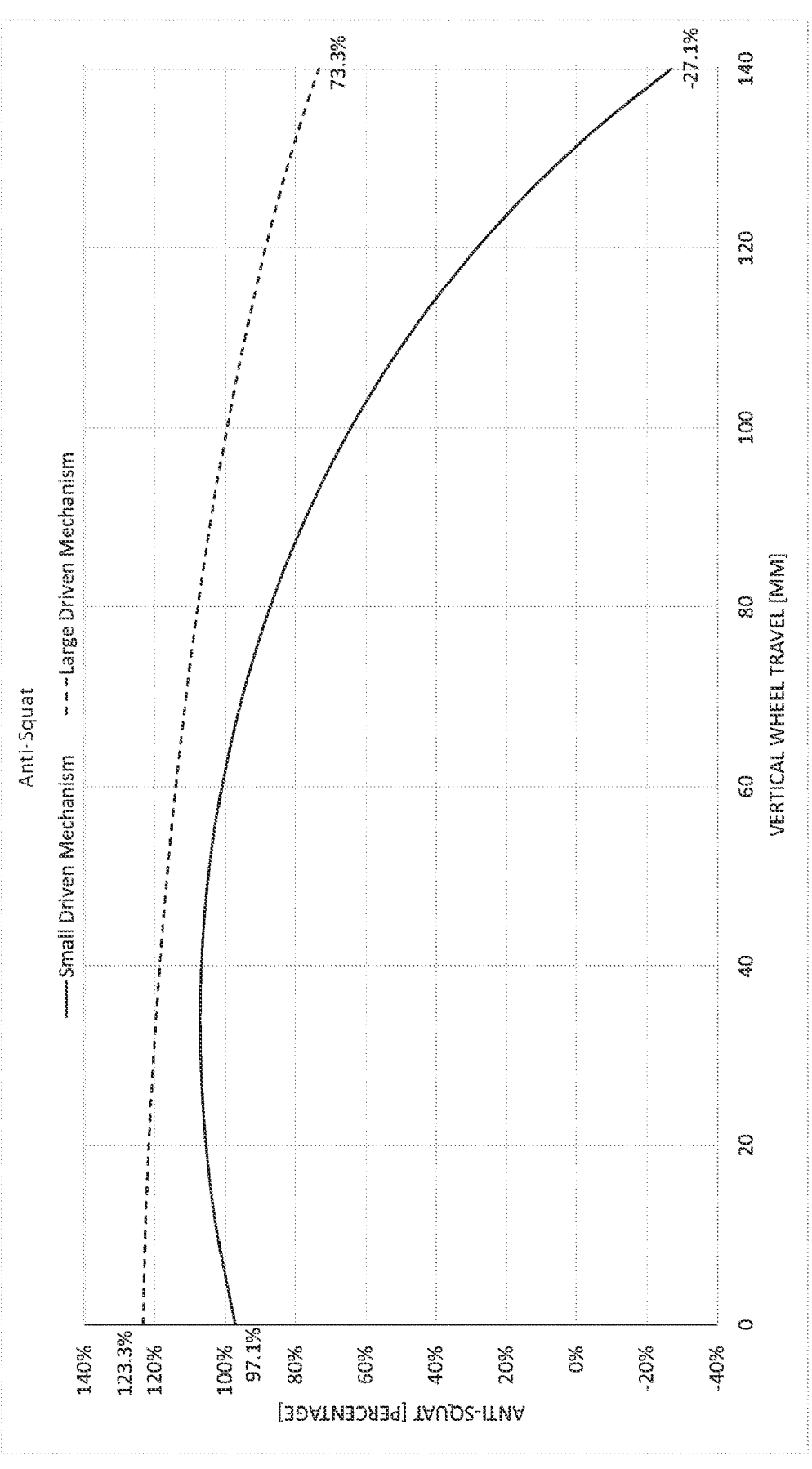
FIG. 19 is a graph depicting expected/exemplary anti-squat curves of a 6-bar suspension linkage system of the present disclosure with relatively smaller and larger driven mechanisms (e.g., differently sized cogs of a rear cassette).

FIG. 19 depicts expected/exemplary anti-squat curves of a 6-bar suspension linkage system of the present disclosure with relatively smaller and larger driven mechanisms (e.g., differently sized cogs of a rear cassette). For example, as the chain/belt 57 is moved between differently sized driven mechanisms (e.g., between differently sized cogs 514 of a rear cassette 52), the anti-squat behavior of the suspension linkage may change. For example, when the belt/chain 57 drives a relatively larger cog 514 (i.e., the bike is in a relatively lower gear), the anti-squat may initially increase as the vertical wheel travel increases (e.g., between about 0-mm and about 35-mm). As the vertical wheel travel increases further, the anti-squat may fall. The relationship between anti-squat and vertical wheel travel may have a maximum point between the minimum and maximum vertical wheel travel. When the belt/chain 57 drives a relatively smaller cog 514 (i.e., the bike is in a relatively higher gear), the anti-squat may fall between the minimum and maximum vertical wheel travel. The anti-squat may have a maximum value at a minimum value of vertical wheel travel and a minimum value at a maximum value of vertical wheel travel. Other driven mechanisms may exhibit other suitable anti-squat behavior.

Figure 20:
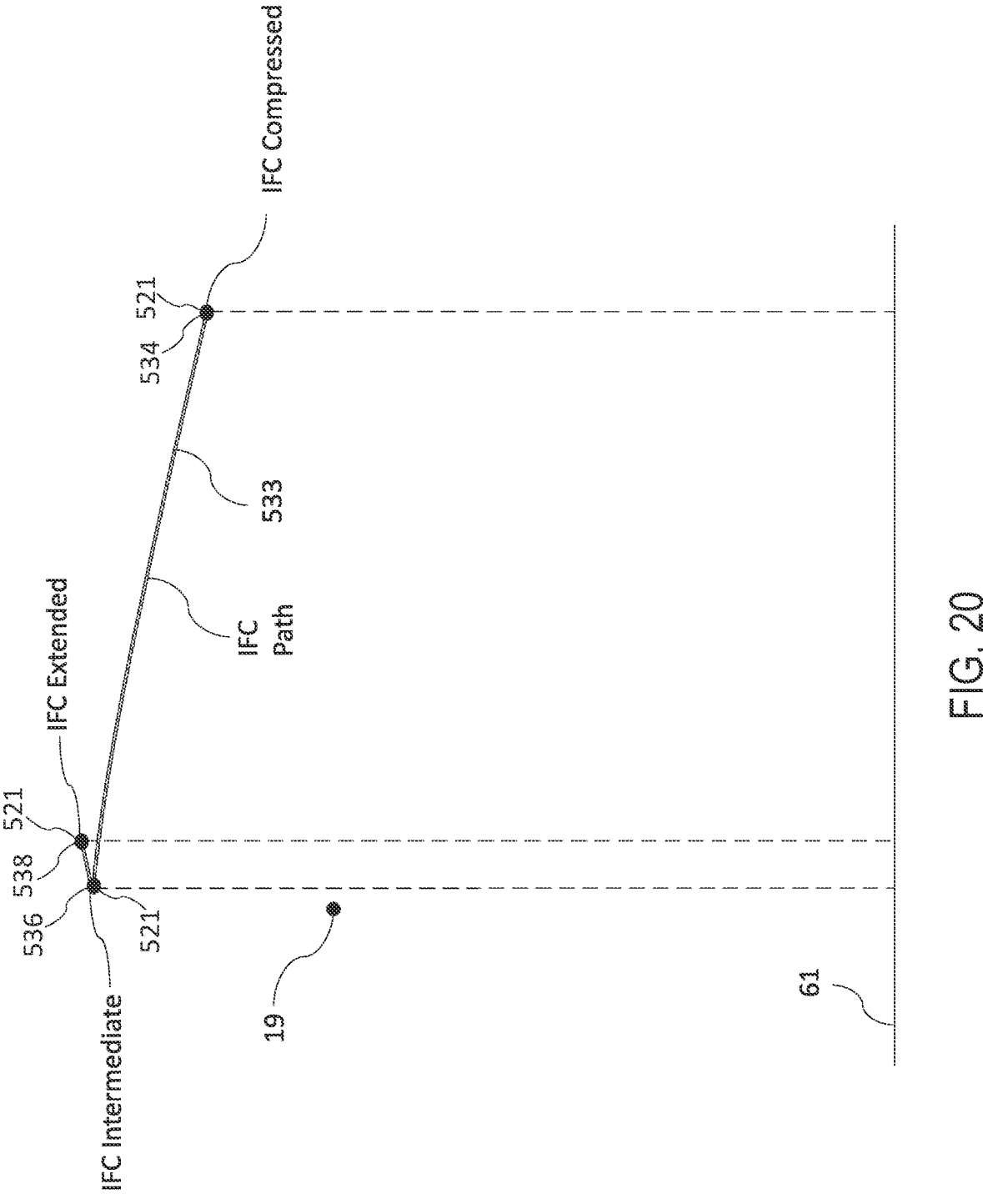
FIG. 20 is a graph depicting an expected/exemplary migration path of an instantaneous force center as a suspension linkage moves between extended and compressed states.

FIG. 20 is a graph depicting an expected/exemplary migration path 533 of an IFC 521 of any suspension linkage of the present disclosure. The migration path is shown relative to the driving cog axis 19 and the ground line 61, for reference. As the suspension linkage moves between an extended and compressed state, the IFC 521 may move rearward to an intermediate position 536 and then forward to compressed position 534. For example, when a suspension linkage is in an extended state, the IFC 521 may be in an extended position 538. As the suspension linkage is compressed, the IFC may move rearward along the migration path 533 to an intermediate position 536. As the suspension is further compressed, the IFC 521 may move forward along the migration path 533 to a compressed position 534. The compressed position 534 may be forward of one or both of the extended position 538 and/or the intermediate position 536. This reversing motion of the IFC along the path 522 influences the increasing/decreasing behavior of the anti-squat in certain driven mechanism (e.g., the anti-squat of the relatively larger driven mechanism in FIG. 19).

The anti-squat includes (e.g., is the sum of) two components, often referred to as "frame" anti-squat and "chain/belt" anti-squat. Chain/belt anti-squat is related to the lengthening of the Power Transmitting (PT) portion of the chain/belt (e.g., the top portion of the chain/belt 57 between to the tops of idler cog 56 and the driven cog 514), as the suspension is moved from the extended to the compressed state. Note that the lengthening of the PT portion of the chain/belt 57 may result in counter clockwise ("CCW") rotation of the crank arm 54 when viewed as in FIG. 1A. This CCW rotation is opposite of the clockwise ("CW") direction when the rider inputs a force on the pedals during acceleration and can be detrimental to suspension performance.

The amount of lengthening of the power transmitting portion may vary depending on the diameter of driven cog 514 (e.g., as shown and described with respect to FIG. 19), which may vary depending upon which gear is chosen within the cassette 52, chain/belt anti-squat may vary as well. Thus, a "family" of anti-squat curves per driven cog diameter may be generated.

Figure 21A:
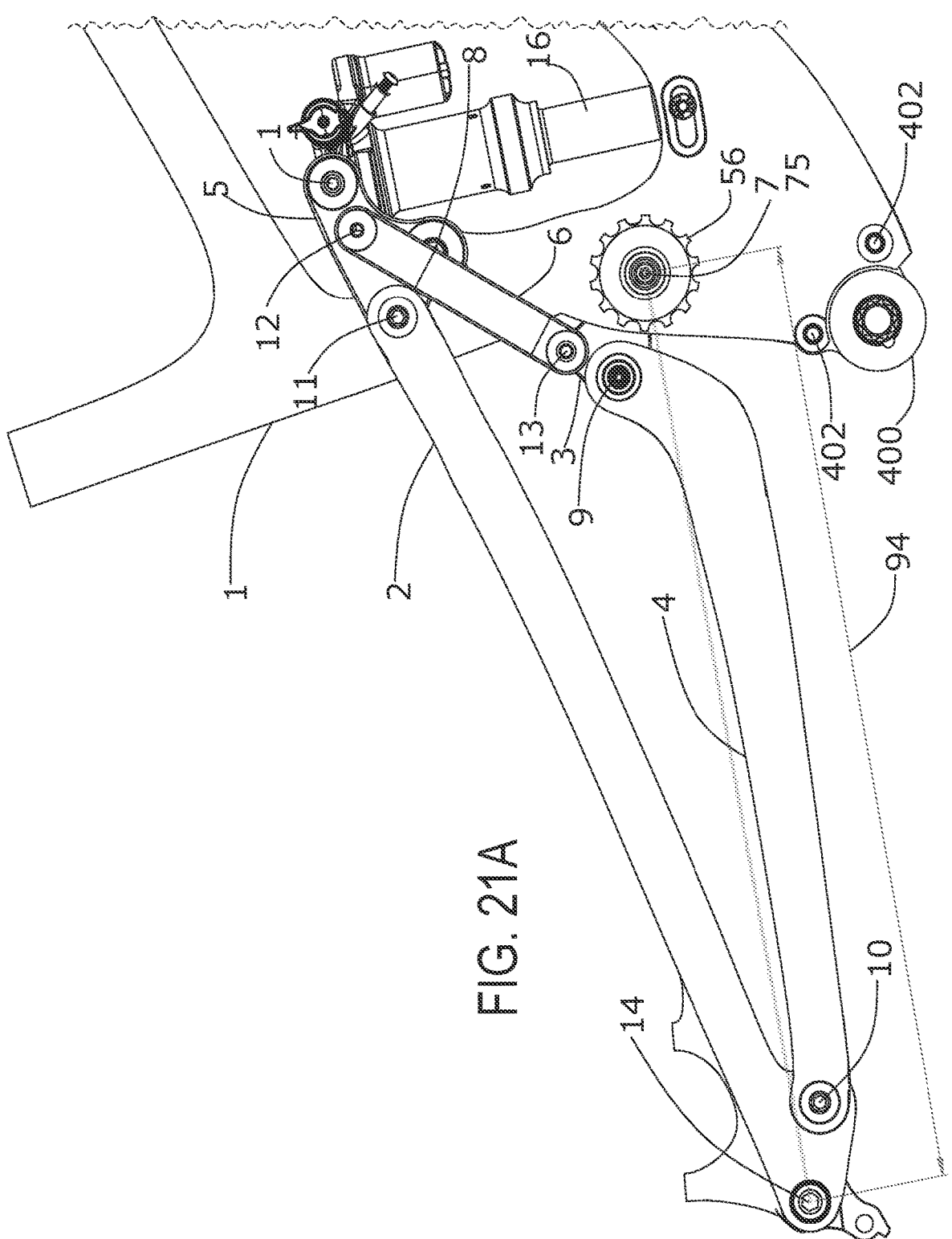
FIG. 21A shows an example of a suspension linkage of an electric bike in an at least partially extended position.
Figure 21B:
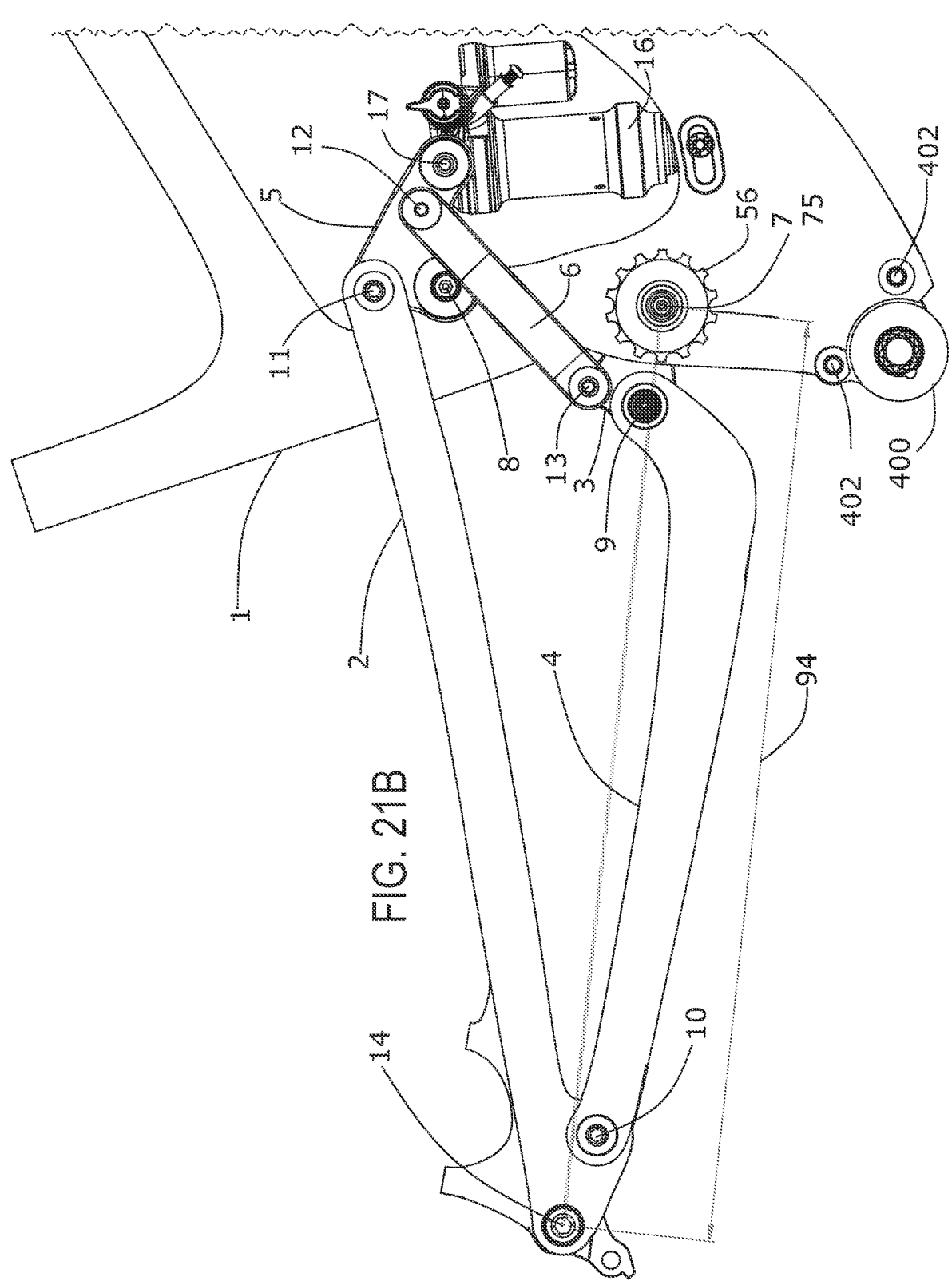
FIG. 21B shows the suspension linkage of FIG. 22A in an at least partially contracted position.

To simplify the analysis of chain/belt anti-squat behavior into one approximated parameter, the Power Transmitting Length "PTL" is introduced. As shown in FIGS. 21A-B, the PTL 94 is the distance between driven wheel axis 14 and idler axis 75. The diameter of the driven or driving cogs are not considered. This PTL 94 may vary as the suspension moves from the extended state to the compressed state. FIG. 21A shows PTL 94 when the suspension in the extended state, while FIG. 21B shows the PTL 94 when the suspension in the compressed state. The PTL may be computed as a function of the vertical wheel travel "VWT".

"dPTL" is the rate of change of the PTL or the slope of the f(VWT)=PTL curve. Given a set of VWT and corresponding PTL data points, dPTL may be calculated as:

$$dPTL = \frac{\Delta PTL}{\Delta VWT}$$

dPTL may then be plotted as a function of VWT. The magnitude of the dPTL represents the chain/belt anti-squat component that has been simplified and does not consider the driven or driven cog diameters. This is useful for understanding the overall chain/belt anti-squat behavior, and to aid in tuning of this variable with respect to sag.

Figure 22:
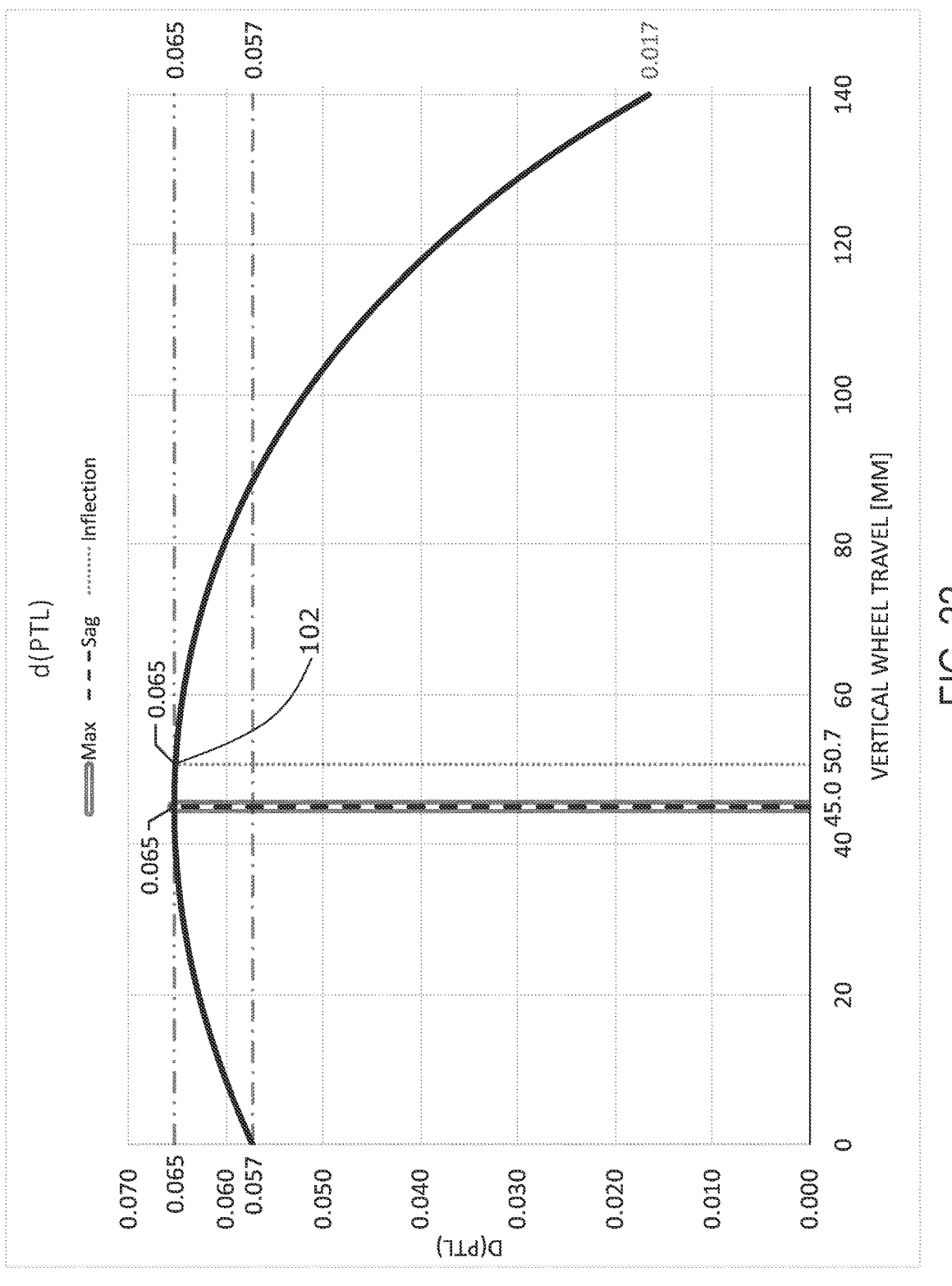
FIG. 22 is a graph depicting an expected/exemplary rate of change of the power transmitting length of the suspension linkages of FIGS. 1A, 2A, 3A, 8A, 9A, 14, and/or 18A as it relates to vertical wheel travel.

FIG. 22 shows an example of a possible dPTL curve capable of being generated with the disclosed suspension system plotted as a function of VWT. The dPTL curve has a non-linear behavior where the dPTL first increases as the VWT increases and then decreases as the VWT is increased further. In this example, at the extended state, VWT (0 mm), the dPTL may have a value of about 0.057. The dPTL increases to a max value of about 0.065 at VWT (45 mm), and then decreases to a value of 0.017 at the compressed state or VWT (140 mm). It also may be noted that the maximum dPTL is maximum at the sag point in this example. In addition, as DWAP 15 moves from the extended state to the compressed state, link body 3 initially rotates clockwise until it reaches inflection point position 102, it then reverses direction and rotates counter clockwise until the compressed state.

This behavior of increasing and decreasing dPTL may translate to similar behavior for an anti-squat, depending upon the driven and driving cog diameters. Maximizing dPTL at the sag point may translate to an anti-squat peak near sag depending upon the driven and driving cog diameters. FIG. 19 shows two possible anti-squat curves one with a small, and one with a large driven dog diameter given the dPTL plot in FIG. 22. As discussed above, the relatively smaller driven cog diameter curve increases and then decreases similar to the dPTL, while the large driven cog diameter curve decreases throughout the VWT.

The frame anti-squat component is that which would occur should the Power PT portion of the chain/belt not lengthen as the suspension moves between extended and compressed states. This is not typical, and this component is typically used to aid in the theoretical understanding of which component, (i.e., chain/belt or frame) anti-squat contributes more greatly to the anti-squat percentage. This is useful for explaining the benefits of implementing an idler 56.

In a traditional chain/belt driven two-wheeled vehicle without the use of an idler, the chain/belt anti-squat component is larger than that of the frame component. This is typically done to keep the lengthening of the PT portion of the chain/belt at low levels to reduce the amount of CCW crank arm rotation described above. This is achieved by keeping the DIVC[A] migration relatively low, and therefore resulting in a DWAP that is less rearward. As the DIVC[A] migration is raised, the frame anti-squat typically increases, the chain/belt anti-squat typically increases and the DWAP becomes more rearward. The lengthening of the PT portion of the chain/belt also increases keeping the driven and driving cogs constant.

An idler 56 may be introduced to achieve the optimum anti-squat and magnitude of the lengthening of the PT portion of the chain/belt while simultaneously tuning the rearward magnitude of the DWAP. The suspension linkages of the present disclosure allow even further variable independence of anti-squat, anti-rise, dPTL, and/or leverage rate compared to existing designs. For example, the 15 IVCs that can be manipulated vs the 6 IVCs with a traditional 4-bar system. In addition, within the 6-bar layout, relationships of the IVC migrations discussed allow for fine-tuning and manipulation of these dynamic performance variables to achieve specific and improved dynamic responses.

Figure 6:
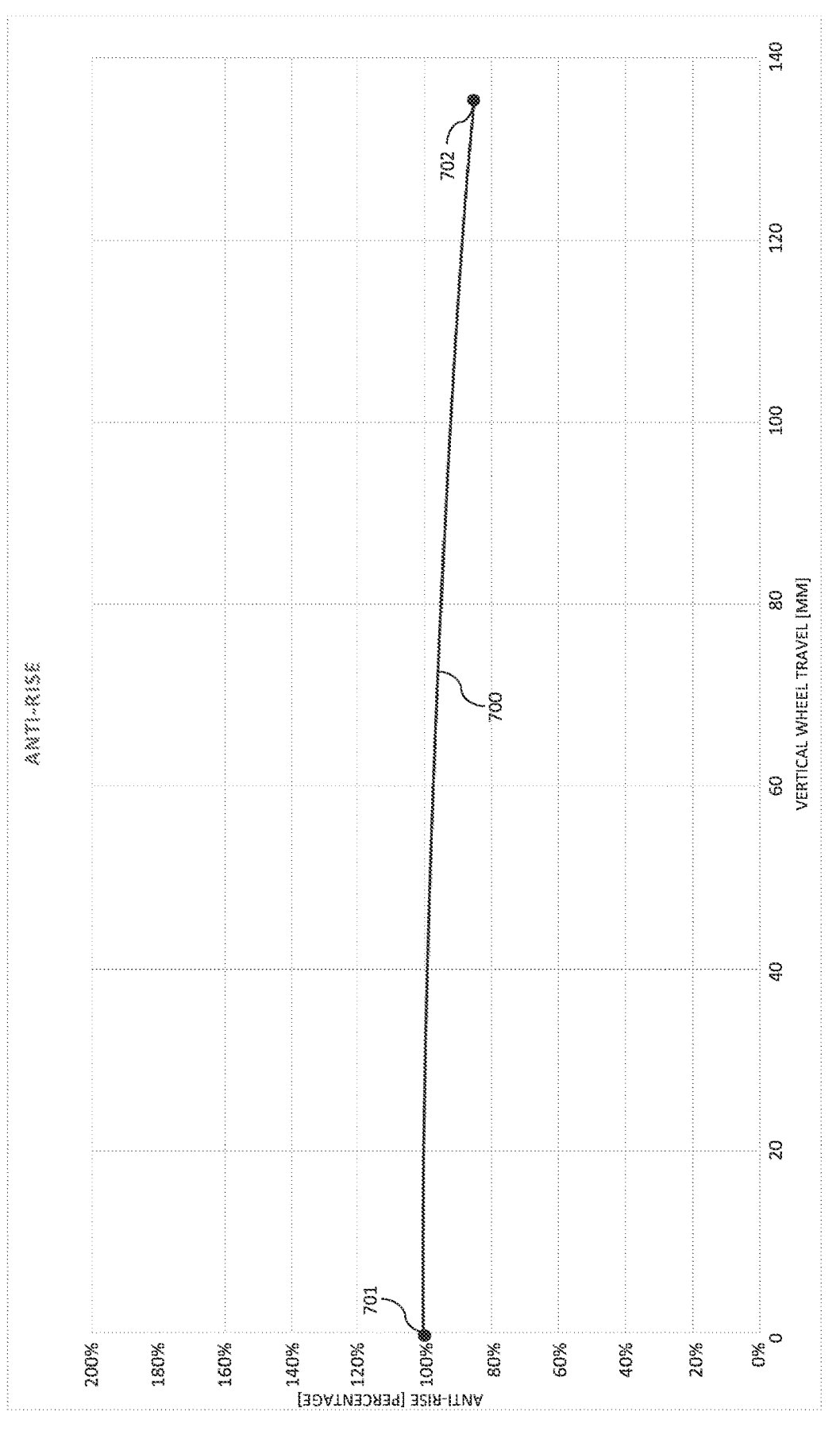
FIG. 6 is a graph of an expected/exemplary anti-rise curve of the embodiments illustrated in FIGS. 2A and 3A.

FIG. 6 shows a possible anti-rise curve 700 using this embodiment where 701 is the extended state of the suspension and 702 is the compressed state of the suspension. The anti-squat remains around 100% range which is ideal. Anti-rise less than 100% may help improve traction while anti-rise greater than 0% may help stabilize geometry during deceleration.

Figure 7:
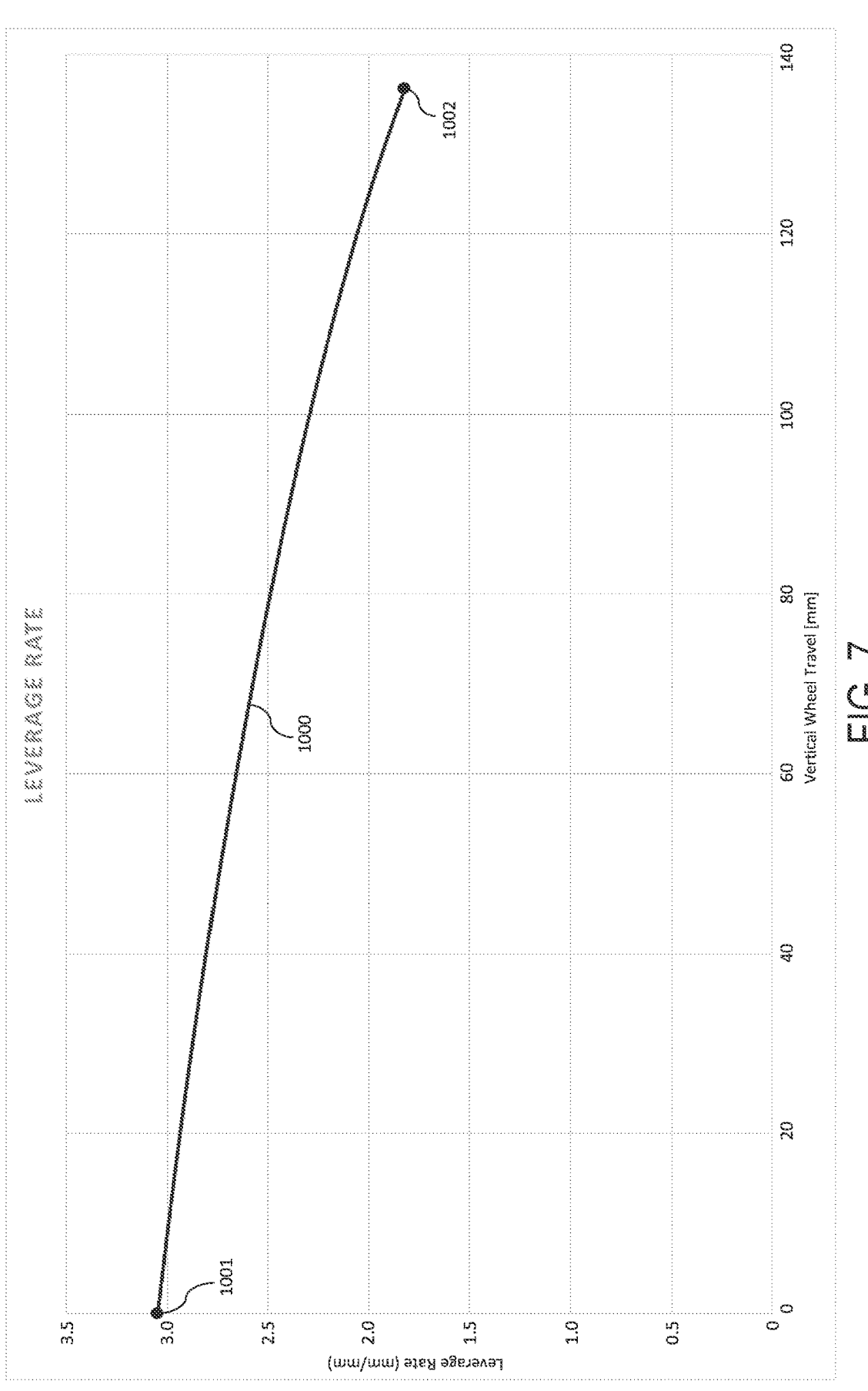
FIG. 7 is a graph of an expected/exemplary leverage rate curve of the embodiments illustrated in FIGS. 2A and 3A.

FIG. 7 shows a possible leverage rate curve 1000 using this embodiment where 901 is the extended state of the suspension and 1002 is the compressed state of the suspension. The LR falls generally linearly from 1001 to 1002. This is preferable because the higher LR in the beginning of the travel helps improve small bump sensitivity, and the lower leverage rate at the end of the travel helps prevent harsh bottom outs. In addition, the general linear trend of the LR curve provides a supported mid-stroke and the aids in shock tuning as there are no dramatic changes in the LR.

Note that anti-squat, anti-rise, leverage rate and DWAP direction are typically dependent variables in a typical 4-bar linkage or other suspension designs. As a result, the behavior of these three variables is limited with these designs. The disclosed 6-bar linkage with the addition of an idler cog 56 allows for greater separation of these variables so that each can be adjusted or optimized as discussed above to improve the ride quality.

The addition of idler cog 56 to the 6-bar linkage configuration allows for both the anti-squat and anti-rise percentages to be more finely controlled resulting in improved magnitudes, while simultaneously manipulating the rearward direction of the DWAP.

FIGS. 8A-8H illustrate an example of an electric bicycle, or e-bike frame including the idler 56 as described with respect to the suspension linkage of FIGS. 2A-2H. As used herein, an e-bike means any two-wheeled vehicle powered at least in part by a motive power source. For example in the embodiment shown in FIGS. 8A-8H, the idler cog 56 axis 75 is coincident with the PIVC[1][3] 7. The suspension linkage and idler cog 56 of FIGS. 8A-8H may be substantially similar to those of FIGS. 2A-2H, applied to an e-bike frame. Further description of the suspension linkage of FIGS. 8A-8H is therefore omitted for brevity. An advantage of using an idler cog 56 with an e-bike may be that such an e-bike may resemble a pedal bike, which may have marketing appeal. Without an idler cog 56, an e-bike may look very different than a pedal bike due to packaging constraints of an e-bike. Such a different bike may be disfavored by buyers.

Figure 8B:
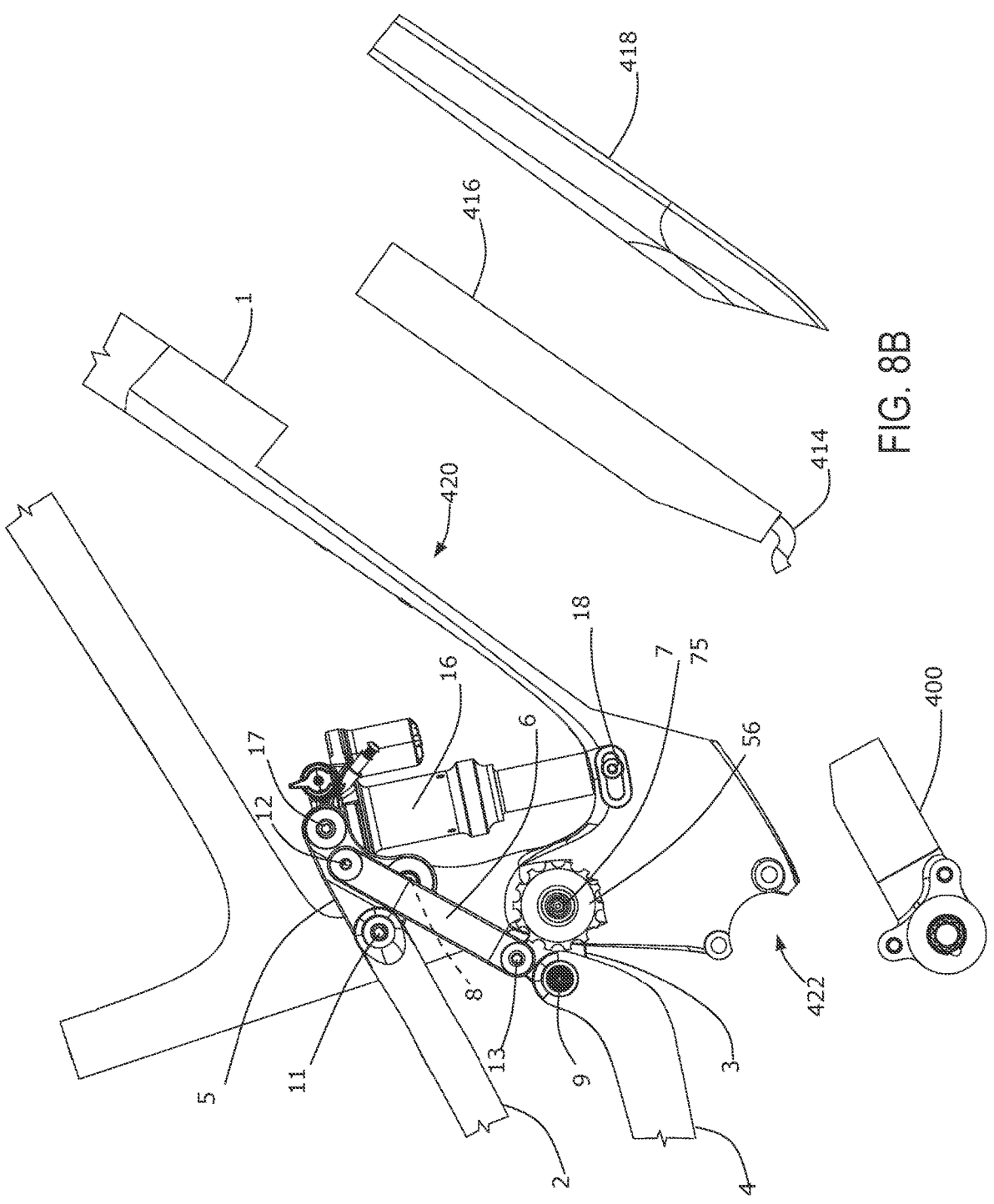
FIG. 8B is a partial exploded elevation view of the suspension linkage of FIG. 8A.
Figure 8C:
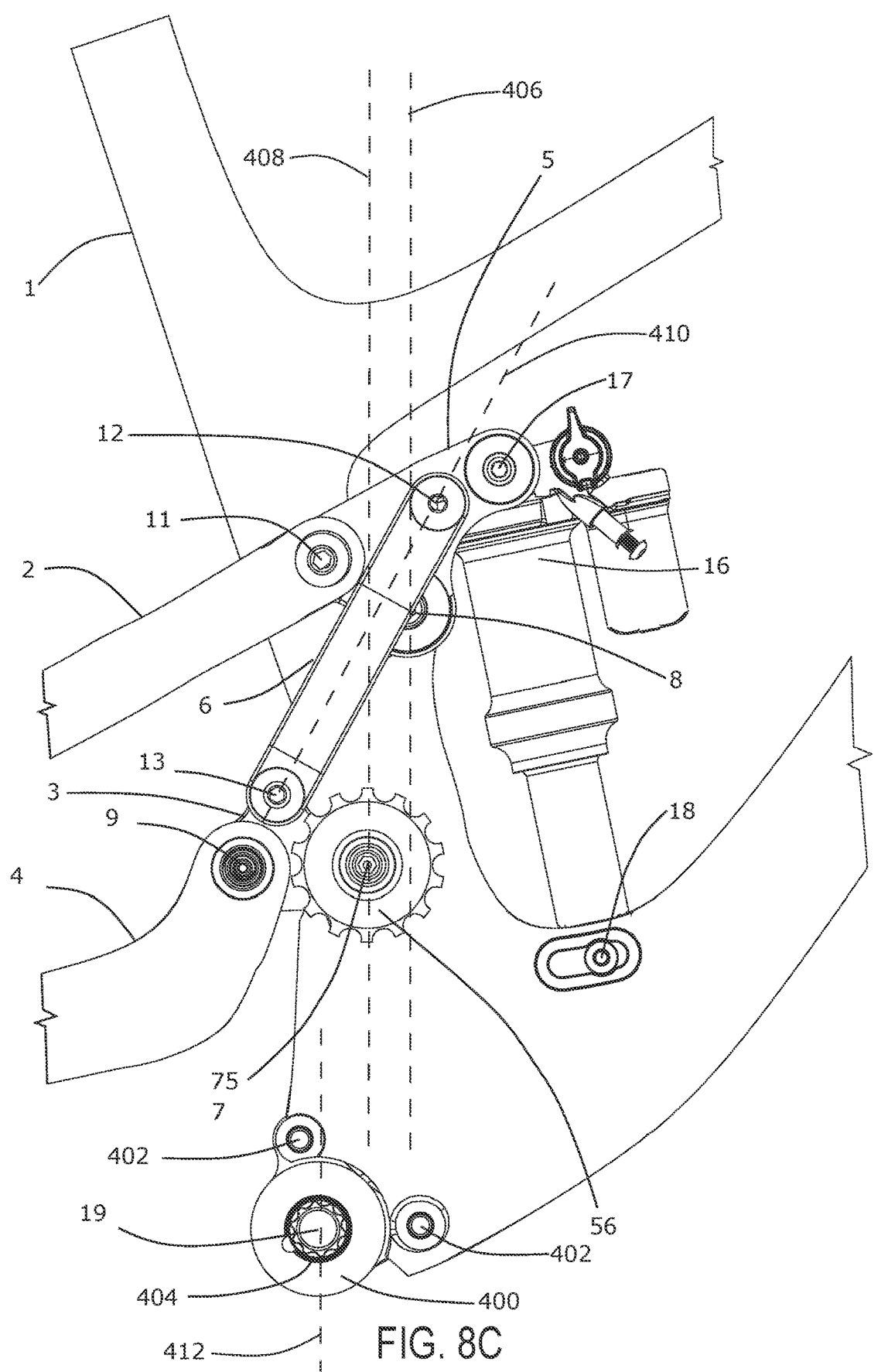
FIG. 8C is a partial right elevation view of the suspension linkage of FIG. 8A.
Figure 8D:
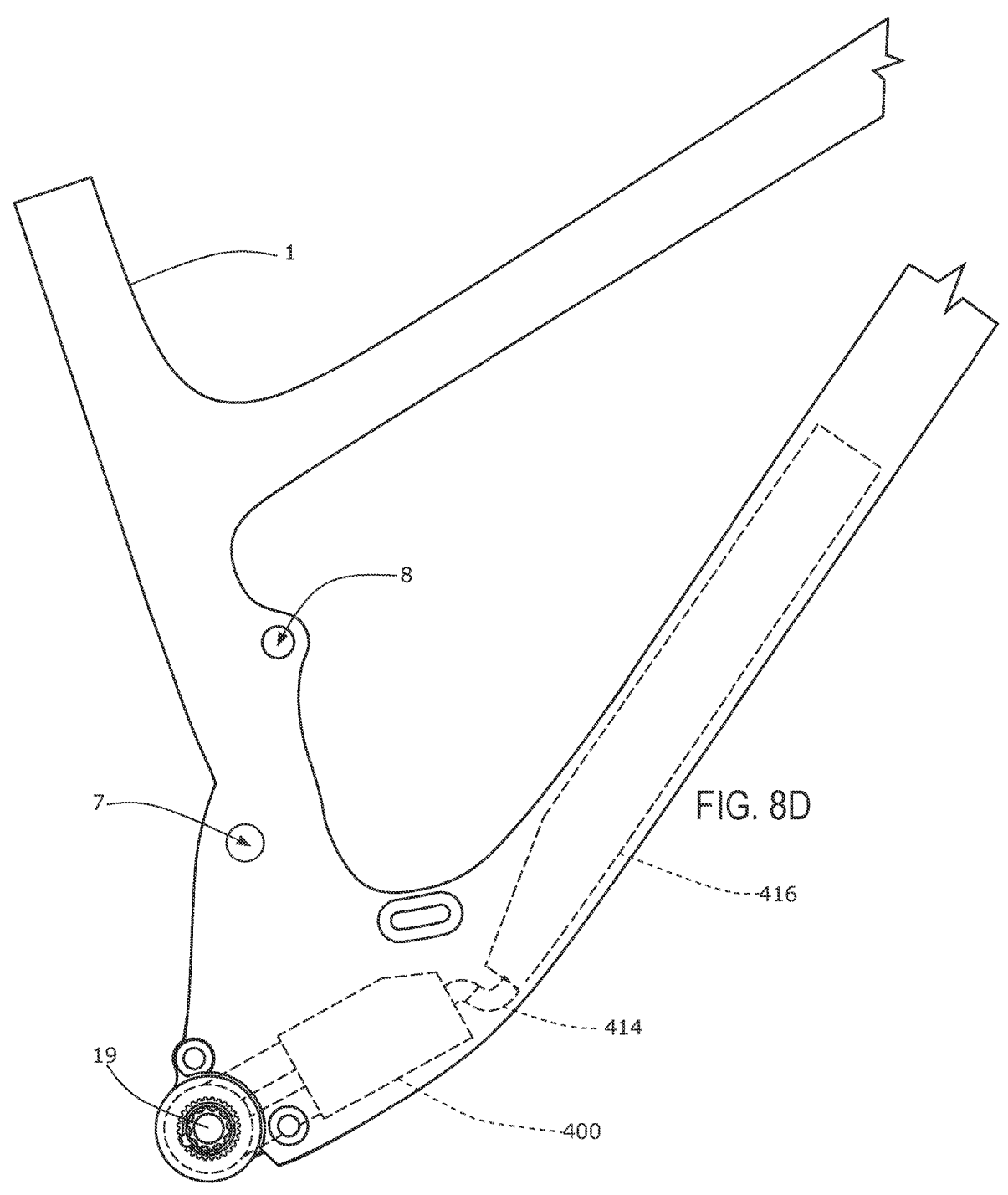
FIG. 8D is a partial right elevation view of the suspended body of the suspension linkage of FIG. 8A.
Figure 8E:
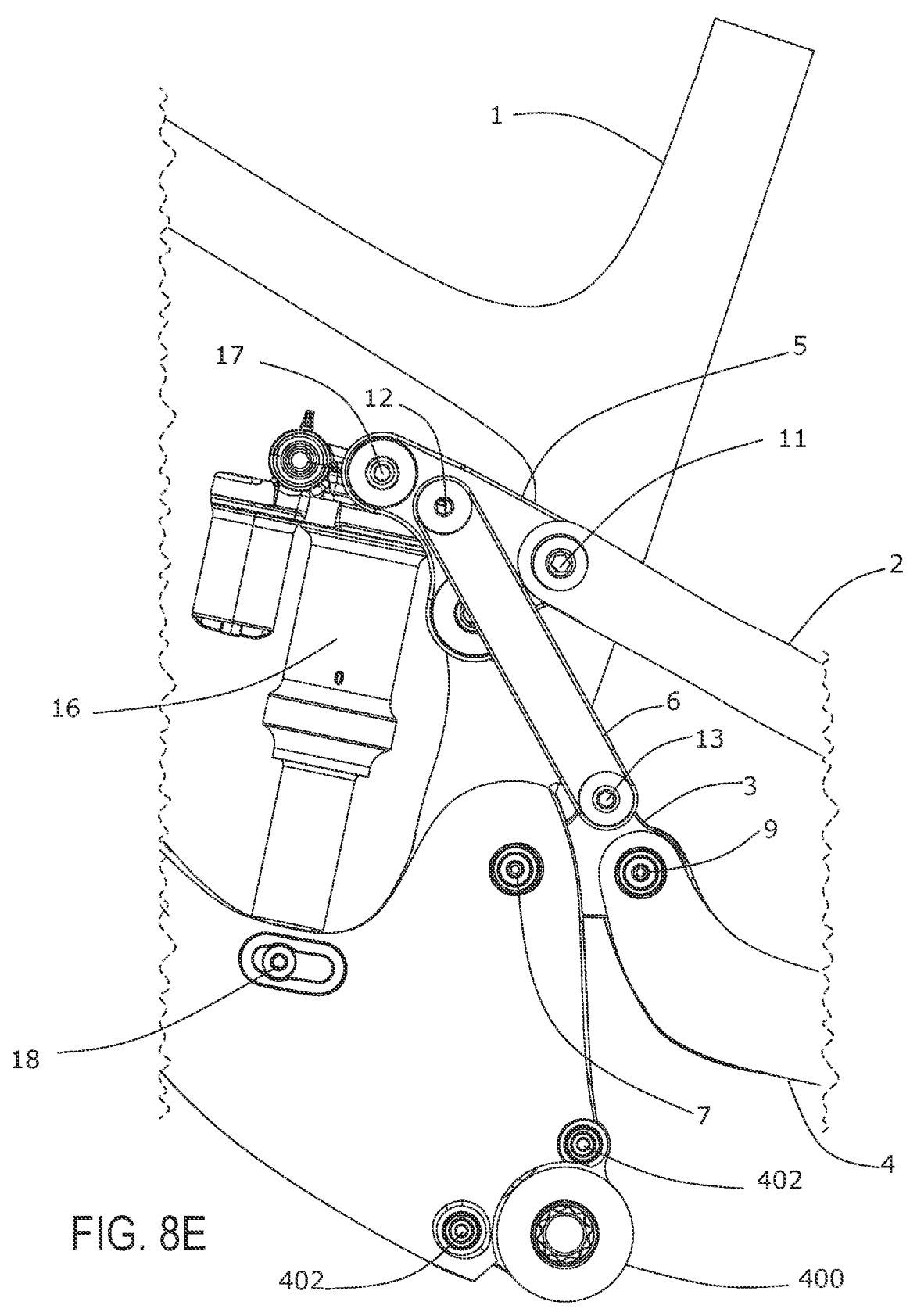
FIG. 8E is a partial left elevation view of the suspension linkage of FIG. 8A.

As best shown in FIGS. 8A, 8B and 8D, the suspended body 1 of FIG. 8A includes a motive power source compartment 422 adapted to receive a motive power source 400. A motive power source 400 may be such as an electric motor powered by an on-board power source such as a battery. In other examples, a motive power source 400 may be an engine such as an internal combustion engine, or a combination of an engine and a motor, or a combination of one or more of these with a transmission. In some examples, a gearbox may be coupled to the suspended body-1 and may be used with any idler disclosed herein. The motive power source 400 may be coupled to the suspended body-1 with one or more mounts 402. An e-bike may also include a crank 54 and pedals to enable the e-bike to be powered at least in part by a rider's legs. For example, as shown in FIG. 8C, the motive power source 400 may include a crank interface 404 to allow a crank and/or driving cog 55 to couple to the motive power source 400. The motive power source 400 and/or the rider's legs, via the cranks, may power the two-wheeled vehicle. The crank interface may be any suitable interface that can transmit torque between the motive power source 400 and a crank 54. For example, the crank interface 404 may be a shaft with a spline, flat, key, threaded aperture, or other suitable structure to receive a crank 54.

The suspended body-1 may include an energy storage compartment 420 adapted to receive an energy storage module 416, such as a battery. In the embodiment shown, the energy storage compartment 420 is formed in the downtube of the suspended body 1. In other embodiments, one or more energy storage compartments 420 may be formed in other portions of the suspended body 1 such as the seat tube or a top tube. The energy storage compartment 420 may be selectively closed by a panel 418, for example to enable removal of the energy storage module 416 from the energy storage compartment 420 such as for charging, replacement, and/or removal to reduce weight of the vehicle if the e-bike is to be used in a pedal-only mode, or the like. The panel 418 may be formed of a thin shell including one or more attachment mechanisms suitable to selectively couple the panel 418 to the suspended body 1 to seal the energy storage compartment 420. The panel 418 may help prevent the ingress of dirt, water, mud, dust or other contaminants into the energy storage compartment 420. The panel 418 may contain the energy storage module 416 within the energy storage compartment 420.

The energy storage module 416 may be any suitable device that can store and/or convert energy into electrical energy for use by the motive power source 400. For example, the energy storage module 416 may be a primary (e.g., single use) or secondary (e.g., rechargeable) battery. Any suitable battery technology may be used. In many implementations, the energy storage module 416 is a rechargeable battery using a technology such as lithium ion, nickel metal hydride, nickel cadmium, lead acid, or other rechargeable batteries. In some implementations, the energy storage module 416 is a single use battery, such as an alkaline battery.

The energy storage module 416 is in electrical communication with the motive power source 400 via an electrical conduit 414. The electrical conduit 414 may provide electrical power to the motive power source 400. In some implementations where the motive power source 400 also generates power (e.g., regenerative braking), the energy storage module 416 may receive power from the motive power source 400 via the electrical conduit 414.

Figure 8F:
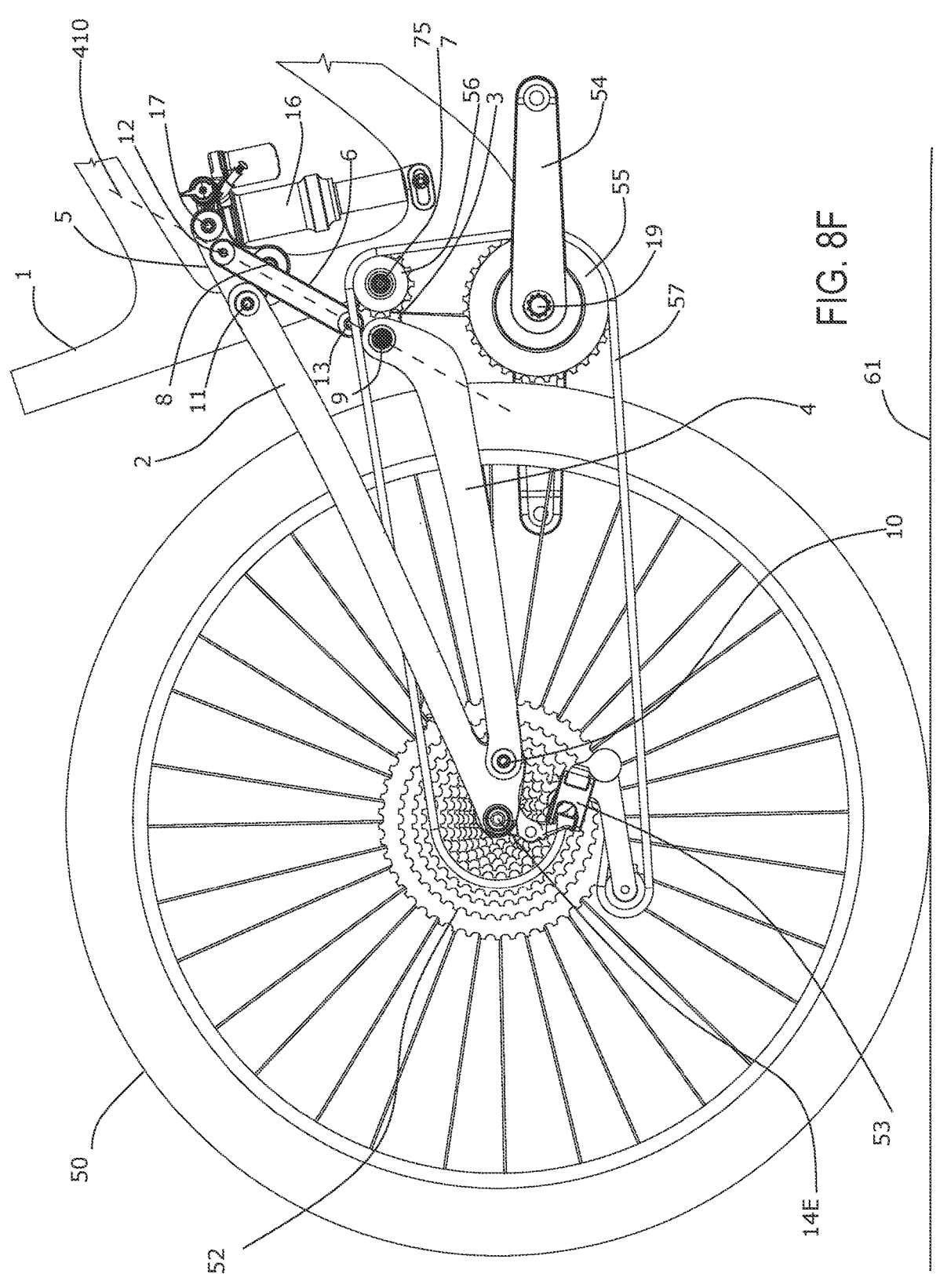
FIG. 8F is a partial right elevation view of the suspension linkage of FIG. 8A in an extended state.
Figure 8G:
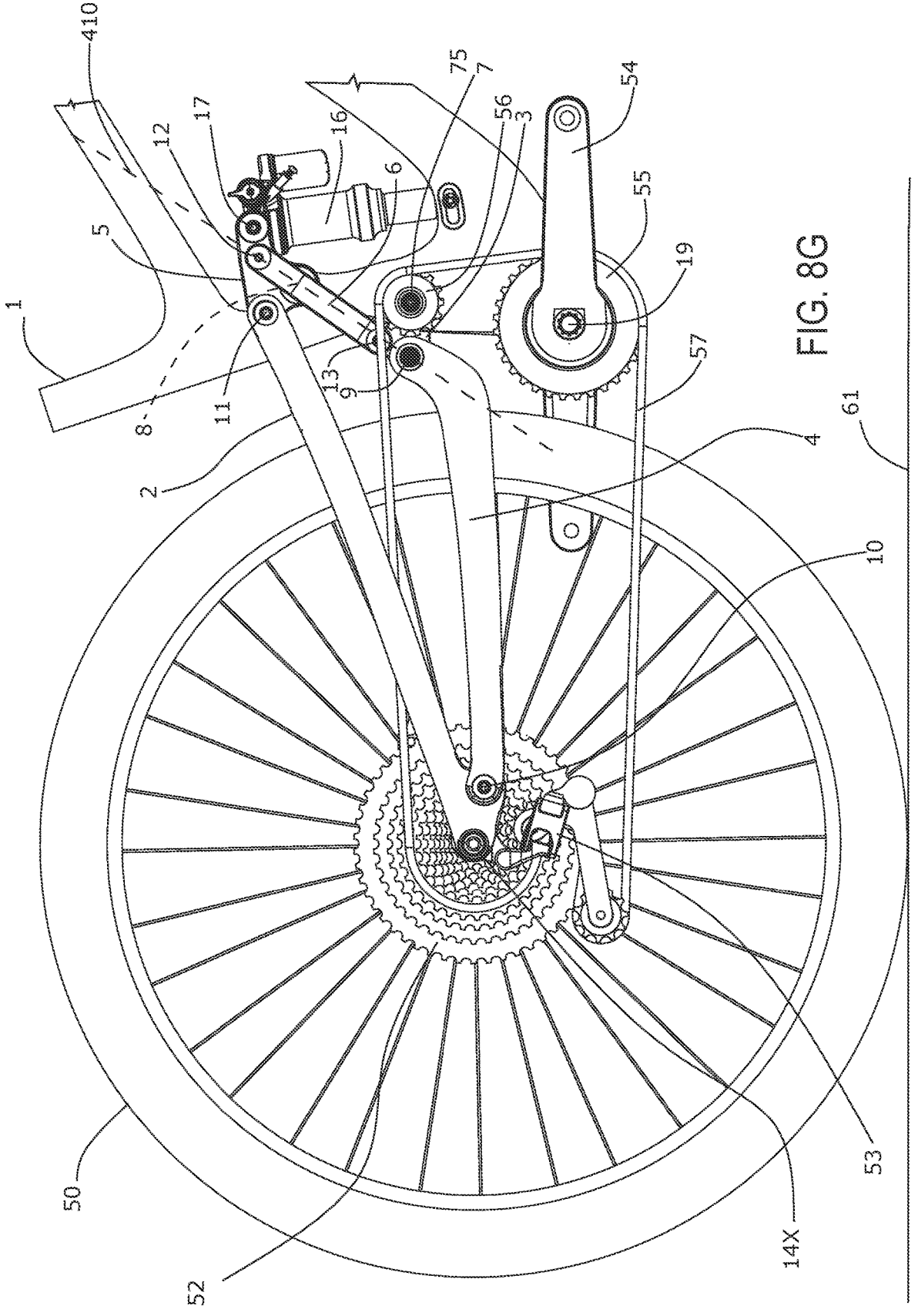
FIG. 8G is a partial right elevation view of the suspension linkage of FIG. 8A at an intermediate state between an extended and compressed state.
Figure 8H:
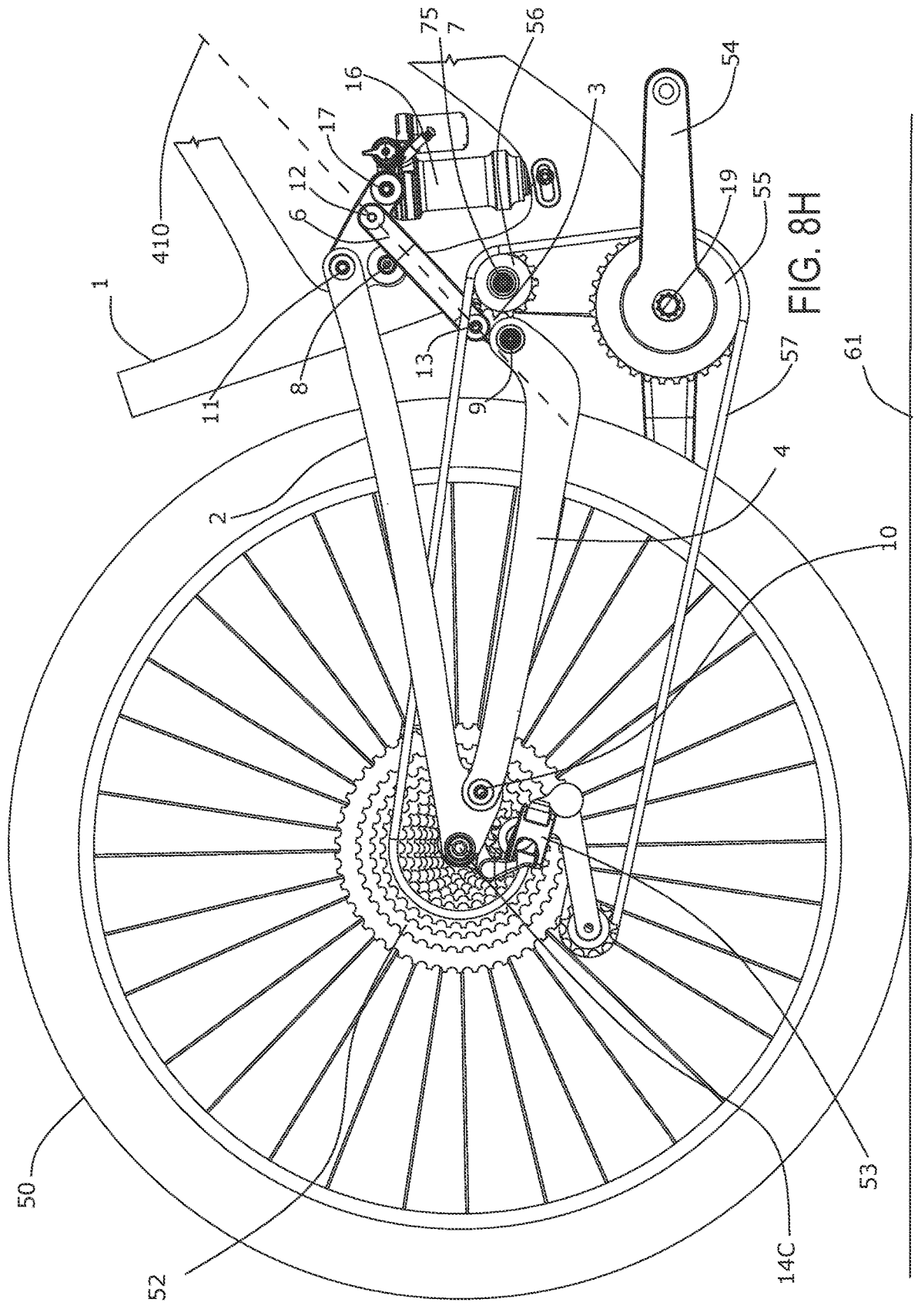
FIG. 8H is a partial right elevation view of the suspension linkage of FIG. 8A in a compressed state.
Figure 8I:
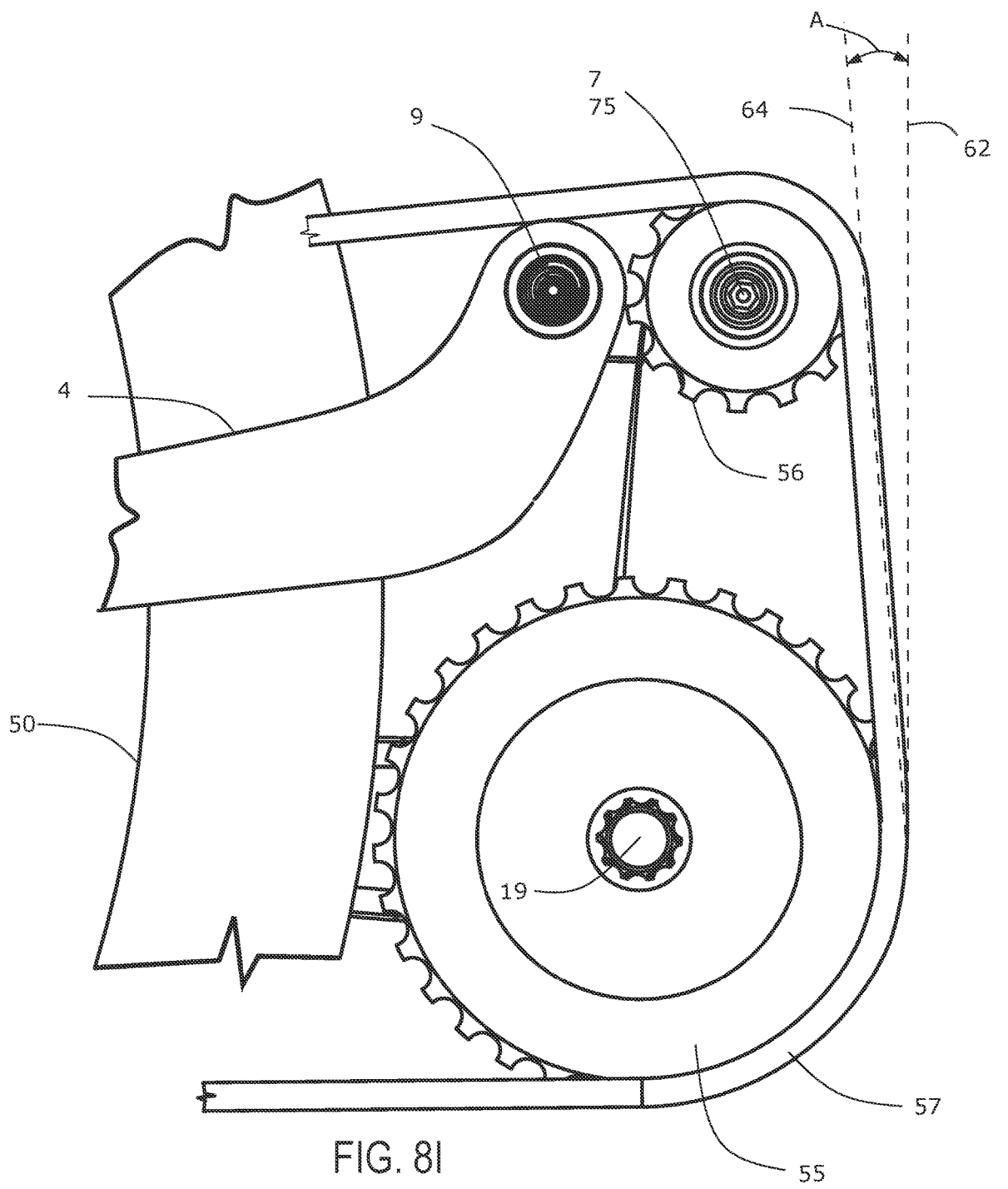
FIG. 8I is a partial right elevation view of the suspension linkage of FIG. 8A showing a contact angle of the belt/chain to the driving cog.
Figure 9A:
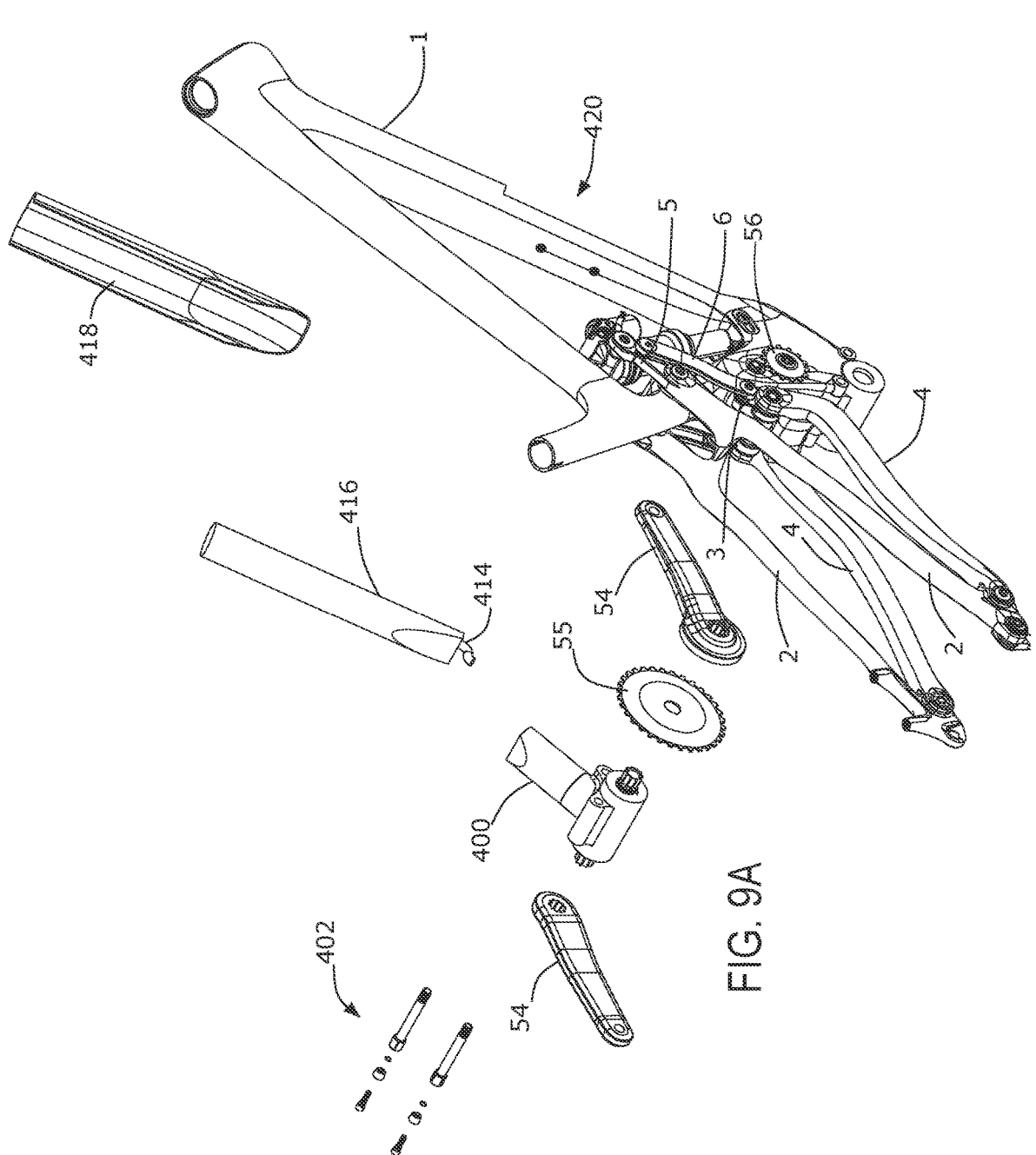
FIG. 9A is an exploded isometric view of a 6-bar suspension linkage for an electric bike.
Figure 9B:
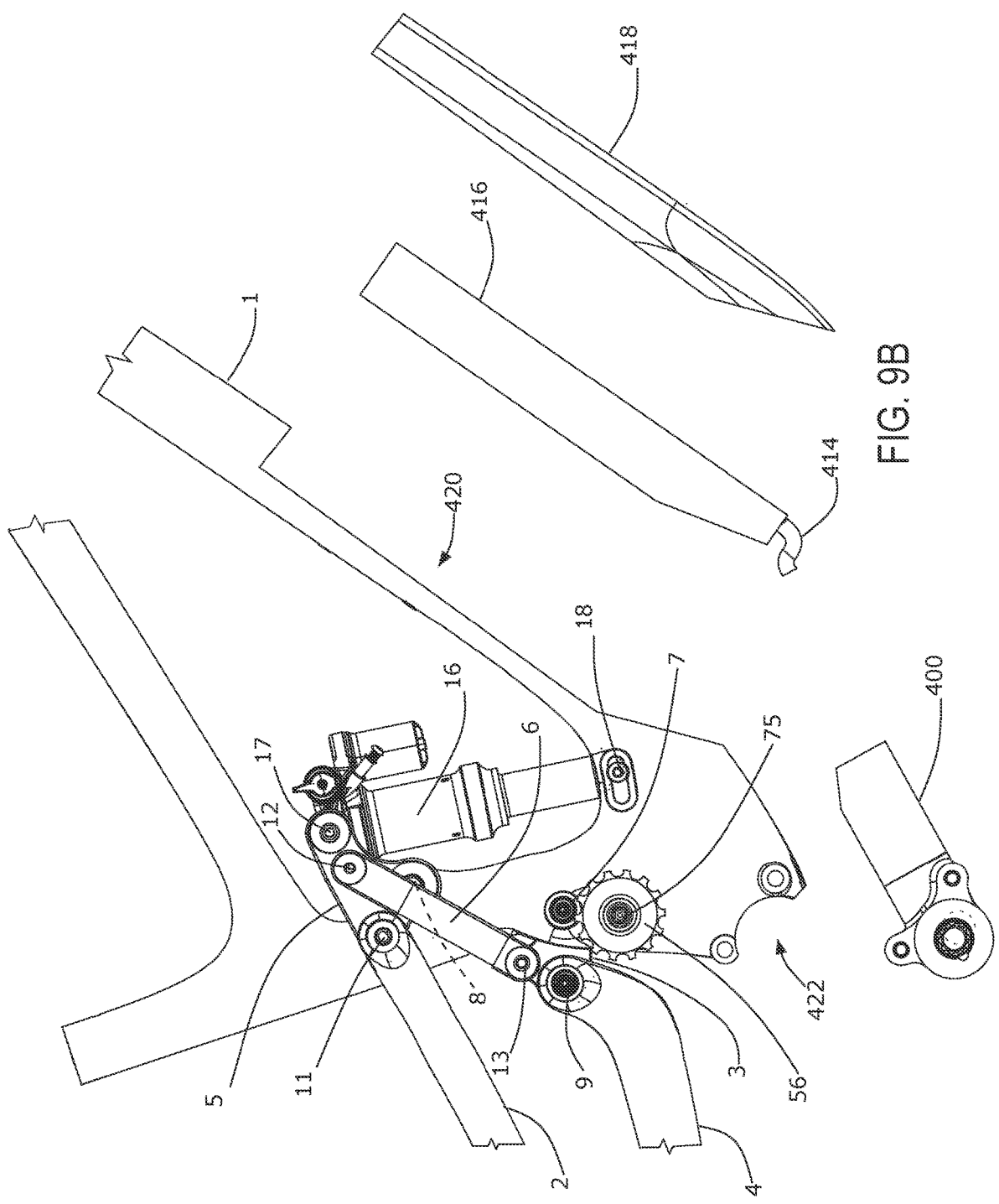
FIG. 9B is a partial exploded elevation view of the suspension linkage of FIG. 9A.
Figure 9C:
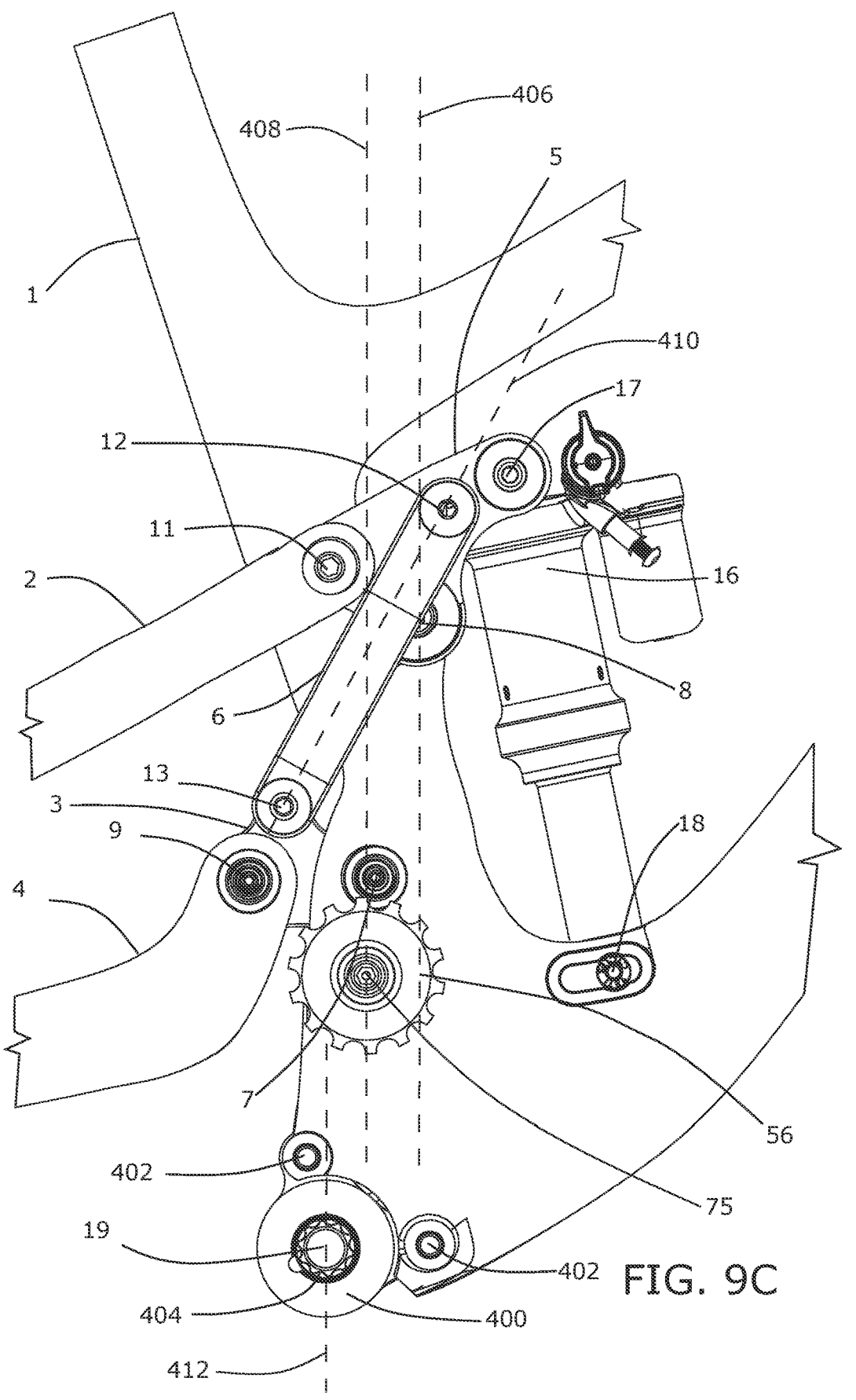
FIG. 9C is a partial right elevation view of the suspension linkage of FIG. 9A.
Figure 9D:
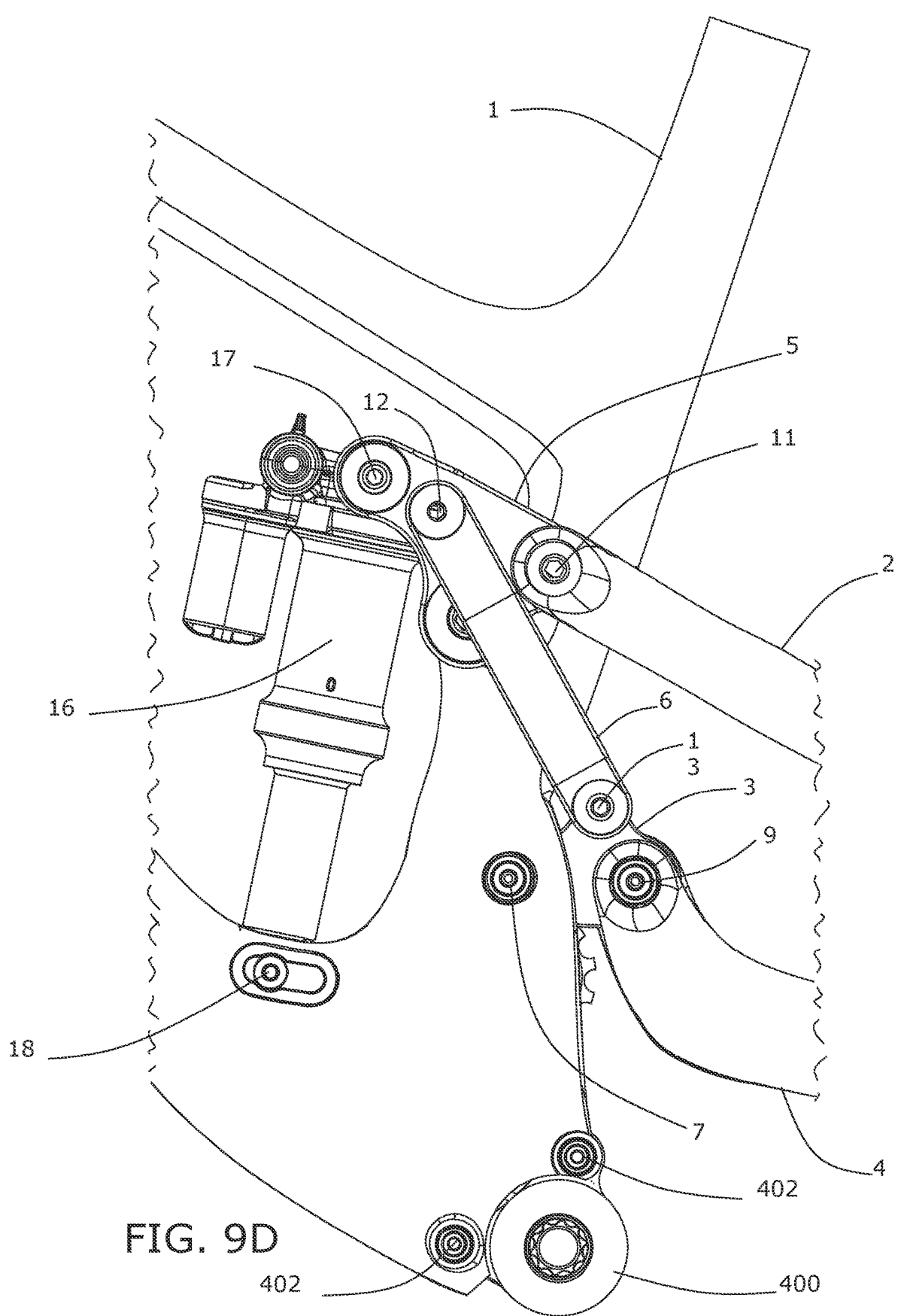
FIG. 9D is a partial left elevation view of the suspension linkage of FIG. 9A.
Figure 9E:
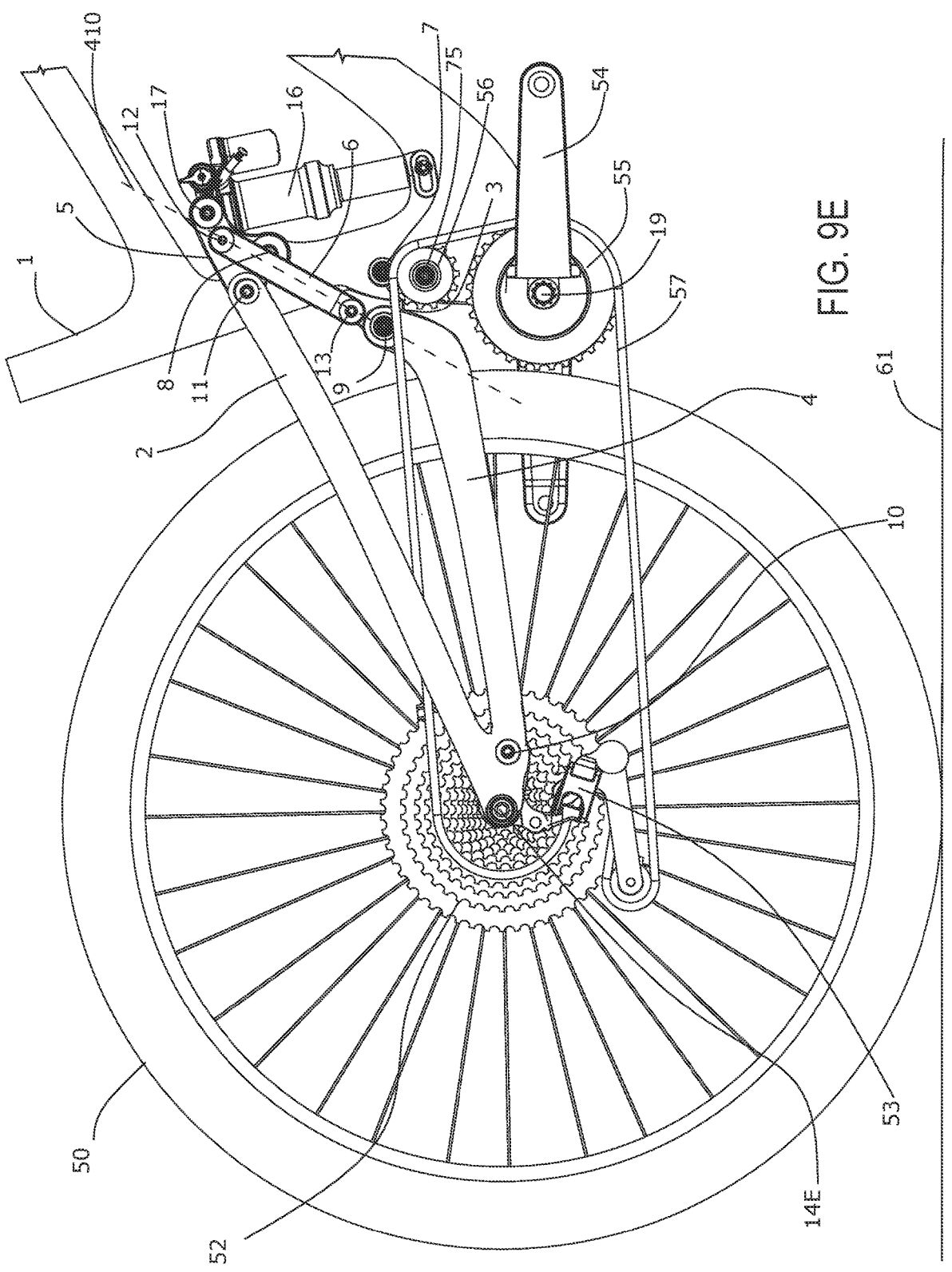
FIG. 9E is a partial right elevation view of the suspension linkage of FIG. 9A in an extended state.
Figure 9F:
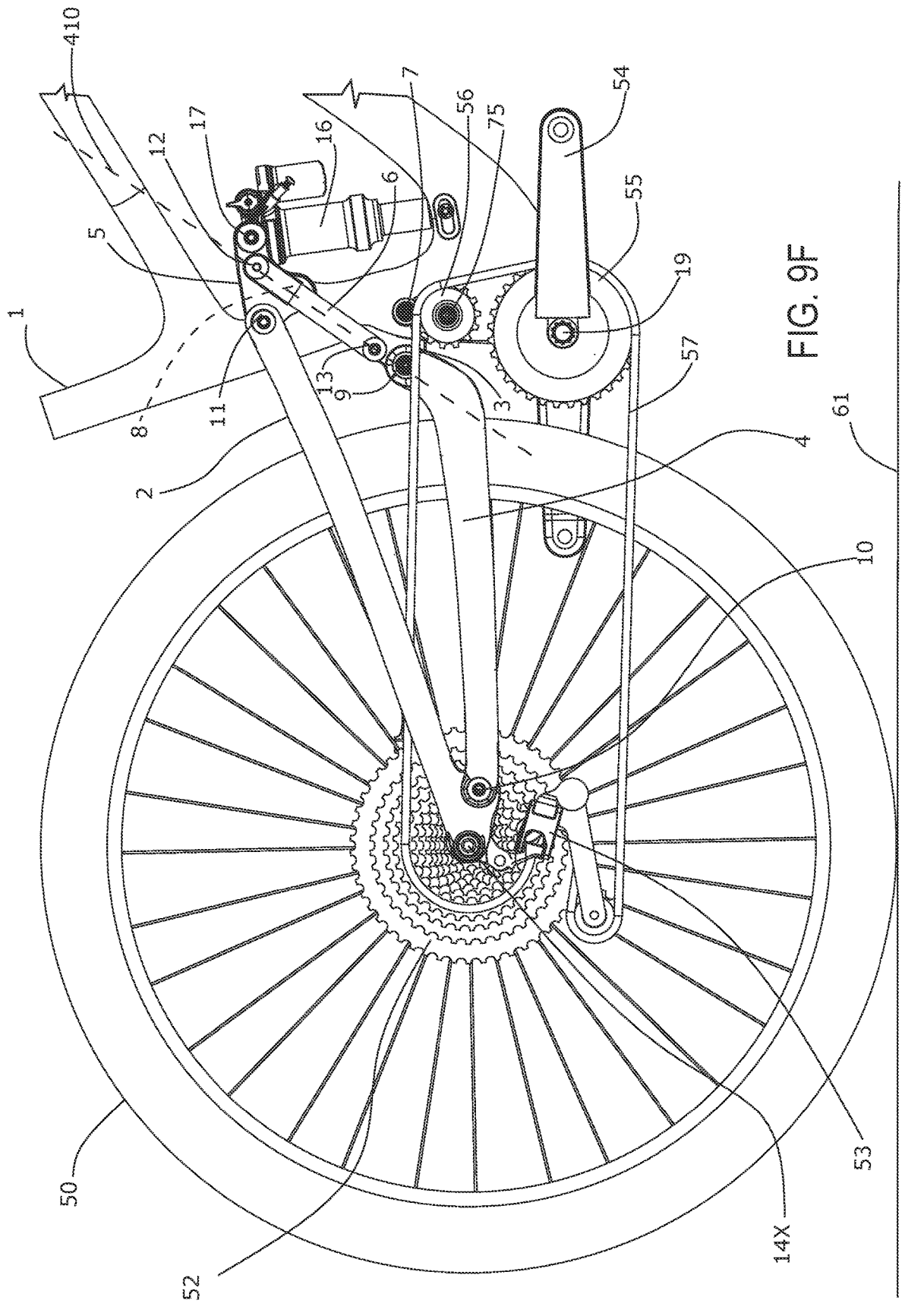
FIG. 9F is a partial right elevation view of the suspension linkage of FIG. 9A at an intermediate state between an extended and compressed state.
Figure 9G:
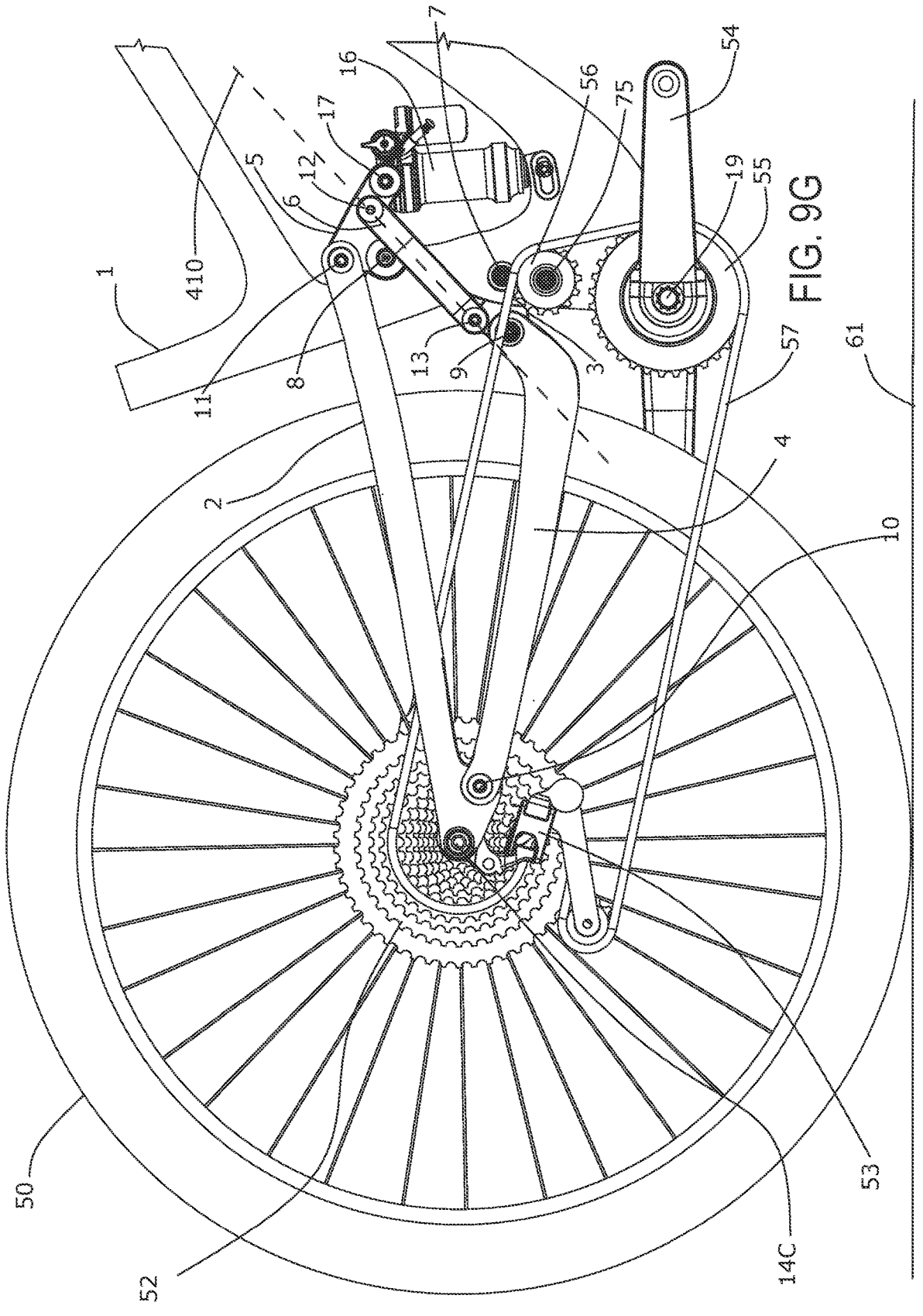
FIG. 9G is a partial right elevation view of the suspension linkage of FIG. 9A in a compressed state.
Figure 10:
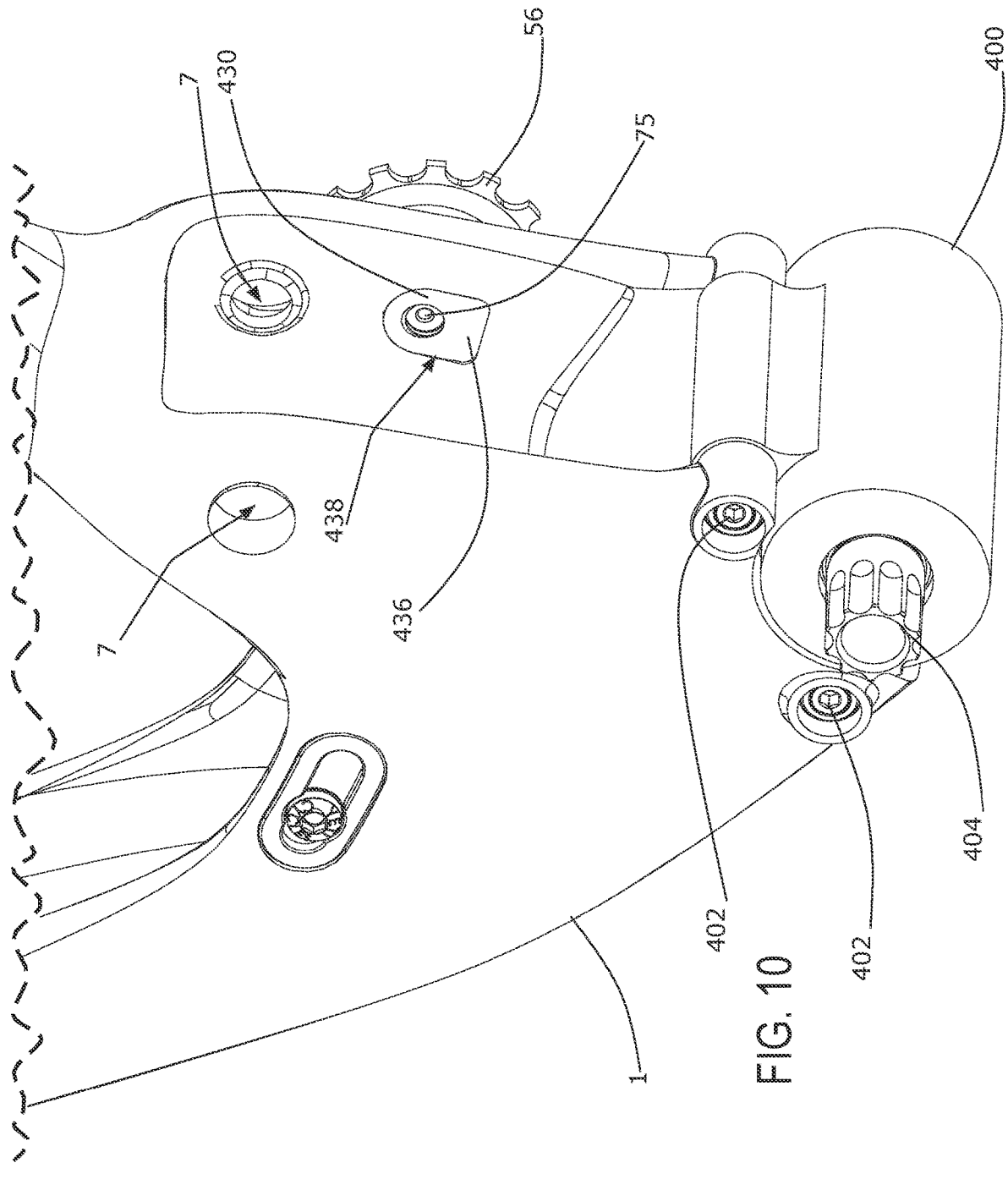
FIG. 10 is a partial isometric view of an embodiment of a suspension linkage.
Figure 11:
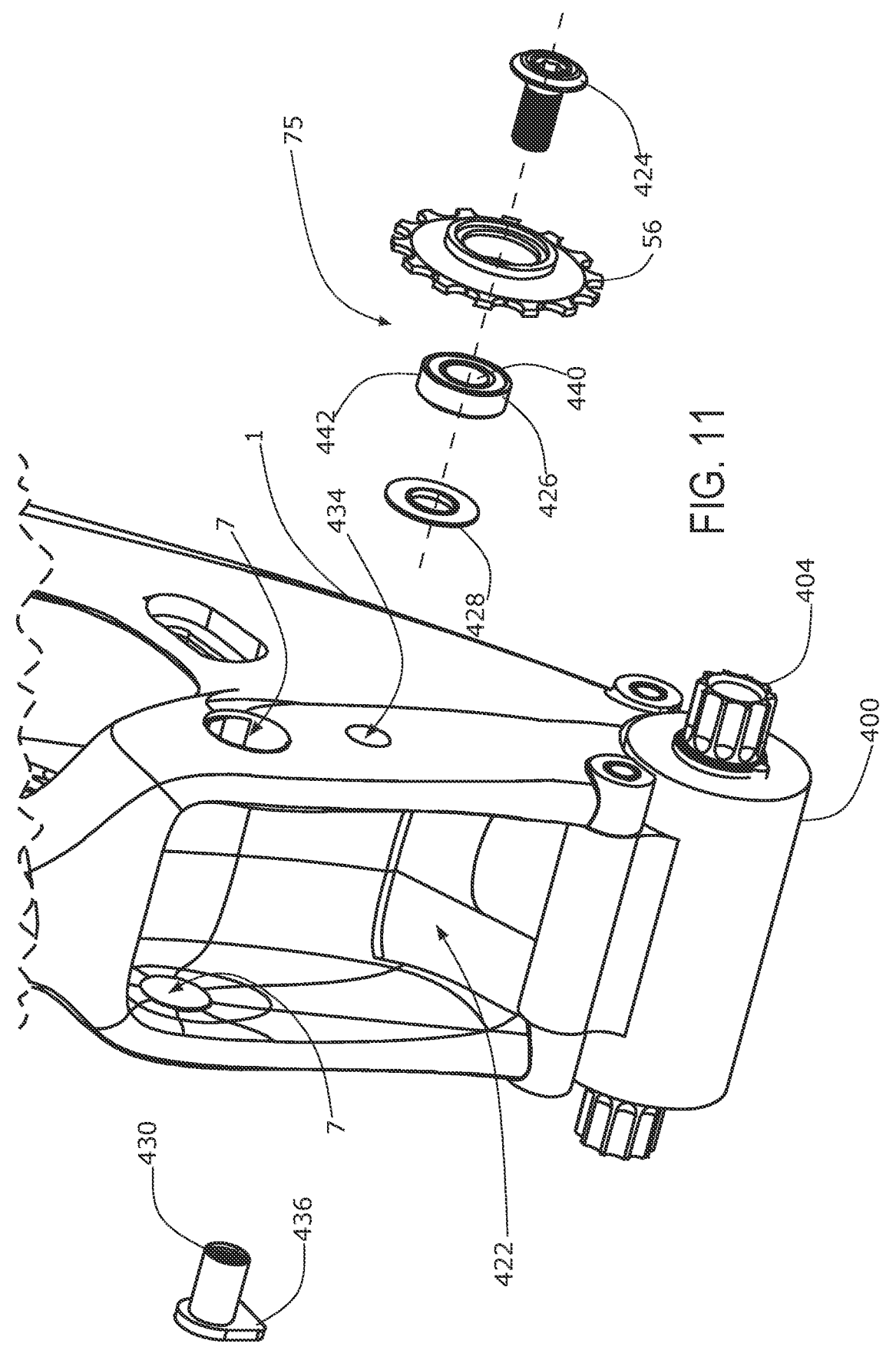
FIG. 11 is a partial exploded isometric view of the suspension linkage of FIG. 10.
Figure 12:
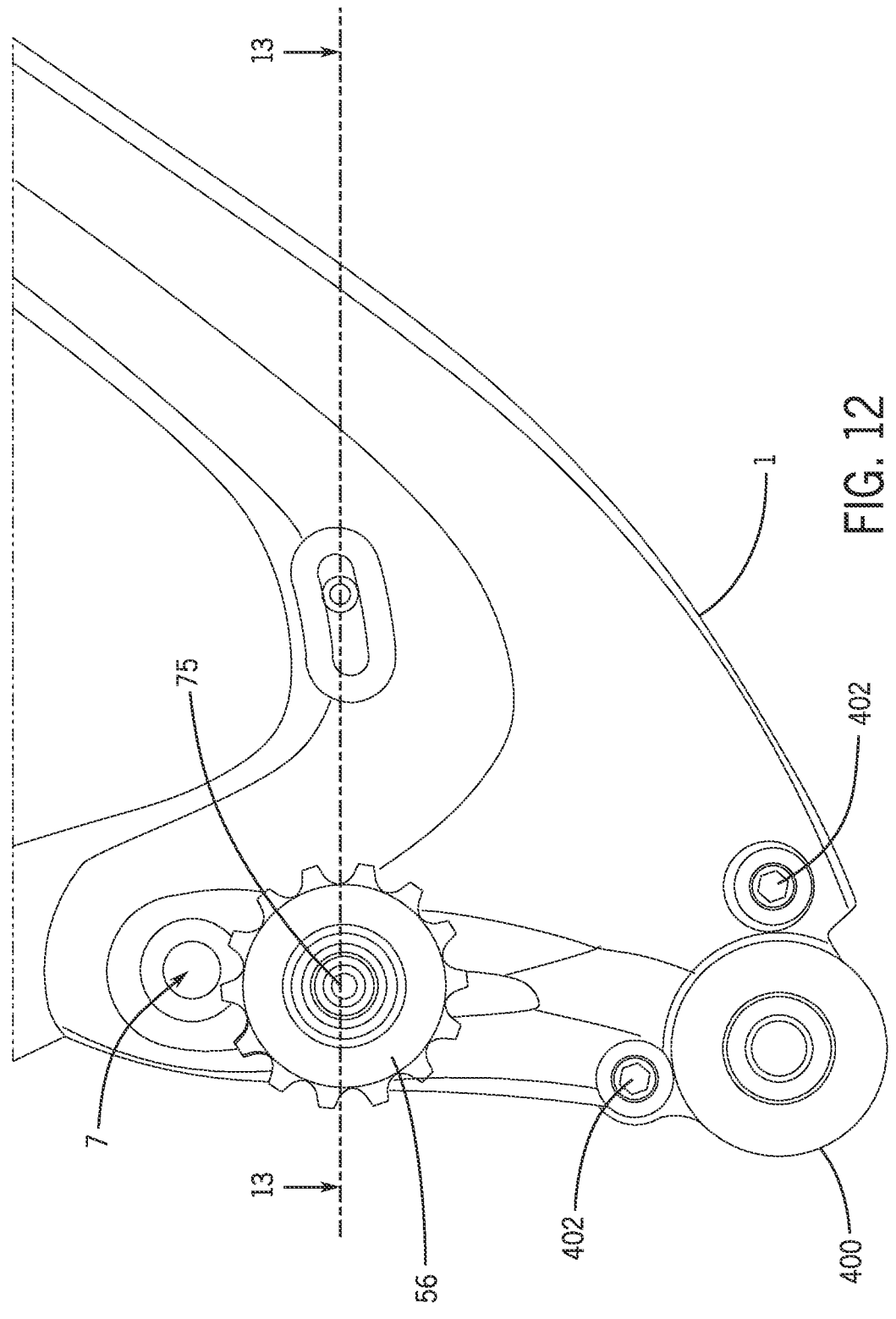
FIG. 12 is a partial elevation view of the suspension linkage of FIG. 10.
Figure 13:
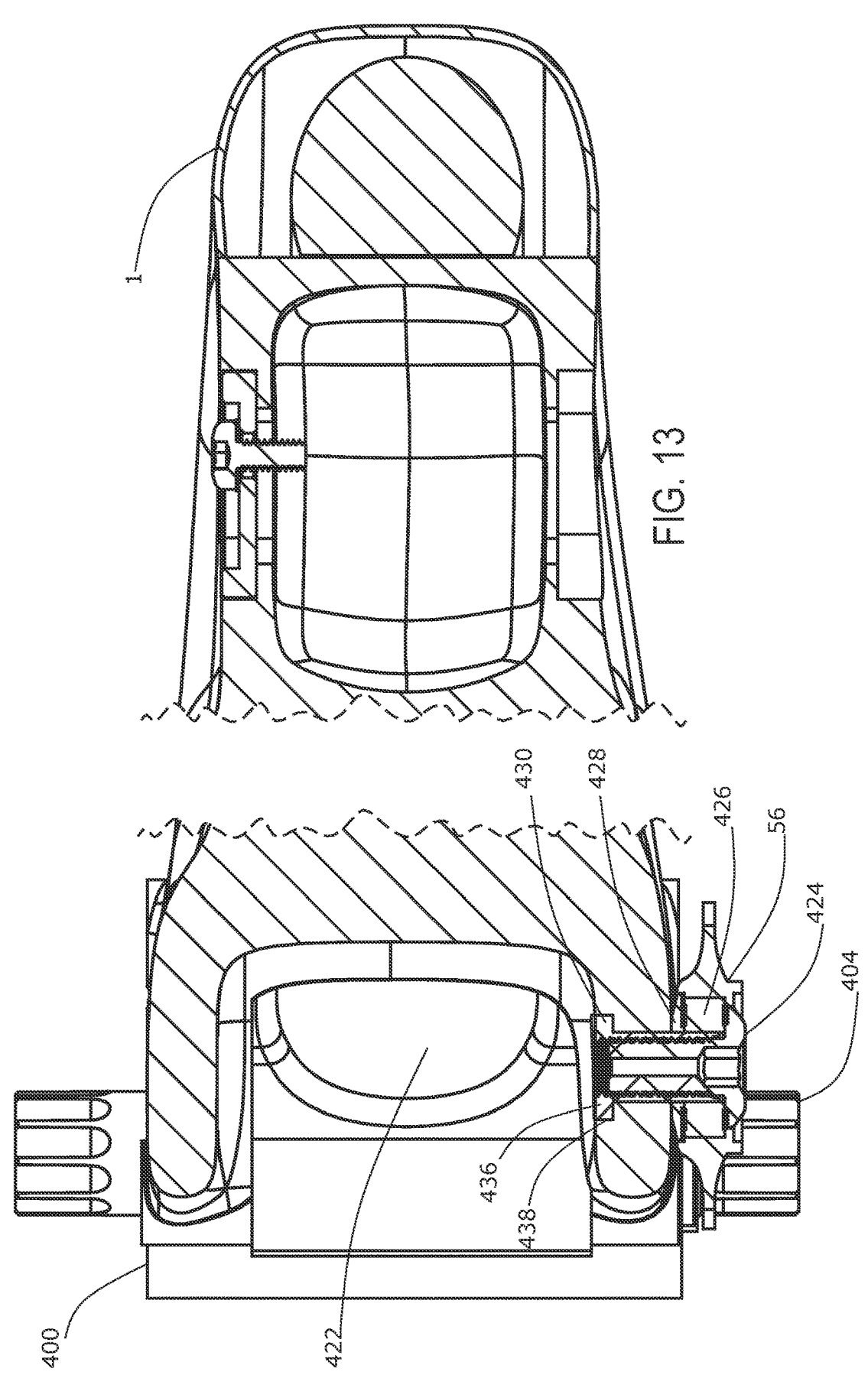
FIG. 13 is a partial section view of the suspension linkage of FIG. 10 taken along section line E-E of FIG. 12.

As shown best in FIG. 8C, the driving cog 55 axis 19 may define a driving cog axis plane 412. The driving cog axis plane 412 may extend vertically through the driving cog axis 19. An IVC plane may extend vertically through any of the IVCs disclosed herein, such as an IVC plane 406 that extends vertically through the IVC[1][5] 8. Similarly, an IVC plane 408 may extend vertically through the IVC[1][3] 7. The IVC plane 408 may also extend through the idler cog 56 axis 75, such as in the embodiment shown in FIG. 8C where the idler cog 56 axis 75 is coincident with the IVC[1][3] 7. In many embodiments, the IVC plane 406 may be disposed forward of the IVC plane 408. In many embodiments, the IVC plane 408 may be disposed close to the driving cog axis plane 412. Disposing the IVC plane 408 close to the driving cog axis plane 412 may have the advantage of enabling a larger contact angle of the chain/belt 57 with the idler 56 than an arrangement where the planes 412 and 408 are relatively farther from one another, such as when the IVC plane 408 is disposed forward of the plane 412. See, e.g., FIG. 8I showing a contact angle A of the chain/belt 57 relative to the driving cog 55 and the idler 56. The contact angle A is formed between a forward vertical tangent 62 of the driving cog 55 and line 64 that is tangent to both the driving cog and the idler. As the IVC plane 408 is moved closer to the driving cog axis plane 412, the contact angle A increases. Typically the contact angle A is greater than zero degrees. Larger contact angles A of the chain/belt 57 with the idler 56 may increase the efficiency of the energy transmission around the idler, decrease wear, decrease the likelihood of the chain/belt 57 coming loose or slipping off the driving cog 55 and/or idler 56, and/or decrease stress on the idler 56 and/or chain/belt 57. In general there is a balance between weight and efficiency with the diameter or tooth count of the idler 56. A greater diameter or tooth count can better retain the chain/belt 57 with a greater chain/tooth interface. Generally the larger the diameter of the idler (i.e., greater tooth count), the lower the anti-squat of the suspension linkage and vice versa. A greater diameter or tooth count improves power transmission efficiency due to the relative chain/belt 57 angle reduction. Generally, the larger the idler 56, the heavier and the more difficult it is to package. Thus, disposing the IVC plane 408 forward of the driving cog axis plane 412 may improve idler cog 56 efficiency without the necessity of adding a larger, heavier idler. In some embodiments, a larger idler may be used with an e-bike than with a pedal bike since weight may be less critical in an e-bike application.

Also shown in FIG. 8C, is a longitudinal axis 410 of the link body-6. The longitudinal axis 410 extends between the IVC[3][6] 13 and the IVC [5][6] 12. As shown in FIGS. 8F-8H, the longitudinal axis 410 may move from a position behind the IVC[1][5] 8 when the suspension linkage is in an at least partially extended state (e.g., FIG. 8F) to a position over the IVC[1][5] 8 as the suspension linkage is in an intermediate state (e.g., at an inflection point shown in FIG. 8G), and to a position in front of the IVC[1][5] 8 as the suspension linkage is moved to an at least partially compressed state (e.g., as shown in FIG. 8H).

The suspension linkage and idler cog 56 of FIGS. 9A-9H may be substantially similar to those of FIGS. 3A-3F, but applied to an e-bike frame. Duplicative description of the suspension linkage of FIGS. 9A-9H is therefore omitted for brevity. Certain aspects of the embodiment of FIGS. 9A-9G may be similar to aspects of the embodiment of FIGS. 8A-8H, such as the aspects related to e-bike features. Such similar features are not described further, for the sake of brevity. The frame of FIGS. 9A-9G includes an idler cog 56 whose axis 75 is not coincident with the IVC [1][3] 7. For example, as shown in FIGS. 9A-9G, the idler cog 56 is disposed on the suspended body-1 at a location below the IVC[1][3] 7. In other embodiments, the idler cog 56 and its axis 75 may be located in other suitable positions on the suspended body-1. The relative position of the idler cog axis 75 to the driving cog axis 19 may influence the anti-squat behavior of the suspension linkage. An advantage of the embodiment of FIGS. 9A-9G, where the idler cog axis is not coincident with the IVC[1][3] 7, includes fine tuning of the anti-squat performance of the suspension linkage, as such embodiments may have more flexibility of placement of the idler cog axis 75 when the idler cog axis 75 location is not coupled to the location of the IVC[1][3] 7 (e.g., as compared to the embodiment of FIGS. 8A-8H). For example, an idler cog axis 75 position that is further away from the driving cog axis 19 (e.g., higher or closer to the IVC [1][3] 7) reduces anti-squat of the suspension relative to a suspension whose idler cog axis is closer to the driving cog axis 19. Generally, as the idler cog axis 75 position gets closer to the IVC[1][3], anti-squat is reduced. For example, the position of the idler cog axis 75 shown in FIGS. 9A-9G, may reduce the anti-squat performance of the suspension linkage keeping it closer to 100% in magnitude at sag/inflection (e.g., in the position of the suspension linkage shown in FIG. 9F). Such a position of the idler cog axis 75 may be beneficial for an e-bike as less anti-squat may be needed with the addition of power from the motive power source 400.

FIGS. 10-13 show an embodiment of a suspended body-1 suitable for use with the e-bike frame of FIGS. 9A-9G. In this embodiment, the location of the idler cog axis 75 may be determined by an aperture 434 formed in the suspended body-1. In some embodiments, more than one aperture 434 may be formed in different locations in the suspended body-1 and/or the aperture 434 may be a slot, such that the idler cog 56 may be selectively located in different locations in the suspended body-1, such as to tune anti-squat performance of the suspension linkage. In the embodiment shown in FIGS. 10-13, the idler cog 56 may be secured to the suspended body-1 by a washer 428 and a fastener 424. The fastener 424 may be a screw, a bolt, or the like. The fastener 424 may be received in an internal race 440 of a bearing assembly 426. The outer race 442 of the bearing assembly 426 may be received in the idler cog 56, such as to allow the idler cog 56 to rotate with respect to the suspended body-1. The fastener 424 may be selectively couplable to a nut 430. For example, the fastener 424 may include threads that couple with threads in the nut 430. The nut 430 may include a keyed portion 436. The keyed portion 436 may be selectively receivable in a receptacle 438 formed in the suspended body-1. The interface of the receptacle 438 and the keyed portion 436 may prevent the nut 430 from rotating relative to the suspended body-1. In some examples, the aperture 434 may include threads adapted to receive threads of the fastener 424 alternately to the use of the nut 430.

Figure 14:
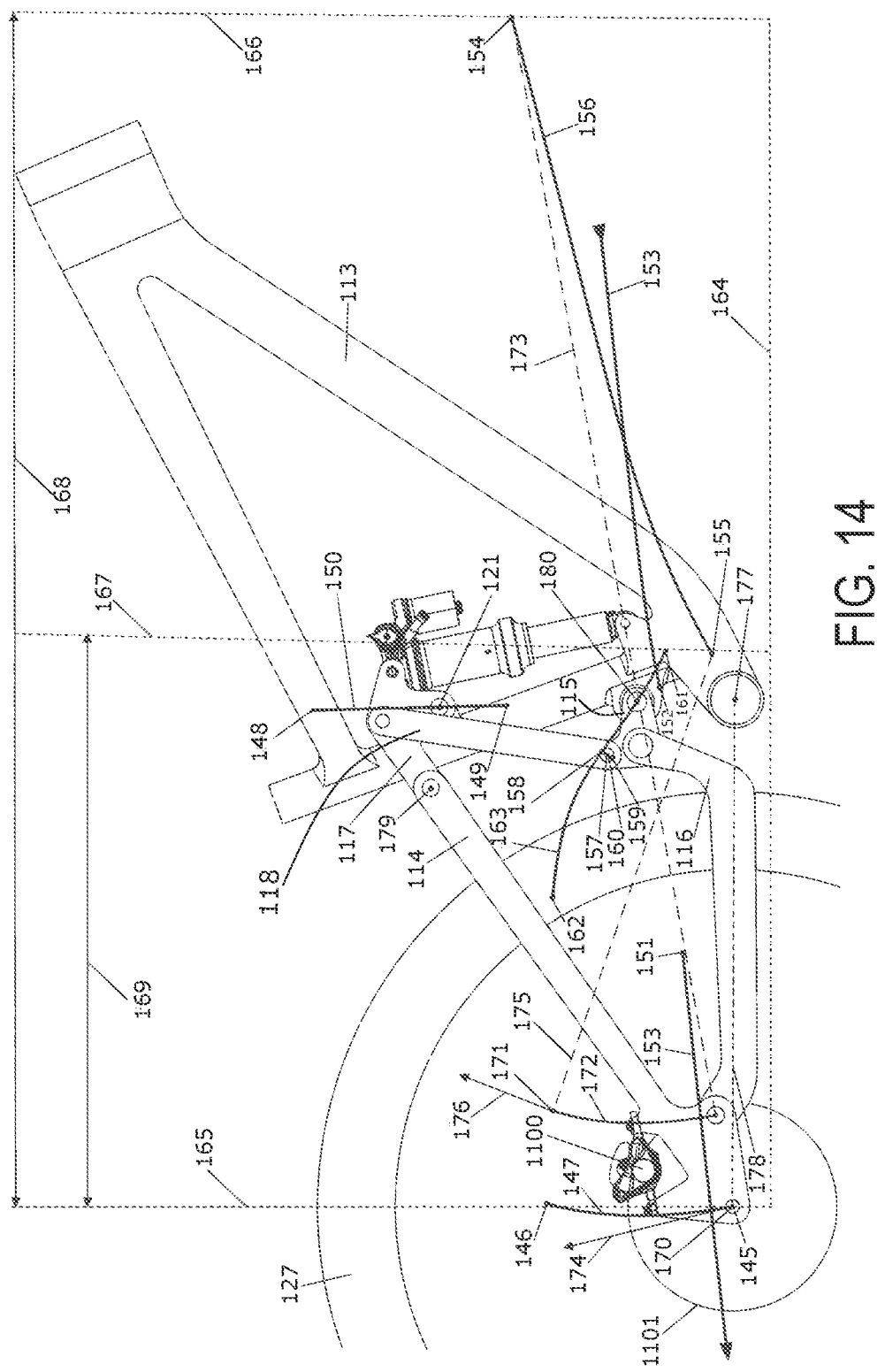
FIG. 14 shows a selected portion of the 15 IVC migration paths of the embodiments shown in FIGS. 1A, 2A, 3A, 8A, and 9A.

FIG. 14 illustrates a selected portion of the 15 IVC migration paths of the embodiments shown herein. Note that not all IVCs or IVC migrations are shown for clarity of the figure. As shown in FIG. 14, the various parts and IVCs of the suspension system may be located at different positions in the system depending on the state of the system. For example, the driven wheel axis may be located at different positions along the driven wheel axis migration path (DWAP) 147, which has a path length DWAP[L]. For example, the driven wheel axis 145 may be at extended state position as shown in FIG. 14, at compressed state position 146 as shown by the termination of DWAP 147, or at any other position along the DWAP 147. As another example, IVC[115][117] 133 may be located at different positions along the IVC[115][117] migration path 150. For example, IVC[115][117] may be at extended state position 148, at compressed state position 149, or at any other position along the IVC[115][117] migration path 150. DIVC[AD][113][114] may be located at different positions along the DIVC [AD][113][114] migration path 156, which has a path length DIVC[AD][113][114][L]. For example, DIVC[AD][113][114] may be at extended state position 154, at compressed state position 155, or at any other position along the DIVC

[AD][113][114] migration path 156. IVC[115][118] may be located at different positions along the IVC[115][118] migration path 160. For example, IVC[115][118] may be at extended state position 157, at inflection point 158 of bottom link 115, at compressed state position 159, or at any other position along the IVC[115][118] migration path 160. In other words, as DWAP moves from the extended state to the compressed state, link body 115 initially rotates clockwise until IVC[115][118] reaches inflection point position 158, then reverses direction and rotates counter clockwise until IVC[115][118] reaches the compressed position 159. IVC [113][118] may be located at different positions along the IVC[113][118] migration path 163. For example, IVC[113] [118] may be at extended state position 161, at compressed state position 162, or at any other position along the IVC [113][118] migration path 163.

The various migration paths may be composed of more than one migration path. For example, IVC[114][115] may be located at different positions along the IVC[114][115] migration path 153, which has an inflection point and is therefore composed of two migration paths. IVC[114][115] may be at extended state position 151, at compressed state position 152, or at any other position along the IVC[114] [115] migration path 153. FIG. 14 shows IVC[114][117] at the extended state 179 and SIVC[113][115] at the extended state 180, but for the sake of clarity in the FIG. 14 does not show their migration paths.

Several different relationships may exist between IVCs, as shown in FIG. 14. For example, IVC[114][116] may have different positional relationships relative to various IVCs. IVC[114][116] may be located at different positions along the IVC[114][116] migration path 172. IVC[114][116] may be at extended state position 170, at compressed state position 171, or at any other position along the IVC[114] [116] migration path 172. The relationship between IVC [114][116] at extended state position 170 and DIVC[AD] [113][114] at extended state position 154 is represented by extended IVC line IVC[E] 173. In various examples, IVC [114][116] extended tangent direction IVC[114][116][ET] 174 is coincident to IVC[114][116] at extended state position 170 and perpendicular to IVC[E] 173. In various examples, the relationship between IVC[114][116] at compressed state position 171 and DIVC[AD][113][114] at compressed state position 155 is represented by compressed IVC line IVC[C] 175. In various examples, IVC[114][116] compressed tangent direction IVC[114][116][CT] 176 is coincident to IVC[114][116] at compressed state position 171 and perpendicular to IVC[C] 175.

In various examples, the base line 164 extends parallel to the ground at the extended state. Rear line 165 extends perpendicular to a rear end of base line 164 and intersects with driven wheel axis 145 at extended state position. Front line 166 extends perpendicular to a front end of base line 164 and intersects with DIVC[AD][113][114] at extended state position 154. Center line 167 is perpendicular to a center portion of base line 164 and intersects with DIVC[AD][113] [114] at compressed state position 155. The DIVC extended direction variable (DIVC[AD][EDV]) 168 extends between rear line 165 and front line 166. The DIVC compressed direction variable (DIVC[AD][CDV]) 169 extends between rear line 165 and center line 167.

Figure 15:
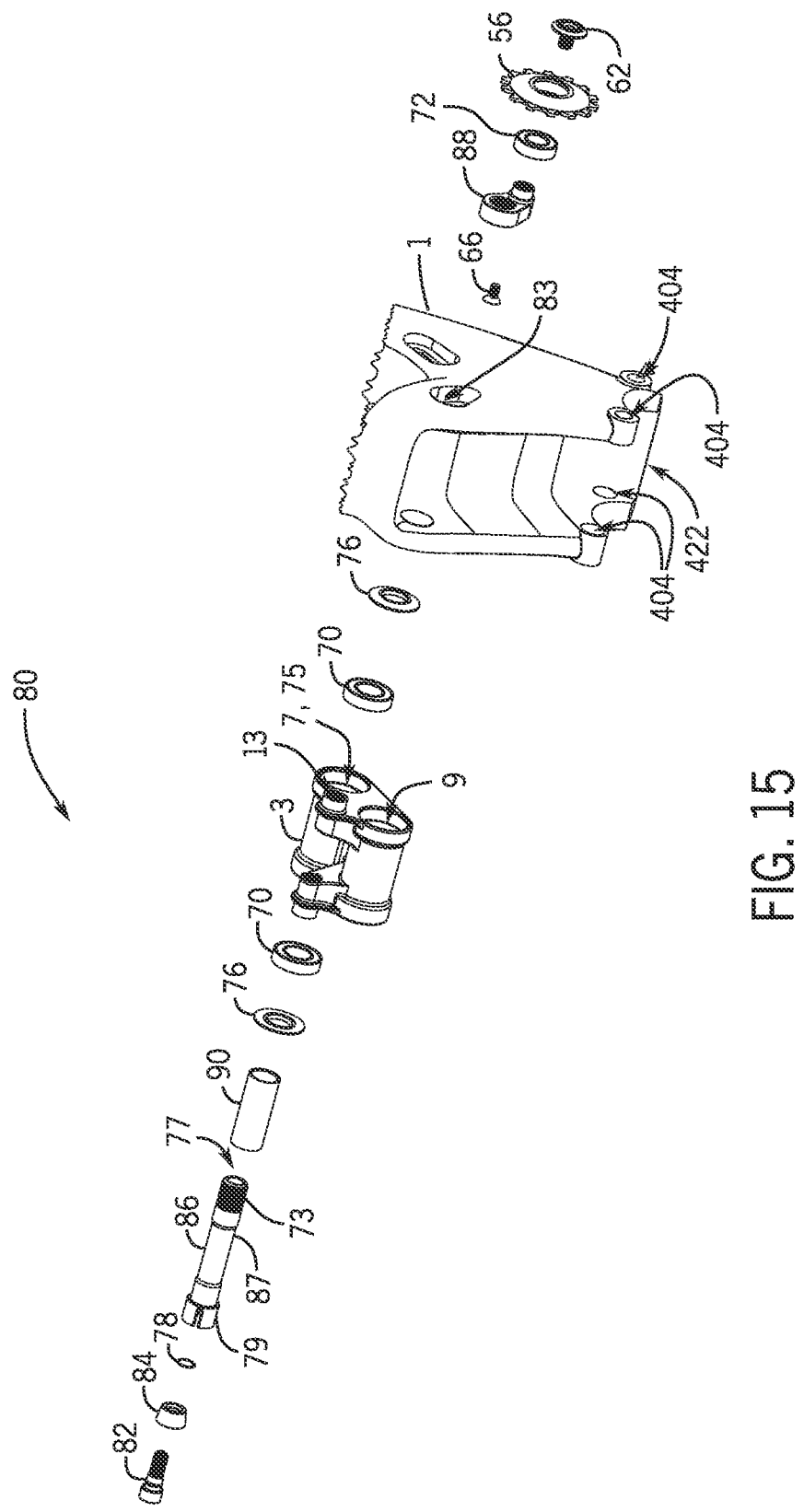
FIG. 15 shows an exploded isometric view of a portion of a suspension linkage for an electric bike.
Figure 16:
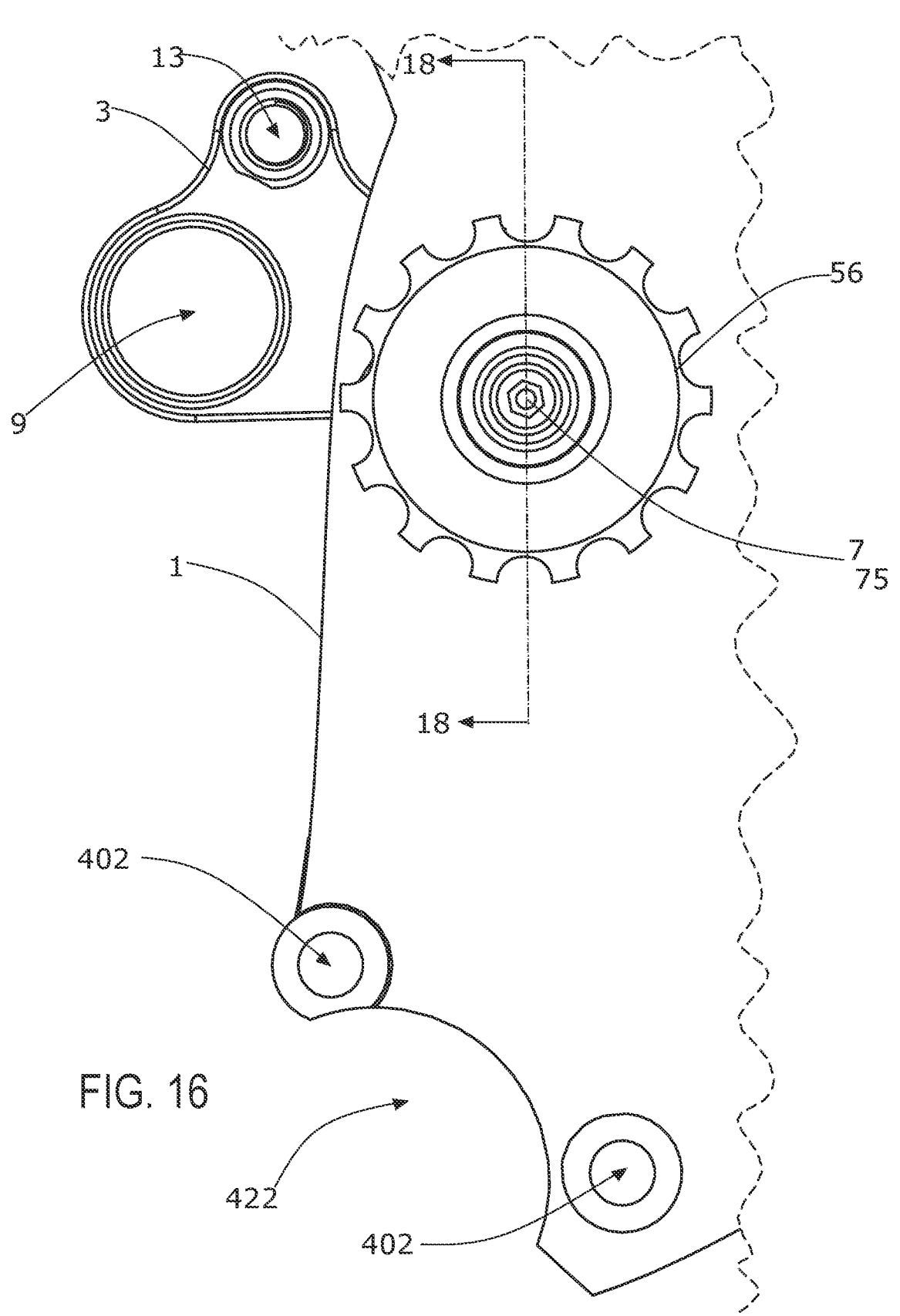
FIG. 16 shows a partial elevation view of a portion of the suspension linkage of FIG. 15.
Figure 17A:
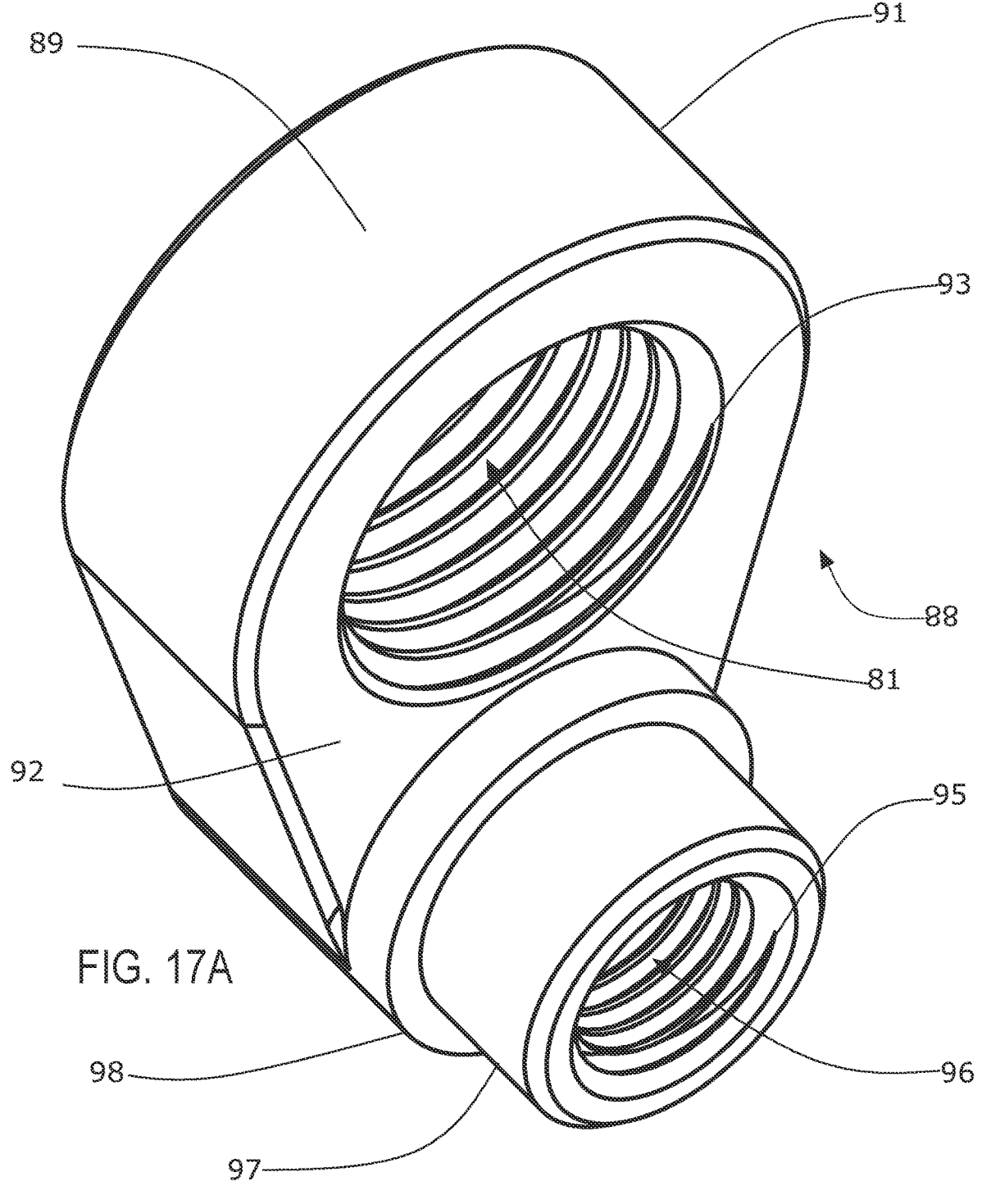
FIG. 17A shows an example of a key suitable for use with the suspension linkages disclosed herein.
Figure 17B:
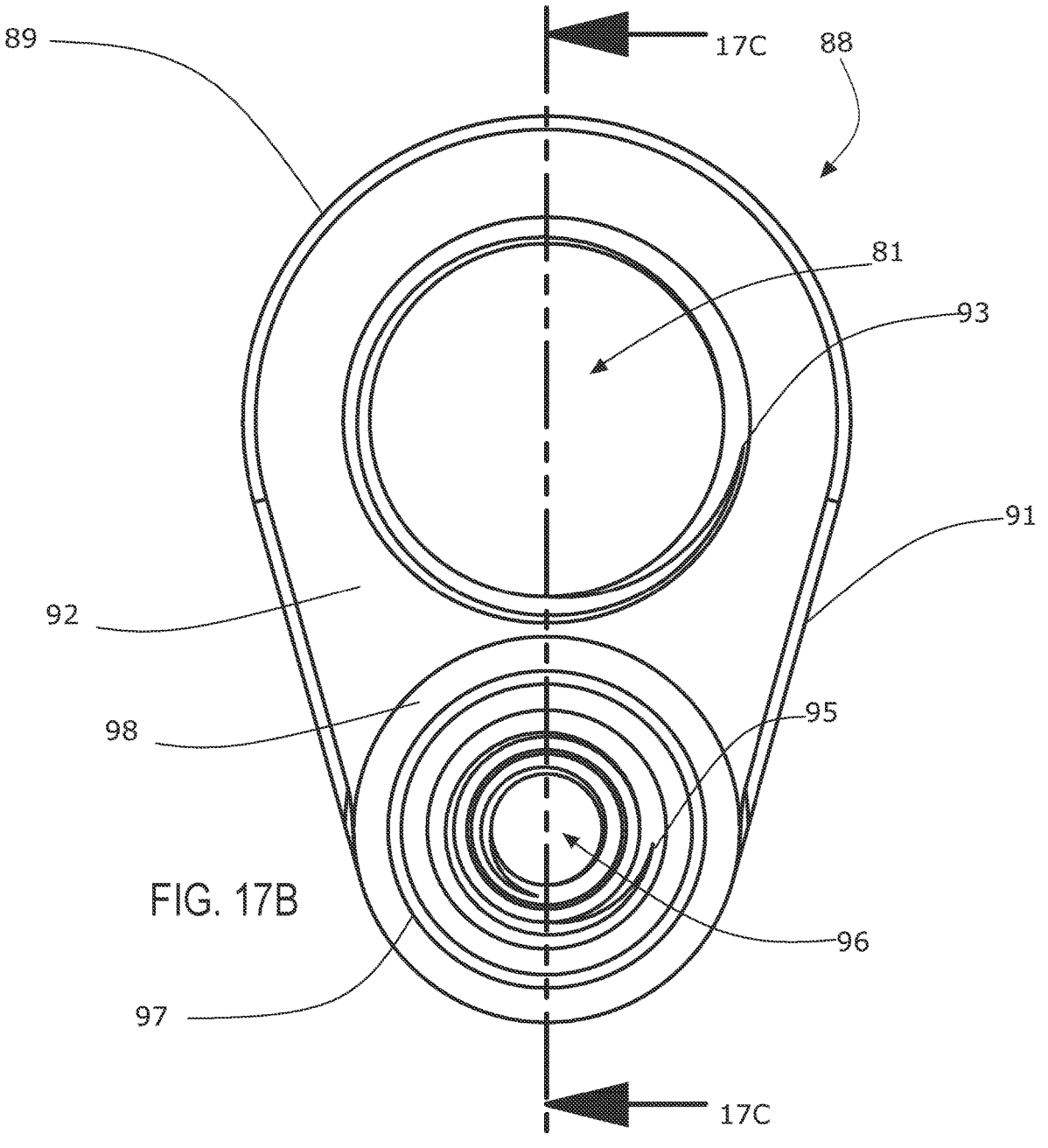
FIG. 17B shows a side elevation view of the key of FIG. 17A.
Figure 17C:
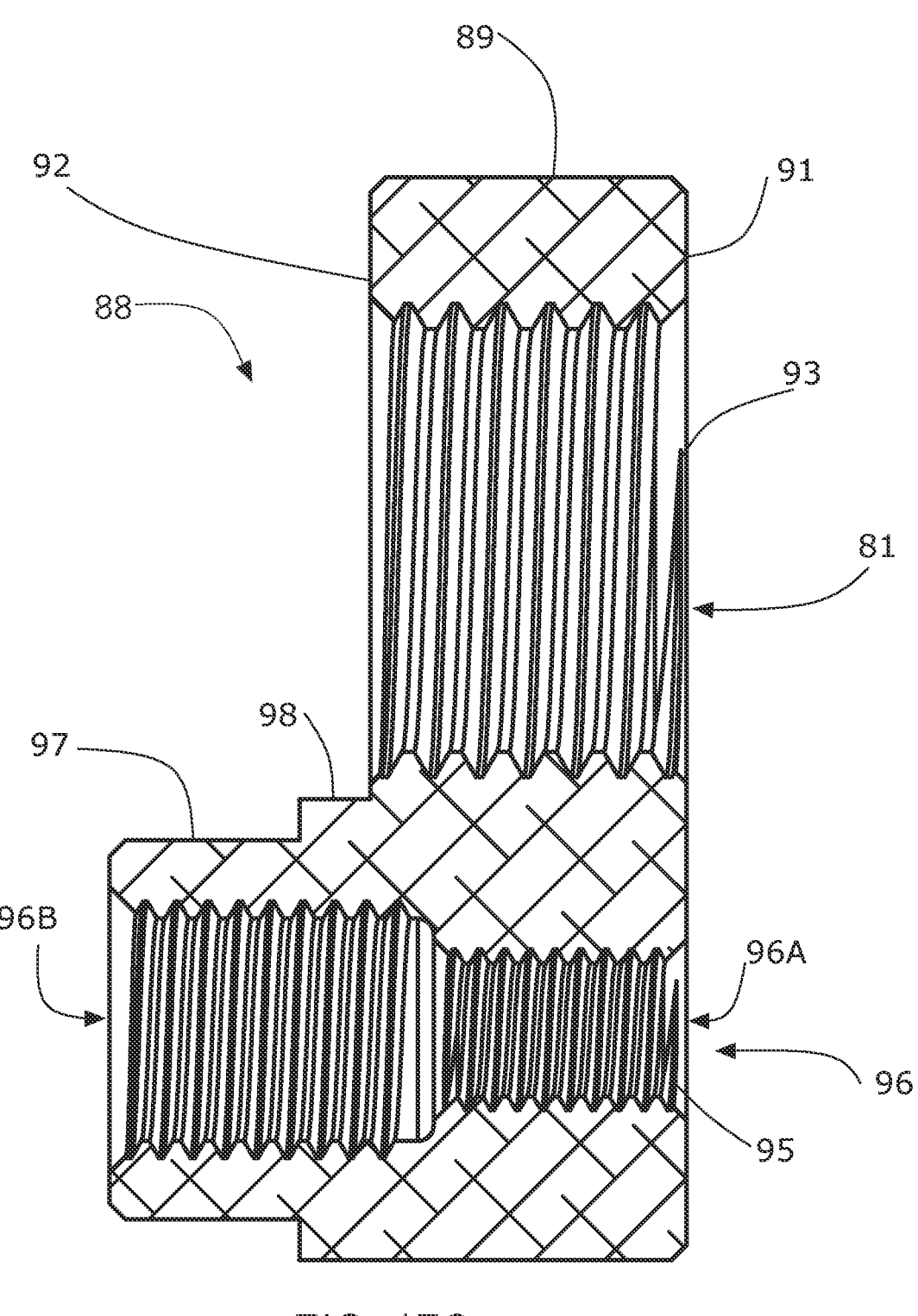
FIG. 17C shows a section view of the key of FIG. 17A taken along section line 17C-17C of FIG. 17B.
Figure 18:
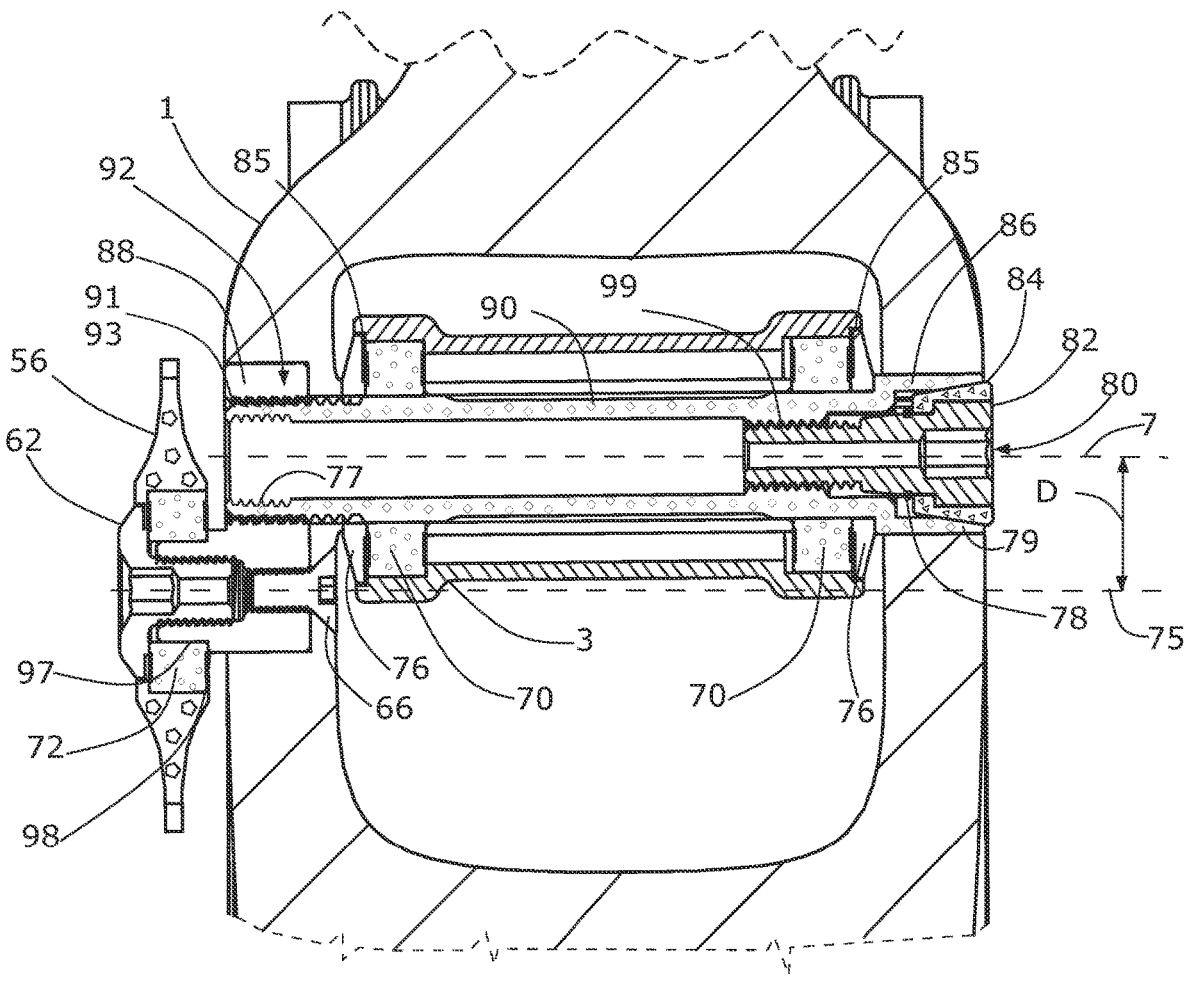
FIG. 18 shows a partial section view of the portion of the suspension linkage of FIG. 16 taken along section line 18-18 of FIG. 16.

FIG. 15 is a partial exploded rear isometric of a portion of a suspension linkage according to the present disclosure. FIG. 16 shows a partial elevation view of a portion of the suspension linkage of the FIG. 15. FIGS. 17A-C show details of a key. FIG. 18 shows a partial section view of the portion of the suspension linkage of FIG. 16 taken along section line 18-18 of FIG. 16. In FIGS. 15-18, portions of the suspension linkage are removed, for clarity. As shown for example in FIG. 15-18, the motive power source 400 may be received in the motive power source compartment 422 and secured to the suspended body 1 via the mounts 402.

As best shown in FIGS. 15 and 18, the idler 56 may be coupled to the suspended body 1 and the suspension linkage by an axle assembly 80. The link body 3 may be coupled to the suspended body 1 by the axle assembly 80. The axle assembly 80 may include a fastener element 82, a tapered collet 84, one or more race extenders 76, a retainer 78, one or more bearings 70/72, an axle 86, a key 88, an optional key fastener 66, a spacer 90, and an idler fastener 62.

With reference to FIGS. 17A-17C, the key 88 may be formed of a body 91. The body 91 may have a main portion 89. The main portion 89 may have a locking shape, such as a lobe as shown. The main portion 89 may have other suitable shapes that resist rotation when coupled with the suspended body 1 or other portions of the axle assembly 80 (e.g., triangle, square, spline, star, other polygons or irregular shapes). The main portion 89 may have an aperture 81 formed therein or therethrough (e.g., may be a through hole or a blind hole). The aperture 81 may include threads 93 formed on an inner surface thereof. A shoulder 98 may extend proud of a face 92 of the main portion 89. A wall 97 may extend from the shoulder 98 further away from the face 92 of the main portion 89. The wall 97 may have an aperture 96 formed therein or therethrough (e.g., may be a through hole or a blind hole). As shown, in FIG. 17C, the aperture 96 may have a first portion 96A with a diameter that is smaller than a diameter of a second portion 96B. The first portion 96A and the second portion 96B may be disposed end-to-end along the length of the aperture 96. A step may be formed between the portions 96A, B due to the different diameters of the respective portions. Either or both of the portions 96A, B may include helical threads 95.

The fastener element 82, key fastener 66 and/or idler fastener 62 may be a variety of types of fastener. In some examples, the fastener 82 is a socket head cap screw. In some examples the key fastener is a counter sink screw. In some examples the idler fastener is a flange bolt. The fasteners 62, 66, and 82 include external helical fastener threads adapted to mate with other components of the assembly 80. The tapered collet 84 has an aperture formed therein and adapted to receive the fastener 82. The aperture 186 is sufficiently large to allow a clearance with the fastener 82 such that the fastener threads 184 do not engage the tapered collet 84 at the aperture 186. The tapered collet 84 may be assembled with the fastener 82 and held to the fastener 82 with a retainer 78 such as a snap ring, spring, circlip, or the like. The retainer 78 may help withdraw the tapered collet 84 when disassembling the axle assembly 80.

The axle 86 may have an elongate body 87 with an expandable portion 79 at one end of the elongate body 87 and external axle threads 73 at an opposite end of the elongate body 87. The axle 86 may optionally have internal axle threads 77 at the opposite end of the elongate body 87 from the expandable portion 79. The axle 86 may include internal axle threads 99 in an end of the elongate body 87 near the expandable portion 79. The inside diameter of the expandable portion 79 may be the same size or less than an outer diameter of the tapered collet 84.

The bearings 70 may allow for rotational motion of the link body 3 with respect to the axle assembly 80. For example, the bearings 70 may be roller bearings, tapered bearings, bushings, or the like. The spacer 90 may be a hollow tube with a diameter larger than that of the axle 86.

The spacer 90 may be received over the axle 86. The bearings 70 may be adapted to receive the race extenders 76. The race extender 76 and the spacer 90 may stabilize and/or locate the bearings 70 in the axle assembly 80. In some embodiments, the bearings 70 may be located or secured to the axle 86 by the spacer 90 and the race extenders 76. For example, as shown in FIG. 17, the bearing 70 may be sandwiched between the respective ends of the spacer 90 and the respective race extenders 76.

As best shown in FIG. 17, when assembled, the key 88 may be received in an aperture 83 (see FIG. 15) formed in the suspended body 1. The key 88 may be secured to the suspended body 1 such as by the pulling force of the engagement of the external axle threads 73 with the threads 93 in the aperture 81, a press fit, or by other suitable structures. The key 88 may optionally be secured to the suspended by the threaded engagement of the fastener 66 with the threads 95 of the first portion 96A of the aperture 96. The bearings 70 and respective race extenders 76, and spacer 90, may be assembled with the link body 3, such as within an aperture of the link body 3 that is coincident with the IVC[1][3] 7. Either of the bearings 70 may be floating or fixed along the axle 86. For example, the link body 3 may include a locating feature, such as a step 85, that receives an outer portion of the race extenders 76 that limits movement of the bearing 70 in a transverse direction 105 along the axle 86. The bearings 70 may be allowed to move along the axle 86.

The fastener element 82 may be threaded into internal threads 99 formed in the axle. As the fastener element 82 is drawn in to the axle 86, the fastener element 82 may cause the collet 84 to expand the expandable portion 79 outward to engage the expandable portion 79 with the inner face of an aperture formed in the suspended body 1 (e.g., by friction), to secure the axle assembly 80 to the suspended body 1.

The bearing 72 may be assembled with the key 88. For example, an inner race of the bearing 72 may be received on the wall 97 and located by the shoulder 98. The outer race of the bearing 72 may be received in an aperture formed in the idler 56. The idler 56 and bearing 72 may be secured to the axle assembly 80 by the threaded engagement of the fastener 62 with the threads 95 of the second portion 96B of the aperture 96. The structure shown in FIG. 17 may be suitable for an idler as shown in FIGS. 3A-3F and/or FIGS. 9A-9G. The PIVC [1][3] 7 may be spaced apart from the idler rotation axis 75 by a distance D. The distance D may be determined by a spacing between the aperture 81 and the aperture 96 of the key 88. In many embodiments, the distance D may be less than or equal to about 50-mm. For example, the distance D may be about 10-mm, 15-mm, 20-mm, 25-mm, 30-mm, 35-mm, 40-mm, 45-mm, or other suitable distances. In other embodiments, the idler 56 may be secured to the axle assembly 80 such as by the optional internal axle threads 77. Such an arrangement may be suitable for an idler 56 such as shown in FIGS. 2A-2H and/or FIGS. 9A-9G.

In numerous embodiments, a method of analyzing different behaviors of the suspension system is disclosed. For example, motions related to inflection point 158 of bottom link 115 may be analyzed as the suspension is moved from the extended to the compressed state. In one example, IVC[115][118] migration path 160 may be analyzed. IVC [115][118] migration path 160 reverses as the suspension moves from the extended state at least partially to the compressed state. In another example, this behavior may be visualized by analyzing IVC[113][118] migration path 163 in comparison to IVC[115][118] migration path 160. When the suspension is in the extended state, IVC[113][118] at extended state position 161 is not coincident to IVC[115][118] migration path 160. As the suspension moves towards the compressed state, IVC[115][118] moves from extended state position 157 towards inflection point 158 of bottom link 115 along IVC[115][118] migration path 160. At a point between the driven wheel axis 145 at the extended state position and at the compressed state 146, IVC[113][118] migration path 163 intersects IVC[115][118] migration path 160 at inflection point 158. As the suspension continues to move towards the compressed state, IVC[115][118] moves from inflection point 158 towards compressed state position 159 along the IVC[115][118] migration path 160.

FIG. 14 also shows a relationship between the driven wheel axis 145 at the extended state and a driving cog axis 177, represented by the driving wheel axis to driving cog axis (DWDC) line 178. The seat-stay 114 is operatively coupled to a driven wheel 127.

With reference to FIGS. 23A-23L an idler assembly 2300 suitable for use with the suspension linkages of FIGS. 1A, 2A, 3A, 8A, 9A, 14, and/or 18A is disclosed. In the example shown in FIG. 23A-FIG. 23L, the idler assembly 2300 is such that the idler rotational axis 75 is offset from a pivot axis of the suspension, similar to the embodiment shown in FIGS. 3A-3F, 9A-9G, and 10-13. Other embodiments, of the idler assembly 2300 may be suitable for use with a suspension where the idler assembly 2300 is concentric with a suspension pivot axis such as the suspensions of FIGS. 2A-2H and 8A-8I. The idler assembly 2300 and 2400 discussed below are configured to create two rotational axes. A first rotational axis is for the idler, and a second rotational axis is for a suspension link. For example, the rotational axis of the idler 75 and the rotational axis of the PIVC[1][3] 7 may be formed by the idler assemblies 2300 and 2400. The idler rotational axis is offset from the suspension link axis. The idler assemblies 2300 and 2400 enable close spacing of the idler rotational axis and the suspension link axis closer than could be achieved by traditional methods, such as forming two or more apertures in the suspended body 1 (i.e., with close spacing of the axes, the apertures may interfere with one another and cause weakness in the suspended body 1 compared to a single aperture or a large aperture and a relatively smaller aperture). The idler assemblies 2300 and 2400 couple the drive performance of the vehicle with the suspension performance and enable the suspension and drive performance of the vehicle to be fine-tuned.

Figure 23A:
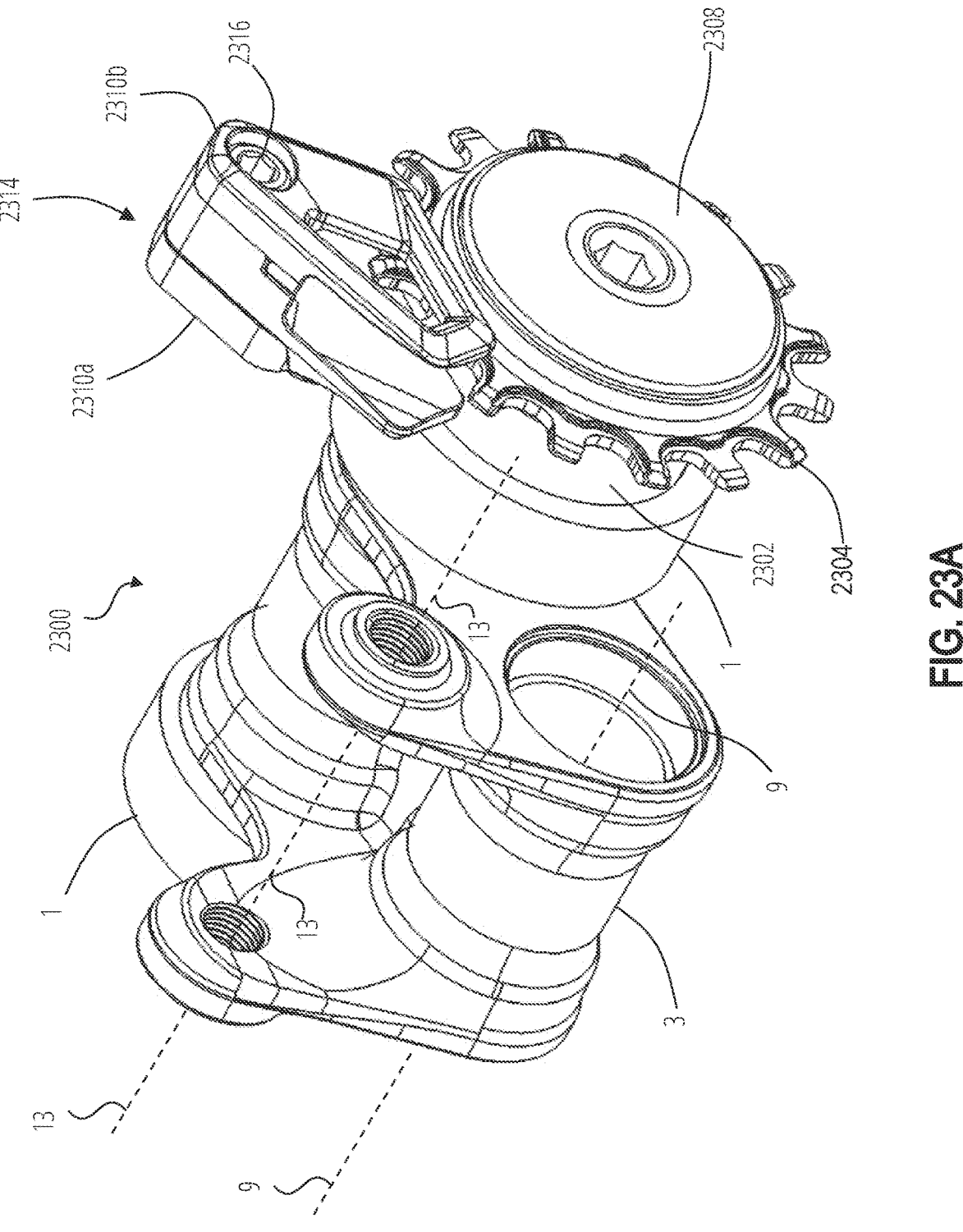
FIG. 23A is a partial isometric view of an idler assembly suitable for use with the suspension linkages of FIGS. 1A, 2A, 3A, 8A, 9A, 14, and/or 18A.
Figure 23B:
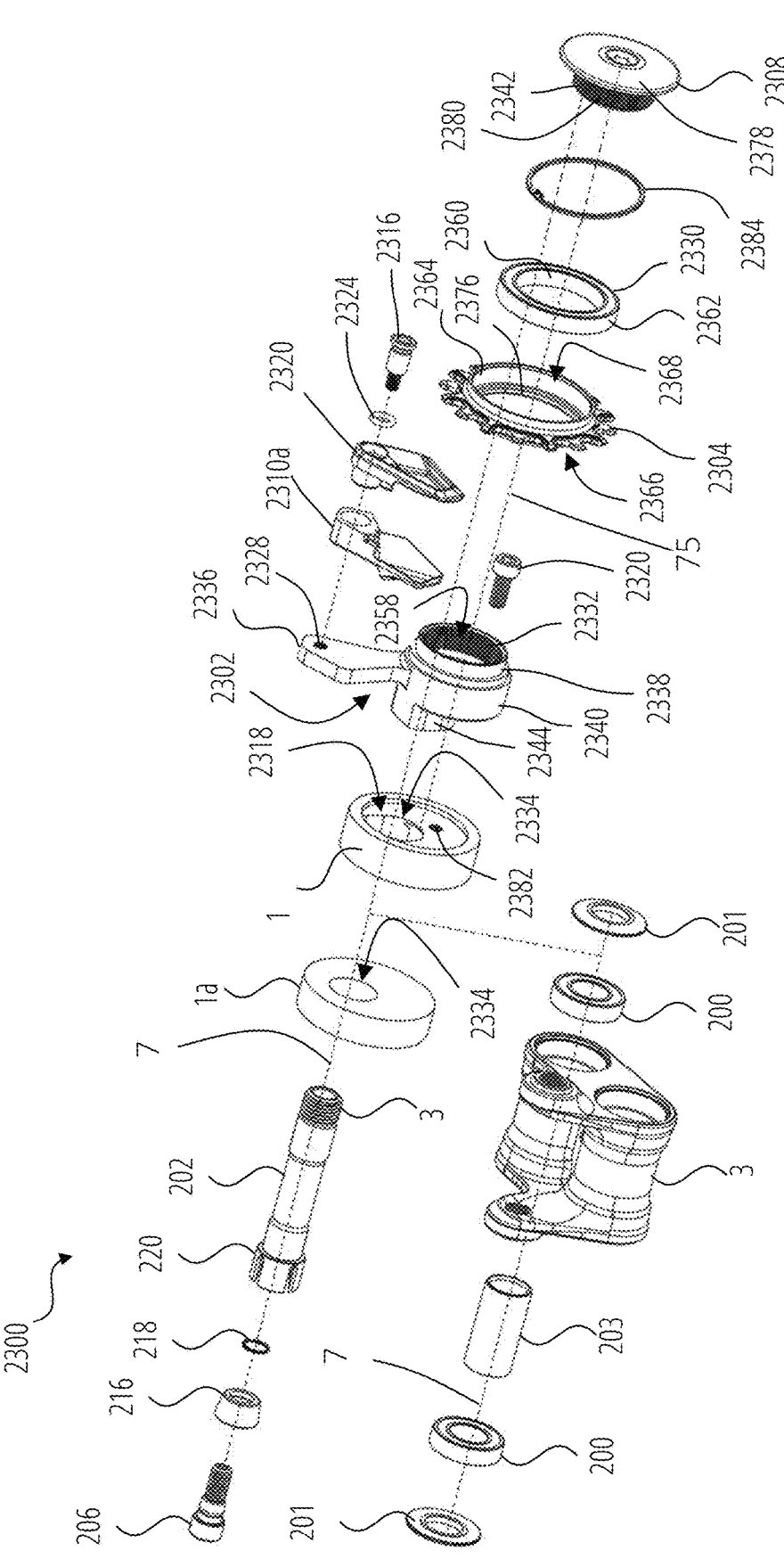
FIG. 23B is an exploded isometric view of the idler assembly of FIG. 23A shown with portions of a suspension.

With particular reference to FIG. 23A and FIG. 23B, the idler assembly 2300 includes an idler mount 2302 couplable to the suspended body 1. In these figures, suspended body 1 may be, for example, a front triangle portion of a suspension bicycle, and is shown as a partial cut-away portion of the suspended body for clarity purposes. The idler assembly 2300 may include a cog 2304, a bearing 2330, and a cap 2308. The cog 2304 has a plurality of teeth 2366 on an outer surface thereof. The teeth 2366 may be suitable to engage a drive element such as a chain or belt. In the example shown, the cog 2304 includes sixteen teeth 2366. In other embodiments, more or fewer teeth may be used. The cog 2304 includes an aperture 2368 formed therein, with an inner surface 2364 thereof. The aperture may include a cog flange 2376 extending radially inward from inner surface 2364. The cog flange 2376 may form a stop or shoulder to locate the bearing 2330. The bearing 2330 may be coupled to the cog by a retainer 2384, such as a snap ring or circlip adapted to be received in a groove 2386 formed in the cog (see FIG. 23K). In FIG. 23A, the idler assembly 2300 is shown with portions of the suspended body 1 removed, and with a link body 3 coupled to the suspended body 1. A first portion 1a of the suspended body 1 and a second portion 1b of the suspended body 1 are shown. The portions 1a and 1b are connected to one another via other portions of the suspended body 1, not shown for the sake of clarity. The portions 1a and 1b are opposing sidewalls of the suspended body 1. The PIVC[3][6] 13 and PIVC[3][4] 9 are shown with respect to the link body 3. As shown, for example in FIG. 23B, the idler assembly 2300 may be suitable to position the idler rotational axis 75 at an offset from the PIVC[1][3] 7.

Figure 23C:
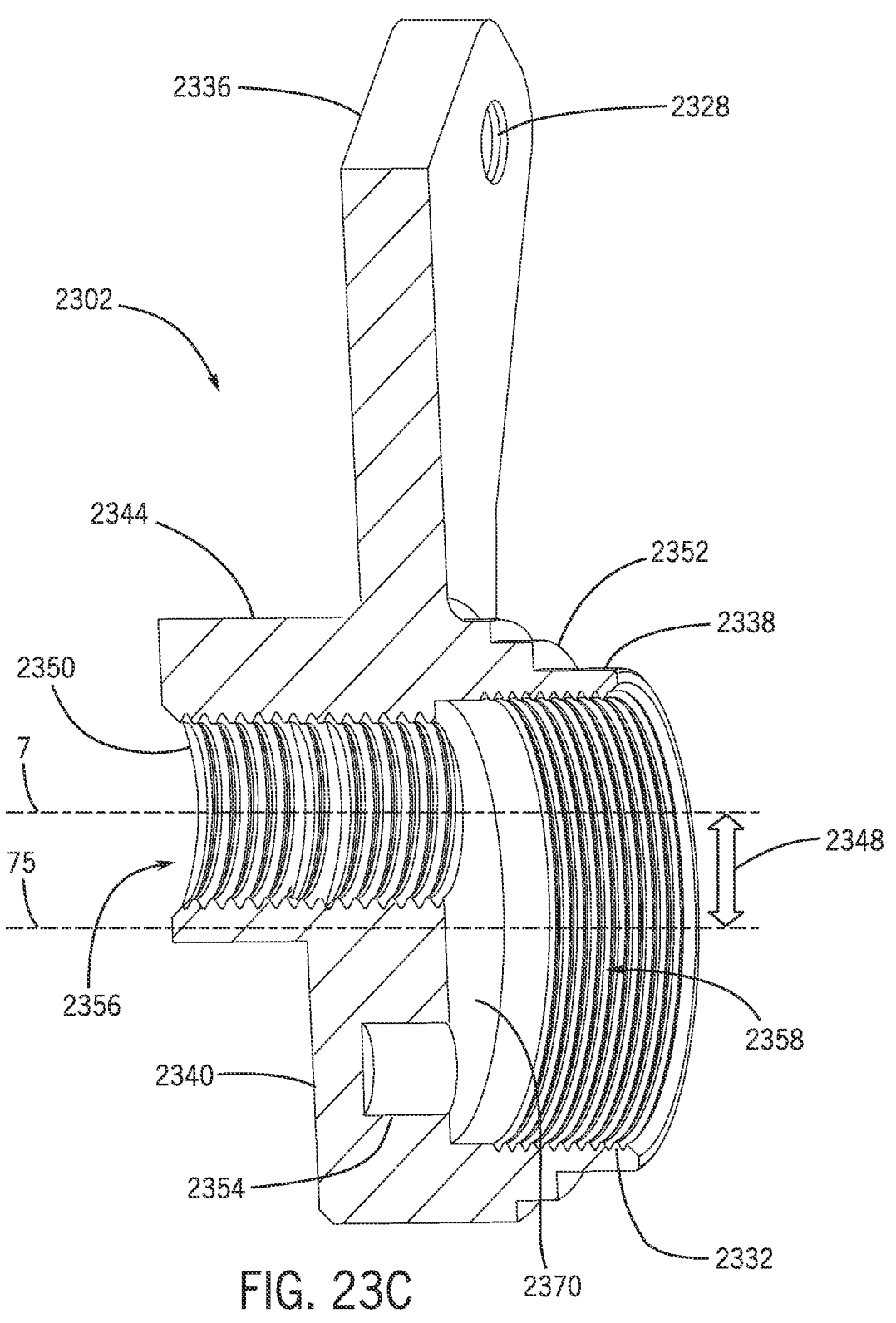
FIG. 23C is a section view of a portion of the idler assembly of FIG. 23A.

With reference to FIG. 23B and FIG. 23C, the idler mount 2302 includes a body 2340. In many embodiments, the body 2340 is substantially cylindrical. An aperture 2358 is formed in the body 2340. The aperture 2358 may be a blind aperture with a blind face 2370. Threads 2332 may be formed on an interior surface of the aperture 2358. A flange 2338 may extend from the body 2340 and form a portion of the wall of the aperture 2358. A shoulder 2352 may extend from the body 2340 surrounding at least a portion of the flange 2338. The shoulder 2352 may have a diameter larger than that of the flange 2338. An aperture 2354 may extend into the body 2340 from the blind face 2370 of the aperture 2358. The aperture 2354 may be a blind aperture (as shown for example in FIG. 23C) or may be a through aperture (as shown for example in FIG. 23I and FIG. 23J). A locking feature 2344 may extend from a face of the body 2340 opposite the flange 2338.

A protrusion 2336 may extend from a circumferential portion of the body 2340. The protrusion 2336 is optional and may be suitable to mount a guide 2314 that routes a drive member such as a chain or belt. An aperture 2328 may be formed in or through the protrusion 2336. The guide 2314 may have a first guide portion 2310a and a second guide portion 2310b that are selectively couplable to the protrusion 2336 such as with a fastener 2316 received in the aperture 2328, such as with mating threads between the aperture 2328 and the fastener 2316. Optionally, a seal 2324 may be received on the fastener 2316.

An aperture 2356 may extend into the locking feature 2344. In some embodiments, the aperture 2356 may be a through aperture that extends through the locking feature 2344, through the body 2340 and penetrates the blind face 2370 of the aperture 2358. In other embodiments, the aperture 2356 may be a blind aperture that penetrates into the locking feature 2344 and/or a portion of the body 2340, but does not penetrate the blind face 2370. The aperture 2358 and the flange 2338 may be relatively large in diameter compared to the aperture 2356 and/or aperture 2354. For example, the aperture 2356 may have a diameter and center such that the circumference of the aperture 2356 is contained within the circumference of the aperture 2358 (see, e.g., FIG. 23L). Similarly, the aperture 2354 may have a diameter and center such that the circumference of the aperture 2354 is contained within the circumference of the aperture 2358 (see, e.g., FIG. 23L). The relationship of the central axis of the aperture 2356 an the central axis of the aperture 2358 may define an offset 2348 of the PIVC[1][3] 7, or another suspension link axis, from the idler rotational axis 75.

The cap 2308 includes a head 2378 and a collar 2380 extending longitudinally therefrom. The collar 2380 includes threads 2342 formed on an outer portion thereof. The head 2378 of the cap 2308 may be sufficiently large so as to be able to retain the cog 2304 and/or bearing 200 with the idler assembly 2300 when assembled.

Figure 23D:
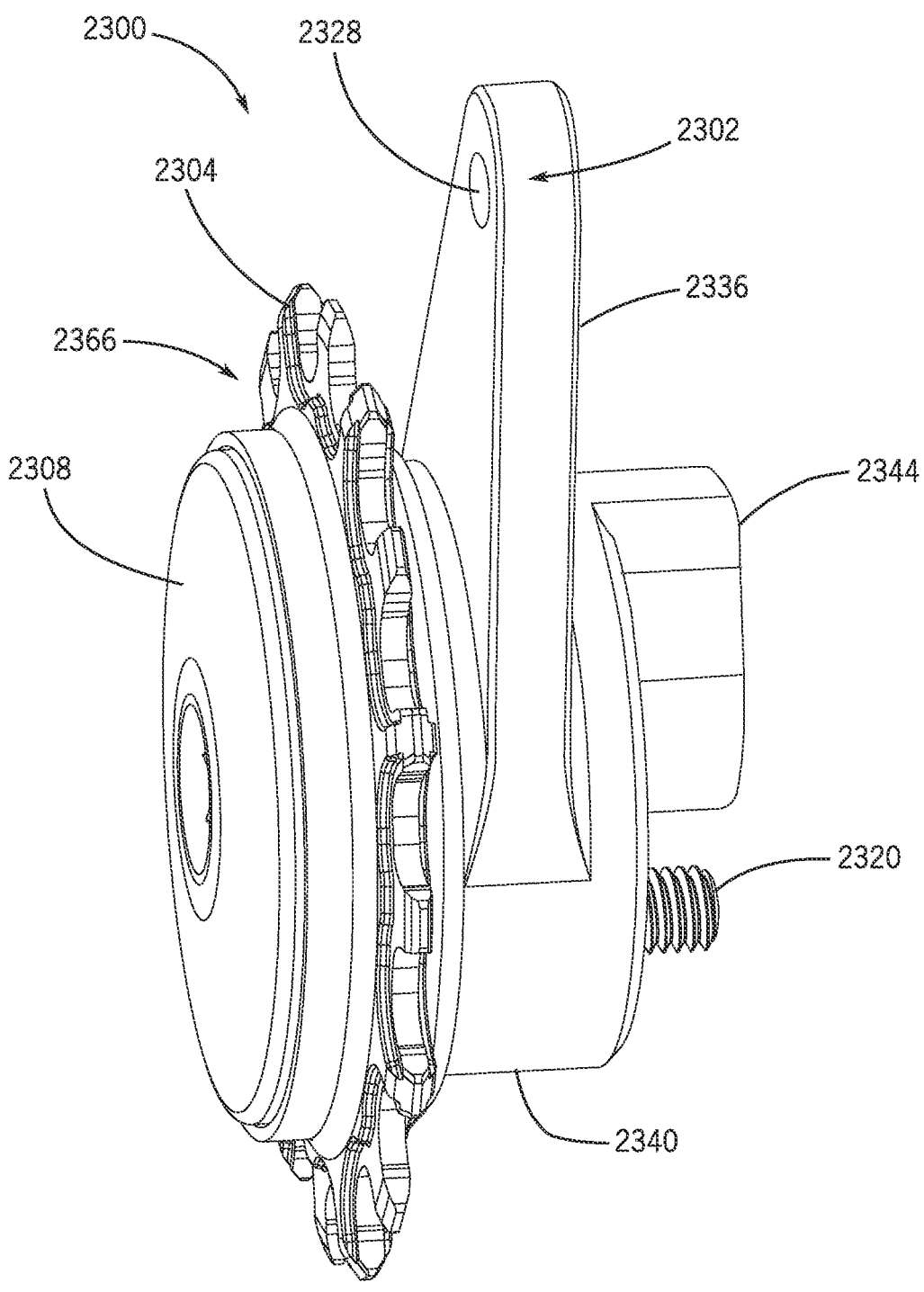
FIG. 23D is a partial isometric view of the idler assembly of FIG. 23A.
Figure 23E:
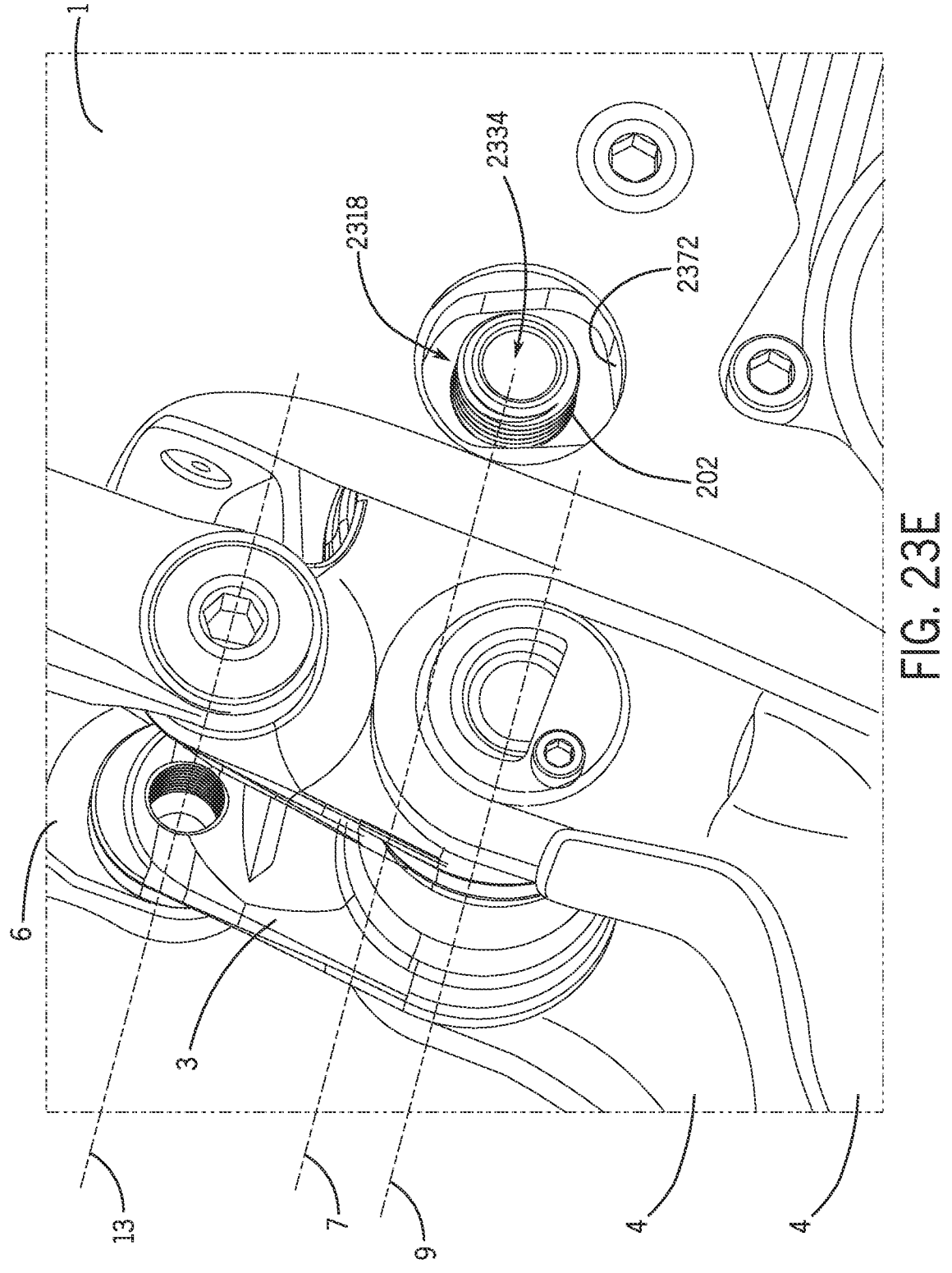
FIG. 23E is a partial isometric view of a portion of a suspension suitable for use with the idler assembly of FIG. 23A.
Figure 23F:
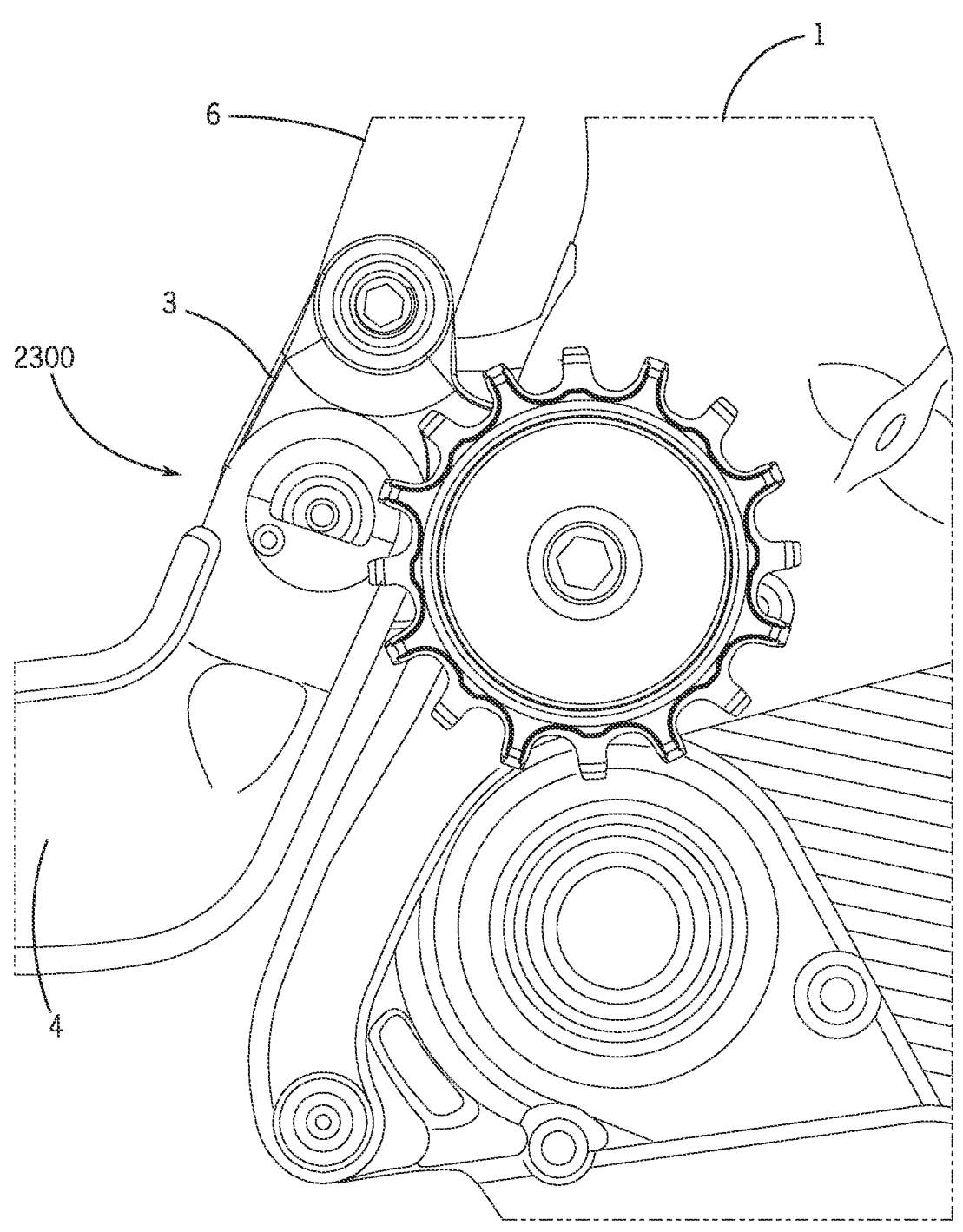
FIG. 23F is a partial detail side elevation view of the idler assembly of FIG. 23A, coupled to a suspension.
Figure 23G:
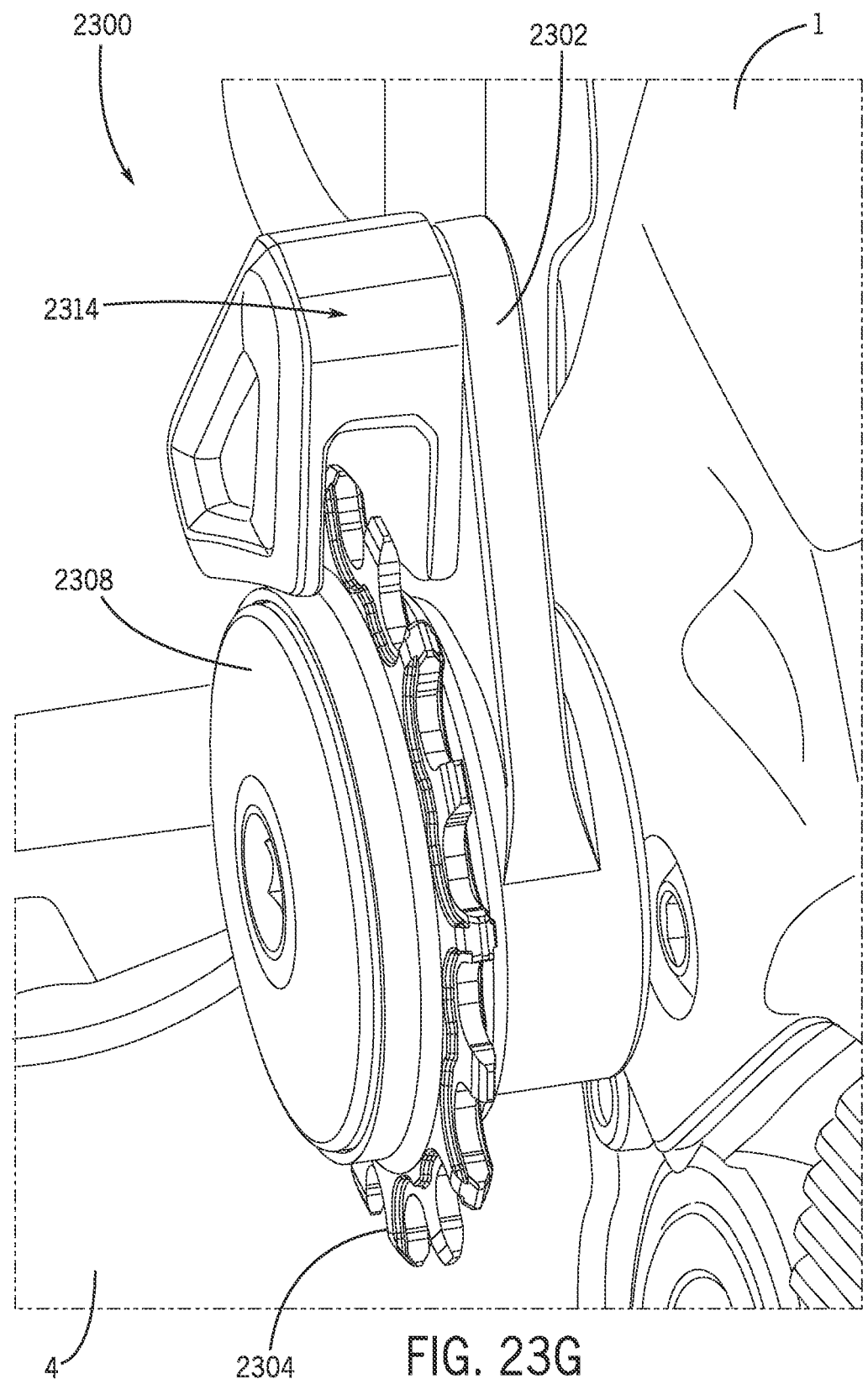
FIG. 23G is a partial isometric view of the idler assembly of FIG. 23A, coupled to a suspension.
Figure 23H:
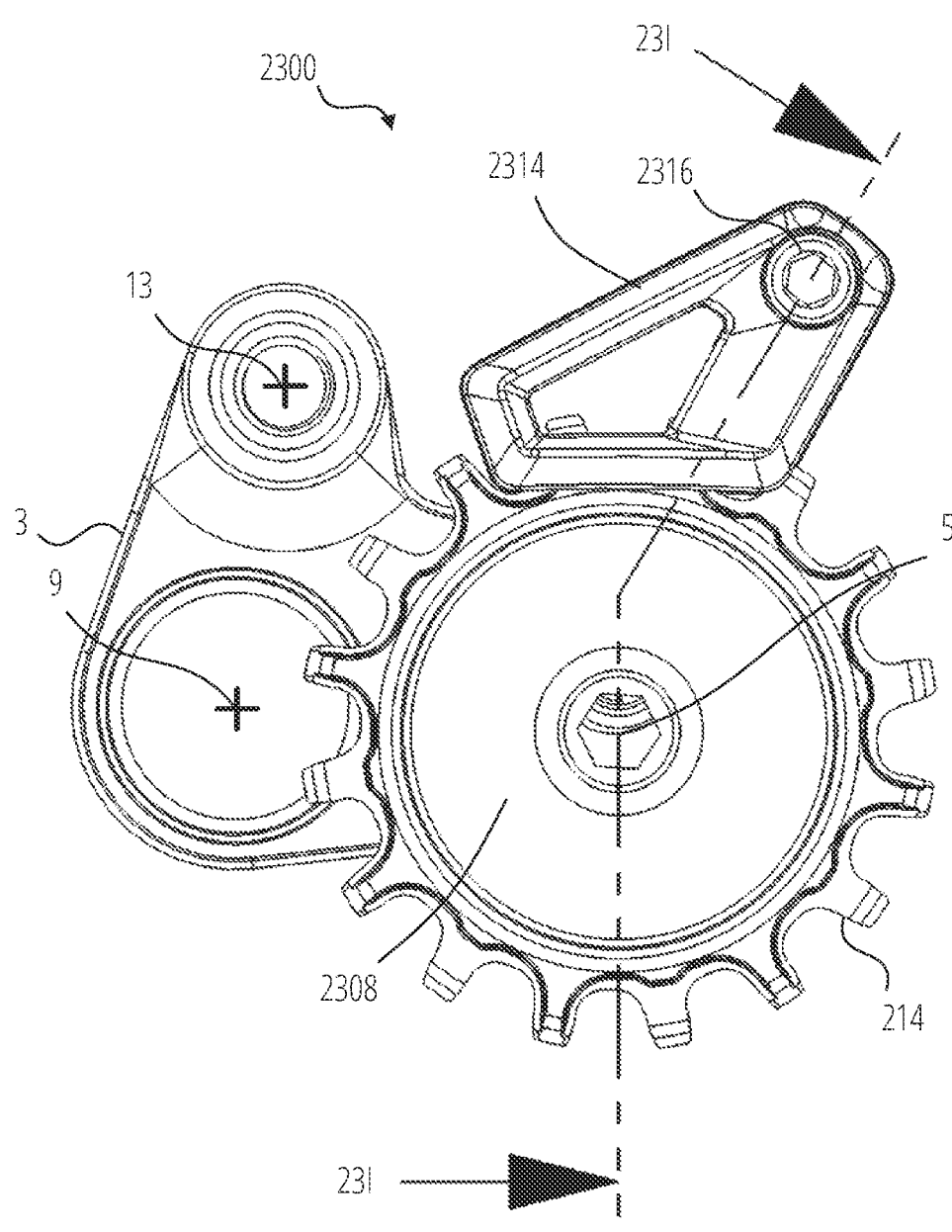
FIG. 23H is a partial side elevation view of the idler assembly of FIG. 23A shown with portions of a suspension.

FIG. 23D shows the idler assembly 2300 assembled, and separate from the two wheeled vehicle (e.g., bicycle, ebike, motorcycle, etc.). FIG. 23E shows the suspended body 1 with a pivot member such as the axle 202 installed but with the idler assembly 2300 hidden, for clarity. The suspended body 1 of the ebike includes a recess 2318 formed in the suspended body 1. An aperture 2334 is formed in the suspended body 1, passing through the first portion 1a and the second portion 1b of the suspended body 1, and through the recess 2318. The portion 1a may include an aperture 2334 to receive a portion of a suspension pivot (e.g., the axle 202) to form a pivot attachment for a first side of a suspension link pivot (e.g., the PIVC[1][3] 7). The portion 1b may define a through aperture 2334. The portion 1b may include a recess 2318 on an outside surface thereof. The through aperture 2334 may extend through the portion 1b in the recess 2318. The recess 2318 is adapted to receive the idler mount 2302. The axle 202 extends through the apertures 2334 to engage idler mount 2302. The axle 202 extends between the portions 1a and 1b. The idler assembly is coupled to the outside of one of the portions (e.g., the side walls 1b). The recess 2318 may include a locking feature 2372 such as a flat, D-shape, spline, or the like adapted to receive a mating locking feature of the idler support 2302. The locking features of the recess 2318 and the idler support 2302 may limit or prevent relative rotation between the idler support and the suspended body. The locking features of the recess 2318 and the idler support 2302 may orient the idler support relative to the suspended body 1. Optionally, in some embodiments, the idler rotational axis and the suspension link pivot axis are located within the recess 2318 formed in the outside walls 1a, 1b of the suspended body 1. Optionally, the idler rotational axis and the suspension link pivot axis may be defined within the idler support 2302 positioned in the recess 2318. Optionally, an aperture 2354 may be formed in the suspended body 1 in the recess 2318, where the aperture 2354 is suitable to help secure the idler mount 2302 to the suspended body 1 (see, FIG. 23B, not shown in FIG. 23E). FIG. 23F-FIG. 23L show the idler assembly 2300 installed with the suspended body 1 of an ebike. The idler assembly 2300 may be suitable for installation in a pedal bike or a motorcycle, or other two wheeled vehicles. Some components may be hidden in some figures, for clarity.

Figure 23I:
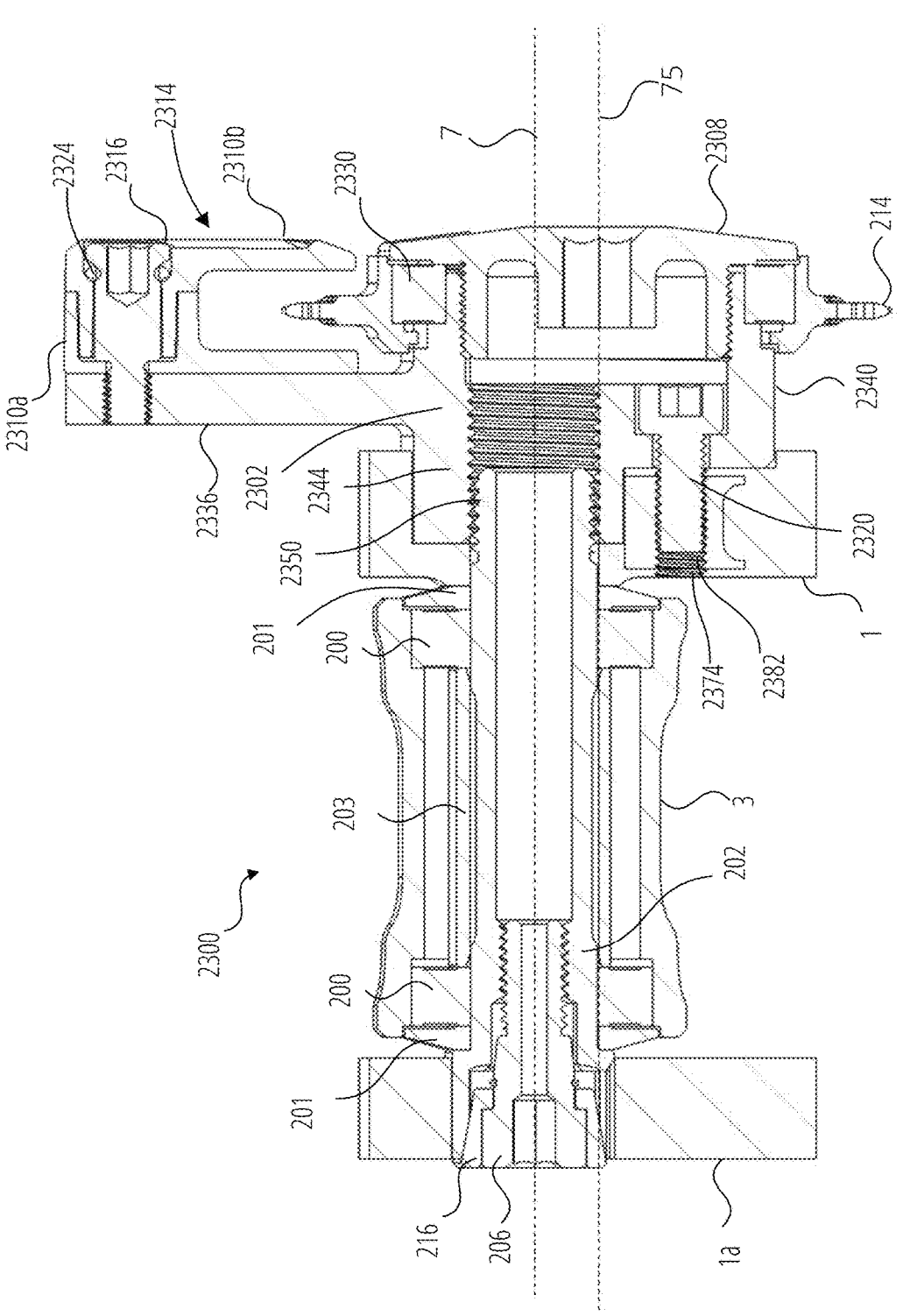
FIG. 23I is a section view of the idler assembly of FIG. 23A taken along section line 23I-23I of FIG. 23E.
Figure 23J:
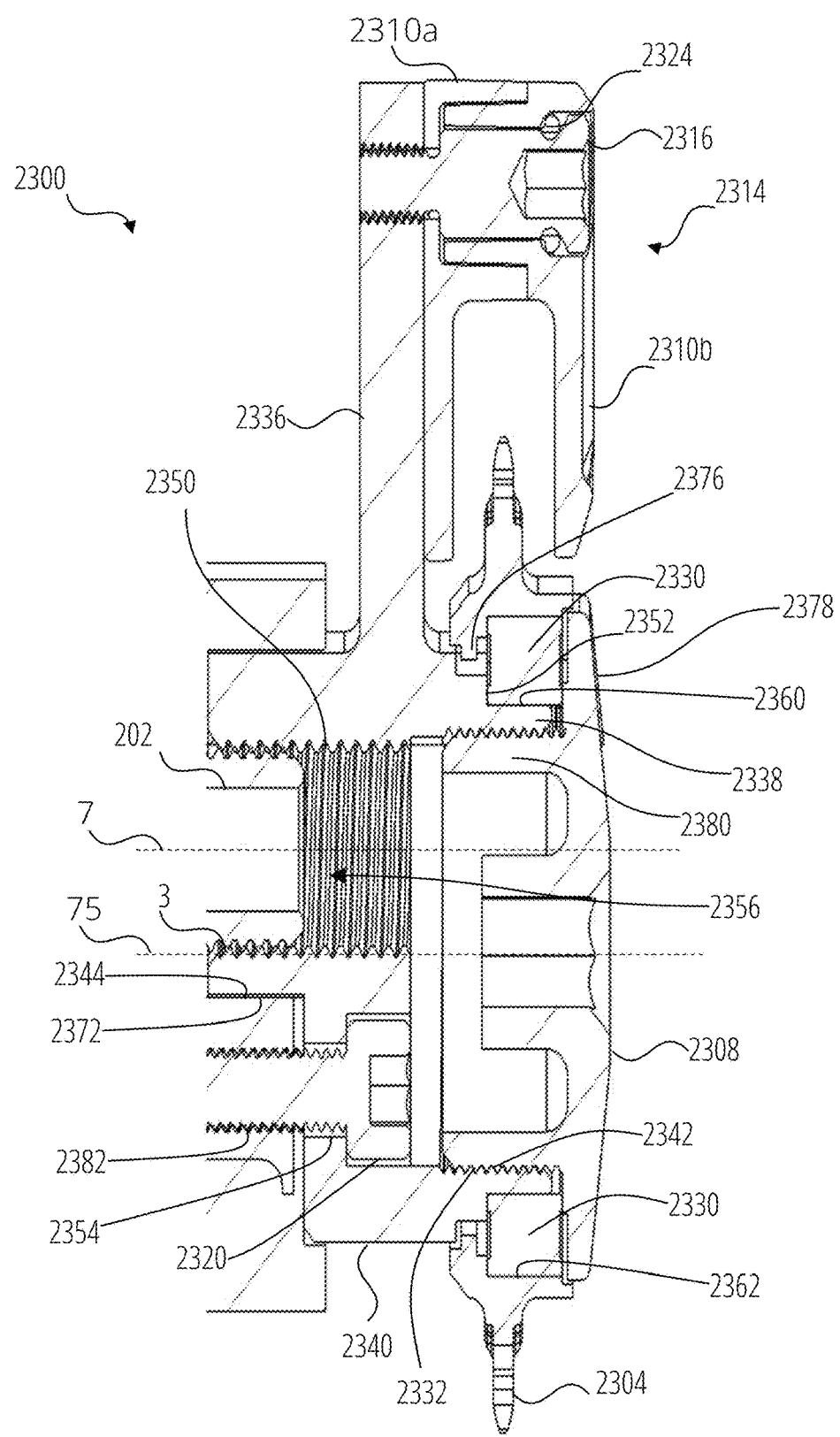
FIG. 23J is a detailed section view of the idler assembly of FIG. 23A taken along section line 23I-23I of FIG. 23E.
Figure 23K:
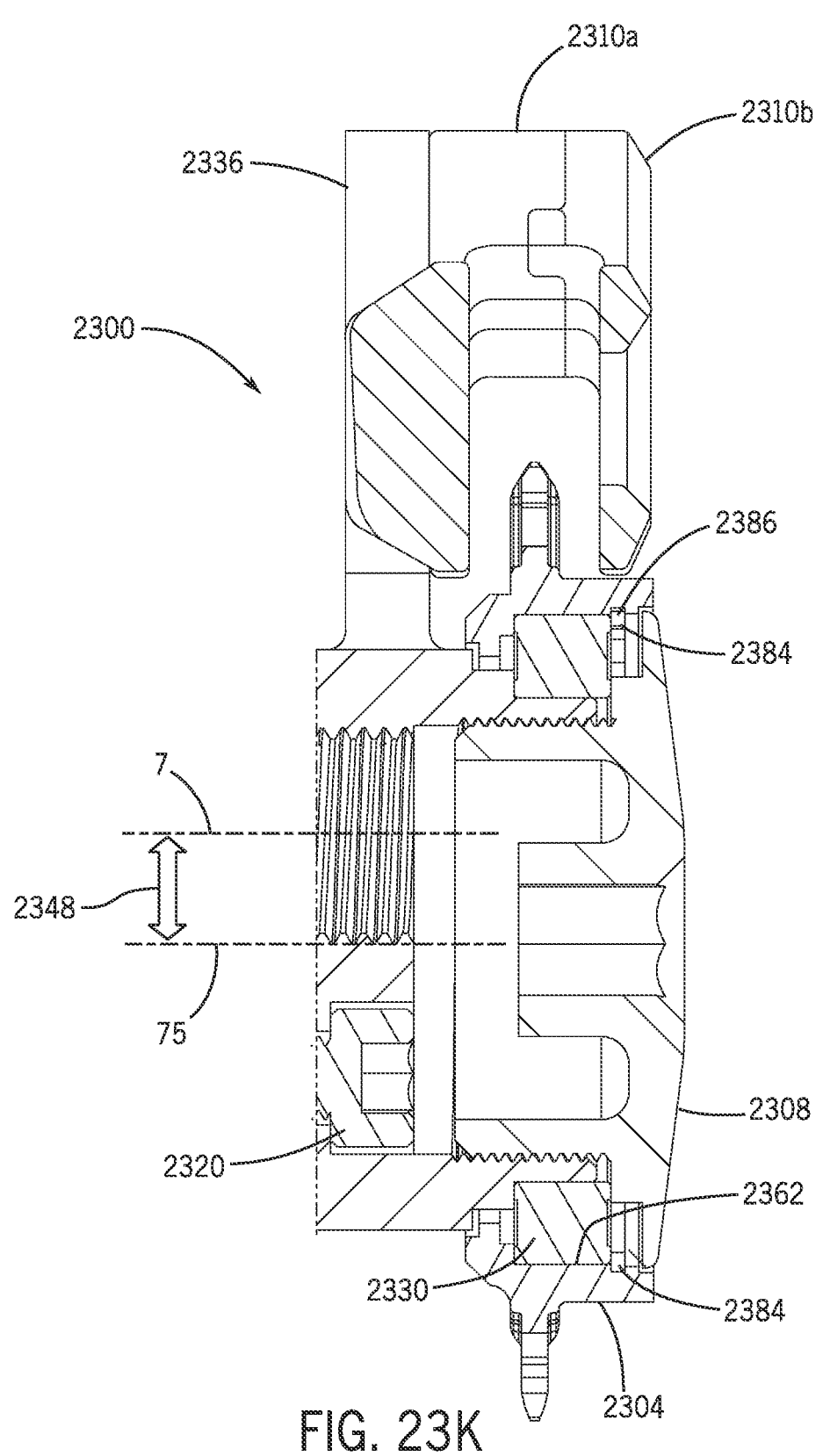
FIG. 23K is a detailed section view of the idler assembly of FIG. 23A showing an optional bearing retainer.

With particular reference to FIG. 23I and FIG. 23J, the assembly of the idler assembly 2300 with the suspended body 1 is described. The idler mount 2302 and/or the link body 3 may be selectively secured to the suspended body 1 by an axle 202. The axle 202 may be inserted through the apertures 2334. The idler mount 2302 may be received in the recess 2318. The locking feature 2344 of the idler mount 2302 may be received in the locking feature 2372. The locking feature 2344 and/or the locking feature 2372 may limit or prevent relative motion of the suspended body 1 and the idler mount 2302. For example, the locking features 2344, 2372 may include flats, keys, splines, or the like. The axle 202 may be rotated, such that the external axle threads 73 of the axle 202 threadedly engage with the threads 2350 of the aperture 2356 in the idler mount 2302. Thus, the axle 202 may secure the idler mount 2302 to the suspended body 1. For example, the idler mount 2302 may act as a suspension pivot nut, securing the link body 3 to the suspended body 1 via the axle 202. As previously described, the axle 202 may include an expanding collet head feature 220 that receives a wedge 216. The wedge 216 may be coupled to a bolt 206 by a retainer 218 such as a snap ring, circlip, or the like. The bolt 206 may be threadedly received in the axle 202, such that the wedge 216 expands the expanding collet head feature 220 to secure the axle 202 to the inner face of an aperture 2334 formed in the suspended body 1. Rotational motion of the link body 3 may be facilitated by one or more bearing 200, bearing sleeves 203, and/or one or more inner race extensions 201. The optional secondary idler fastener 2320 may be threadedly secured to the aperture 2382, passing through the aperture 2354 in embodiments, where the aperture 2354 is a through aperture. In any of the idler assemblies disclosed herein, the secondary idler fastener 2320 may be optional. For example, the secondary idler fastener 2320 may be replaced by a pin, dowel, or the like. Similarly, a structure with similar functionality may be integrated with the pivot structure.

The bearing 2330 may be placed into the aperture 2368 of the cog 2304. An outer race 2362 of the bearing 2330 may be received in the aperture 2368. For example, the outer race 2362 of the bearing 2330 may be in contact with the inner surface 2364 of the aperture 2368 of the cog 2304. The cog flange 2376 may locate the bearing 2330 within the cog 2304 and may prevent the bearing 2330 from passing completely through the aperture 2368. If the optional retainer 2384 is used, the retainer 2384 may be installed in the groove 2386 (if present) such that the retainer 2384 engages the outer race 2362 of the bearing 2330 to hole the bearing 2330 in the cog 2304. See, e.g., FIG. 23K. The cog 2304/bearing 2330 may be assembled with the idler mount 2302. An inner race 2360 of the bearing 2330 may be received on the flange 2338 of the idler mount 2302. The threads 2342 of the cap 2308 may be threadedly engaged with the threads 2332 of the aperture 2358 of the idler mount 2302. The head 2378 of the cap 2308 may have a diameter larger than the diameter of the aperture 2368 and/or the outer race of the bearing idler assembly 2300. Thus, the cap 2308 may secure the cog 2304 and bearing to the idler mount 2302, the idler mount 2302 being secured to the suspended body 1 by the axle 202 and, optionally, the secondary idler fastener 2320.

Figure 23L:
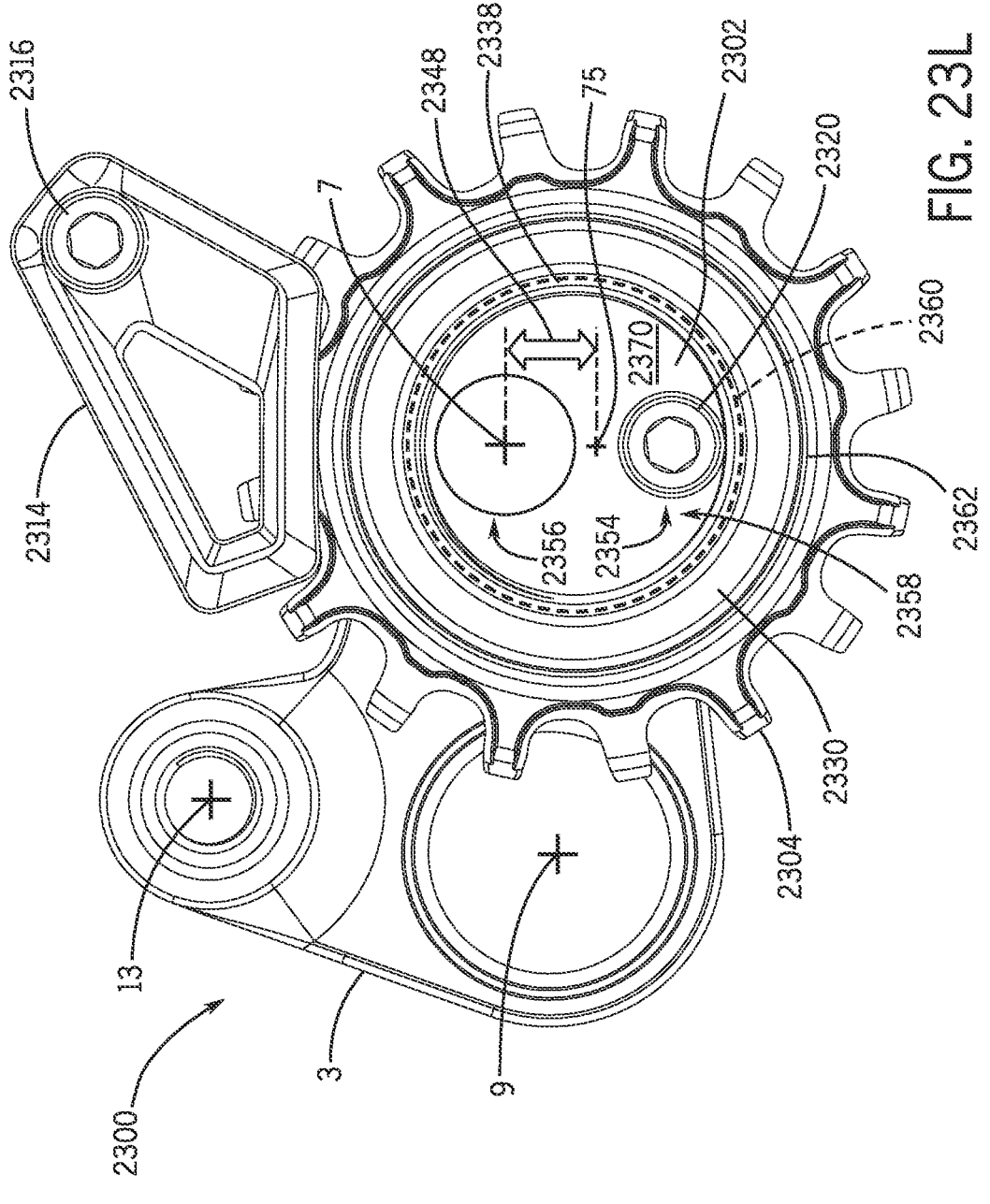
FIG. 23L is a partial side elevation section view of the idler assembly of FIG. 23A shown with portions of a suspension.

As shown in FIG. 23L, the idler rotational axis 75 and a suspension link axis such as the PIVC[1][3] 7 may be located within the inner diameter of the idler bearing 2330, where the suspension link axis and idler rotational axis 75 are not coincident. For example, the PIVC[1][3] 7 may be offset from the idler rotational axis 75 by an offset 2348. The PIVC[1][3] 7 and the idler rotational axis 75 may both be located within the aperture 2358. As discussed, the circumferences of the aperture 2356 and/or the aperture 2354 may be disposed within the aperture 2358. Thus, the idler assembly 2300 affords flexibility with respect to the size and location of the offset dimension 2348 within the bounds of the idler support 2303. For example, the idler rotational axis 75 may be concentric with the rotational axis of the bearing 2330. In some examples, the offset 2348 may be about 8-mm. In other embodiments, the offset may be greater than zero up to about 30-mm. In other embodiments, the offset may be zero (i.e., the PIVC[1][3] 7 and the idler axis 75 may be coincident).

Offsetting the idler rotational axis from a suspension pivot, such as the PIVC[1] [3] 7 may enable tuning of the suspension performance by allowing adjustment of the offset between a suspension pivot and the idler rotational axis. For example, one performance characteristic that may be adjusted is the anti-squat properties, which may be affected by the distance or space between the idler axis and the link body axis. Such offsets 2348 can be difficult to achieve due to the packaging of the link body (e.g., link body 3 assembly). For example, the suspension pivot and the idler may use separate bearings. Placing bearing-sized apertures in the suspended body 1 is not practical in the limited space available in the suspended body 1. In contrast, by defining the offset between the suspension pivot and the idler rotational axis within the same component (e.g., the idler assembly 2300 or 2400) as few a one hole may need to be formed in the suspended body 1. In embodiments where the aperture 2382 is used, the aperture 2382 can be much smaller than an aperture that would otherwise be used for a bearing. Furthermore, the idler support can be formed by high-accuracy processes such as machining or forging thereby enabling fine, accurate, and precise control of the offset 2348 while reducing the impact on the structural integrity of the suspended body 1. The relatively large size of the idler cog 2304 and the bearing 2330 enable a great degree of freedom in positioning the idler rotational axis relative to the link body axis. Additional benefits may be increased life of the bearing 2330, as a relatively larger bearing 2330 spreads the load from the drive element (e.g., chain or belt) over a larger area and reduces stress on the bearing 2330 compared to a smaller bearing. Also, the relatively large diameter of the flange 2338 results in a relatively stronger mount for the idler cog 2304 and bearing 2330 which is beneficial when the idler cog 2304 is loaded in single shear as in the idler assembly 2300. By including the optional protrusion 2336 and guide 2314 with the idler assembly 2300, the guide 2314 location tolerance can be controlled with precision as the protrusion 2336 can be formed with the body 2340 such as by machining or forging the idler mount 2302. Further, the suspended body 1 in many embodiments, is formed of a fiber-reinforced composite such as a carbon fiber/matrix composite. Such composite materials are not amenable to having holes drilled or formed therein and reduced hole count is an important consideration for the strength of the suspended body 1. Thus, another benefit of the idler assembly 2300 is that the guide 2314 may be mounted to the vehicle without making a penetration in the suspended body 1. Additionally, the idler assembly 2300 may be stiffened or strengthened due to the interaction of the locking feature 2344 of the idler mount 2302 and the locking feature 2372 of the suspended body 1, as well as the clamping force of the secondary idler fastener 2320.

Figure 24A:
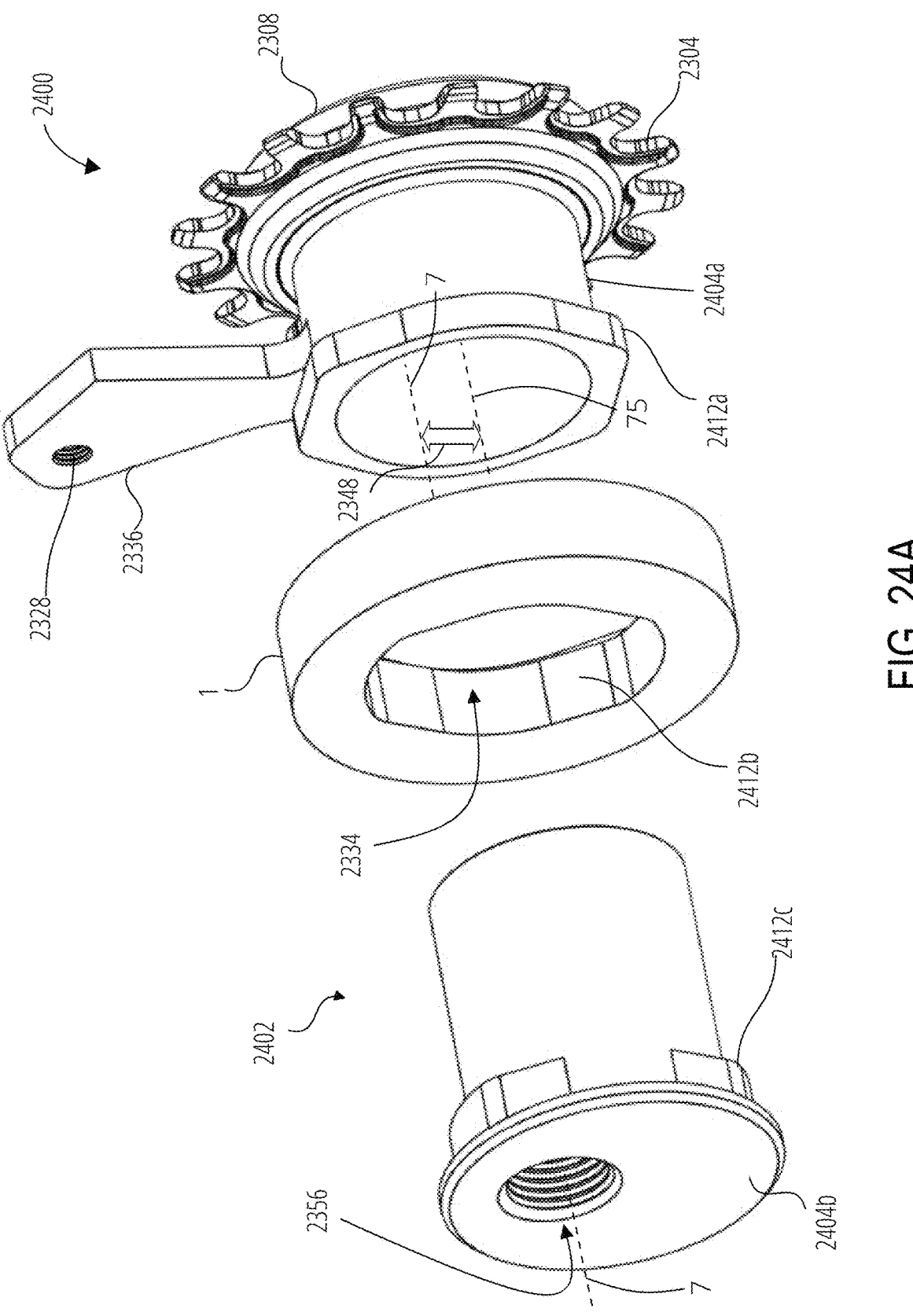
FIG. 24A is a partial detail isometric view of an idler assembly suitable for use with the suspension linkages of FIGS. 1A, 2A, 3A, 8A, 9A, 14, and/or 18A.
Figure 24B:
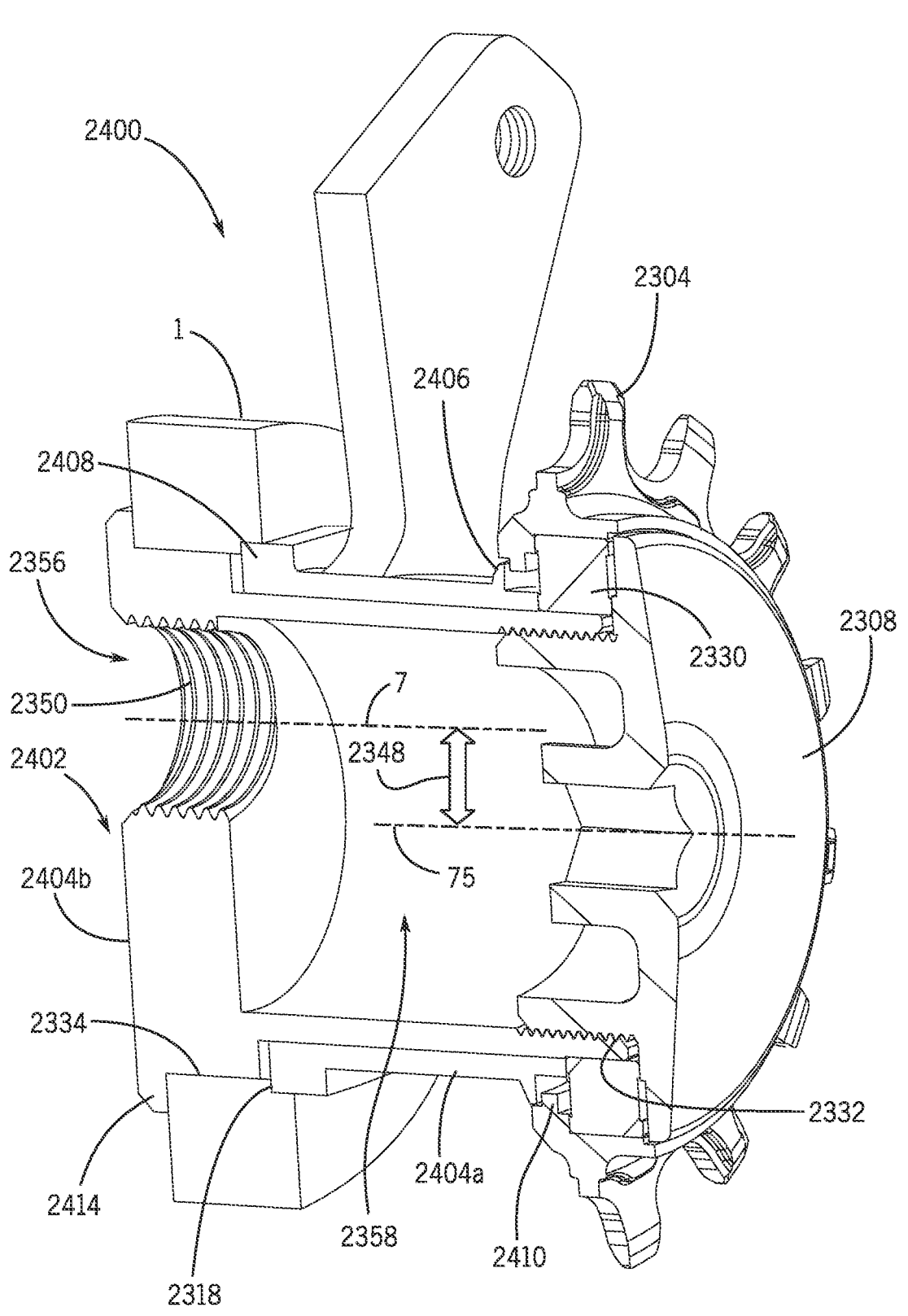
FIG. 24B is a section view of the idler assembly of FIG. 24A.

FIG. 24A and FIG. 24B show an embodiment of an idler assembly 2400. The idler assembly 2400 is similar to the idler assembly 2300 in many aspects. For example the bearing 2330, cog 2304, cap 2308, protrusion 2336, and aperture 2328 may be substantially the same as described with respect to the idler assembly 2300. The idler mount 2402 includes an outer portion 2402a and an inner portion 2404b. The outer portion may include a locking feature 2412a at an end distal from the cog 2304. The aperture 2334 formed in the suspended body 1 may include a locking feature 2412b suitable to receive the locking feature 2412a and reduce or prevent relative rotational motion between the suspended body 1 and the idler mount 2402. The inner portion 2404 may include a locking feature 2412c also suitable to be received in the locking feature 2412b to reduce or prevent relative rotational motion between the suspended body 1 and the idler mount 2402. The idler mount 2402 may include an aperture 2358 and an aperture 2356 formed therein as previously described. The aperture 2356 may include threads 2350 that may be coupled to the external axle threads 73 of the axle 202 so as secure the idler mount 2402 to the suspended body 1. The wall of the aperture 2358 may include threads 2332 as previously described.

The outer portion 2404a may include a flange 2406 at an end proximate to the cog 2304 and a flange 2408 at an end distil from the cog 2304, both extending outward from an external surface of the outer portion 2404a. The inner portion 2404b may include a flange 2414 at an end distil from the cog 2304 extending outward from an external surface of the inner portion 2404b.

To assemble the idler assembly 2400, the inner portion 2404 may be inserted into the aperture 2334 in the suspended body 1. The inner portion 2404b may be secured by threadedly coupling the threads 2350 with the external axle threads 73 of the axle 202 so as secure the inner portion 2404b to the suspended body 1. The flange 2414 may act as a stop to locate the inner portion 2404b relative to the suspended body 1. The locking feature 2412c may engage the locking feature 2412b. The outer portion 2404a may be slid over the inner portion 2404b. The flange 2408 may be received in the recess 2318 and may locate the outer portion 2404a relative to the suspended body 1 and/or the inner portion 2404c. The locking feature 2412a may be received in the locking feature 2412b. The flange 2406 may form a stop for the cog flange 2376, to locate and/or secure the cog 2304 and/or bearing 2330 to the idler mount 2402. The cap 2308 may be threadedly engaged with the threads 2332 to secure the cog 2304 and/or bearing 2330 to the idler assembly 2400. An optional retainer 2384 may be used to secure the bearing 2330 to the cog 2304, as previously described. The benefits of the idler assembly 2400 may be similar to those of the idler assembly 2300. In addition, the idler assembly 2400 may, via the locking features 2412a-c, rotationally locate the protrusion 2336 with respect to a drive element such as a chain to enable easy placement of the guide 2314 and desired routing of the drive element.

With reference to FIG. 25A-FIG. 25D, an embodiment of an idler assembly 2500 is shown. The idler assembly 2500 may be similar to other idler assemblies disclosed herein in certain aspects, for example the idler assembly 2300 and/or the idler assembly 2400. For example the idler assembly 2500 includes a cog 2304, a cap 2308, and a bearing 2330. Additionally, the idler assembly 2500 may interface with parts such as the bearing 200, axle 202, bearing sleeve 203 210, bolt 206, inner race extension, wedge 216, and the link body 3 110 as described herein. At least a portion of the idler assembly 2500 may be received in an aperture 2334 formed in a portion (such as a 2504b of the suspended body). Similar to the idler assemblies 2300 and 2400, in the idler assembly 2500, the PIVC[1][3] 7 is disposed within an inner race 2360, within an aperture 2518 formed in the idler mount, and/or within an outer race 2362 of the bearing 2330 when assembled with the suspended body. See, e.g., FIG. 25D. The link body 3 110 includes a PIVC[3][4] 9, a PIVC[3][6] 13, and a PIVC[1][3] 7 as described herein.

Figure 25A:
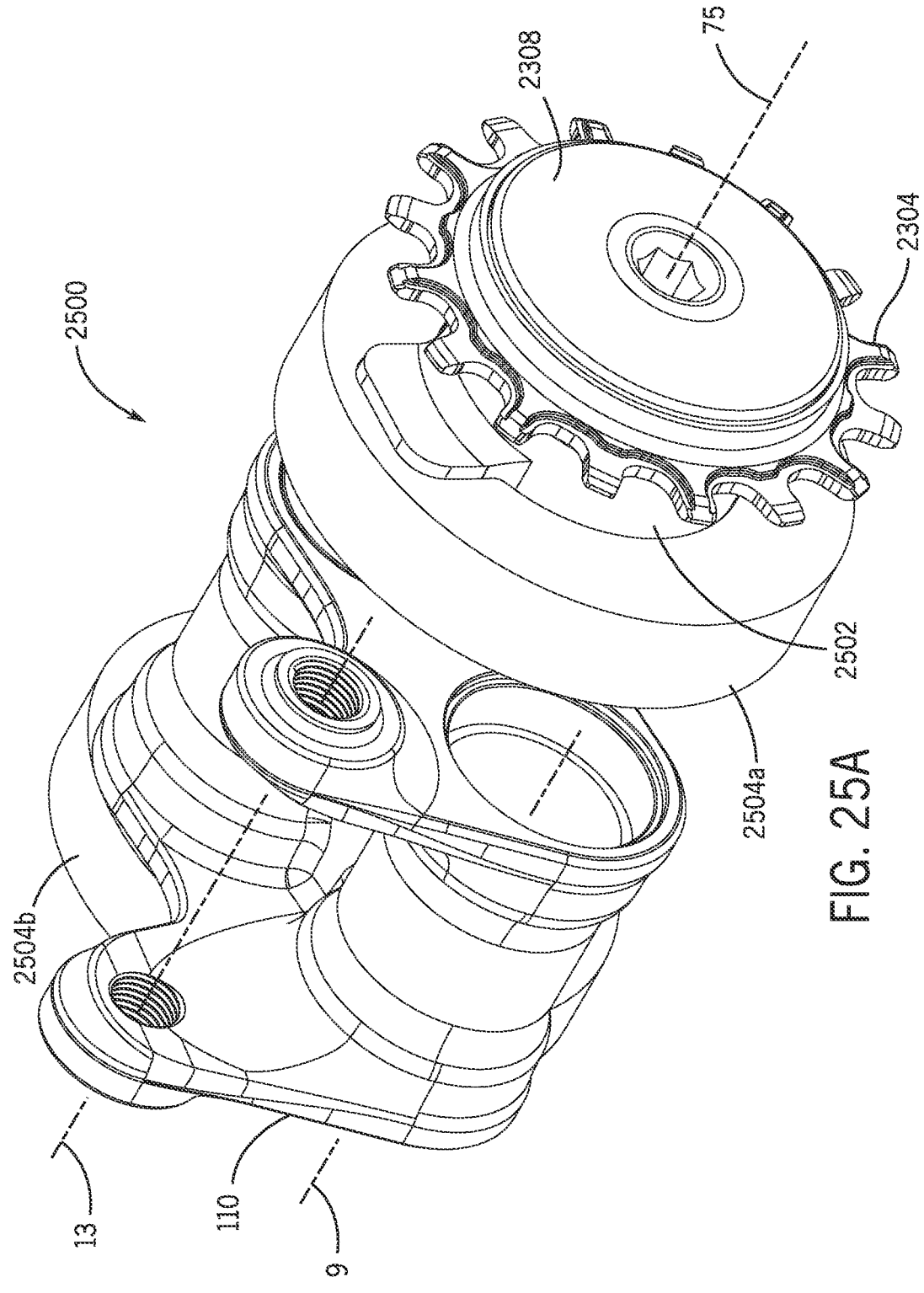
FIG. 25A is an isometric view of an example of an idler assembly.
Figure 25B:
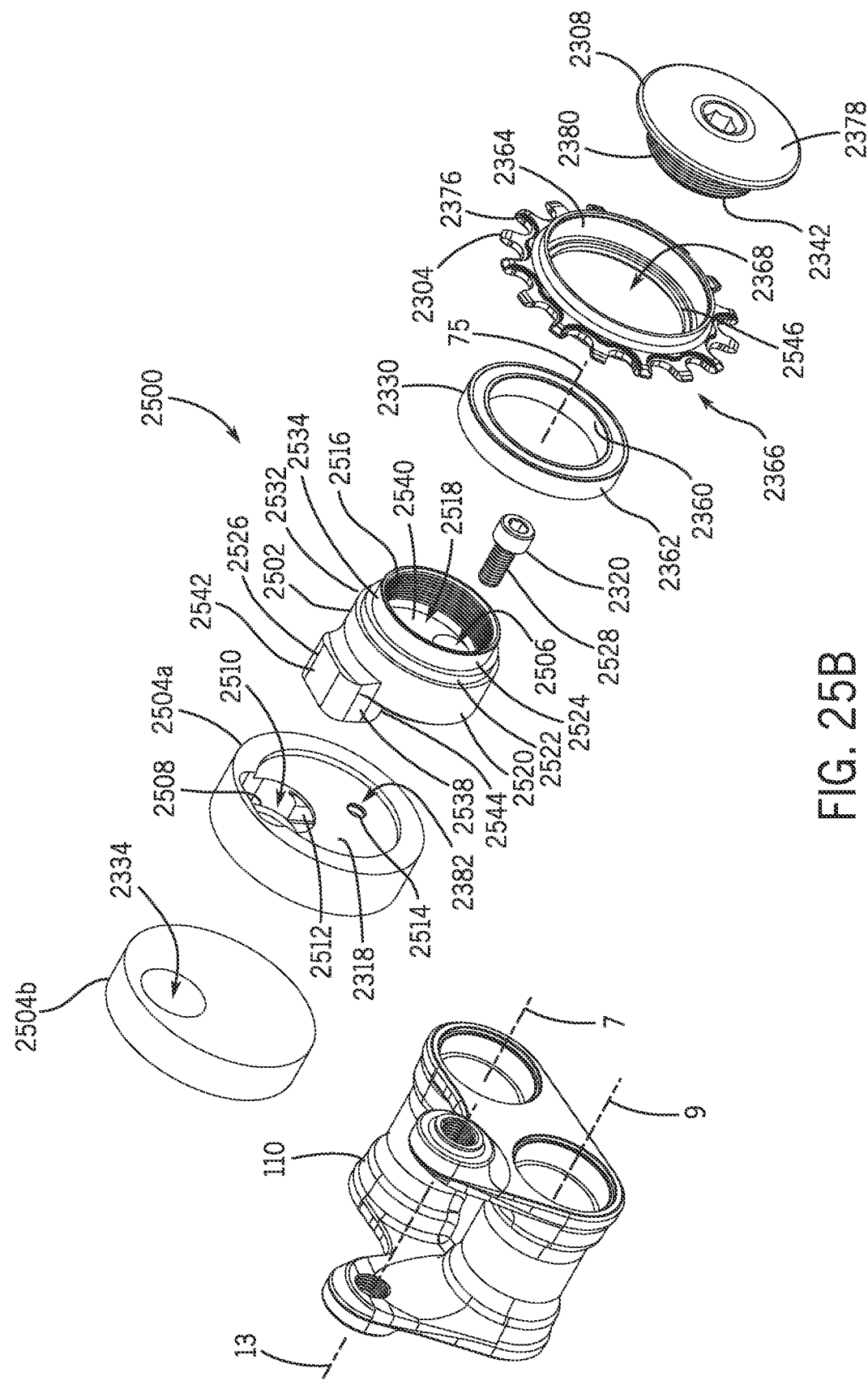
FIG. 25B is a partially exploded isometric view of the idler assembly of FIG. 25A.

As best shown in FIG. 25B, the idler assembly 2500 includes an idler mount 2502. The idler mount 2502 is formed of a body portion 2520. The body portion 2520 may be at least partially cylindrical. A first collar 2522 may extend from a face (e.g., an outward face outward face 2532 of the body portion 2520). The first collar 2522 may have a diameter smaller than that of the body portion 2520. A second collar 2524 may extend from the first collar 2522. The second collar 2524 may have a diameter smaller than that of both the first collar 2522 and the body portion 2520. The second collars 2524 may be taller than the first collar 2522. The second collar 2524 may form a flange 2534 adapted to support or receive other portions of the idler assembly 2500.

The cog 2304 includes a plurality of teeth 2366 arrayed about an external circumferential face thereof. An aperture 2368 may be formed in a central portion of the cog 2304. The aperture 2368 may be a through aperture or a blind aperture. A cog flange 2376 may be formed on and extend inwardly from an inner surface 2364 of the aperture 2368.

As described, the bearing 2330 includes an inner race 2360 and an outer race 2362 adapted to rotate with respect to one another and to support a radial load induced by the flexible member. The inner race 2360 of the bearing 2330 may be received on the flange 2534 of the second collar 2524. The outer race 2362 may be received in the aperture 2368 formed in the cog 2304.

A protrusion 2526 may extend from the body portion 2520. For example, the 2526 may extend radially and/or longitudinally from the body portion 2520. An aperture 2536 may be formed in at least a portion of the protrusions 2526. The 2536 may be a blind aperture or may be a through aperture. The aperture 2536 may include one or more helical threads 2530 formed on an inner face thereof, similar to the threads 2350 of the idler assembly 2300. The protrusion 2526 may have or form an anti-rotation element 2538, such as a key, spline, or the like to reduce or prevent rotation of the idler mount 2502 relative to the suspended body. For example, the protrusion 2526 may have a rounded square profile adapted to be received in a complementary aperture 2510 formed in a portion of the suspended body (e.g., a first portion of the suspended body 2504a). In the example shown, the protrusion 2526 includes a first portion 2542 having a rounded square profile and a second portion 2544 having a substantially round profile. The first portion and the second portion may transition from one to the other in a smooth fashion. An aperture 2518 may be formed in the idler mount 2502 having an inner diameter less than that of the first collar 2522 and/or second collar 2524. The aperture 2518 may be a blind aperture having a blind face 2540. An aperture 2506 may further be formed in the idler mount 2502 within the aperture 2518 and extending into the body portion 2520. The aperture 2506 may have a diameter smaller than that of the aperture 2518 and the inscribed within the diameter of the aperture 2518. In some examples, the aperture 2506 is a counter bore aperture, as shown for example in FIG. 25D. However, in other examples, the aperture 2506 may be a countersink aperture, or a through aperture. The inner face of the aperture 2518 may have one or more helical threads 2516 formed thereon.

The suspended body of may have an aperture 2510 formed therein having a complementary shape to the protrusion 2526. The aperture 2510 may have a face 2512 with a shape that complements or substantially matches a shape of the protrusion 2526 such that the protrusion 2526 can be received in the aperture 2510. The aperture 2510 may have a shoulder 2508 formed therein and adapted to act as a lateral or depth stop for the protrusion 2526, such as to limit an insertion of the protrusion 2526 into the aperture 2510. Proximate to the aperture 2510, the suspended body may include a recess 2318 adapted to receive at least a portion of the body portion 2520. An aperture 2382 may be formed in the suspended body within the recess 2318. Threads 2514 may be formed on an inner face of the aperture 2382 and adapted to receive complementary threads 2528 of a secondary idler fastener 2320.

Figure 25C:
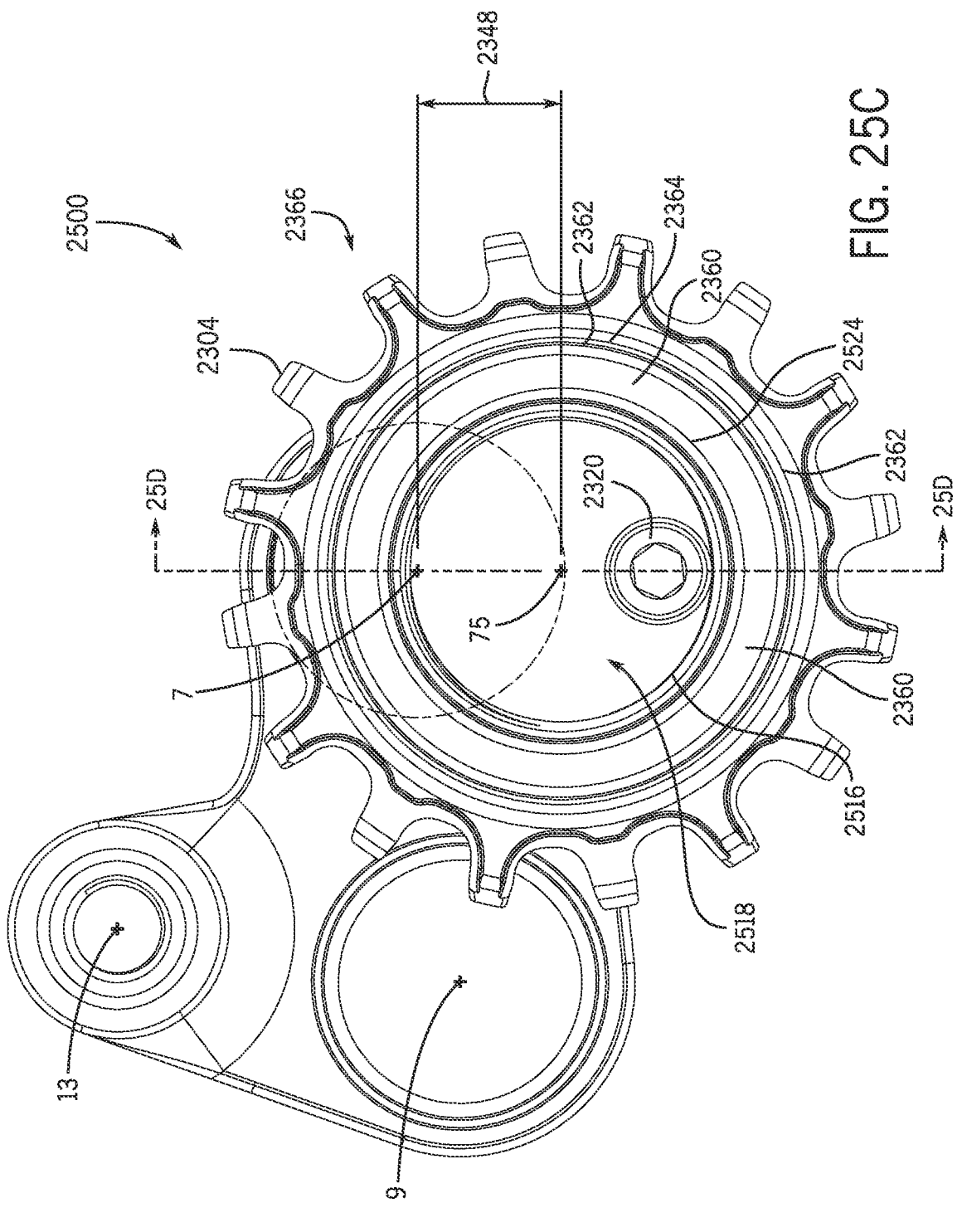
FIG. 25C is a partial side elevation view of the idler assembly of FIG. 25A.
Figure 25D:
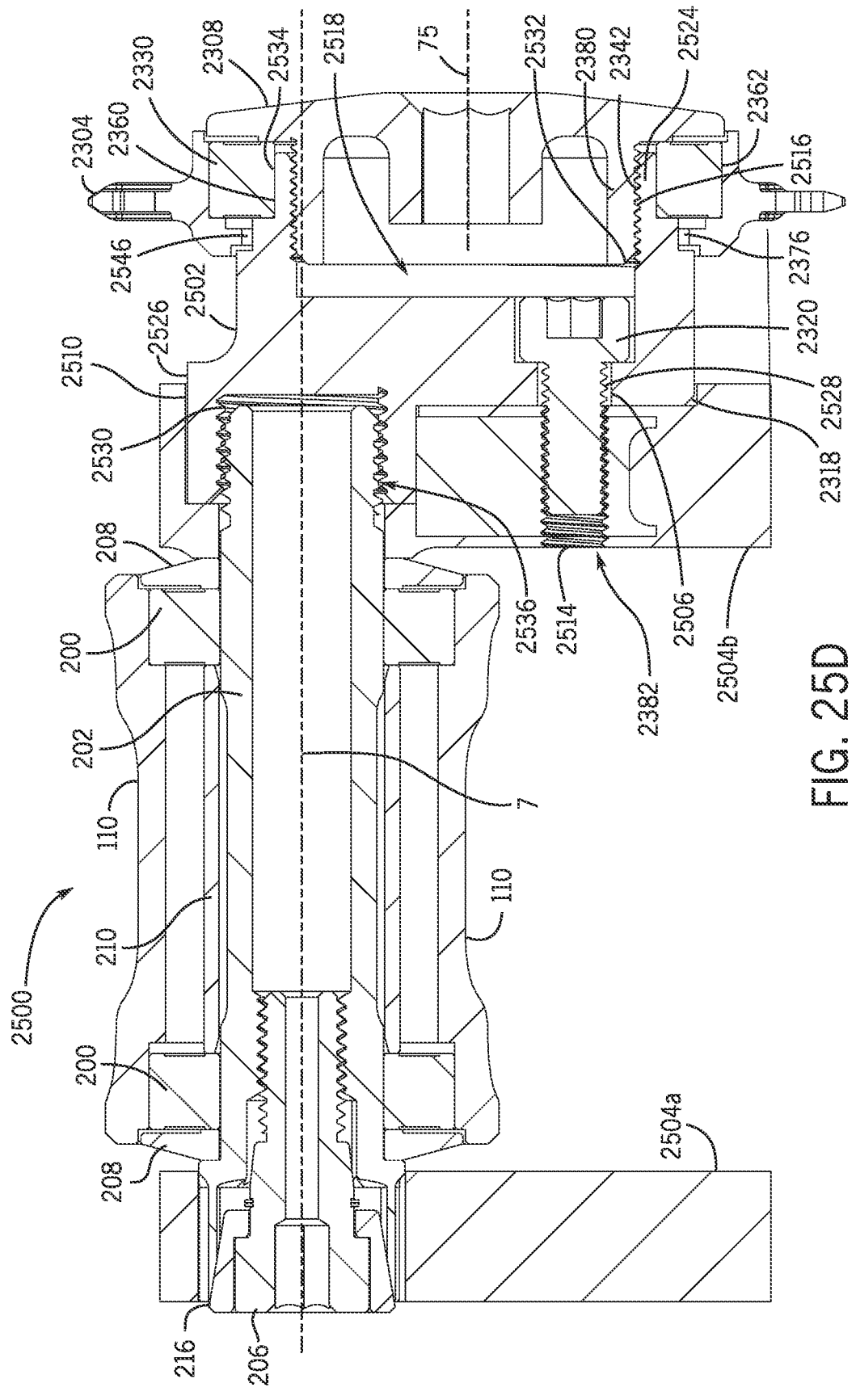
FIG. 25D is a partial section view of the idler assembly of FIG. 25A taken along line 25D-25D of FIG. 25C.
Figure 26A:
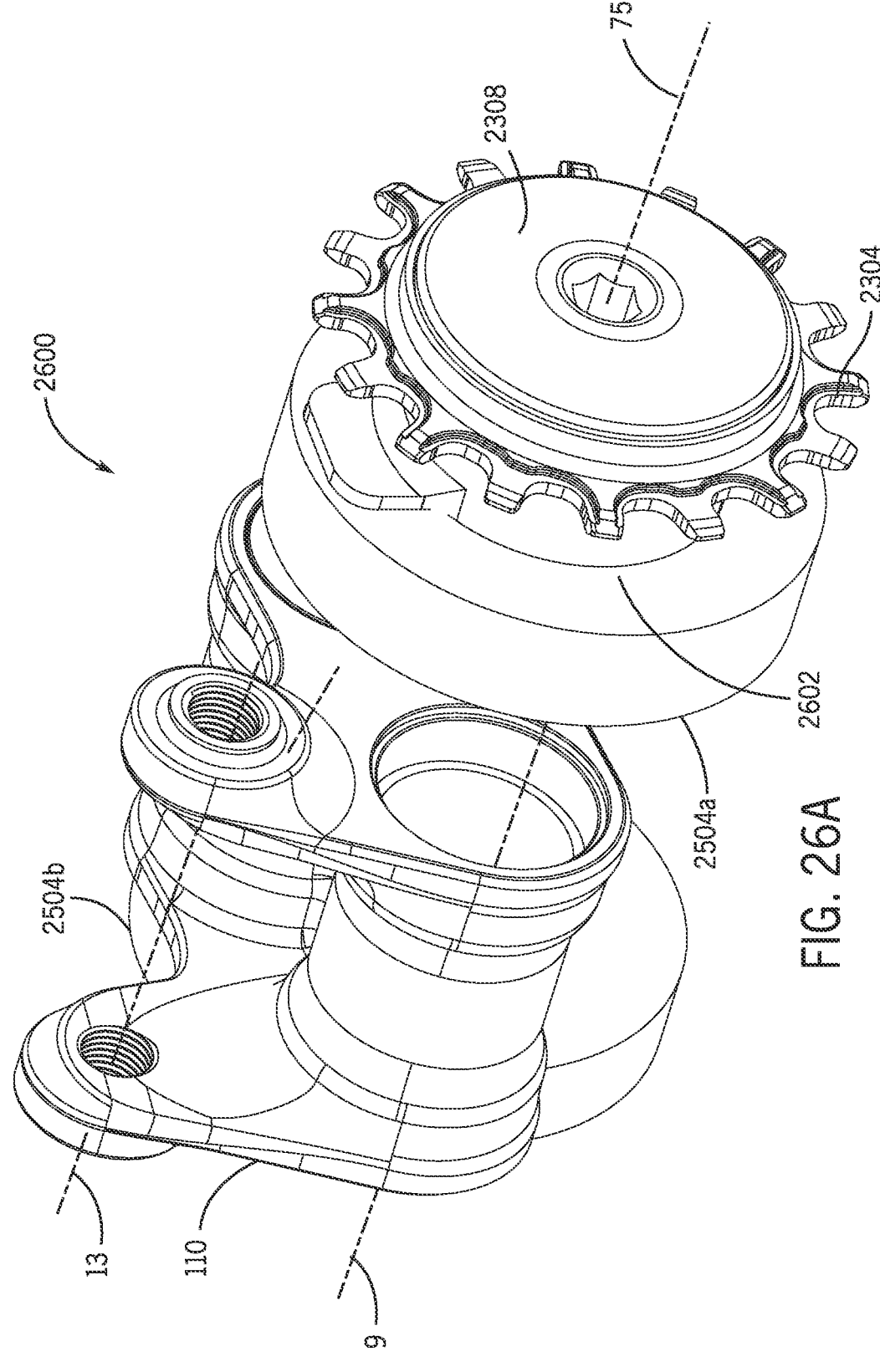
FIG. 26A is an isometric view of an example of an idler assembly.
Figure 26B:
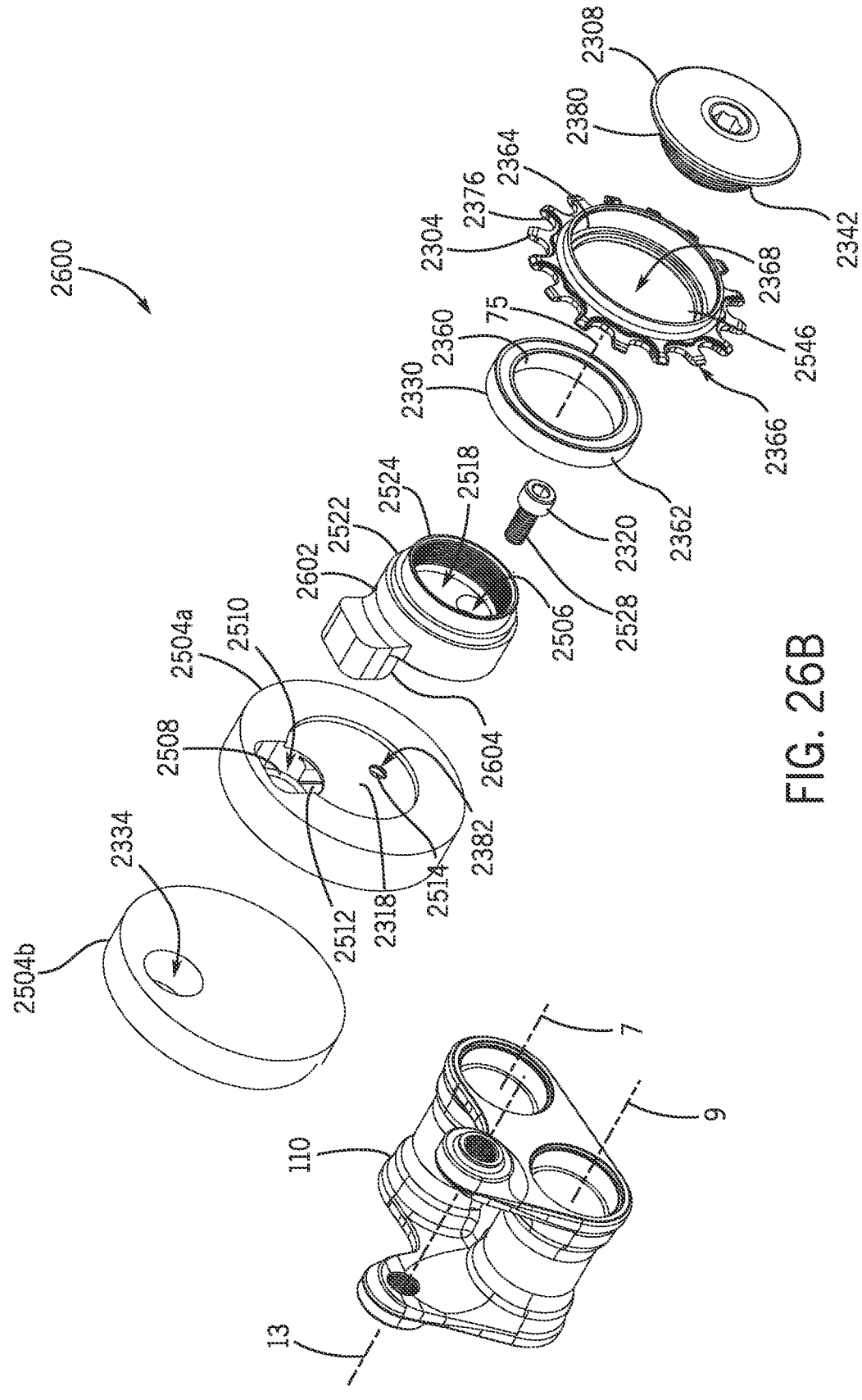
FIG. 26B is a partially exploded isometric view of the idler assembly of FIG. 26A.
Figure 26C:
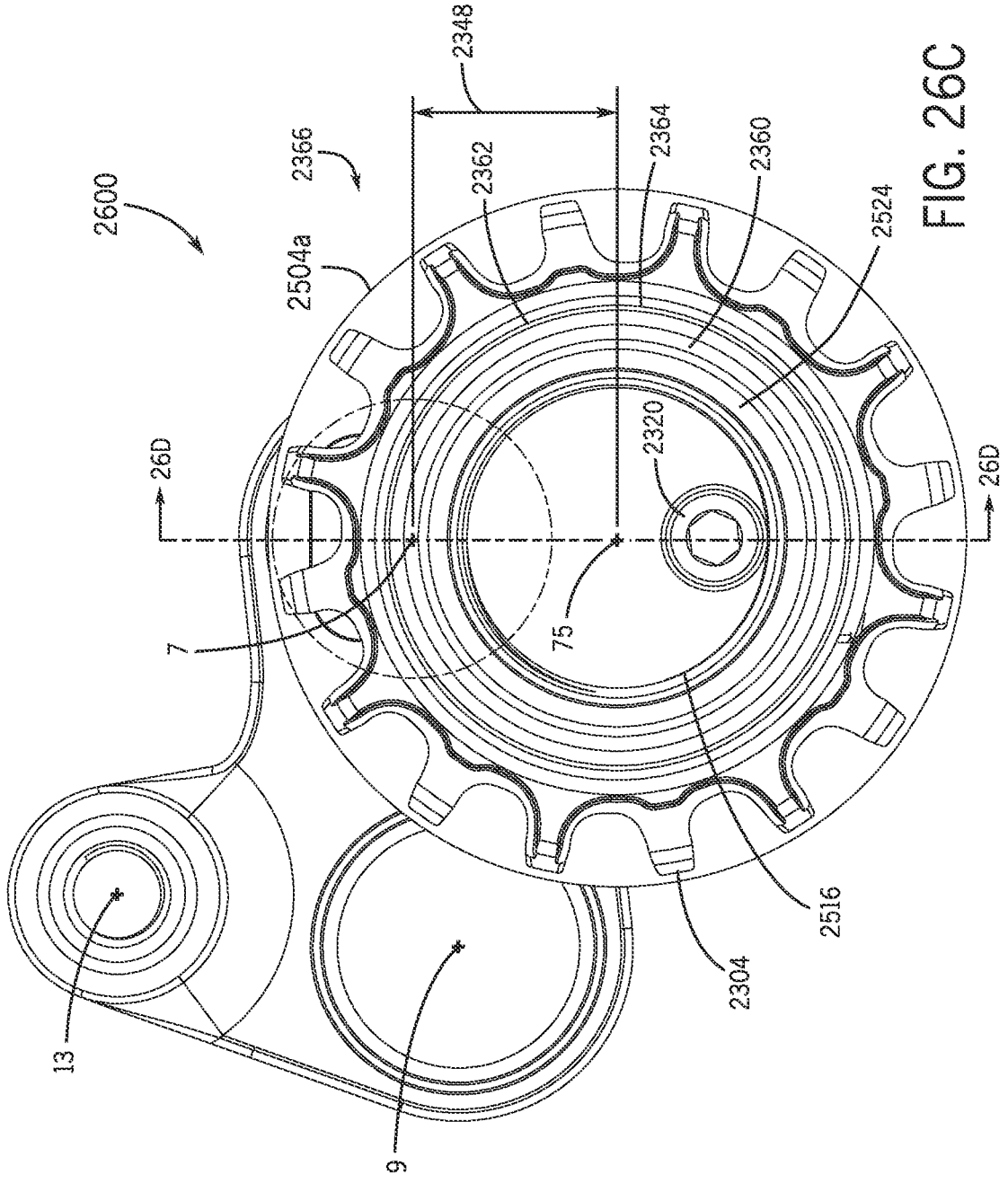
FIG. 26C is a partial side elevation view of the idler assembly of FIG. 26A.
Figure 26D:
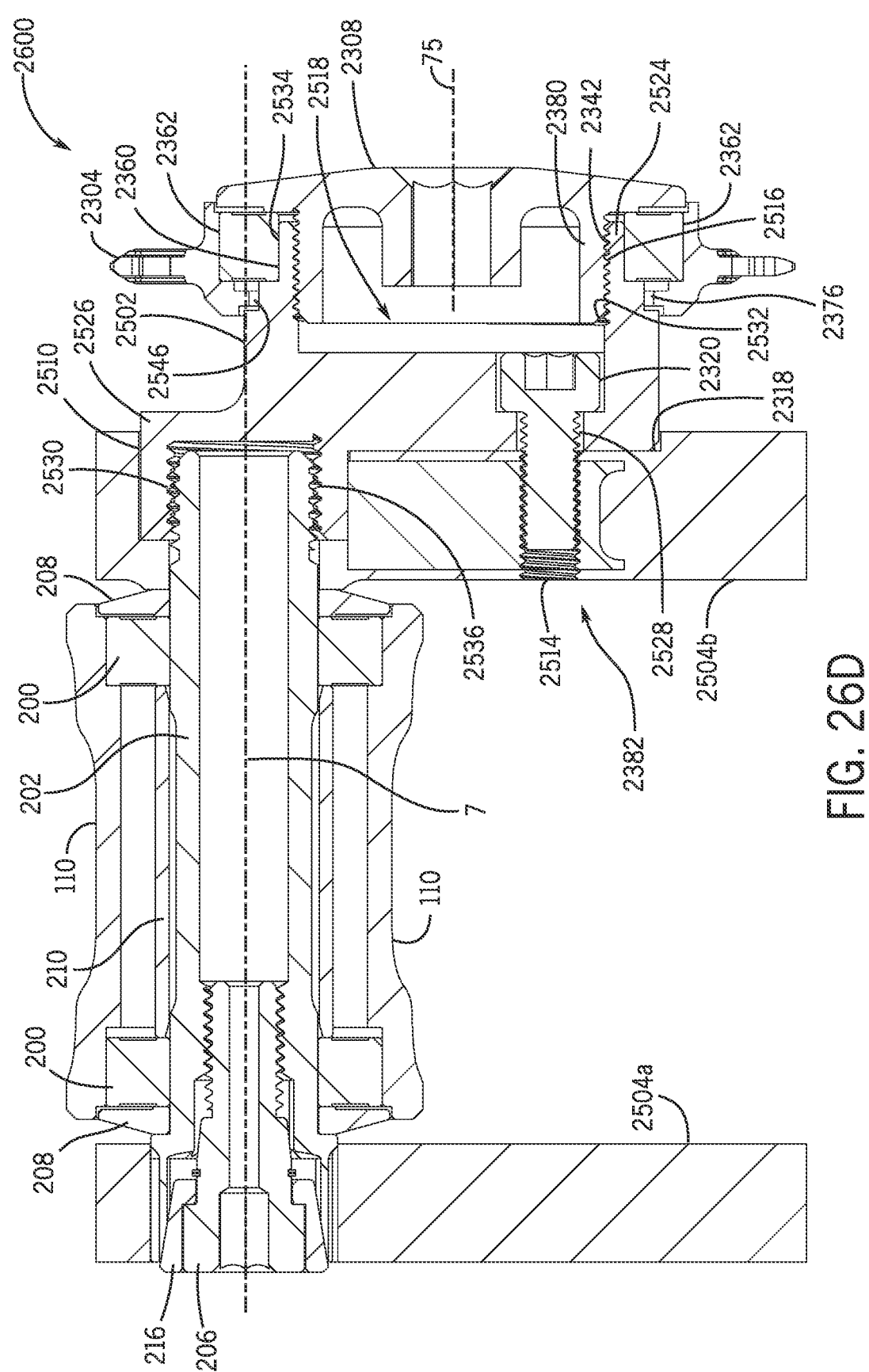
FIG. 26D is a partial section view of the idler assembly of FIG. 26A taken along line 26D-26D of FIG. 26C.

As best shown in FIG. 25D, to secure the idler mount 2502 to the suspended body, the idler mount 2502 may be fitted to the suspended body with a portion of the protrusion 2526 being received in the aperture 2510 and a portion of the body portion 2520 received in the recess 2318. The secondary idler fastener 2320 may be inserted into the aperture 2506, which may or may not have threads on an internal face thereof (the example shown in FIG. 25D does not have threads on the face of the aperture 2506. In the example shown, the 2506 is a clearance aperture through which the threaded portion of the secondary idler fastener 2320 may pass without interference. The secondary idler fastener 2320 may be rotated such that the threads 2528 of the secondary idler fastener 2320 engage the threads 2514 of the aperture 2382. The secondary idler fastener 2320 may be tightened until a desired torque value is achieved or the idler mount 2502 stops against the recess 2318. The axle 202 may be attached to the aperture 2536 by threading the external axle threads 70 into the threads 2530 of the aperture 2536 and tightening the bolt 206 in the wedge 216 as described herein. The recess 2318, the aperture 2510, and/or the protrusion 2526 may act to restrict, prevent, or reduce relative rotation between the idler mount 2502 and the suspended body. The cog 2304 may be fitted over the first collar 2522 and the second collar 2524 of the idler mount 2502. The bearing 2330 may be fitted into the cog 2304 with the inner race 2360 being received on the flange 2534 of the second collar 2524 and the outer race 2362 being received in the aperture 2368 of the cog 2304. The outward face 2532 may have a diameter small enough to fit in the aperture 2368 but larger than a diameter of the cog flange 2376 such that the outward face 2532 at least partially restrains the movement of the cog 2304 in the transverse direction 105. The cap 2308 may be secured to the idler mount 2502 by rotational engagement of the threads 2516 of the idler mount 2502 with the threads 2342 of the cap 2308. Thus, the cog 2304 may rotate about an idler rotational axis 75. The idler rotational axis 75 may be fixed in relation to the suspended body and located within the inner surface 2364 of the aperture 2368 of the cog 2304.

With particular reference to FIG. 25C and FIG. 25D, the PIVC[1][3] 7 may be located within the inner race 2360 of the bearing 2330, within the outer race 2362 of the bearing 2330, and/or the inner surface 2364 of the aperture 2368 of the cog 2304. The PIVC[1][3] 7 may be offset from the idler rotational axis 75 by an offset 2348. By controlling the offset 2348, the certain performance characteristics of the suspension linkage may be decoupled from one another. For example, anti-squat behavior of the suspension may be decoupled from chain lengthening resulting in more stable or efficient operation of the suspension and propulsion systems of the two-wheeled vehicle.

With reference to FIG. 26A-FIG. 26D, an idler assembly 2600 is disclosed. The idler assembly 2600 is similar to the idler assembly 2500 in many aspects. For example the idler assembly 2600 includes a cog 2304, a cap 2308, and bearing 2330. The idler assembly 2600 includes an idler mount 2602 that has many similar features to the idler mount 2502. For example, the idler mount 2602 includes a protrusion 2604 similar to the protrusion 2526 that acts to limit, reduce, or restrict relative rotation between the idler mount 2602 and the suspended body. The idler assembly 2600 may be assembled substantially similarly to the idler assembly 2500 as described herein.

The idler mount 2602 may differ from the idler mount 2502 in where the idler mount 2602 places the idler rotational axis 75 with respect to the PIVC[1][3] 7. For example, the idler mount 2602 may place the PIVC[1][3] 7 within a diameter of the inner surface 2364 of the cog 2304, within a diameter of the outer race 2362 of the bearing 2330, but outside the diameter of the inner race 2360. See, e.g., FIGS. 26C and 26D. More specifically, the idler mount 2602 may place the PIVC[1][3] 7 inside the diameter of the inner surface 2364 but outside the cog flange diameter 2546, as shown for example in FIG. 26D. Like the idler assembly 2500, the idler assembly 2600 may cause the idler rotational axis 75 to be fixed in relation to the suspended body. Thus, the offset 2348 between the idler rotational axis 75 and the PIVC[1][3] 7 may be larger in the idler assembly 2600 than the idler assembly 2500

With reference to FIG. 27A-FIG. 27I, an idler assembly 2700 is disclosed. The idler assembly 2700 is suitable for use with any suspension linkage disclosed herein. The idler assembly 2700 may differ from other idler assemblies disclosed herein in that the idler assembly 2700 includes an idler mount 2702 that enables the position of the idler cog 2304 to be changed or reconfigured, e.g., by a user, without changes to the underlying structure of the idler mount 2702 nor the bicycle or suspension itself. FIG. 28A-FIG. 33C show other embodiments of idler assemblies where the idler cog 2304 position can be changed as desired, either through adjustment of the respective idler mounts, or the by swapping out an idler mount with another idler mount 2502. In the embodiments shown in FIGS. 27A-33C, the idler axis may be separate from an IVC of the suspension linkage. The idler axis may be independently placed with respect to one or more IVCs or suspension pivots. As such the embodiments shown in FIGS. 27A-33C may be suitable for use with a 6-bar linkage as disclosed herein, or any other suspension linkage, such as a 2-bar, 3-bar, 4-bar suspension or the like.

Figure 27A:
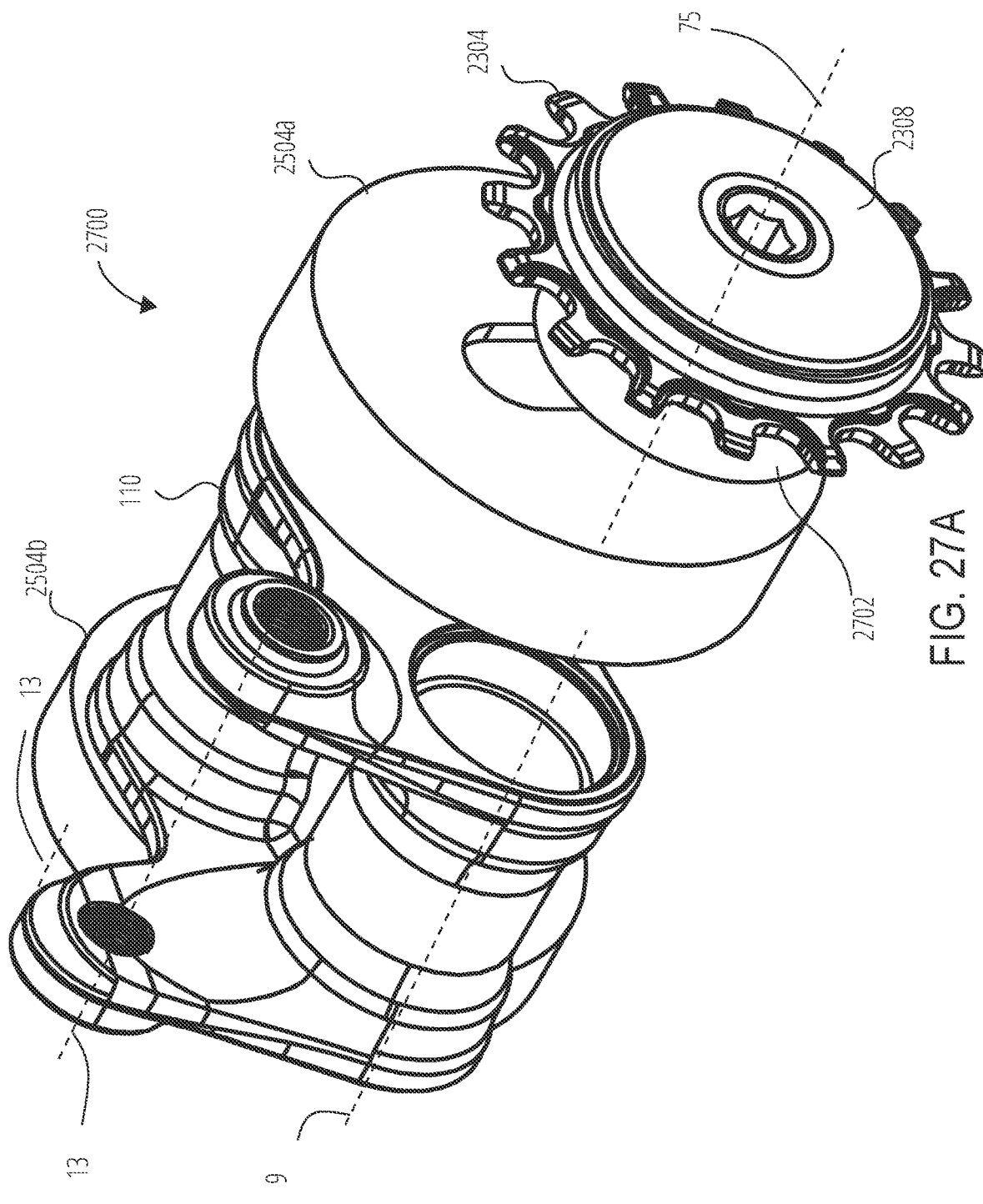
FIG. 27A is an isometric view of an embodiment of an idler assembly.
Figure 27B:
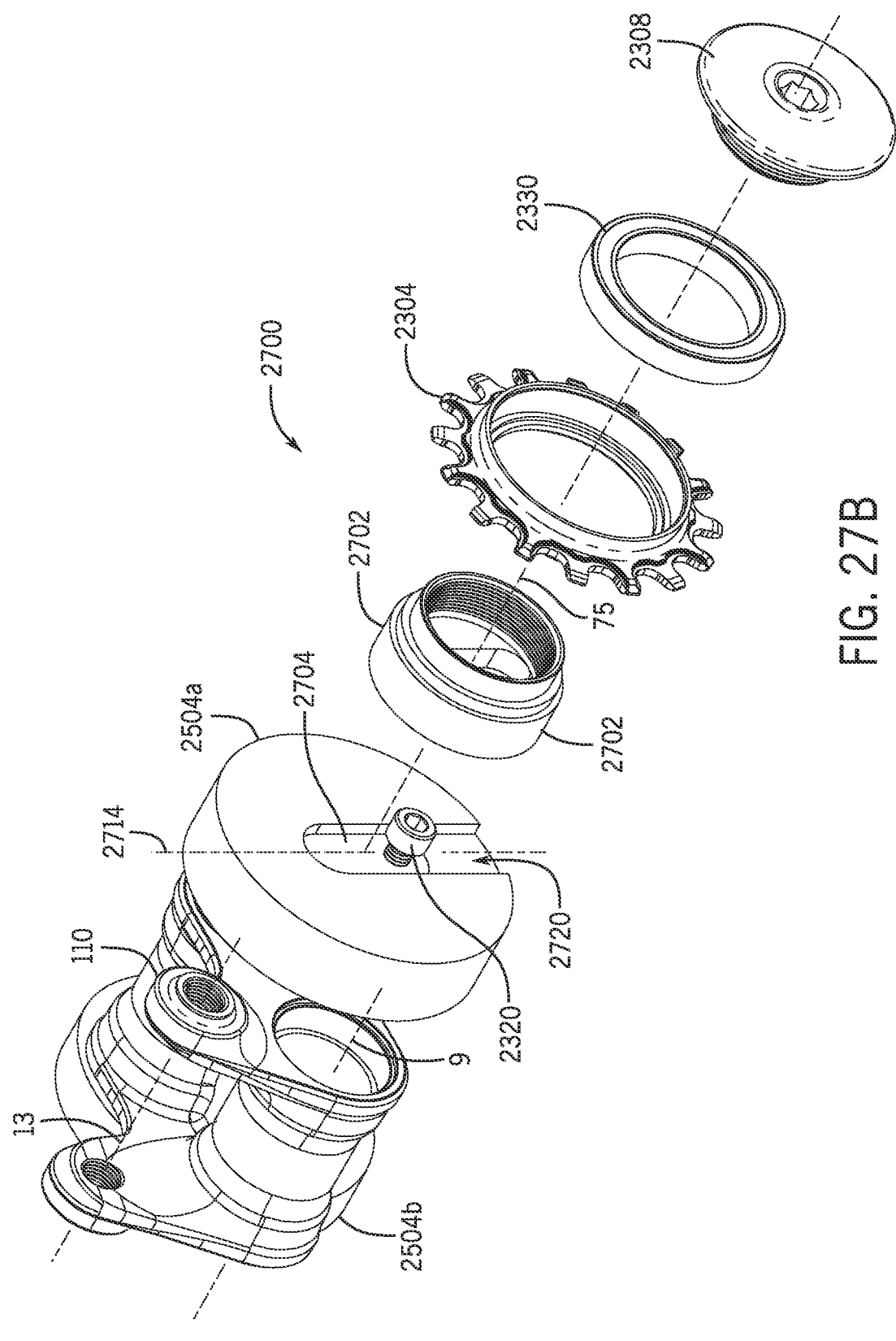
FIG. 27B is a partial exploded view of the idler assembly of FIG. 27A.
Figures 27F, 27G:
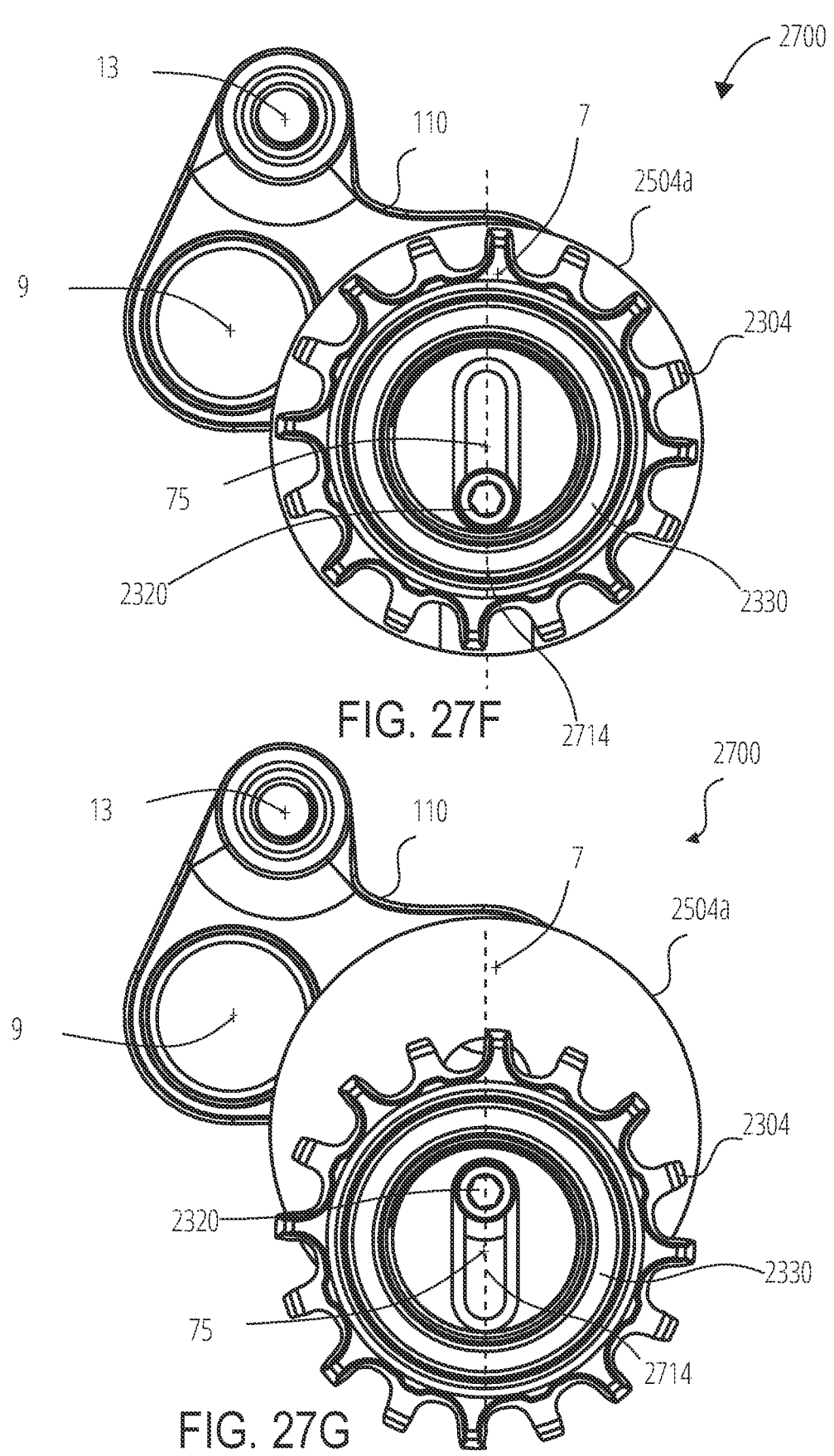
FIG. 27F is an elevation view of the idler assembly of FIG. 27A in a first configuration.
FIG. 27G is an elevation view of the idler assembly of FIG. 27A in a second configuration.
Figure 27H:
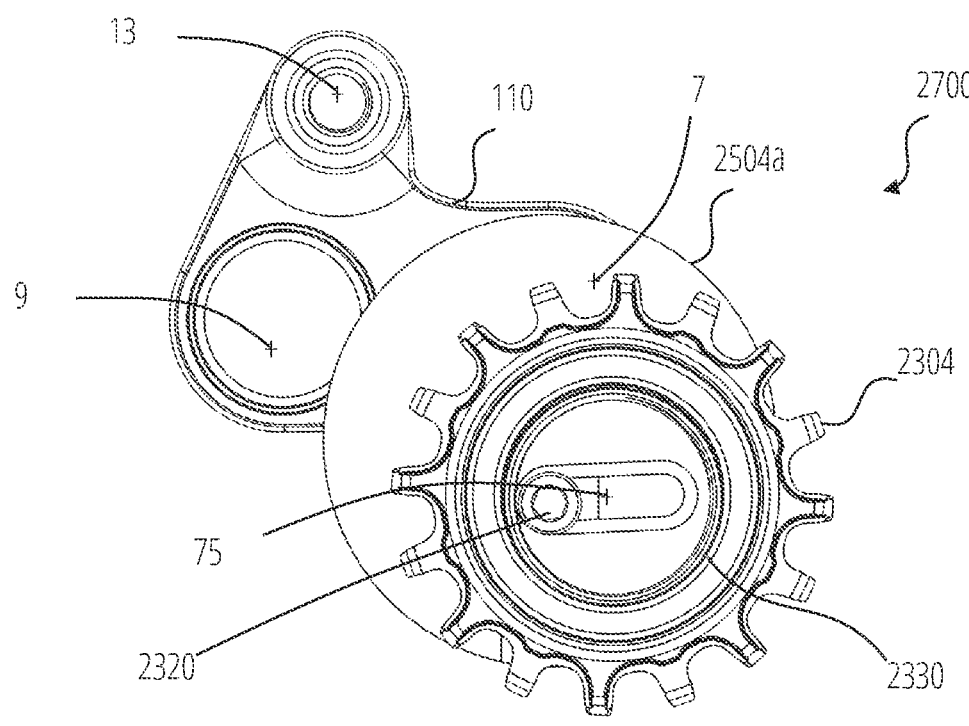
FIG. 27H is an elevation view of the idler assembly of FIG. 27A in a third configuration.
Figure 27I:
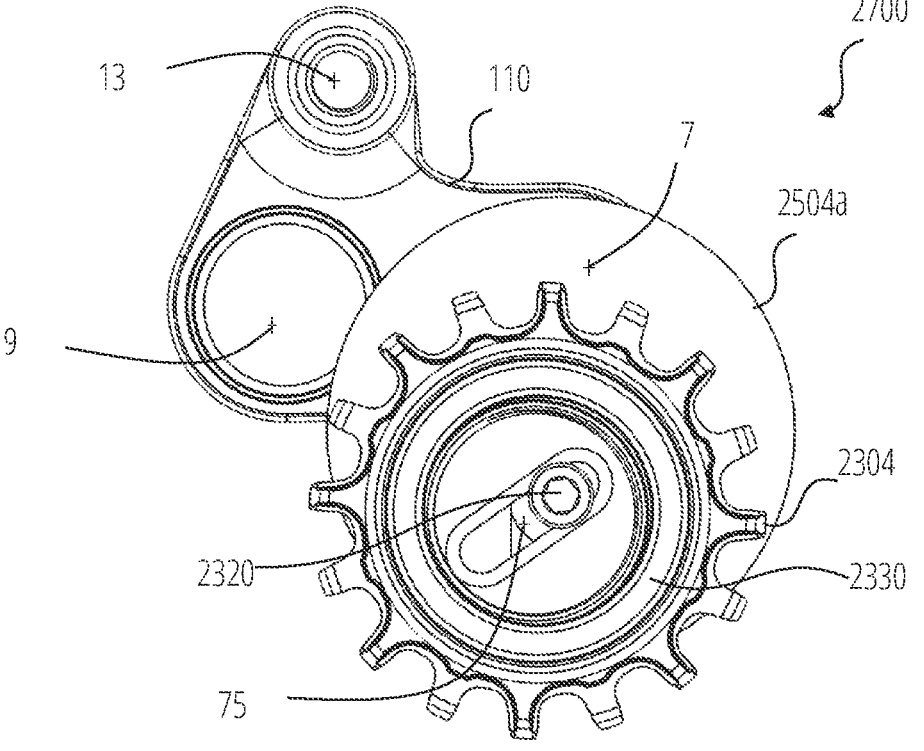
FIG. 27I is an elevation view of the idler assembly of FIG. 27A in a fourth configuration.

Turning to FIG. 27B, FIG. 27F, and FIG. 27G, the idler assembly 2700 includes a cog 2304 with an idler rotational axis 75 shown eccentric from a suspension IVC, such as the IVC[3][4] 9, the IVC[1][3] 7, or the IVC[3][6] 13. The idler rotational axis 75 may be eccentric with respect to the suspension pivots when in some configurations, e.g., as shown, or may be concentric with, or overlap with one or more IVCs in various other configurations or embodiments.

The idler assembly 2700 may include a slot 2720 formed in the suspended body 1, such as in the first portion of the suspended body 2504a. The slot 2720 may enable the idler mount 2702 to be moved in one or two degrees of freedom, e.g., in a vertical direction 101, a longitudinal direction 103, or any combination of longitudinal 103 and vertical 101 directions 101. In some embodiments, the slot 2720 may be optional such that the idler mount 2702 may be moved in a plane, such as one or more planes defined by the longitudinal 103 and vertical directions 101. Alternately, the idler mount 2702 may only be moved in one direction (e.g., a substantially vertical direction 101 or horizontal directions) with respect to the suspended body 1. The idler assembly 2700 may enable the idler mount 2702 (and thus the cog 2304) to be moved in longitudinal directions 103 (e.g., forward backward with respect to a primary direction of motion of the bicycle when ridden). See, e.g., FIG. 27F-FIG. 27I showing the idler in different configurations within a plane. An insert 2704 may be formed with or coupled to the suspended body 1, such as to attach the idler mount 2702 to the suspended body 1. The insert 2704 may include an anchor 2724 adapted to receive a threaded fastener such as a fastener 2320.

With specific reference to FIG. 27C-FIG. 27E, the idler mount 2702 may include a substantially cylindrical body. The body may have a first collar 2522, threads 2516, second collar 2524, and aperture 2518 as previously described with respect to the idler mount 2502.

The body may have a slot 2706 formed therein, such as in a blind face of the aperture 2518. The slot 2706 may have a through portion 2708 that extends through the body. The slot 2706 may have a blind portion 2710 that extends only partly into the body. The slot 2706 may have a stepped internal surface formed by the through portion 2708 and the blind portion 2710. The through portion 2708 and the blind portion 2710 may define one or more cam surfaces such as an inner cam surface 2716 and an outer cam surface 2718. A cam surface may be a surface that directs the position and/or orientation idler mount relative to the suspended body. A shoulder 2712 may be formed between the inner cam surface 2716 and the outer cam surface 2718. For example, the blind portion 2710 may have a larger dimension than the through portion 2708. In the embodiment shown, the cam surfaces may form a substantially linear track 2722 along which the idler mount 2702 may be positioned. The idler mount 2702 may have a protrusion 2726 extending from a face thereof opposite the aperture 2518. The protrusion 2726 may be suitable to be received in the slot 2720 formed in the suspended body 1, for example to constrain the movement of the idler mount 2702 to one degree of freedom. For example, the track 2722 may form a slide axis 2714 along which the idler mount 2702 may be moved, such as to tune performance of the suspension linkage. In examples where the slot 2720 and/or protrusion 2726 are not used, the idler mount may be moved in a plane by translating the fastener 2320 in the track and/or rotating the idler mount 2720 about the fastener 2320. In other embodiments, the cam surfaces may form curved, arcuate, planar, or other non-linear or irregular tracks.

To assemble the idler assembly 2700, a fastener 2320 may be inserted through the slot 2706. The fastener 2320 may have a threaded portion and a head portion. The threaded portion may be suitably sized with respect to the through portion 2708 of the slot 2706 to pass through the through portion 2708. The head of the 2320 may be sized to be received in the blind portion 2710, but not pass through the through portion 2708. In some embodiments, the fastener 2320 may be a cap-screw. The fastener 2320 may be threaded into the insert 2704 until the idler mount 2702 is sufficiently secure (e.g., tight enough that the idler mount 2702 is unlikely to move such as due to forces imparted on the idler cog 2304 by the flexible member when the bicycle is ridden). The cog 2304 may be fitted on the outer race 2362 of the bearing 2330 and the inner race 2360 may be fitted over the second collar 2524. The cog 2304 and/or bearing 2330 may be secured to the idler mount 2702 via the cap 2308 such as by the threads 2516.

As shown for example in FIG. 27F-FIG. 27I, the idler mount 2702 may be positioned in various locations within the slot 2720 or within a plane, e.g., a plane defined by the longitudinal 103 and vertical 101 directions. The fastener 2320 may act as a guide that moves along the track 2722 formed by the inner cam surface 2716 and outer cam surface 2718. For example, a user may move the idler mount 2702 by removing the cap 2308, loosening the fastener 2320, moving the idler mount 2502 to another location along the track 2722, and/or rotating the idler mount about the fastener 2320. In some configurations, a portion of the idler mount may overlap with an IVC of the suspension linkage, or may be coincident with the IVC. Moving the idler mount 2702 may change one or more performance characteristics of the suspension linkage, such as anti-squat behavior, particularly at reversal inflection points of the suspension linkage. As shown for example in FIG. 27F, the idler mount 2502 is positioned at an upper position along the slot 2720 where the idler rotational axis is vertically disposed above the anchor 2724. In another example shown in FIG. 27G, the idler mount 2502 is shown at a lower position along the slot 2720 with the anchor 2724 positioned vertically above the idler rotational axis 75. In another example shown in FIG. 27H, the idler mount 2702 is shown at a substantially forward position with the idler rotational axis 75 forward of the anchor 2724 and slightly above the anchor 2724. In another example, shown in FIG. 27I, the idler mount 2702 is shown at a position with the idler rotational axis 75 below and to the rear of the anchor 2724. The configurations shown for example in FIGS. 27H and 27I may be achieved by an appropriately aligned slot 2720, and/or by omitting the slot 2720 and protrusion 2726 such that the idler mount 2720 may move in a plane. As is evident, the idler mount 2702 and thus the cog 2304 may be moved with two degrees of freedom e.g., within a plane, to affect the performance characteristics of the suspension linkage. Examples of some effects of such performance tuning are provided in FIG. 34A-FIG. 34E and are discussed further below.

In some embodiments, it may be desirable to constrain the idler mount to a single degree of freedom (e.g., movement along a line). With reference to FIG. 28A-FIG. 28G, an idler assembly 2800 is disclosed that may constrain the movement of the idler mount 2802, and thus the idler cog 2304 to a single degree of freedom. In many aspects, the idler assembly 2800 may be similar to the idler assembly 2700, which similarities are not repeated for the sake of brevity. The idler assembly 2800 is suitable for use with any suspension linkage disclosed herein. The idler assembly 2800 may include an idler mount 2802 that enables the position of the idler cog 2304 to be changed, e.g., by a user, without changes to the underlying structure of the idler mount 2802 nor the bicycle or suspension itself. The idler assembly 2800 may include an insert 2804 formed with or coupled to the suspended body 1, such as by co-molding. The insert 2804 may include two or more anchors 2806a/b suitable to couple an equivalent number of fasteners 2320 to the idler assembly 2800. The anchor 2806a/b may be disposed substantially along a line with one another along a longitudinal direction 103 (e.g., side by side).

The body may have two or more slots 2706a/b formed therein, such as in a blind face of the aperture 2518. The slots 2706a/b may be as previously described herein. The slots 2706a/b may have respective inner cam surfaces 2716 and outer cam surface 2718 that form respective tracks 2722. The idler assembly 2800 enables the idler mount 2802 to be moved in relation to the suspended body 1, e.g., a substantially vertical direction 101 with respect to the suspended body 1. For example, the idler mount 2802 may include two or more slots 2706a/b formed therein, as previously described. The slots 2706 may constrain the idler mount 2802 to the single degree of freedom. For example, the slots 2706a/b may form respective tracks 2722 than enable the idler mount 2802 to be moved along slide axes 2714a/b. The slide axes may be disposed at an angle (e.g., 90 degrees) with respect to the line running between the two anchors. The slots 2706 may receive respective fasteners 2320 as previously described.

The idler assembly 2800 may provide a more stable or secure fixture of the idler cog 2304. The idler assembly 2800 may provide for limited changes to the suspension performance. For example, it may be desirable for the suspension to have the anti-squat characteristics of FIG. 34A-FIG. 34C (where the cog 2304 is moved up or down), but not the characteristics of FIG. 34D and FIG. 34E (e.g., where the cog 2304 is moved forward or backward).

Figure 28A:
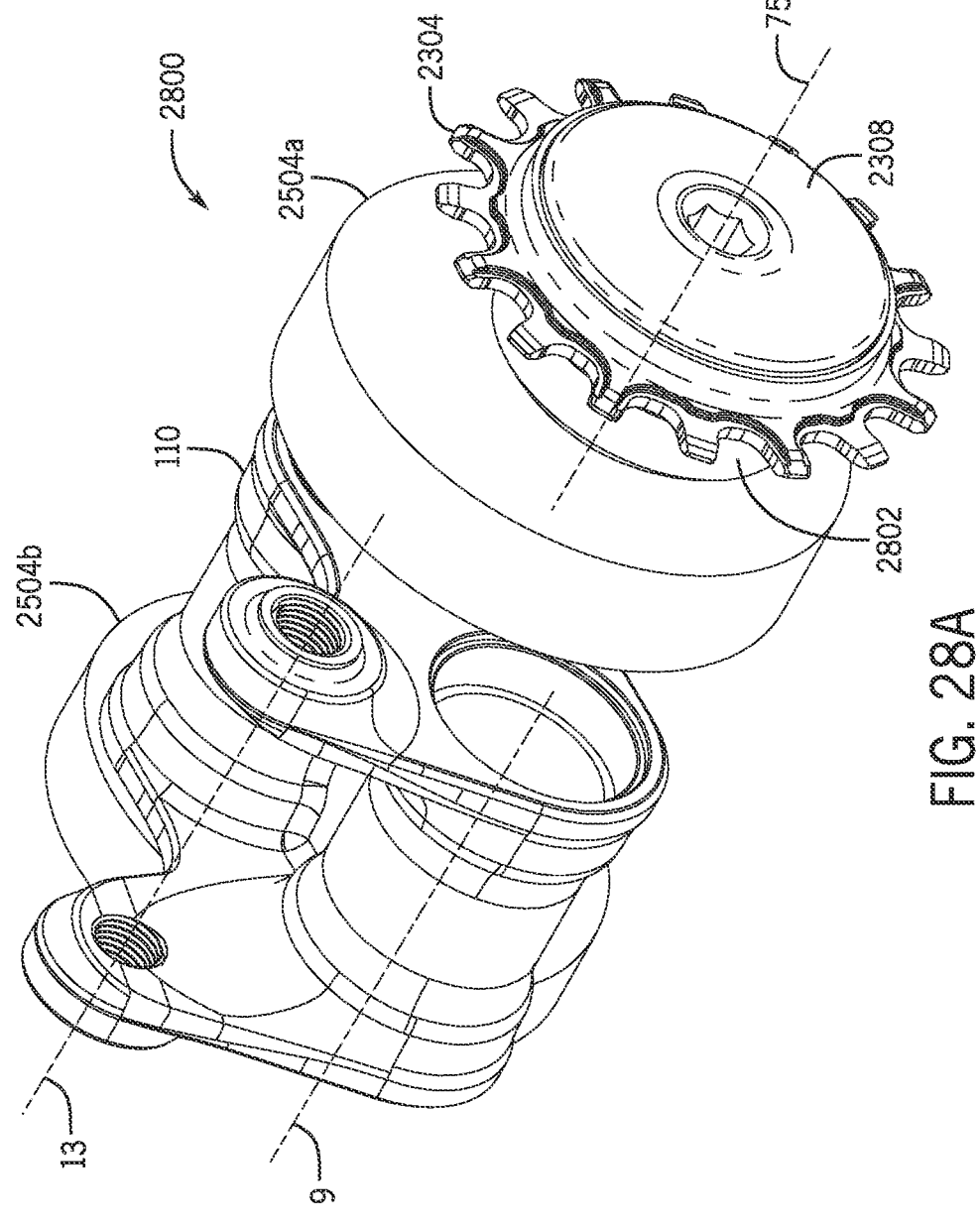
FIG. 28A is an isometric view of an embodiment of an idler assembly.
Figure 28B:
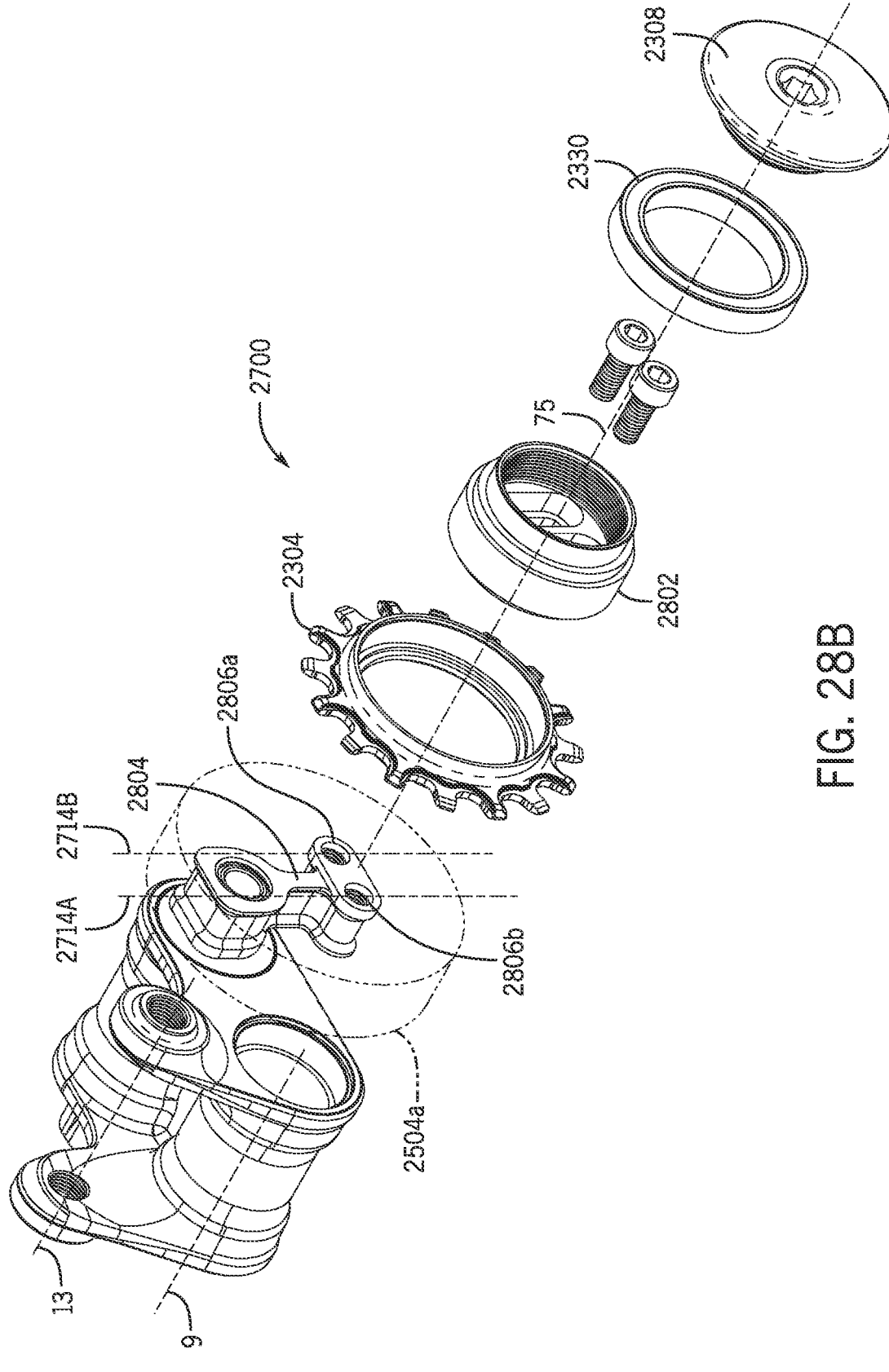
FIG. 28B is a partial exploded view of the idler assembly of FIG. 28A.
Figures 28C, 28D, 28E:
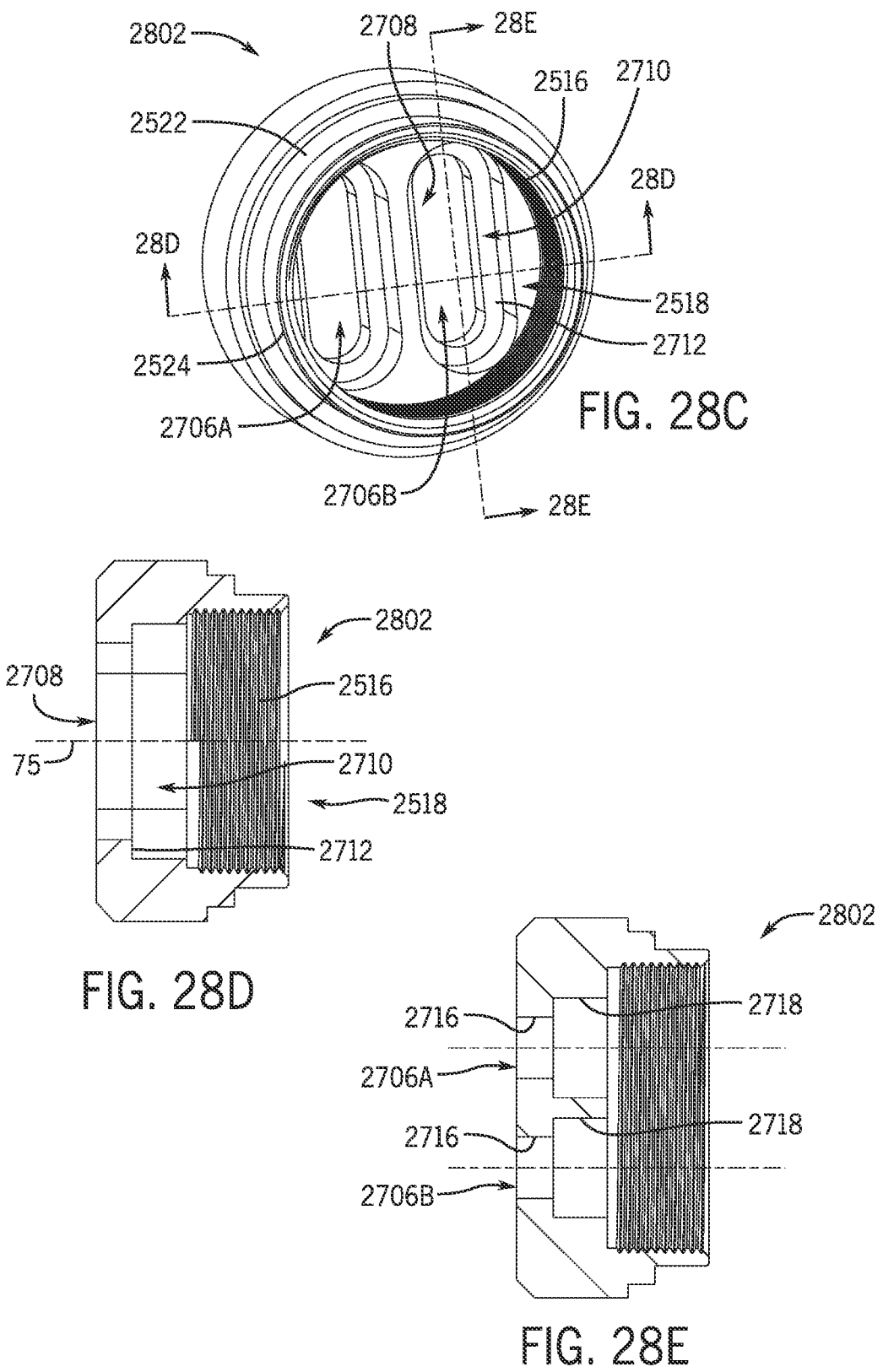
FIG. 28C is an isometric view of an idler mount of the idler assembly of FIG. 28A.
FIG. 28D is a section view of the idler mount of FIG. 28C taken along line 28D-28D of FIG. 28C.
FIG. 28E is a section view of the idler mount of FIG. 28C taken along line 28E-28E of FIG. 28C.
Figure 28F:
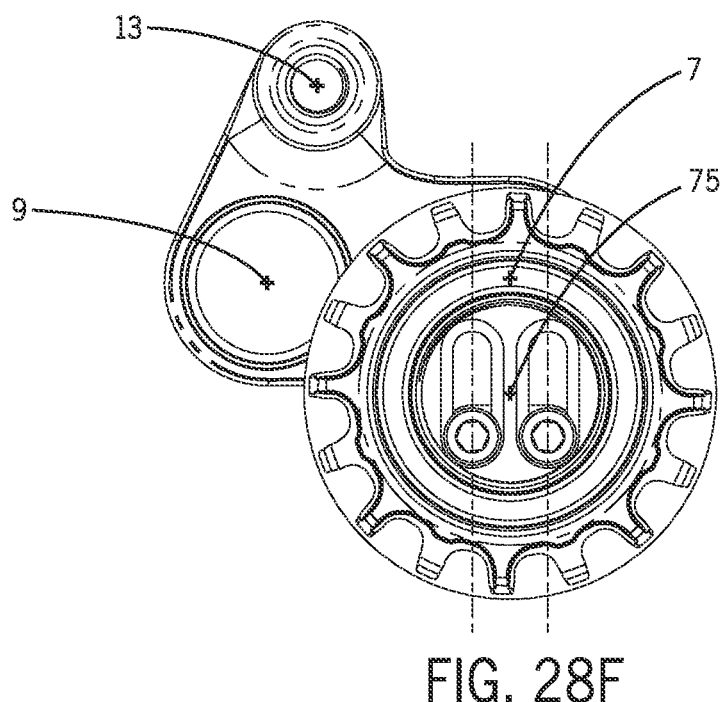
FIG. 28F is an elevation view of the idler assembly of FIG. 28A in a first configuration.
Figure 28G:
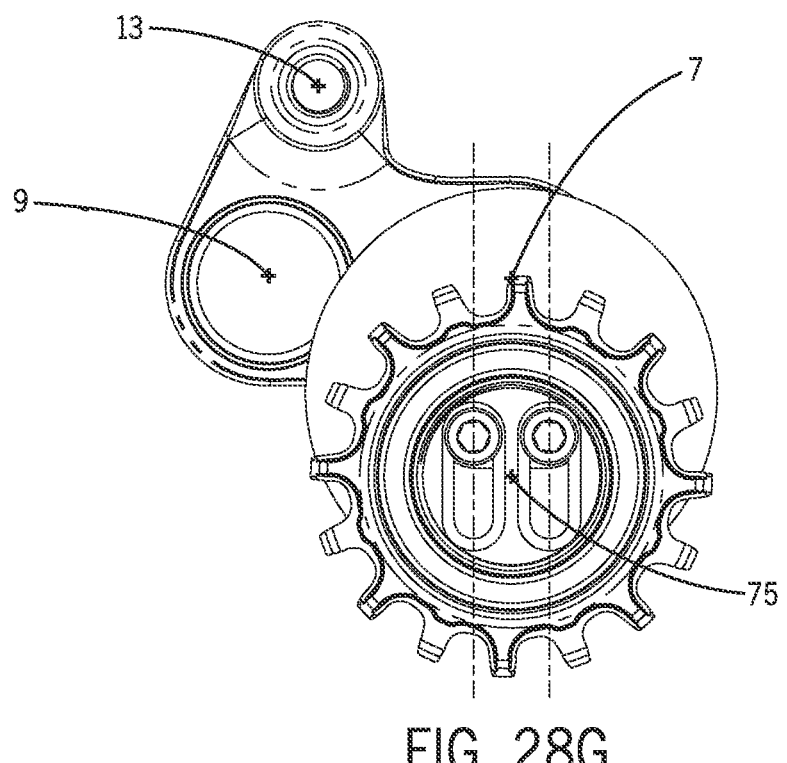
FIG. 28G is an elevation view of the idler assembly of FIG. 28A in a second configuration.
Figure 29A:
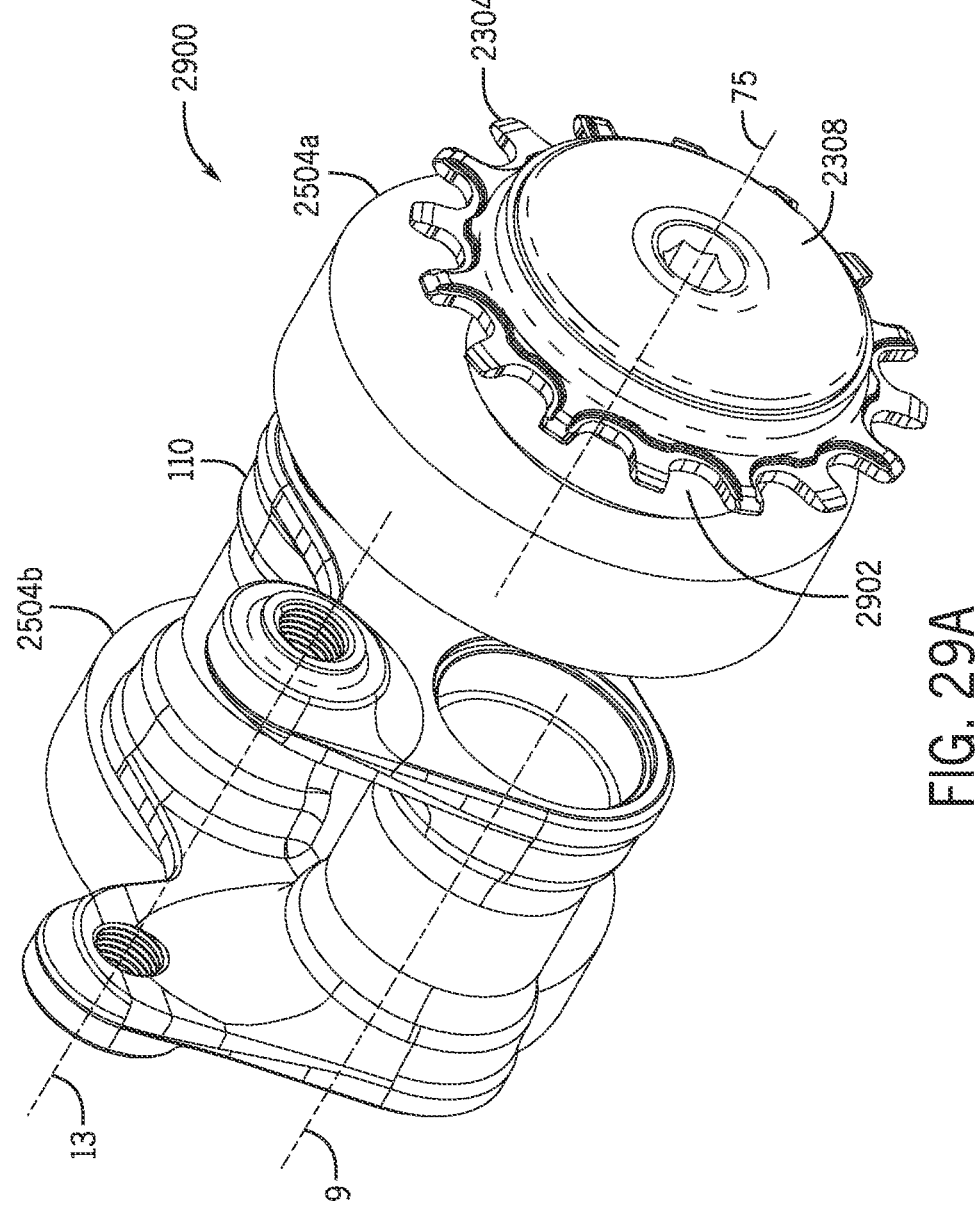
FIG. 29A is an isometric view of an embodiment of an idler assembly.
Figure 29B:
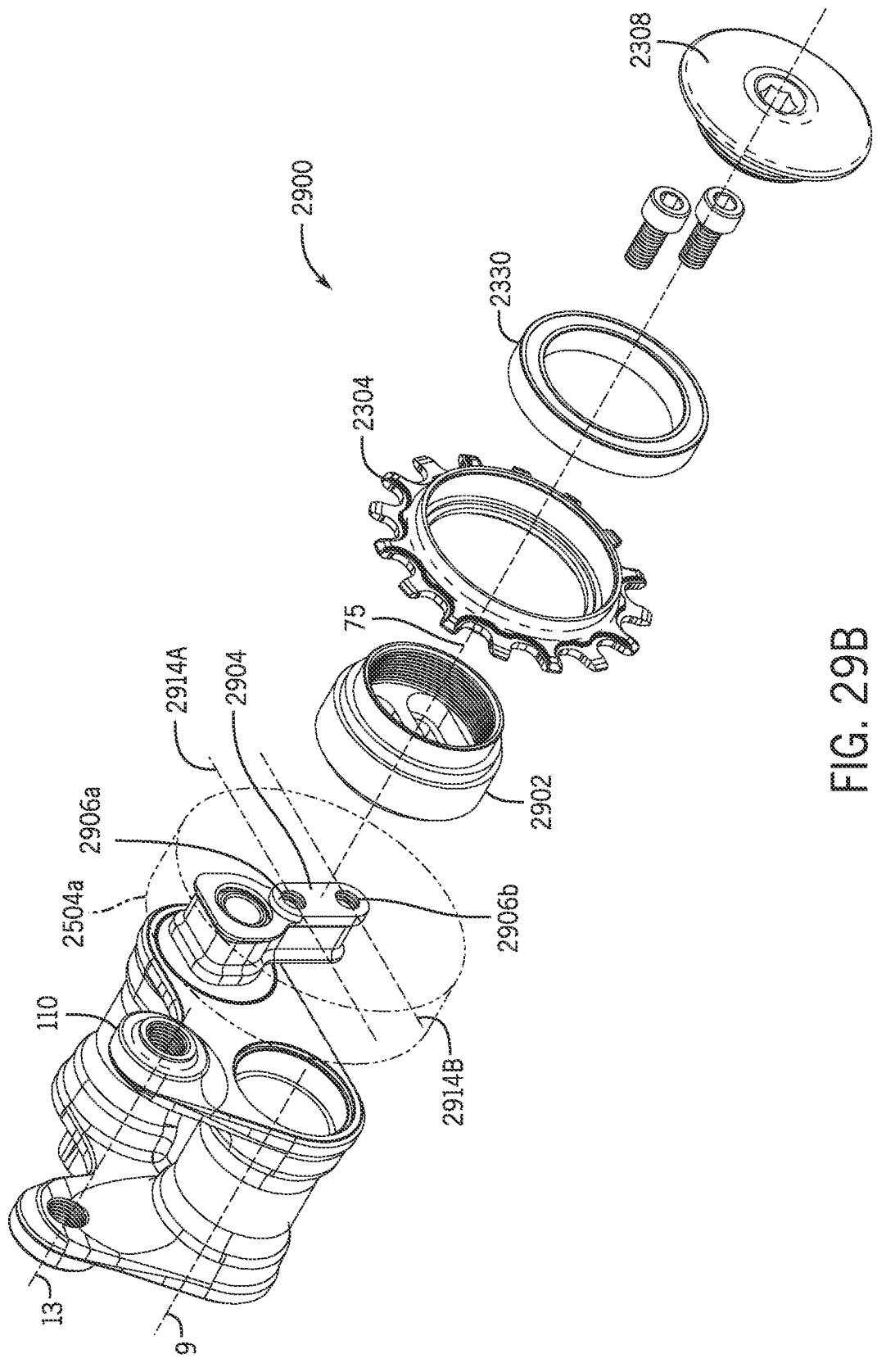
FIG. 29B is a partial exploded view of the idler assembly of FIG. 29A.
Figure 29F:
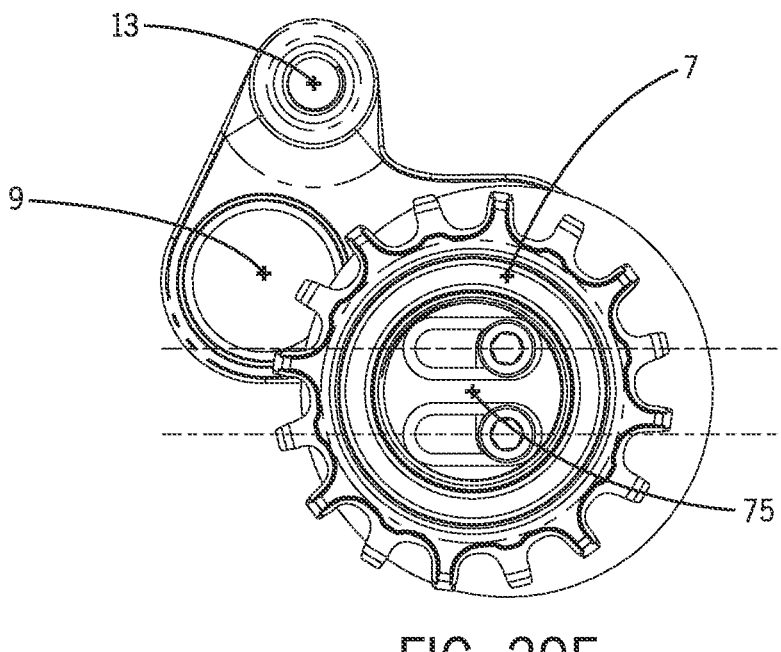
FIG. 29F is an elevation view of the idler assembly of FIG. 29A in a first configuration.
Figure 29G:
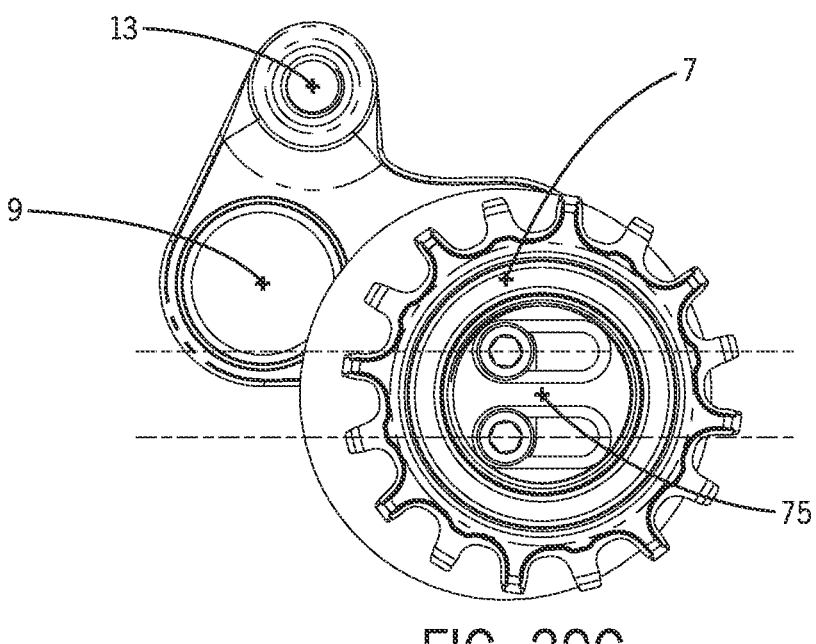
FIG. 29G is an elevation view of the idler assembly of FIG. 29A in a second configuration.

As shown for example in FIG. 28F and FIG. 28G, the idler mount 2802 may be positioned in various locations along the slide axes 2714a/b. The fasteners 2320 act as guides that move along the tracks 2722 formed by the inner cam surfaces 2716 and outer cam surfaces 2718 of the respective slots 2706a/b. For example, a user may move the idler mount 2802 by removing the cap 2308, loosening the fasteners 2320, moving the idler mount 2802 to another location along the slide axes 2714*a/b*. Moving the idler mount 2802 may change one or more performance characteristics of the suspension linkage, such as anti-squat behavior, particularly at reversal inflection points of the suspension linkage. One benefit of the idler assembly 2800 is that the idler mount 2802 may be constrained to one degree of freedom without adding a slot to 2720 to the suspended body 1. Examples of such performance tuning are provided in FIG. 34A-FIG. 34E and are discussed further below.

FIG. 29A-FIG. 29F show an example of an idler assembly 2900. The idler assembly 2900 may be substantially similar to the idler assembly 2800 discussed herein. The idler assembly 2900 includes an idler mount 2802 is disclosed herein. The idler assembly 2900 may, like the idler assembly 2800, constrain the idler mount 2902 to a single degree of freedom. The idler assembly 2900 may include an insert 2904 with anchors 2906*a/b* disposed substantially vertically in relation to one another (e.g., above and below). The anchors 2906*a/b* may define respective slide axes 2914*a/b* along which the tracks 2722 may move.

The idler assembly 2900 may provide a more stable or secure fixture of the idler cog 2304. The idler assembly 2900 may provide for limited changes to the suspension performance. For example, it may be desirable for the suspension to have the anti-squat characteristics of FIG. 34A and FIG. 34D-FIG. 34E. (where the cog 2304 is moved forward or back), but not the characteristics of FIG. 34B and FIG. 34C (e.g., where the cog 2304 is moved up or down).

In other embodiments, of idler assemblies like the idler assembly 2800 and the idler assembly 2900, the insert may have anchors disposed to enable the idler mount to move along a single degree of freedom in any combination of vertical 101 and longitudinal 103 directions 103. For example, the anchors may be disposed along a line 45 degrees with respect to both the longitudinal 103 and vertical 101 directions such that the anchors define slide axes that are 90 degrees offset from the line running between the two anchors. One benefit of the idler assembly 2900 is that the idler mount 2902 may be constrained to one degree of freedom without adding a slot to 2720 to the suspended body 1.

With respect to FIG. 30A-FIG. 30G, an idler assembly 3000 is disclosed. The idler assembly 3000 may be similar to the idler assembly 2800 and the idler assembly 2900 in that the idler assembly 3000 may constrain the movement of an idler mount 3002 along a single degree of freedom. However, the movement of the idler mount 3002 may be along an arc or curve. The idler assembly 3000 may have an insert 3004 similar to the insert 2904 (e.g., with anchors 3006*a/b* arranged substantially vertically with respect to one another. In other examples, of the idler assembly 3000, the anchors may be disposed in other fashions as disclosed herein.

Similar to other embodiments, the idler assembly 3000 may include a slot 3008 that has a through portion 3010 and a blind portion 3012. A shoulder 3014 may be formed therebetween. The slot 3008 may define an inner cam surface 3016 and an outer cam surface 3018 that forms a track 3022. The idler mount 3002 may include an aperture 2506 as previously disclosed.

The idler mount 3002 may be secured to the anchor 3006*a/b* by respective fasteners 2320 as previously disclosed, e.g., by receiving the fasteners 2320 in the 3008 and aperture 2506.

Figure 30A:
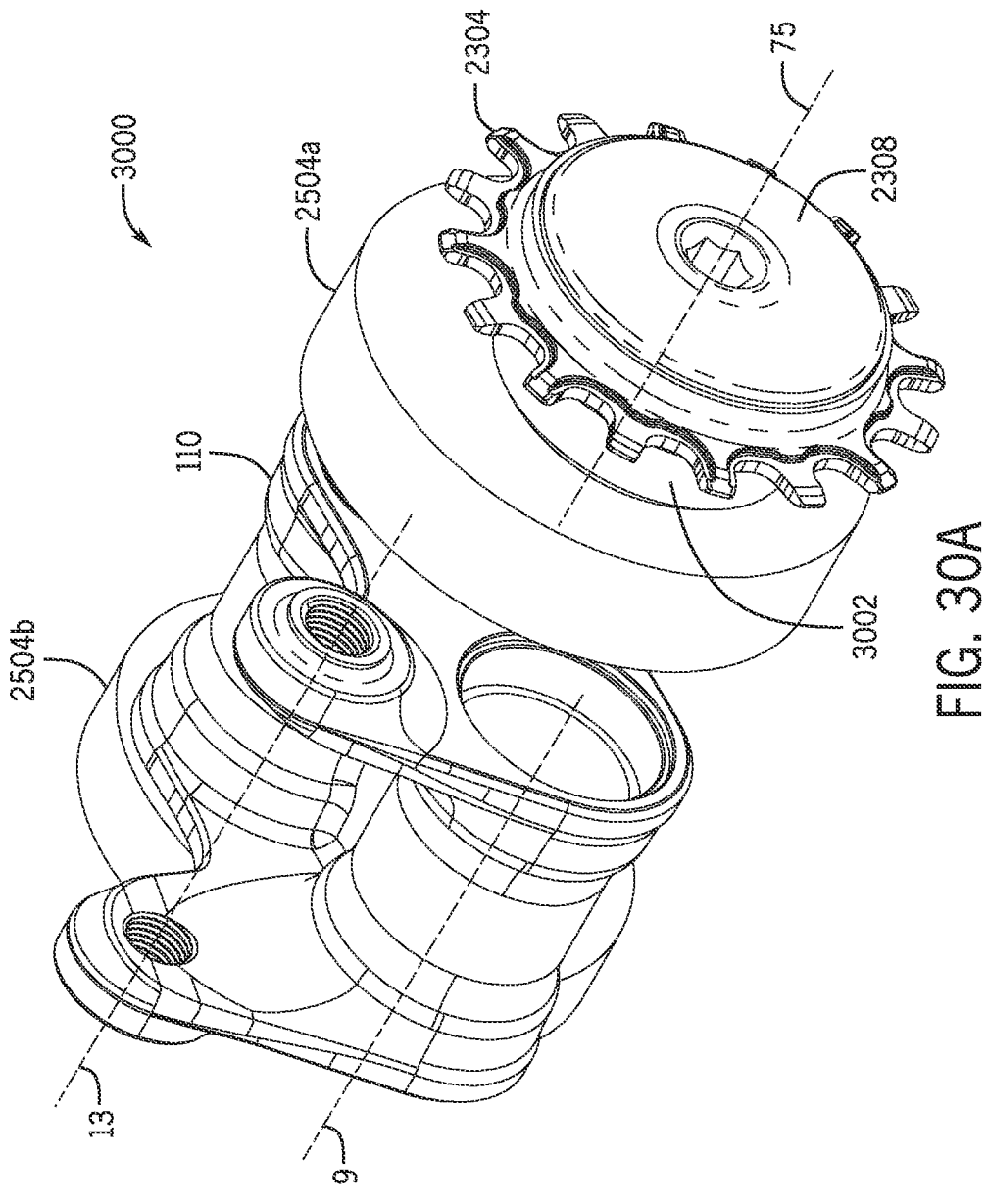
FIG. 30A is an isometric view of an embodiment of an idler assembly.
Figure 30B:
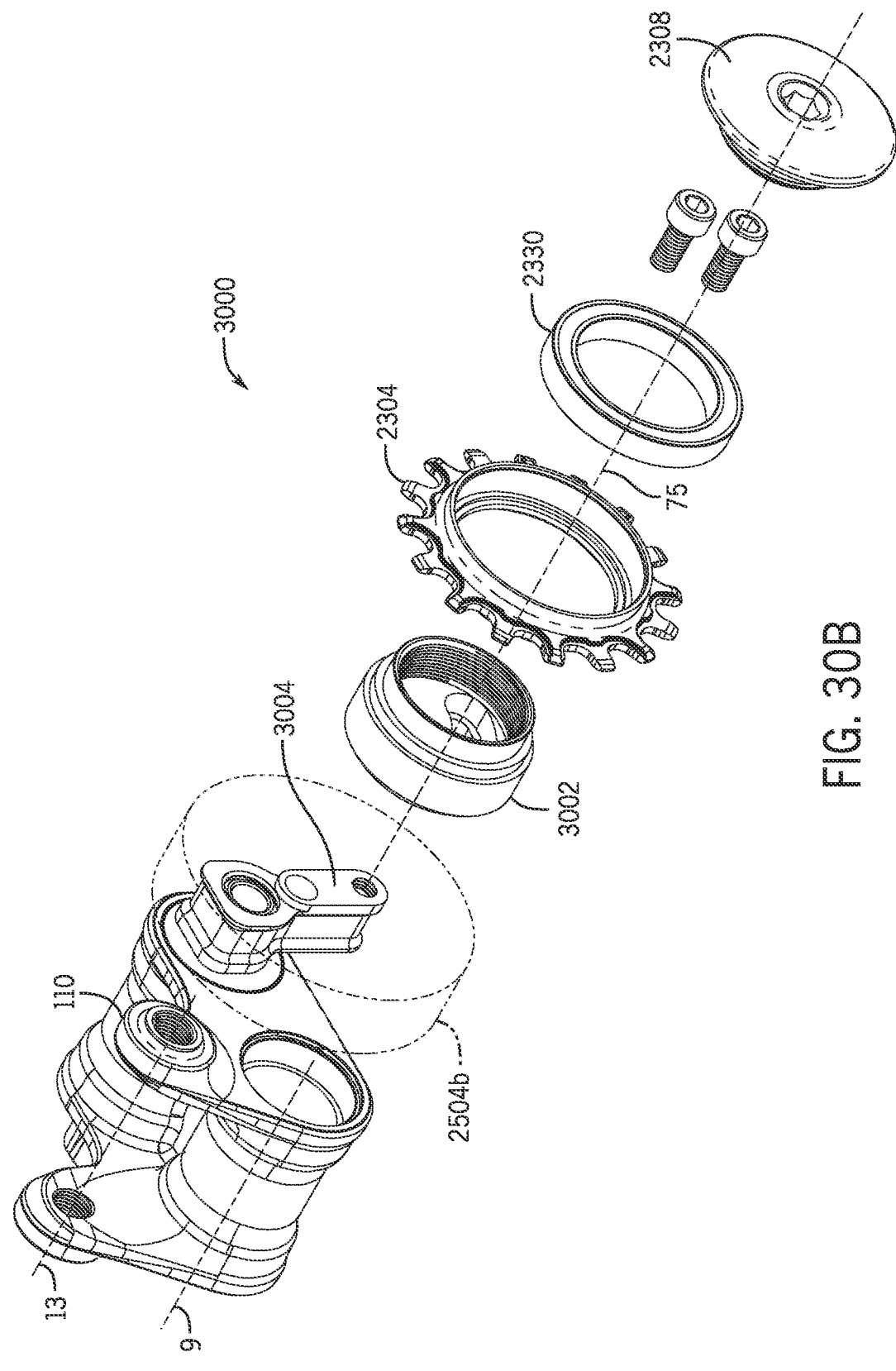
FIG. 30B is a partial exploded view of the idler assembly of FIG. 30A.
Figures 30C, 30D, 30E:
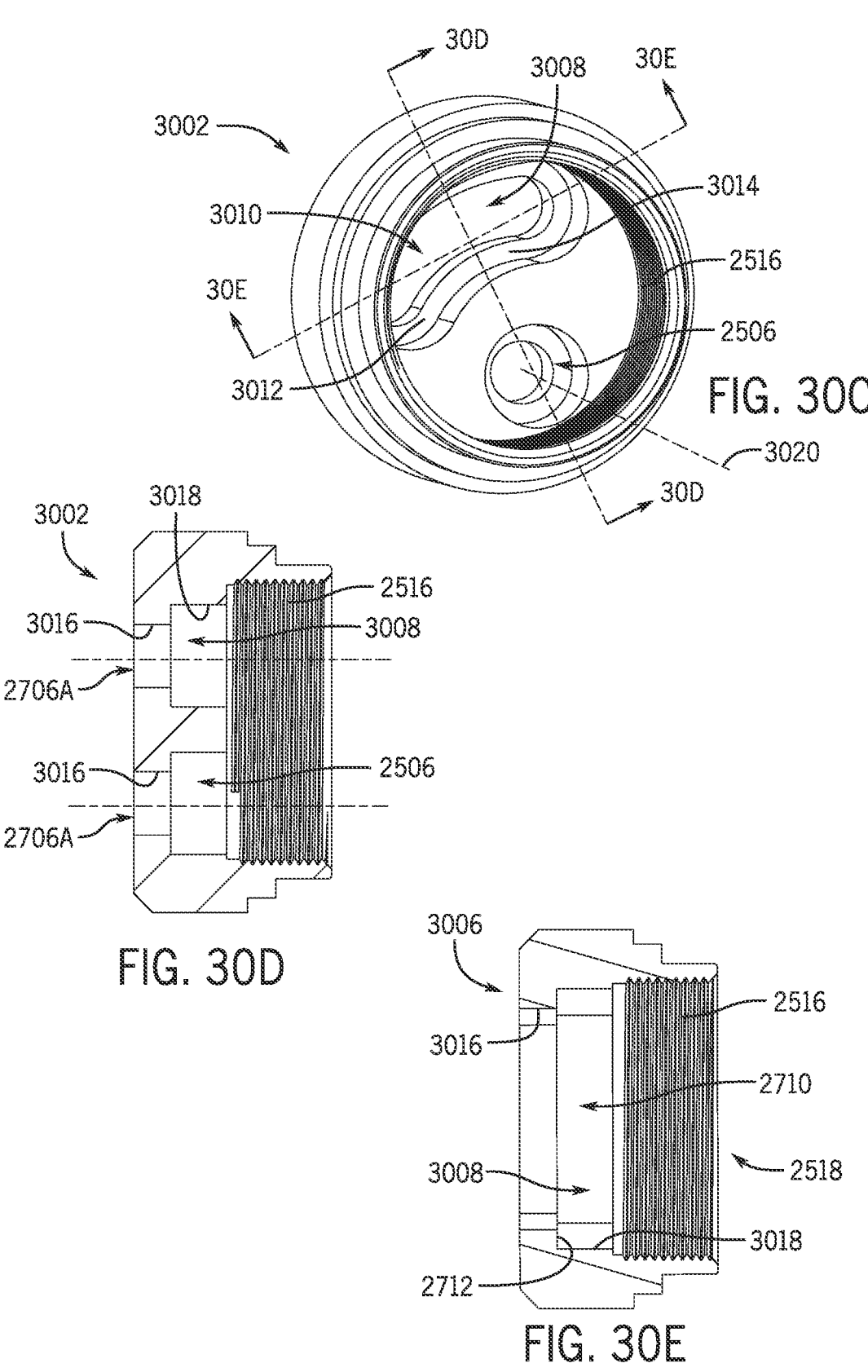
FIG. 30C is an isometric view of an idler mount of the idler assembly of FIG. 30A.
FIG. 30D is a section view of the idler mount of FIG. 30C taken along line 30D-30D of FIG. 30C.
FIG. 30E is a section view of the idler mount of FIG. 30C taken along line 30E-30E of FIG. 30C.
Figure 30F:
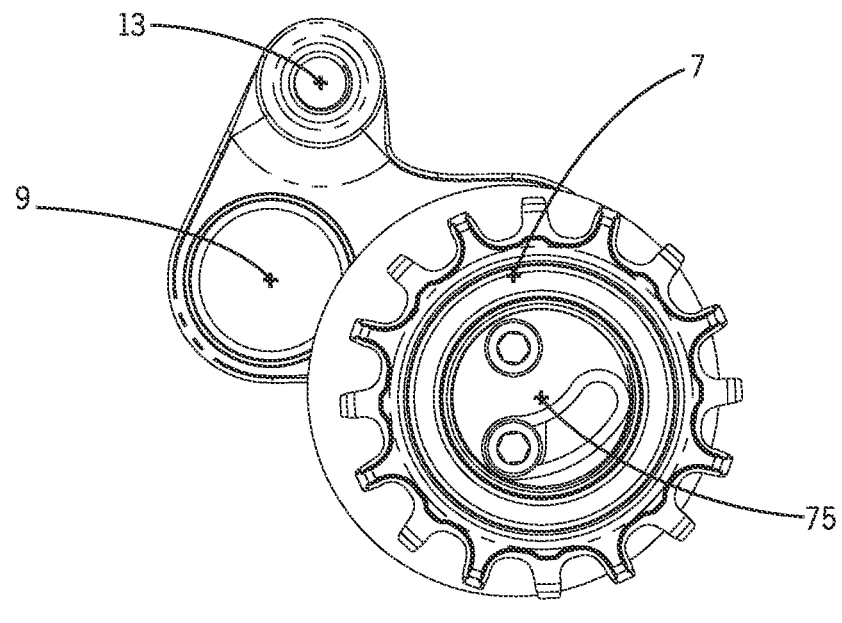
FIG. 30F is an elevation view of the idler assembly of FIG. 30A in a first configuration.
Figure 30G:
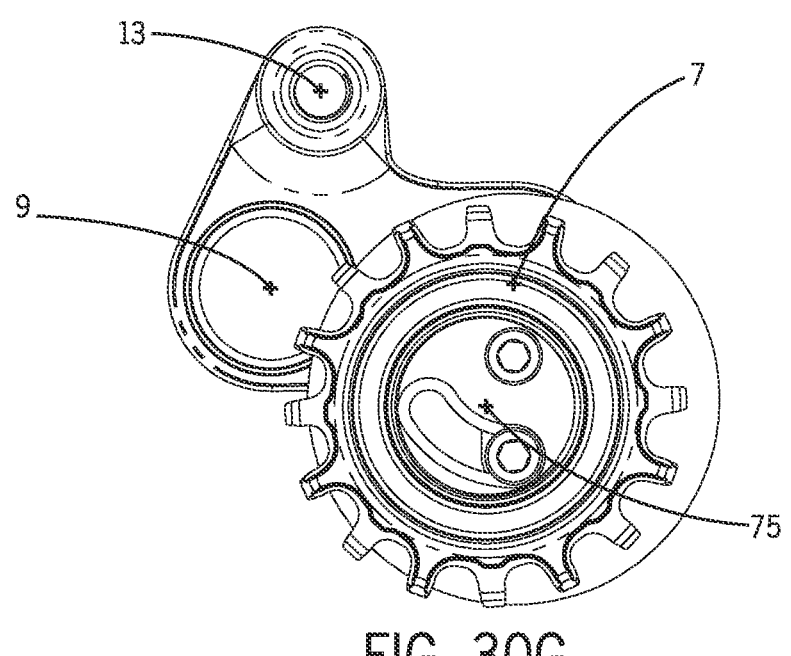
FIG. 30G is an elevation view of the idler assembly of FIG. 30A in a second configuration.

The fastener 2320 received in the aperture 2506 may form a pivot axis 3020 about which the idler mount 3002 may pivot to adjust the position of the idler mount 3002 along the track 3022. FIG. 30F and FIG. 30G show examples of positions into which the idler mount 3002 may be positioned. Additional flexibility of idler mount 3002 position may be achieved by switching the anchors 3006*a/b* to which the slots 3008 and aperture 2506 are mounted, thereby moving the pivot axis 3020 from being within in the lower anchor 3006*b* (as shown for example) to the upper anchor 3006*a*. One benefit of the idler assembly 3000 is that the idler mount 3002 may be constrained to one degree of freedom without adding a slot to 2720 to the suspended body 1. Examples of such performance tuning are provided in FIG. 34A-FIG. 34E and are discussed further below.

FIG. 31A-FIG. 31F show an example of an idler assembly 3100 suitable to position the cog 2304 in one or more discrete positions. The idler assembly 3100 includes an idler mount 3102 substantially similar to the idler mount 2702. The idler assembly 3100 includes a slot 3108 formed in the suspended body 1 to enable the idler mount 3102 to be moved substantially vertically to two different positions shown for example in FIG. 31E and FIG. 31F.

The idler assembly 3100 includes a key 3106 that can be positioned in two positions within the slot 2706, thereby placing the cog 2304 in one of two positions. Thus, the idler assembly 3100 can constrain the cog 2304 to discrete positions. The key 3106 is formed of a main body 3110. A protrusion 3122 protrudes from the main body 3110, e.g., transversely with respect to the vehicle. The protrusion 3122 may be configured to be received in the through portion 2708 of the slot 2706. The protrusion 3122 may extend into the slot 3104 such that the slot 3104 constrains movement of the key 3106 to a selected discrete position. The main body 3110 may be configured to be received in the blind portion 2710 of the slot 2706. The key 3106 may include an aperture 3114 formed therein. The aperture 3114 may include a blind portion 3112 and a through portion 3120 with a shoulder 3118 disposed therebetween. The aperture 3114 may be suitable to receive a fastener 2320 such as a cap screw. The fastener 2320 may be threadedly coupled to an anchor 3104 formed with or coupled to the suspended body.

Figure 31A:
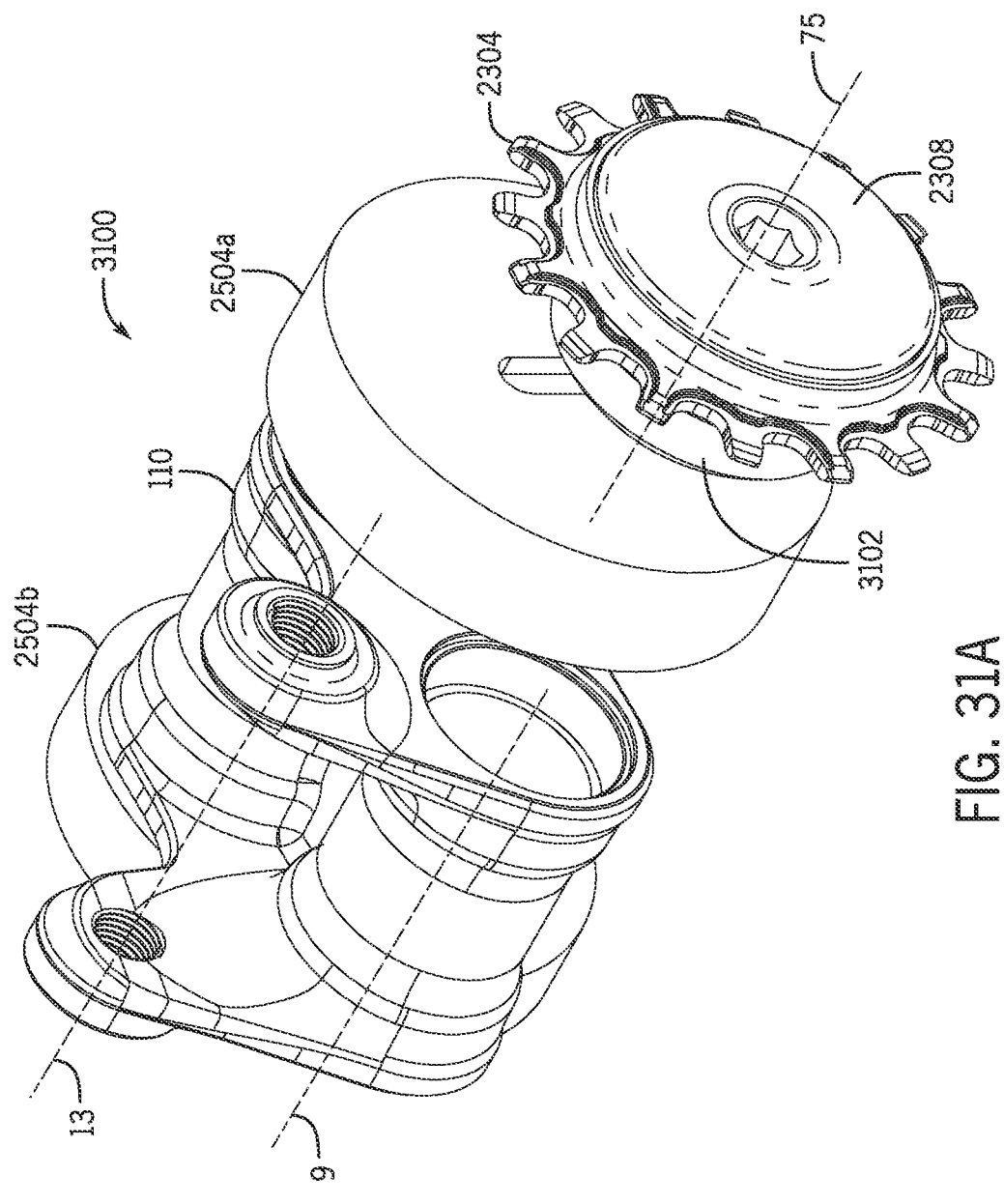
FIG. 31A is an isometric view of an embodiment of an idler assembly.
Figure 31B:
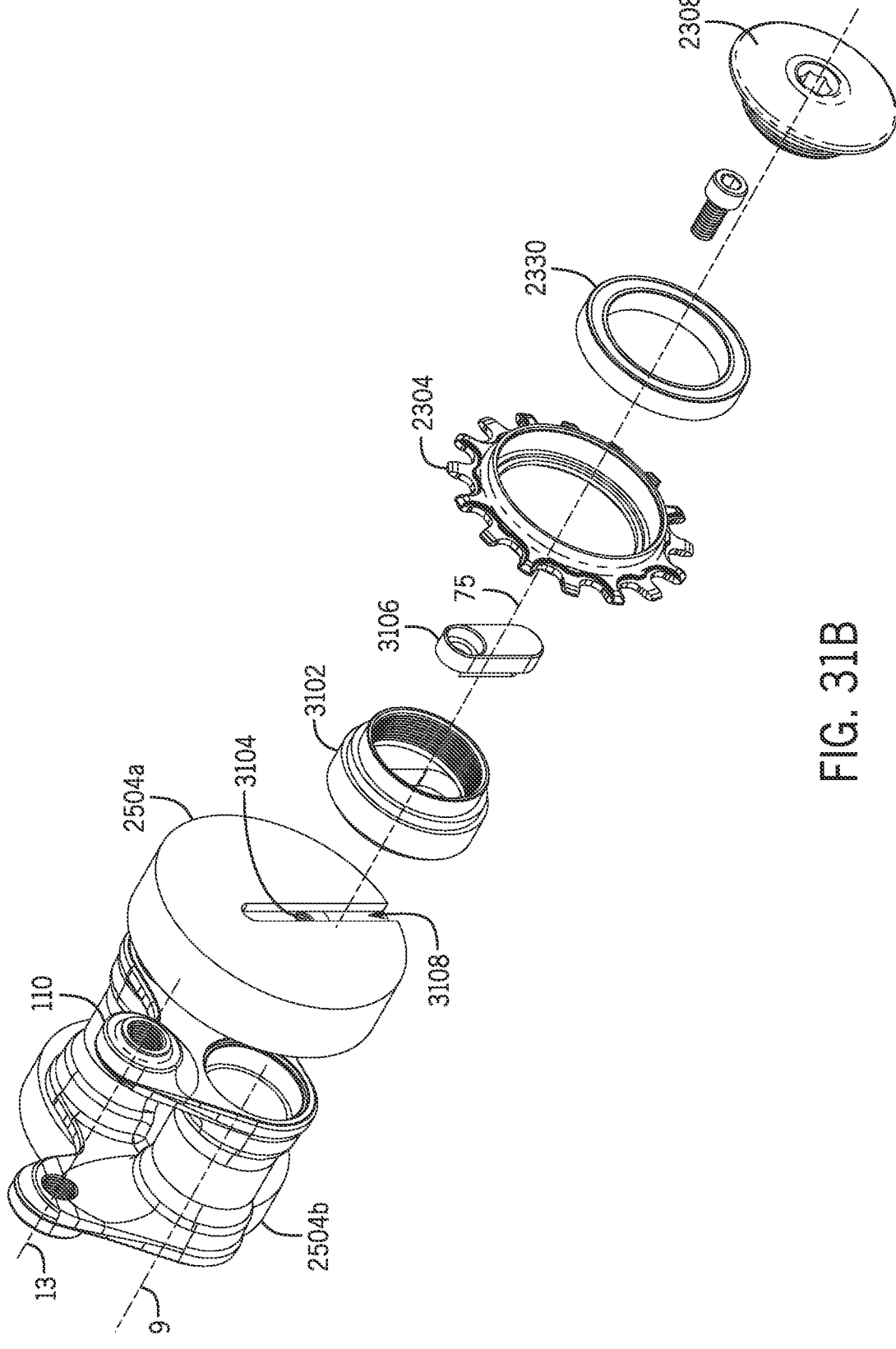
FIG. 31B is a partial exploded view of the idler assembly of FIG. 31A.
Figures 31C, 31D:
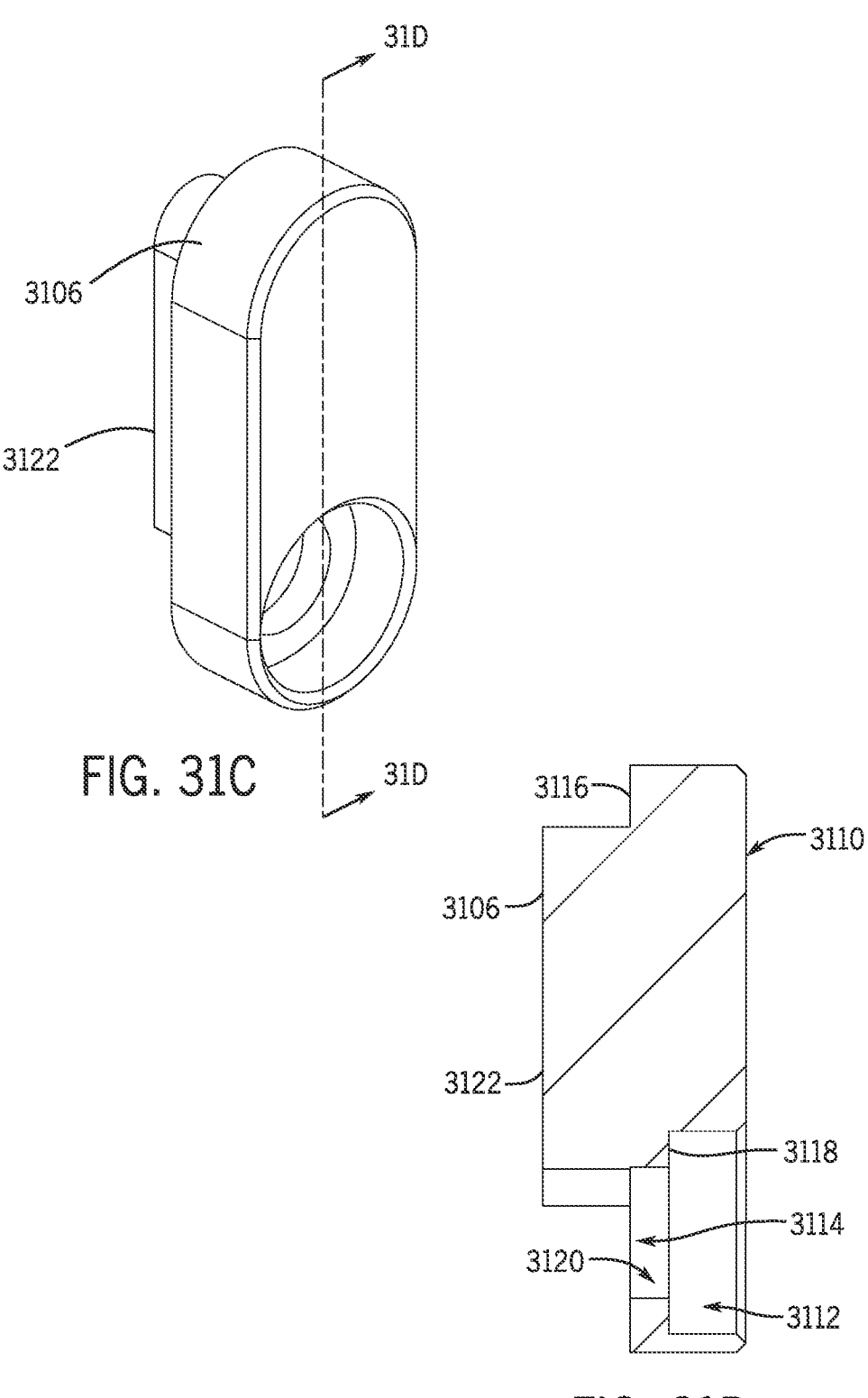
FIG. 31C is an isometric view of a key of the idler assembly of FIG. 31A.
FIG. 31D is a section view of the key of FIG. 31C taken along line 31D-31D of FIG. 31C.
Figure 31E:
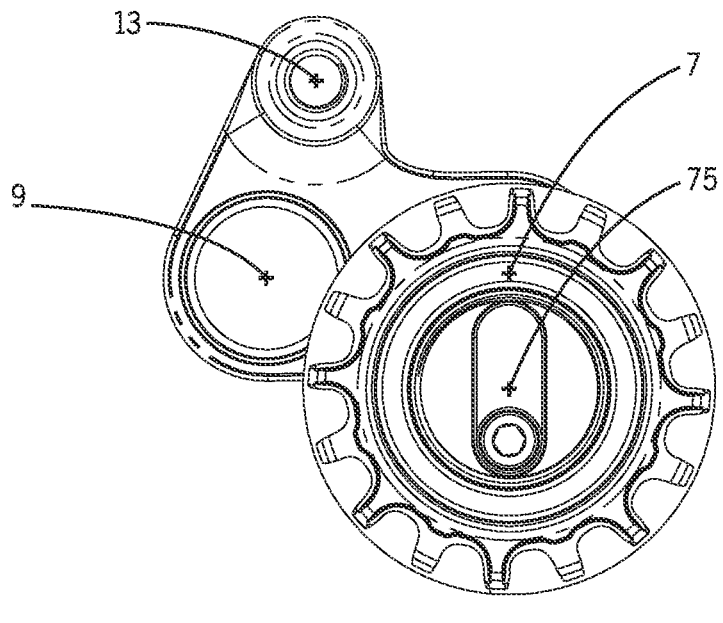
FIG. 31E is an elevation view of the idler assembly of FIG. 31A in a first configuration.
Figure 31F:
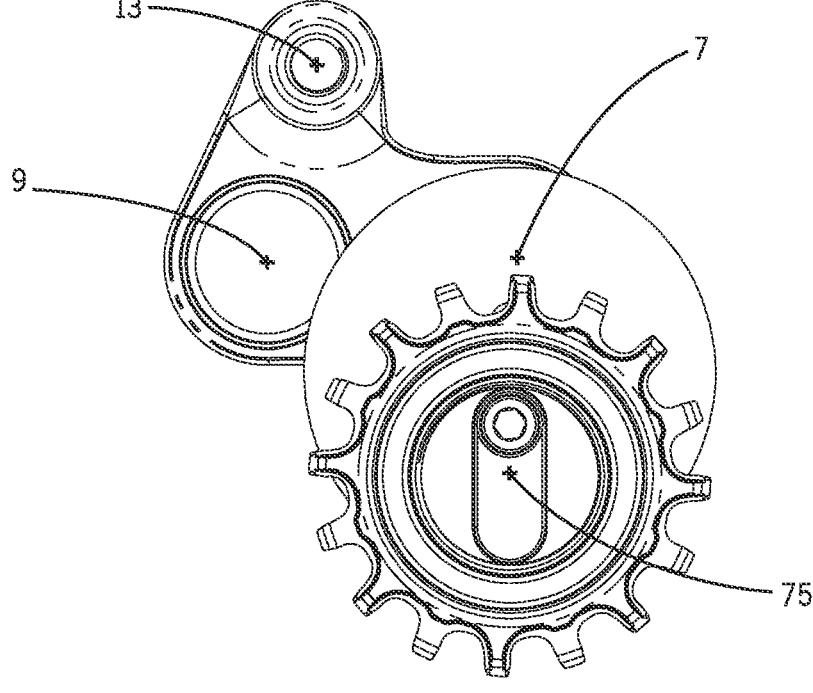
FIG. 31F is an elevation view of the idler assembly of FIG. 31E in a second configuration.

To move the idler mount 3102, and thus the cog 2304 between the two discrete positions, the cap 2308 may be removed, the fastener 2320 may be removed, and the cam position reversed or flipped, a shown for example in FIG. 31E and FIG. 31F. In some embodiments, of the idler assembly 3100, the key 3106 has three or more discrete positions in which it can be placed. In such embodiments, the slot 2706 may be replaced by a suitable shaped recess and/or aperture to receive the key 3106 in the three or more discrete positions. Examples of such performance tuning are provided in FIG. 34A-FIG. 34E and are discussed further below.

Figure 32A:
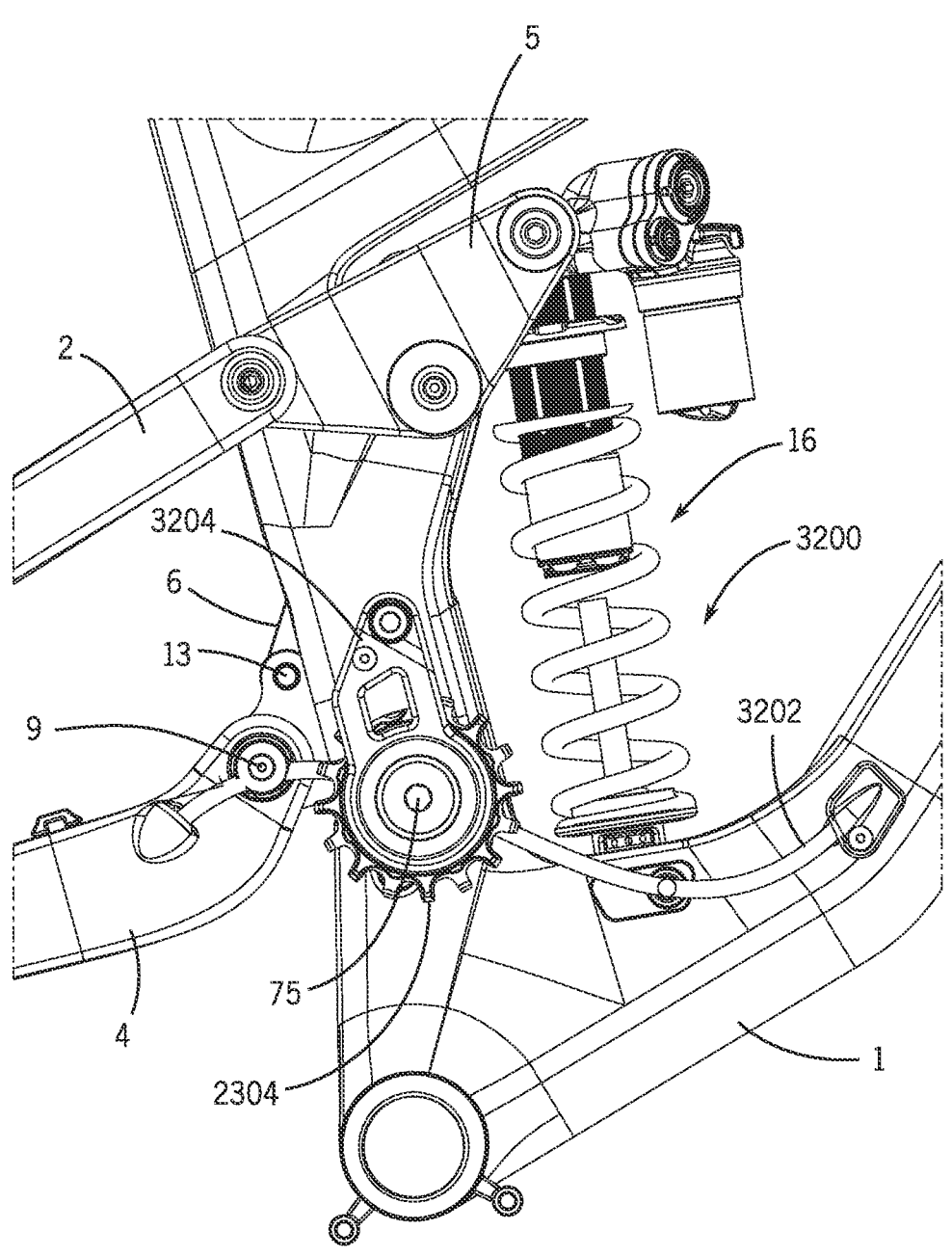
FIG. 32A is an elevation view of an embodiment of an idler assembly in a first configuration.
Figure 32B:
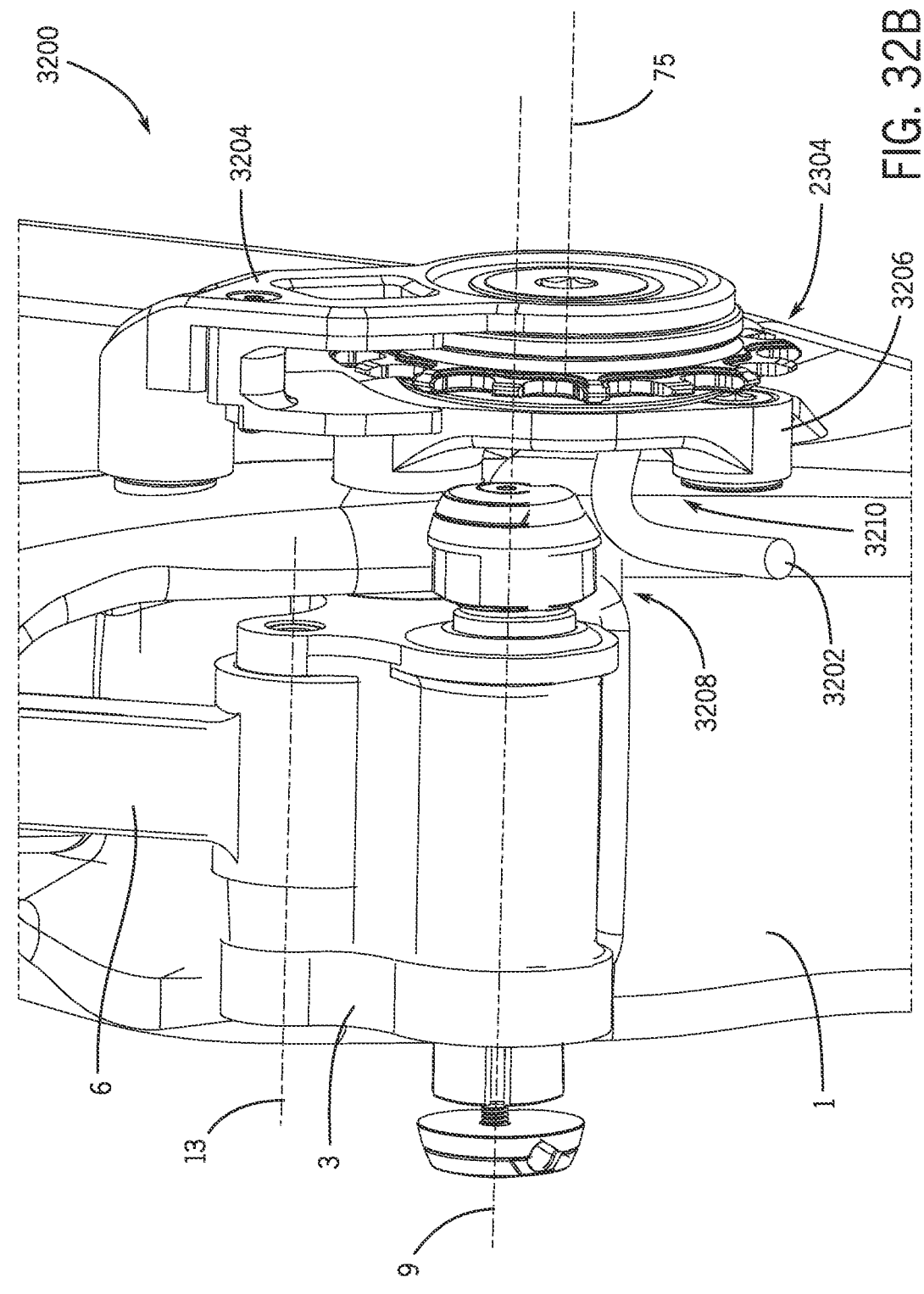
FIG. 32B is a partial rear isometric view of the idler assembly of FIG. 32A.

An example of an idler assembly 3200 is shown in FIG. 32A-FIG. 32H. The idler assembly 3200, like other idler assemblies disclosed herein, may be reconfigurable to enable the performance of the suspension linkage to be tuned by moving the position of the idler cog 2304. The idler assembly 3200 may include provisions for the routing of a control cable of the vehicle, such as a derailleur cable 3202. As shown for example in FIG. 32A, the idler assembly 3200 may enable the routing of the cable 3202 behind the cog 2304. For example, as shown in FIG. 32B, the idler assembly 3200 may form a passage 3210 with respect to the suspended body 1 suitable for the cable 3202 to pass through. The cable 3202 may be disposed between the idler mouton and the suspended body. The cable 3020 maybe freely moveable within the passage 3210. Routing the cable 3202 as such may have many benefits, such as providing for smooth, gradual bends in the cable to reduce binding as the suspension travels in its range of motion. Gradual bends in the cable may help enable smooth shifting of gears of the derailleur. Furthermore, the cable 3202 routing may protect the cable 3202 from snagging on external objects such as trees or rocks. As used herein, the cable 3202 may include the flexible element or wire that controls the aspect of the vehicle and may also include a cable housing or sheath that protects the flexible element.

Figure 32C:
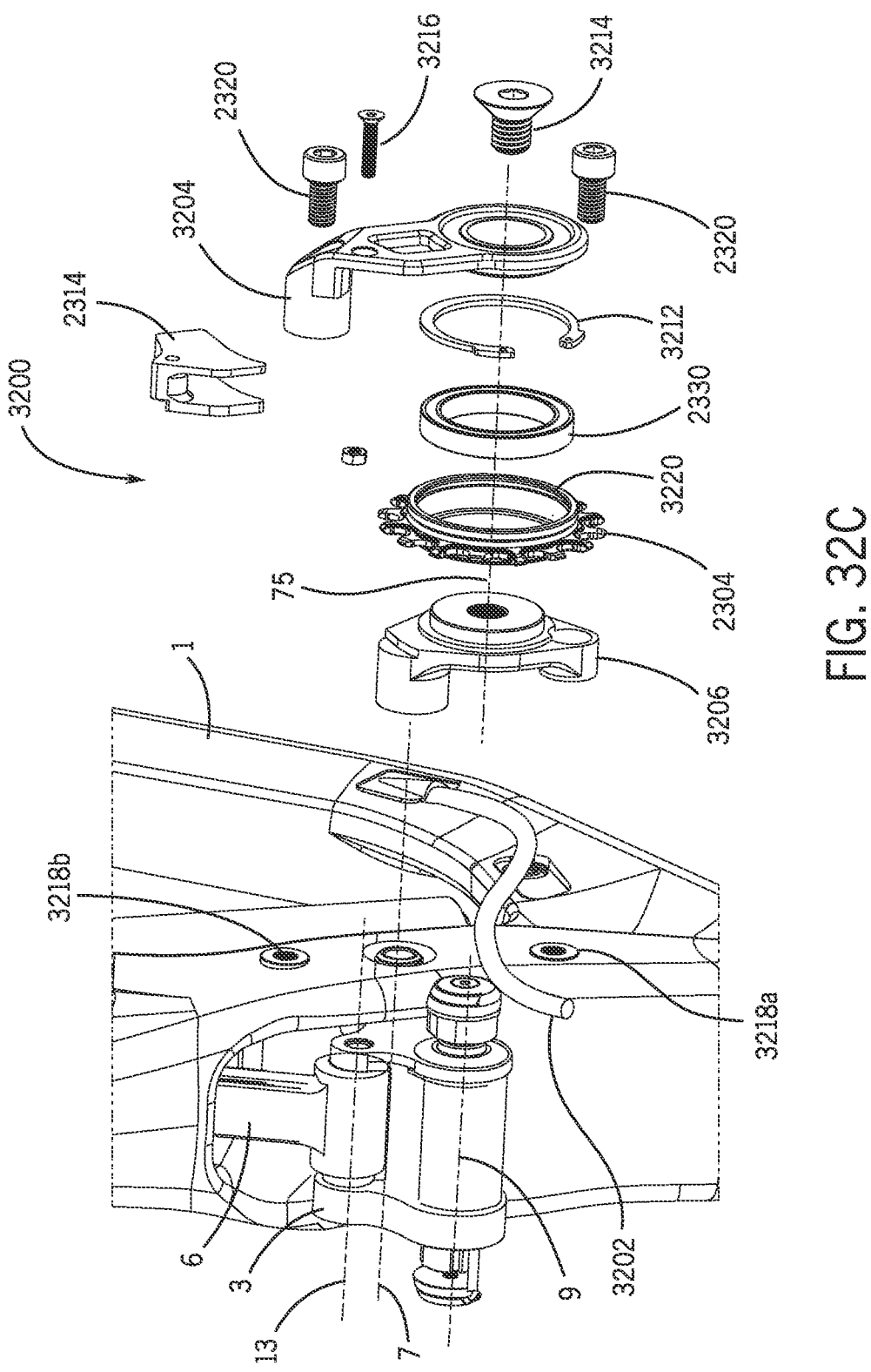
FIG. 32C is a partial exploded view of the idler assembly of FIG. 32A.

With reference to FIG. 32C, the idler assembly 3200 may include an inner bracket 3206 and an outer bracket 3204 that form an idler mount. The cog 2304 and the bearing 2330 may be captive between the inner bracket 3206 and the outer bracket 3204. The idler assembly 3200 may include a resilient member 3212 that secures the bearing 2330 to the cog 2304. For example, the cog 2304 may include a groove 3220 formed therein and suitable sized to receive the resilient member 3212. In some examples, the resilient member 3212 is a circlip, c-clip, snap ring, or other type of spring.

Either of the outer bracket 3204 or the inner bracket 3206 may include a provision for mounting a guide 2314 configured to guide the flexible element (e.g., chain or belt) that passes around the cog 2304. For example, the outer bracket 3204 may include an aperture that receives a fastener 3216 that couples the guide 2314 to the respective inner bracket 3206 or outer bracket 3204. The fastener 3216 may threadedly couple to a nut or to internal threads 3272 formed in the outer bracket 3204 or inner bracket 3206.

Figure 32D:
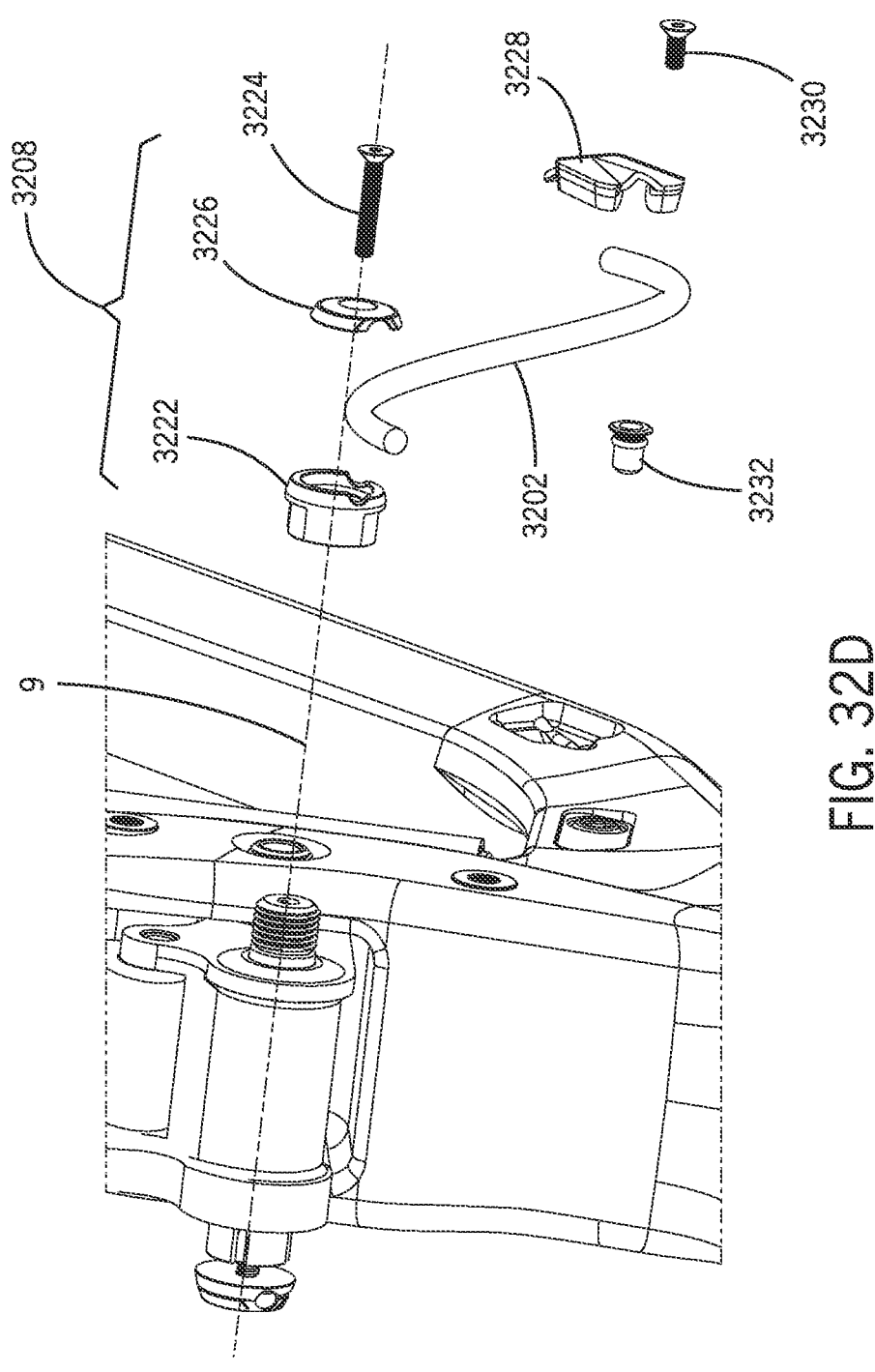
FIG. 32D is a partial exploded view of the idler assembly of FIG. 32A.

With reference to FIG. 32D, the cable 3202 may be supported by one or more clamps 3208. The clamp 3208 may include an inner portion 3222. The clamp 3208 may include an outer portion 3226. The inner portion 3222 may include threads to threadedly couple the inner portion 3222 to mating threads of a suspension link axle, such as the axle forming the IVC[3][4] 9. The inner portion 3222 and the outer portion 3226 may include portions of a passage that together receive the cable 3202. The inner portion 3222 and outer portion 3226 may be coupleable to one another by a fastener 3230, such as a countersink screw. The cable 3202 may also be supported by a plate 3228 secured to an anchor 3232 coupled to or formed with the suspended body 1. The clamp 3208 and the plate 3228 may help route the cable 3202 through the passage 3210 to help ensure smooth cable operation.

Figures 32E, 32F:
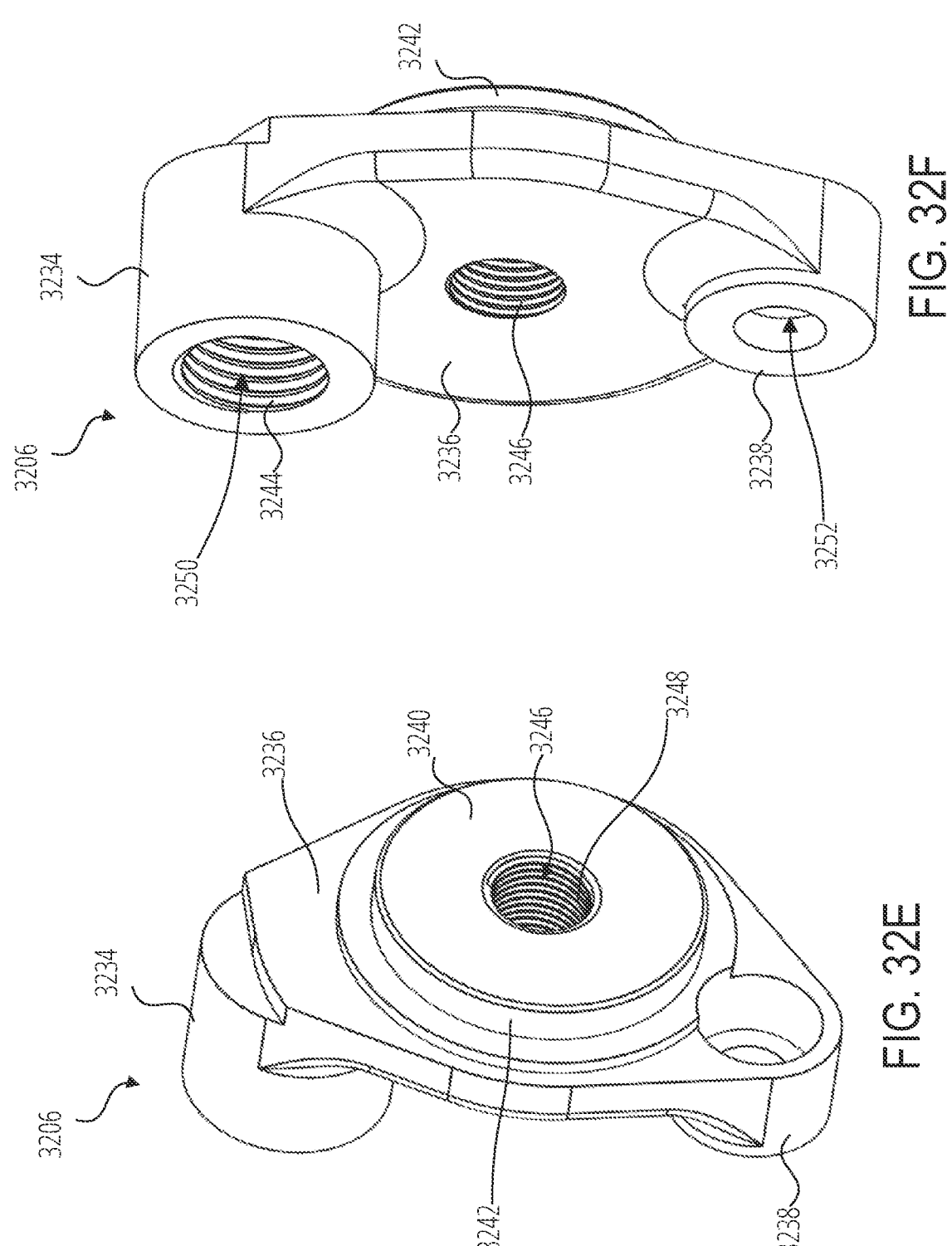
FIG. 32E is an isometric view of an embodiment of an inner bracket of the idler assembly of FIG. 32A.
FIG. 32F is an isometric view of an embodiment of an inner bracket of the idler assembly of FIG. 32A.

With reference to FIG. 32E and FIG. 32F, the inner bracket 3206 may have a body 3236, such as a substantially planar body 3236. The body 3236 may have a first boss 3234 extending from a portion thereof. The first boss 3234 may extend away from the planar body 3236 in a transverse direction 105. The first boss 3234 may be a substantially cylindrical shape. The first boss 3234 may have an aperture 3250 formed therein. The aperture 3250 may be a blind aperture or may be a through aperture. The aperture 3250 may have threads 3244 formed on an internal surface thereof. The threads 3244 may be compatible and threadedly couplable to the threads on a suspension pivot axle, such as the threads 2350 of an axle that forms an IVC[1][3] 7.

A second boss 3240 may extend from the planar body 3236 in a transverse direction 105 opposite the direction the first boss 3234 and third boss 3238 extend. The second boss 3240 may be substantially cylindrical. The second boss 3240 may have a circumferential face 3242. An aperture 3246 may be formed in the second boss 3240 and may pass through the body 3236, or may pass partially into the body (may be a blind aperture). The aperture 3246 may have threads 3248 formed therein. The threads 3248 may be configured to threadedly couple to the threads of a fastener 3214, such as a countersink screw.

A third boss 3238 may extend from a portion of the planar body 3236. The body 3236 may be substantially cylindrical and may be disposed on the planar body 3236 at a portion opposite the first boss 3234. The third boss 3238 may extend from in the transverse direction 105. The third boss 3238 may have a through or blind aperture 3252 formed therein or therethrough. The aperture 3252 may, or may not, have threads formed therein.

Figures 32G, 32H:
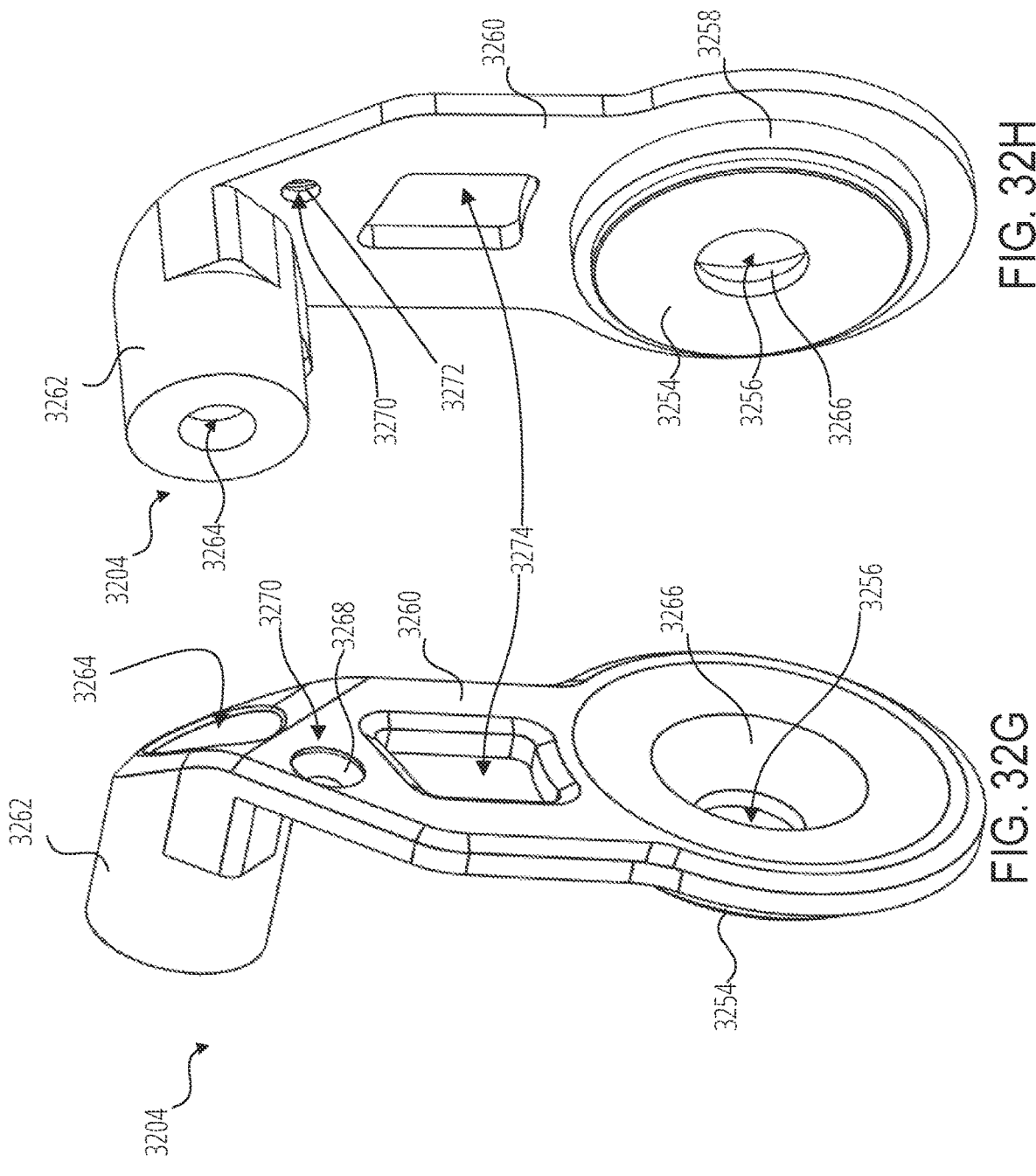

With reference to FIG. 32G and FIG. 32H, the outer bracket 3204 may be formed of a body 3260, such as a substantially planar body 3260. A first boss 3262 may extend from the body 3260, e.g., in a transverse direction 105. An aperture 3264 may be formed in the first boss 3262. The aperture 3264 may include threads or, as in the example shown, may not be threaded. The aperture 3264 may be a blind or through aperture.

An aperture 3270 may be formed in the body 3260 proximate to the first boss 3234. The aperture 3270 may have a conical face 3268 formed therewith, such as to receive the head of the fastener 3216.

A second boss 3254 may extend from the planar body 3260 in a transverse direction 105. The second boss 3254 may extend in the same or opposite direction as the first boss 3262. The second boss 3254 may be substantially cylindrical. The second boss 3254 may have a circumferential face 3258. An aperture 3256 may be formed in the second boss 3254 and may pass through the body 3260, or may pass partially into the body 3260 (may be a blind aperture). The aperture 3256 may have threads formed therein, or as shown, may be unthreaded. A conical face 3266 may be formed in the body 3260 proximate to the aperture 3256. The conical face 3266 may be suitable to receive the head of a fastener such as the fastener 3214. A window 3274 may be formed in the body 3260 such as to lighten the outer bracket 3204.

The inner bracket 3206 and the outer bracket 3204 may be releasably secured to the suspended body 1 by one or more fasteners such as one or more fasteners 2320 configured to thread into anchors anchor 3218a/b formed in, with, or coupled to the suspended body 1. Additionally, or alternately, the inner bracket 3206 and/or outer bracket 3204 may releasably mount to one or more suspension pivots such as at an IVC. In the example shown, the threads 3244 of the aperture 3250 formed on the inner bracket 3206 may threadedly mount to the axle that forms the IVC[1][3] 7. The aperture 3252 formed in the third boss 3238 may receive a fastener 2320 that threadedly couples to the anchor 3218a. The aperture 3264 formed in the first boss 3262 of the outer bracket 3204 may receive a fastener 2320 that threadedly couples to the anchor 3218b. The fastener 3214 may pass through the aperture 3256 formed in the second boss 3254 of the outer bracket 3204 and threadedly engage the threads formed in the threads 3248 of the aperture 3246 formed in the second boss 3240 of the inner bracket 3206. Thus, in the idler assembly 3200 shown, both the inner bracket 3206 and the outer bracket 3204 are supported at two locations. In other embodiments, either or both the inner and/outer brackets may be supported in only one location. In other embodiments still, one of the inner or outer brackets may be omitted.

When assembled, the second boss 3240 and the second boss 3254 may be placed in a facing relationship such that the circumferential face 3242 and the circumferential face 3258 together form an idler mount structure suitable to receive an inner race 2360 of the bearing 2330. The outer race 2362 of the bearing may be coupled to the cog 2304 as previously described, such that the cog 2304 may rotate as the flexible element passes thereover.

Figure 33A:
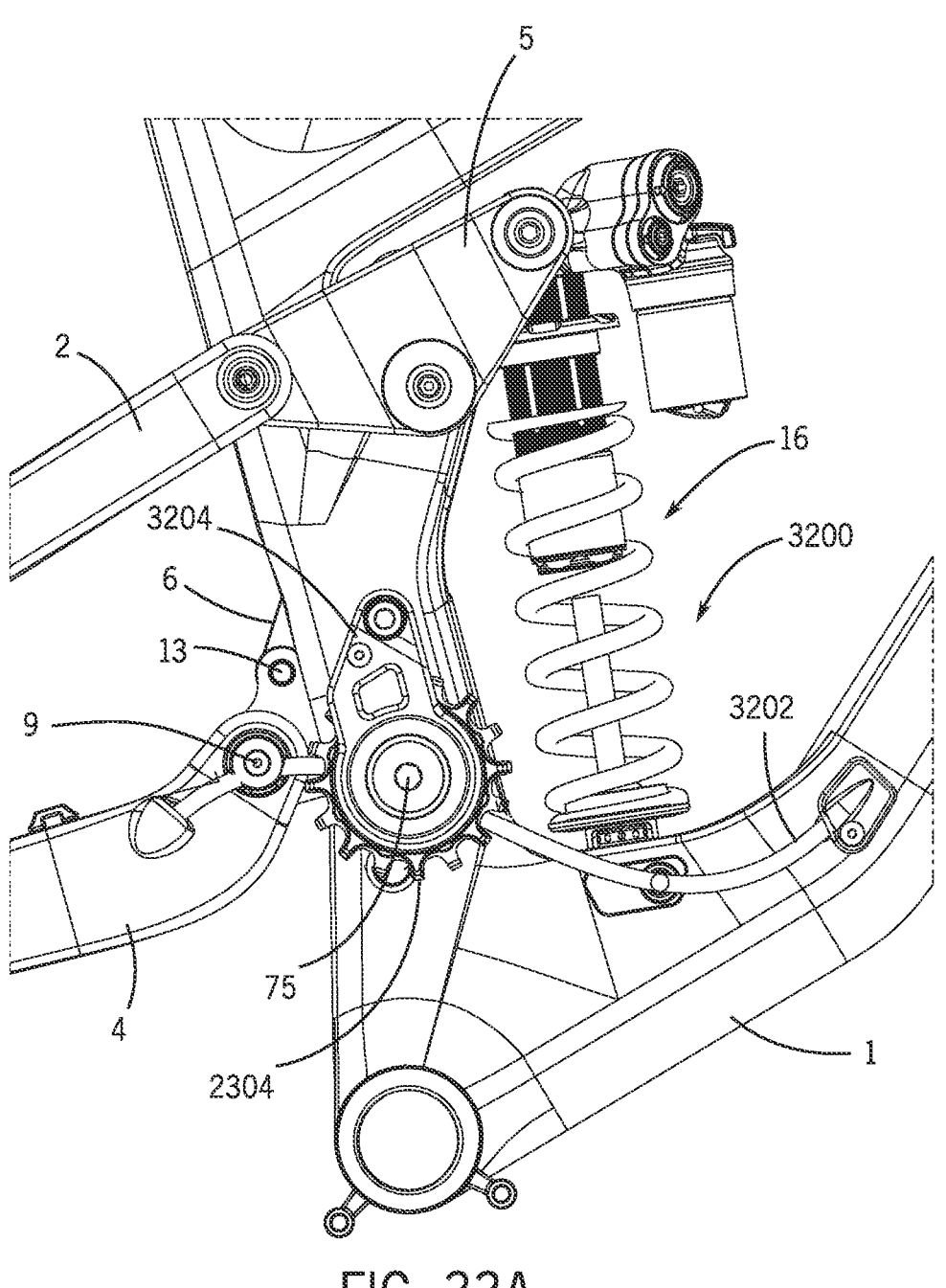
Figure 33B:
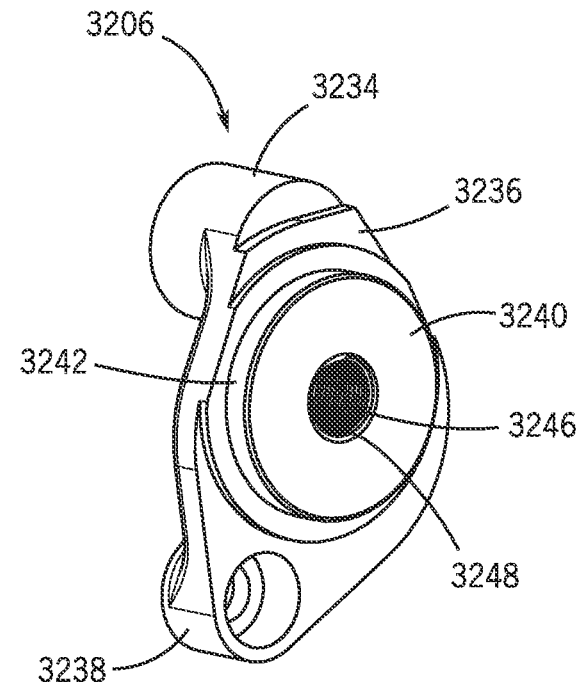
Figure 33C:
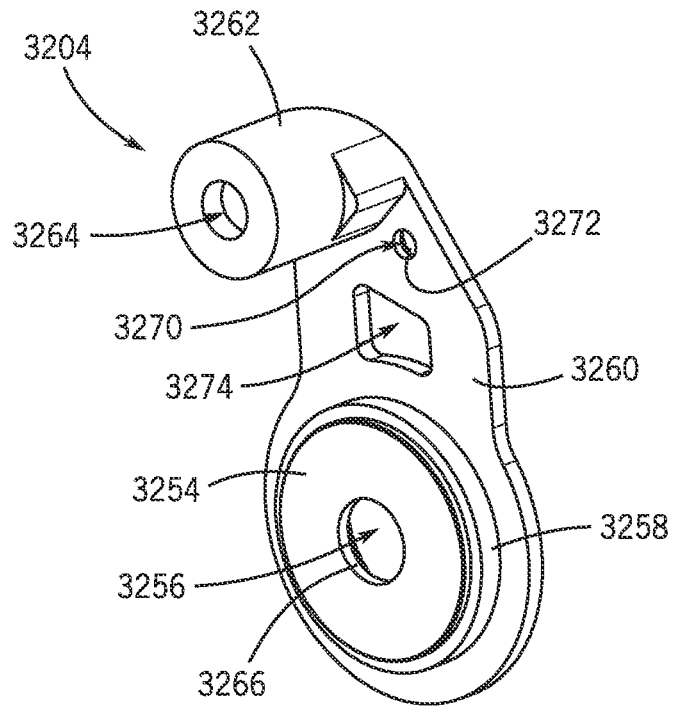

The idler assembly 3200 may be used to reconfigure the position of the idler, for example to tune suspension performance such as anti-squat. For example, as shown in FIG. 33A-FIG. 33C, the inner bracket 3206 and outer bracket 3204 may be replaced with respective inner and outer brackets that have respective second bosses in different locations than the locations shown in FIG. 32A-FIG. 32H. Thus, the location of the idler cog 2304 can be moved with respect to the IVCs of the suspension without changing the underlying anchor points of the idler assembly 3200, for example to tune suspension performance. In some embodiments, a portion of the idler may overlap with an IVC. Examples of such performance tuning are provided in FIG. 34A-FIG. 34E and are discussed further below.

Figure 34A:
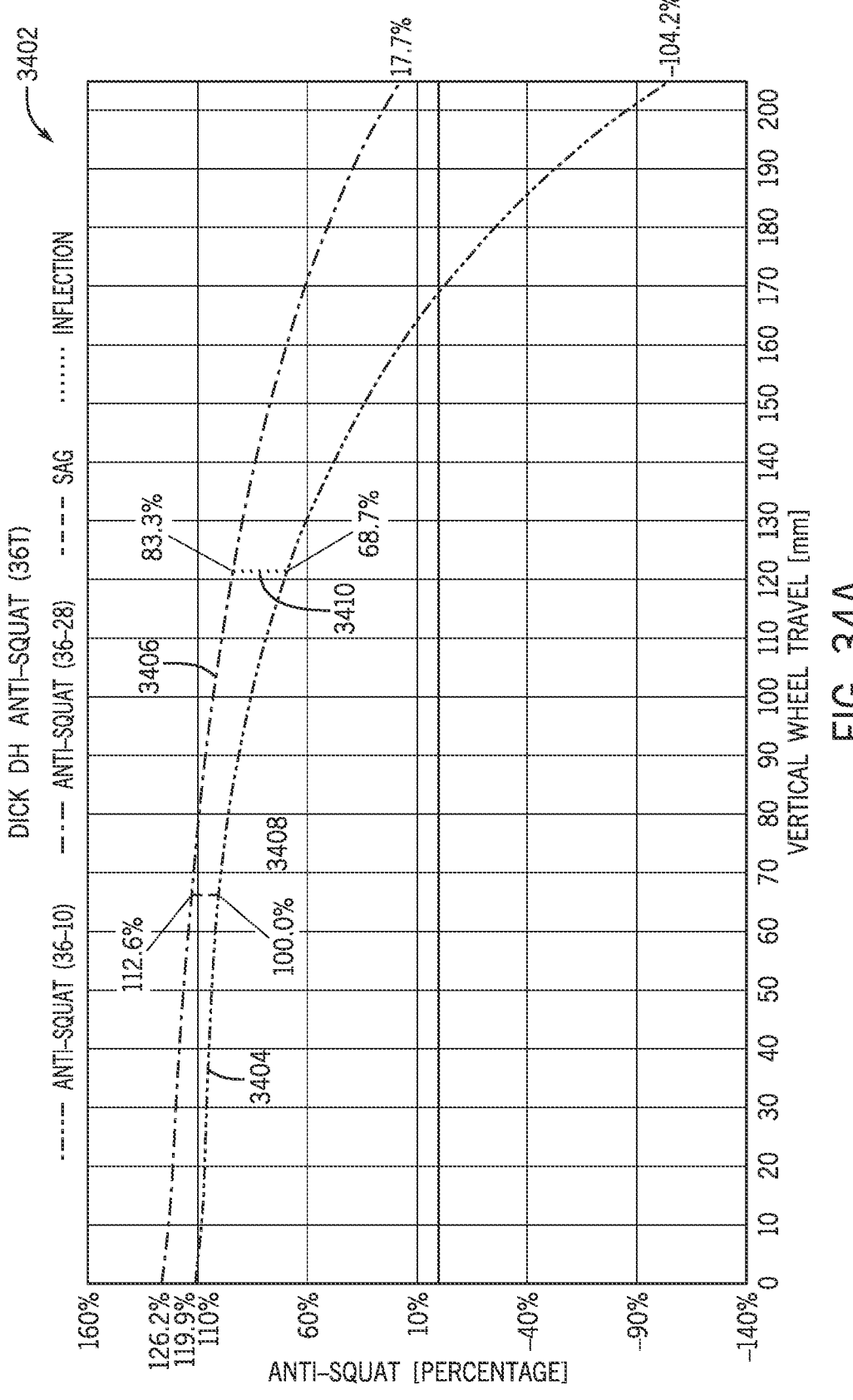

FIG. 34A-FIG. 34E show examples of an effect of moving any of the idler mounts disclosed herein with respect to the suspended body 1, or one or more IVCs of the suspension. For example, changing the idler position may change the anti-squat performance of the suspension linkage. It may be desirable to change anti-squat for different riders, terrain, trails, surface conditions, or for ascending vs. descending. FIG. 34A depicts an anti-squat curve 3402 as a function of vertical wheel travel for an idler cog 2304 in a nominal position. The anti-squat curve 3402 shows anti-squat for a first derailleur position 3404 and a second derailleur position 3406 when the derailleur is at an opposite side of a rear cog cassette. Other anti-squat curves may exist between the first derailleur position 3404 and the second derailleur position 3406 for other selected cogs on the rear cassette. The point 3408 shows an example range of the anti-squat when the suspension is partially compressed. The point 3410 illustrates an example of the anti-squat at an inflection point where a link of the suspension linkage reverses as the suspension is compressed from an at least partially extended state to an at least partially compressed state.

Figure 34B:
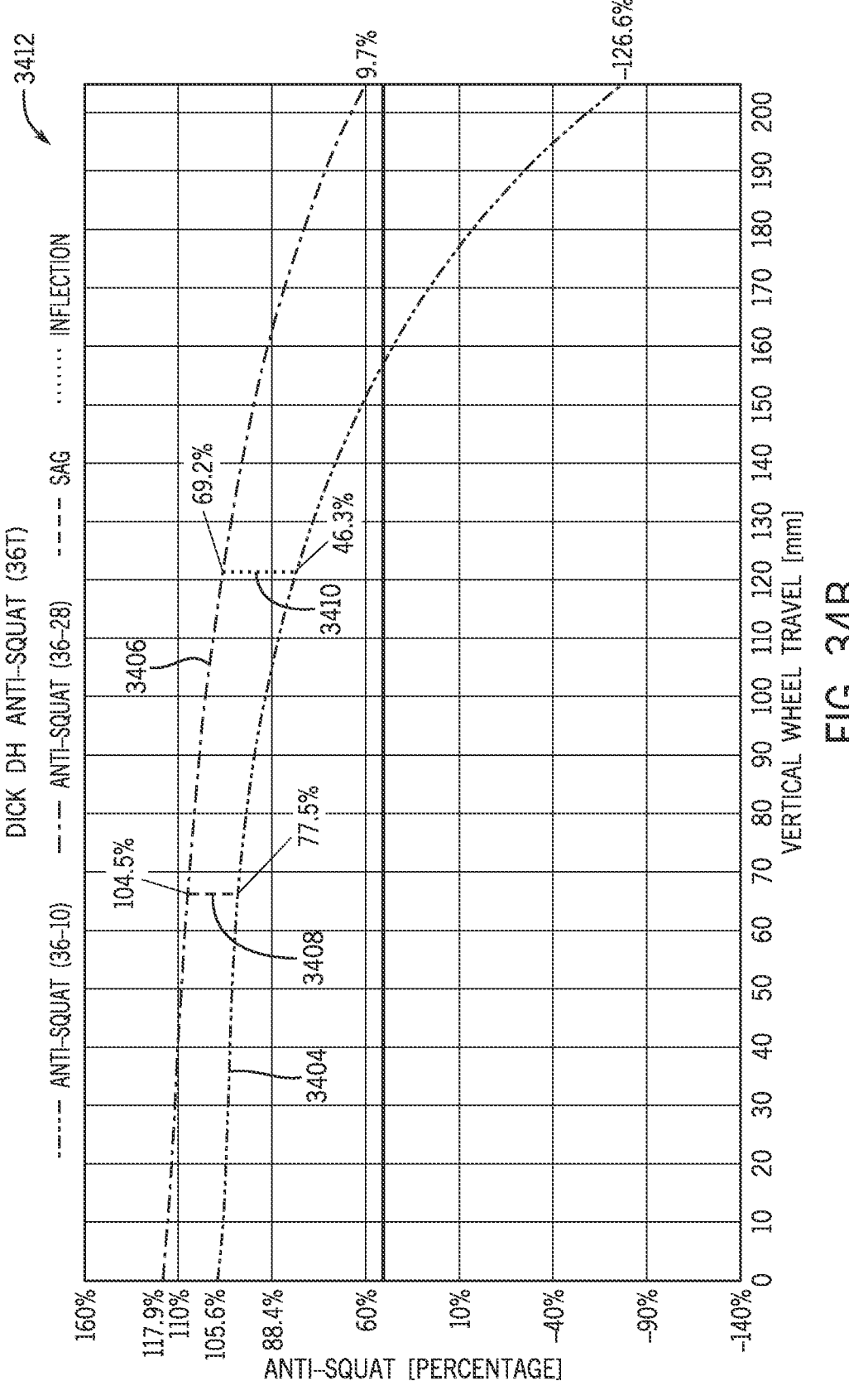
Figure 34C:
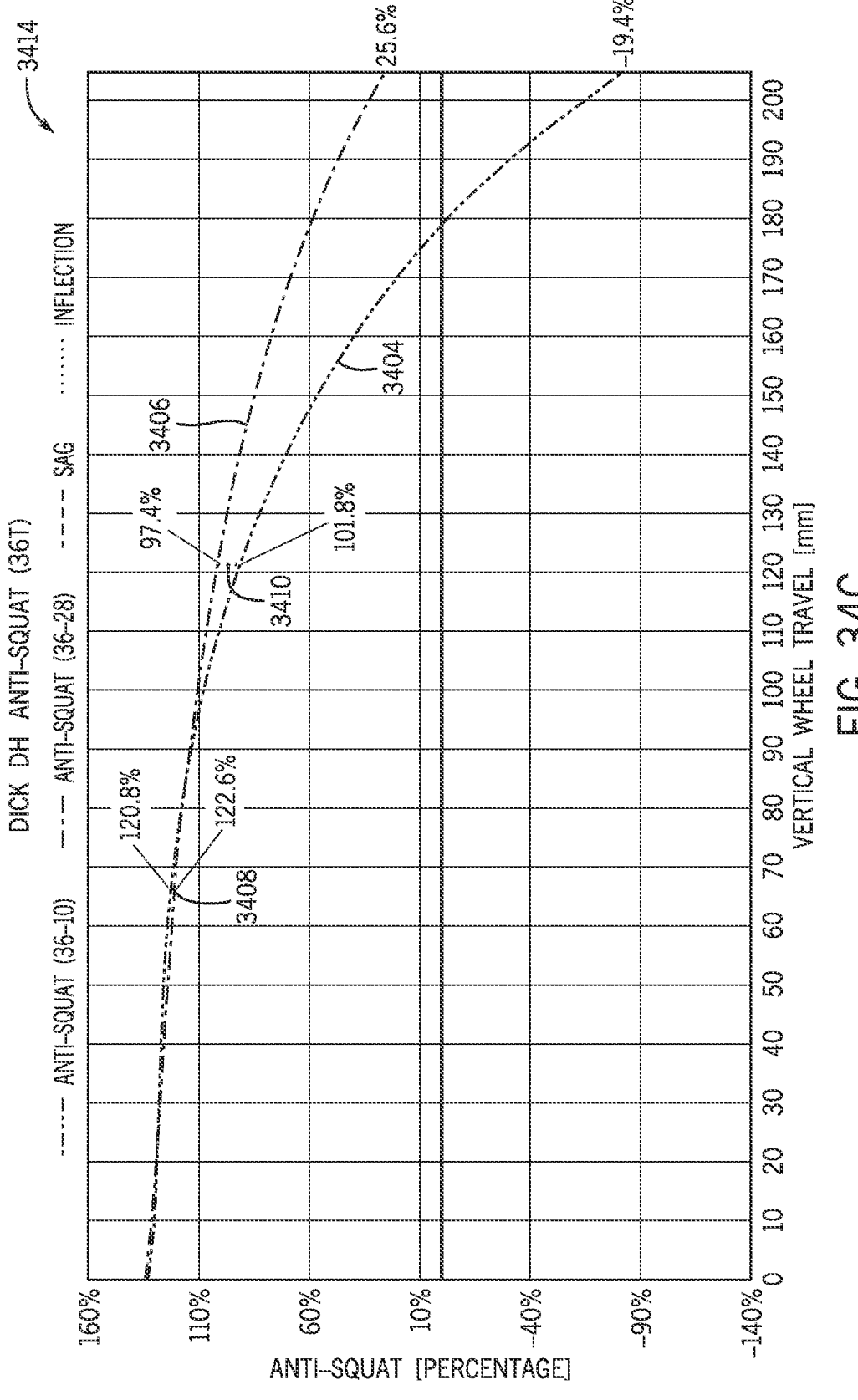
Figure 34D:
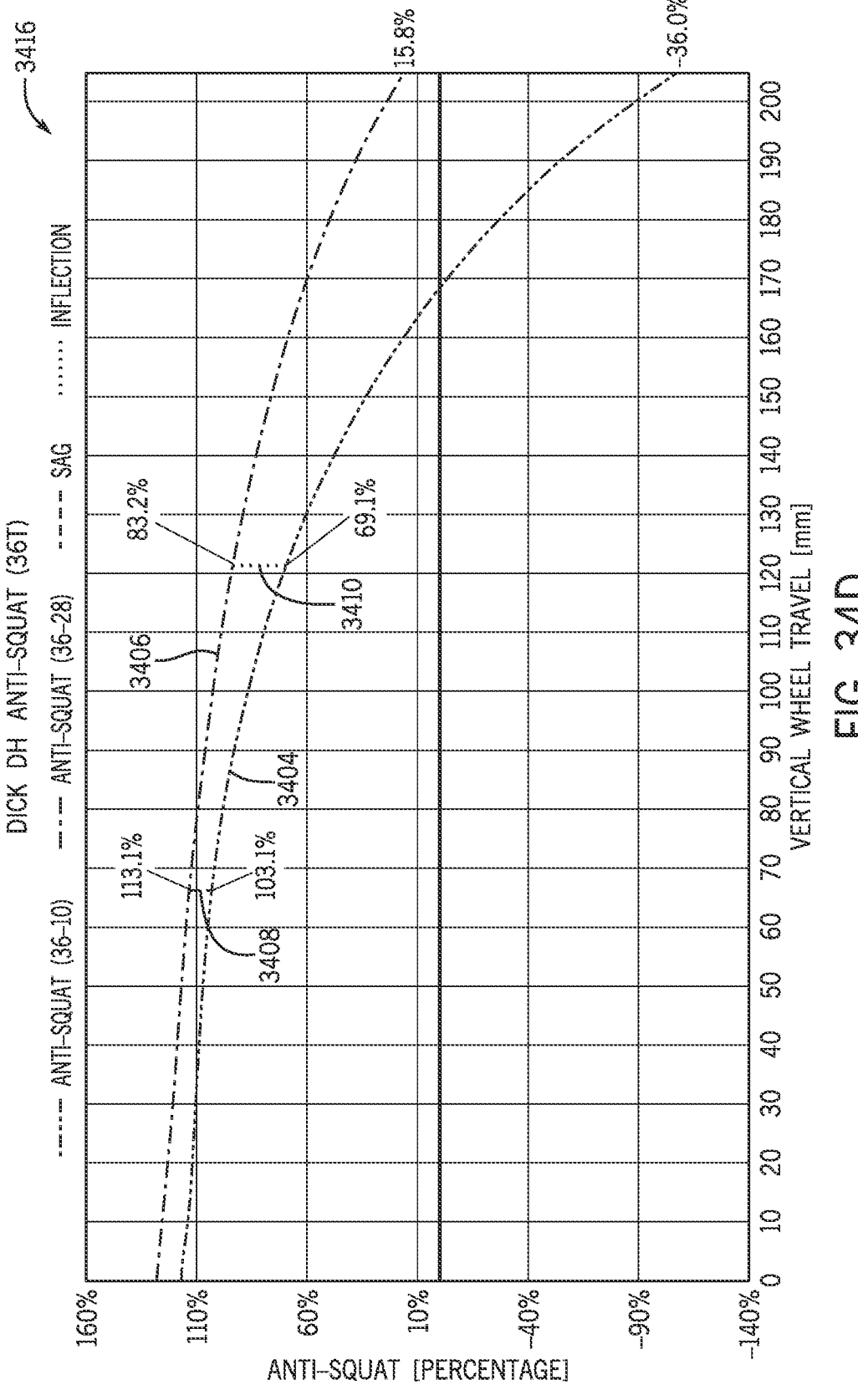
Figure 34E:
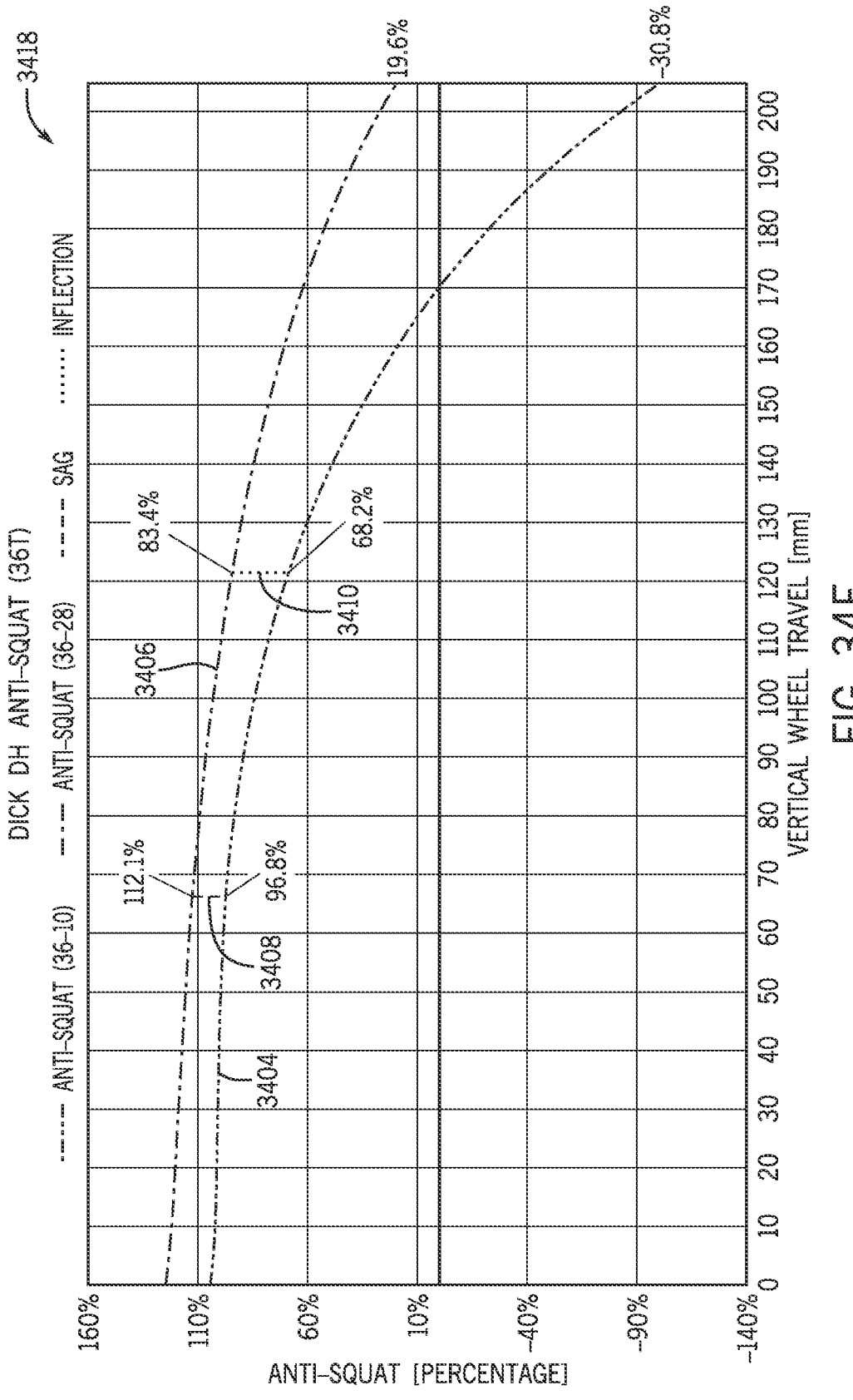

The anti-squat curve 3412 in FIG. 34B shows an example where the cog 2304 has been reconfigured upward 5-mm from the position in the anti-squat curve 3402 in FIG. 32A. In the anti-squat curve 3412, the range of anti-squat behavior is greater at both the point 3408 and the point 3410 compared to the anti-squat curve 3412.

The anti-squat curve 3414 shows an example where the cog 2304 has been reconfigured downward 5-mm from the position in the anti-squat curve 3402 in FIG. 32A. In the anti-squat curve 3414, the anti-squat at the 3048 is nearly the same regardless of derailleur position. Such a configuration may be beneficial where a rider prefers consistent anti-squat behavior regardless of what gear the bicycle is in.

The anti-squat curve 3416 shows an example where the cog 2304 has been reconfigured forward 5-mm from the position in the anti-squat curve 3402 in FIG. 32A. The anti-squat curve 3416 shows an example where the cog 2304 has been reconfigured rearward 5-mm from the position in the anti-squat curve 3402 in FIG. 32A. Again, the anti-squat curve 3416 and anti-squat curve 3418 exhibit different anti-squat behavior from the other curves where the cog 2304 is in other positions.

Note that in all figures, "-E" denotes the extended state, "-C" denotes the compressed state, "-X" denotes a state between extended and compressed. These are only labeled at rear wheel axis 14 for clarity. Rear wheel axis 14-E at the extended state, 14-C at the compressed state, and 14-X at a position between the extended state and the compressed state are shown in figures throughout.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. For example, while some embodiments specify particular relationships between parts of the system, other relationships are contemplated. It is also contemplated that steps to any disclosed method may be performed in any order. It is intended that all matter contained in the above description and shown in the accompanying drawings shall be interpreted as illustrative only of particular embodiments and not limiting. Changes in detail or structure may be made without departing from the basic elements of the invention as defined in the following claims.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An idler assembly for a two-wheeled vehicle comprising:
   an idler mount on a suspended body of a two-wheeled vehicle, the idler mount defining a selectively positionable idler axis; and
   a cog configured to rotate about the idler axis, wherein the idler axis is selectively positionable by removing the idler mount from the idler assembly and installing a second idler mount defining a second idler axis about which the cog is configured to rotate.

2. The idler assembly of claim 1, wherein the idler axis or the second idler axis is selectively positionable within two or fewer degrees of freedom.

3. The idler assembly of claim 2, wherein the idler mount or the second idler mount is reconfigurable to move the respective idler axis or second idler axis with one or fewer degrees of freedom with respect to the suspended body.

4. The idler assembly of claim 3, wherein the idler mount or second idler mount includes a first plurality of cam surfaces and a second plurality of cam surfaces formed in respective slots formed in the respective idler mount or second idler mount.

5. The idler assembly of claim 4, wherein the idler mount or the second idler mount is releasably securable to two anchors associated with the suspended body by respective fasteners that guide the respective idler mount or second idler mount along the respective first and second plurality of cam surfaces.

6. The idler assembly of claim 3, wherein the idler mount or the second idler mount includes one or more curved cam surfaces formed therein.

7. The idler assembly of claim 1, wherein the idler axis or the second idler axis is separate from an instantaneous velocity center of a suspension linkage of the vehicle.

8. The idler assembly of claim 1, wherein the idler axis or the second idler axis is independently moveable with respect to an instantaneous velocity center of a suspension linkage of the vehicle.

9. The idler assembly of claim 1, wherein the idler axis or the second idler axis is moveable to a position where at least a portion of the idler overlaps with an IVC of a suspension linkage of the vehicle.

10. The idler assembly of claim 1, wherein the idler axis or the second idler axis is moveable to a position concentric with an IVC of a suspension linkage of the vehicle.

11. The idler assembly of claim 1, wherein the idler mount or the second idler mount is reconfigurable within a plane defined by a vertical direction and a longitudinal direction of the vehicle.

12. The idler assembly of claim 1, wherein the idler mount or the second idler mount includes one or more cam surfaces formed therein.

13. The idler assembly of claim 12, wherein the idler mount or the second idler mount is releasably securable to an anchor associated with the suspended body by a fastener that guides the respective idler mount or second idler mount along the one or more cam surfaces.

14. The idler assembly of claim 1, wherein the one or more cam surfaces are formed in a slot formed in the idler mount or the second idler mount.

15. The idler assembly of claim 1, wherein the idler mount or the second idler mount is reconfigurable to move the respective idler axis or second idler axis to at least two discrete positions with respect to the suspended body.

16. The idler assembly of claim 1, wherein selectively positioning the idler axis affects a performance characteristic of a suspension linkage.

17. An idler assembly for a two-wheeled vehicle comprising:
   an idler mount on a suspended body of a two-wheeled vehicle, the idler mount defining a selectively positionable idler axis; and
   a cog configured to rotate about the idler axis, wherein the idler mount comprises:
      an inner bracket including a first boss having a first face;
      an outer bracket including a second boss having a second face, wherein the first and second faces are arranged in a facing relationship to form an idler mount structure suitable to receive an inner race of a bearing, and the cog is coupled to an outer race of the bearing.

18. An idler assembly for a two-wheeled vehicle comprising:
   a cog configured to rotate about an idler axis;
   an idler mount selectively positionable on a suspended body of the two-wheeled vehicle, the idler mount including:
      an inner bracket including a first boss having a first face;
      an outer bracket including a second boss having a second face, wherein:
         the first and second faces are arranged in a facing relationship to form a structure suitable to receive an inner race of a bearing, and
         the cog is coupled to an outer race of the bearing.

* * * * *